(12) United States Patent
Lee et al.

(10) Patent No.: US 9,749,667 B2
(45) Date of Patent: Aug. 29, 2017

(54) METHOD FOR RECEIVING BROADCAST SERVICE AND RECEPTION DEVICE THEREOF

(71) Applicants: Joonhui Lee, Seoul (KR); Gomer Thomas, Princeton Junction, NJ (US); Kyoungsoo Moon, Seoul (KR); Jinpil Kim, Seoul (KR); Kyungho Kim, Seoul (KR); Sanghyun Kim, Seoul (KR)

(72) Inventors: Joonhui Lee, Seoul (KR); Gomer Thomas, Princeton Junction, NJ (US); Kyoungsoo Moon, Seoul (KR); Jinpil Kim, Seoul (KR); Kyungho Kim, Seoul (KR); Sanghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/047,183

(22) Filed: Feb. 18, 2016

(65) Prior Publication Data

US 2016/0255377 A1 Sep. 1, 2016

Related U.S. Application Data

(63) Continuation of application No. 14/346,541, filed as application No. PCT/KR2012/007364 on Sep. 14, 2012, now Pat. No. 9,288,554.

(Continued)

(51) Int. Cl.
*H04N 7/173* (2011.01)
*H04N 21/2362* (2011.01)
(Continued)

(52) U.S. Cl.
CPC ........... *H04N 21/2362* (2013.01); *H04N 7/08* (2013.01); *H04N 7/0885* (2013.01); *H04N 7/173* (2013.01);
(Continued)

(58) Field of Classification Search
CPC ........... H04N 21/47214; H04N 21/472; H04N 21/23617
See application file for complete search history.

(56) References Cited

U.S. PATENT DOCUMENTS 6,507,727 B1 * 1/2003 Henrick ................. G06Q 30/06
348/E7.071
7,646,828 B2 1/2010 Song et al.
(Continued)

FOREIGN PATENT DOCUMENTS

CN 101690197 A 3/2010
JP 2008118654 5/2008
(Continued)

*Primary Examiner* — Pankaj Kumar
*Assistant Examiner* — Timothy Newlin
(74) *Attorney, Agent, or Firm* — Dentons US LLP

(57) ABSTRACT

A broadcast service receiving method of a broadcast receiving device provided. The method includes: receiving a trigger including location information of a bookmark target object; extracting the location information of the bookmark target object from the trigger; receiving bookmark target object related information including bookmark signaling data by using the location information of the bookmark target object; extracting the bookmark signaling data from the bookmark target object related information; when the bookmark signaling data is extracted, displaying that a bookmark target object is able to be bookmarked; when a user input for bookmarking the bookmark target object is received, saving the location information of the bookmark (Continued)

target object; and displaying location information of a saved bookmark target object at a predetermined time.

3 Claims, 159 Drawing Sheets

Related U.S. Application Data

(60) Provisional application No. 61/538,150, filed on Sep. 23, 2011.

(51) Int. Cl.
| H04N 21/43 | (2011.01) |
| H04N 21/488 | (2011.01) |
| H04N 21/858 | (2011.01) |
| H04N 7/088 | (2006.01) |
| H04N 21/472 | (2011.01) |
| H04N 7/08 | (2006.01) |
| H04N 21/8358 | (2011.01) |
| H04N 21/845 | (2011.01) |

(52) U.S. Cl.
CPC ... *H04N 21/4307* (2013.01); *H04N 21/47214* (2013.01); *H04N 21/4884* (2013.01); *H04N 21/8358* (2013.01); *H04N 21/8455* (2013.01); *H04N 21/858* (2013.01); *H04N 21/8586* (2013.01)

(56) References Cited

U.S. PATENT DOCUMENTS

| 2002/0007485 A1* | 1/2002 | Rodriguez | H04N 5/44543 725/1 |
| 2002/0056129 A1* | 5/2002 | Blackketter | H04N 5/44 725/112 |
| 2002/0059610 A1* | 5/2002 | Ellis | H04N 5/44543 725/58 |
| 2002/0099800 A1* | 7/2002 | Brainard | H04L 29/06027 709/219 |
| 2002/0162118 A1* | 10/2002 | Levy | H04N 7/088 725/110 |
| 2002/0174430 A1* | 11/2002 | Ellis | G11B 27/005 725/46 |
| 2003/0115595 A1* | 6/2003 | Stevens | H04N 7/163 725/32 |
| 2003/0126611 A1* | 7/2003 | Chernock | H04N 7/165 725/105 |
| 2004/0021793 A1* | 2/2004 | Takatori | H04H 20/93 348/461 |
| 2005/0166258 A1* | 7/2005 | Vasilevsky | G11B 27/00 725/138 |
| 2005/0210145 A1* | 9/2005 | Kim | G06F 17/30849 709/231 |
| 2005/0235319 A1* | 10/2005 | Carpenter | H04N 5/44543 725/52 |
| 2007/0300263 A1* | 12/2007 | Barton | G06Q 30/0241 725/60 |
| 2008/0101760 A1 | 5/2008 | Waller | |
| 2009/0055883 A1* | 2/2009 | Lee | H04N 21/4334 725/105 |
| 2009/0183201 A1* | 7/2009 | Dasgupta | G09B 7/00 725/40 |
| 2009/0254823 A1* | 10/2009 | Barrett | H04N 21/235 715/716 |
| 2010/0082681 A1* | 4/2010 | Adimatyam | G11B 27/32 707/784 |
| 2011/0138432 A1* | 6/2011 | Mitra | H04N 21/443 725/109 |
| 2011/0289135 A1* | 11/2011 | Soldan | G06Q 30/0277 709/203 |
| 2012/0030554 A1* | 2/2012 | Toya | H04N 7/17318 715/206 |
| 2013/0198642 A1* | 8/2013 | Carney | G06F 3/0484 715/738 |
| 2013/0258191 A1* | 10/2013 | Eyer | H04N 7/0882 348/468 |
| 2013/0340007 A1* | 12/2013 | Eyer | H04N 21/8133 725/40 |
| 2014/0250479 A1 | 9/2014 | Lee et al. | |

FOREIGN PATENT DOCUMENTS

| KR | 1020090021111 | 2/2009 |
| KR | 1020090127826 | 12/2009 |
| WO | 2011038012 A2 | 3/2011 |

* cited by examiner

FIG.5

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for)i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG.6

| service_type | Meaning |
|---|---|
| 0x00 | [Reserved] |
| 0x01 | analog_television – The virtual channel carries analog television programming |
| 0x02 | ATSC_digital_television – The virtual channel carries television programming (audio, video and optional associated data) conforming to ATSC standards |
| 0x03 | ATSC_audio – The virtual channel carries audio programming (audio service and optional associated data) conforming to ATSC standard s. |
| 0x04 | ATSC_data_only_service – The virtual channel carries a data service conforming to ATSC standards, but no video of stream_type 0x02 or audio of stream_type 0x81. |
| 0x05-0x3F | [Reserved for future ATSC use] |

FIG.7

| Value | Meaning |
|---|---|
| 0x00 | [ Reserved ] |
| 0x01 | Analog_television-The virtual channel carries analog television programming |
| 0x02 | ATSC_digital_television-The virtual channel carries television programming (audio, video and optional data) conforming to ATSC standards. |
| 0x03 | ATSC_audio-The virtual channel carries audio programming (audio service and optional data) conforming to ATSC standards. |
| 0x04 | ATSC_data_only_service-The virtual channel carries a data service conforming to ATSC standards, but no video of stream_type 0x02 or audio of stream_type 0x81. |
| 0x05 | Software Download Data Service see A/97 |
| 0x06 | Unassociated/small screen service see A/65C Amendment 1 |
| 0x07 | Parameterized Service New A/V CODEC |
| 0x08 | ATSC_nrt_service-The virtual channel carries a NRT service conforming to ATSC standards. |
| 0x09-0x7F | [ Reserved for future ] |
| 0x80-0xFF | [ User Private ] |

FIG.8

| Syntax | No. of bits | Format |
|---|---|---|
| data_service_table_section() { | | |
|     table_id | 8 | 0xCF |
|     section_syntax_indicator | 1 | bslbf |
|     private_indicator | 1 | bslbf |
|     reserved | 2 | '11' |
|     private_section_length | 12 | uimsbf |
|     table_id_extension | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     data_service_table_bytes() | | |
|     CRC_32 | 32 | rpchof |
| } | | |
| Syntax | No. of bits | Format |
| data_service_table_bytes() { | | |
|     sdf_protocol_version | 8 | uimsbf |
|     application_count_in_section | 8 | uimsbf |
|     if( application_count_in_section > 0 ) { | | |
|         for( j = 0; j <application_count_in_section; j++) { | | |
|         compatibility_descriptor() | | |
|         app_id_byte_length | 16 | uimsbf |
|         if(app_id_byte_length > 1) { | | |
|             app_id_description | 16 | uimsbf |
|             for(i=0;i< app_id_byte_length-2;i++) { | | |
|                 app_id_byte | 8 | bslbf |
|             } | | |
|         } | | |
|         tap_count | 8 | uimsbf |
|         for( i = 0; i < tap_count; i++) { | | |
|             protocol_encapsulation | 8 | uimsbf |
|             action_type | 7 | uimsbf |
|             resource_location | 1 | bslbf |
|             Tap() | | |
|             tap_info_length | 16 | uimsbf |
|             for( k=0; k<N; k++) { | | |
|                 descriptor() | | |
|             } | | |
|         } | | |
|         app_info_length | 16 | uimsbf |
|         for( i=0; i< M; i++) { | | |
|             descriptor() | | |
|         } | | |
|         app_data_length | 16 | uimsbf |
|         for( i = 0; i < app_data_length; i++) { | | |
|             app_data_byte | 8 | bslbf |
|         } | | |
|     } | | |
|     } | | |
|     service_info_length | 16 | uimsbf |
|     for(j=0; j<K;j++) { | | |
|         descriptor() | | |
|     } | | |
|     service_private_data_length | 16 | uimsbf |
|     for( j = 0; j < service_private_data_length; j++) { | | |
|         service_private_data_byte | 8 | bslbf |
|     } | | |
| } | | |

FIG.12

| Syntax | No. of Bits | Format |
|---|---|---|
| NRT_service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         NST_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     reserved | 4 | '1111' |
|     carrier_frequency | 32 | uimsbf |
|     channel_TSID | 16 | uimsbf |
|     program_number | 16 | uimsbf |
|     source_id | 16 | uimsbf |
|     num_NRT_services | 8 | uimsbf |
|     for (i=0; i<num_NRT_services; i++) | | |
|     { | | |
|         reserved | 4 | '1111' |
|         NRT_service_status | 2 | uimsbf |
|         SP_indicator | 1 | bslbf |
|         CP_indicator | 1 | bslbf |
|         NRT_service_id | 16 | uimsbf |
|         short_NRT_service_name | 8*8 | |
|         reserved | 2 | '11' |
|         NRT_service_category | 6 | uimsbf |
|         num_components | 5 | uimsbf |
|         IP_version_flag | 1 | bslbf |
|         source_IP_address_flag | 1 | bslbf |
|         NRT_service_destination_IP_address_flag | 1 | bslbf |
|         if (source_IP_address_flag) | | |
|             source_IP_address | 32 or 128 | uimsbf |
|         if (NRT_service_destination _IP_address_flag) | | |
|             NRT_service_destination_IP_address | 32 or 128 | uimsbf |
|         for (j=0; j<num_components; j++) | | |
|         { | | |
|             reserved | 1 | '1' |
|             essential_component_indicator | 1 | bsblf |
|             component_destination_IP_address _flag | 1 | bslbf |
|             port_num_count | 5 | uimsbf |
|             component_destination_UDP_port_num | 16 | uimsbf |
|             if (component_destination_IP_address _flag) | | |
|                 component_destination_IP_address | 32 or 128 | uimsbf |
|             Reserved | 4 | '1111' |

FIG.13

| Syntax | No. of Bits | Format |
|---|---|---|
|     num_component_level_descriptors | 4 | uimsbf |
|     for (k=0; k<num_component_level_descriptors; k++) | | |
|     { | | |
|         component_level_descriptor() | var | |
|     } | | |
| } | | |
| reserved | 4 | '1111' |
| num_NRT_service_level_descriptors | 4 | uimsbf |
| for (m=0; m<num_MH_service_level_descriptors; m++) | | |
| { | | |
|     NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|     virtual_channel_level_descriptor() | var | |
| } | | |
| } | | |

FIG.14

| Syntax | No. of Bits | Format |
|---|---|---|
| MH_component_descriptor() { | | |
|     descriptor_tag | 8 | 0x8D |
|     descriptor_length | 8 | uimsbf |
|     component_type | 7 | uimsbf |
|     component_encryption_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_ data(component_type) | var | |
| } | | |

FIG.15

| Syntax | No. of Bits | Format |
|---|---|---|
| NRT_component_ data() { | | |
|     TSI | 16 | uimsbf |
|     session_start_time | 32 | uimsbf |
|     session_end_time | 32 | uimsbf |
|     reserved | 5 | '11111' |
|     tias_bandwidth_indicator | 1 | bslbf |
|     as_bandwidth_indicator | 1 | bslbf |
|     FEC_OTI_indicator | 1 | bslbf |
|     if (tias_bandwidth_indicator == '1'){ | | |
|         tias_bandwidth | 16 | uimsbf |
|     } | | |
|     if (as_bandwidth_indicator == '1'){ | | |
|         as_bandwidth | 16 | uimsbf |
|     } | | |
|     if (FEC_OTI_indicator == '1'){ | | |
|         FEC_encoding_id | 8 | uimsbf |
|         FEC_instance_id | 16 | uimsbf |
|     } | | |
| } | | |

FIG.16

| Syntax | No.of Bits | Format |
|---|---|---|
| NRT_information_table_section() { | | |
|   table_id | 8 | 0xTBD |
|   section_syntax_indicator | 1 | '1' |
|   private_indicator | 1 | '1' |
|   reserved | 2 | '11' |
|   section_length | 12 | uimsbf |
|   service_id | 16 | uimsbf |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   time_span_start | 32 | uimsbf |
|   reserved | 5 | '11111' |
|   time_span_length | 11 | uimsbf |
|   num_items_in_section | 8 | uimsbf |
|   for(j=0; j<num_items_in_section; j++) { | | |
|     content_linkage | 32 | uimsbf |
|     updates_available | 1 | bslbf |
|     reserved | 1 | '1' |
|     TF_available | 1 | bslbf |
|     low_latency | 1 | bslbf |
|     playback_length_in_seconds | 20 | uimsbf |
|     content_length_included | 1 | bslbf |
|     playback_delay_included | 1 | bslbf |
|     expiration_included | 1 | bslbf |
|     reserved | 1 | '1' |
|     duration | 12 | uimsbf |
|     if(content_length_included=1) { | | |
|       content_length | 40 | uimsbf |
|     } | | |
|     if(playback_delay_included=1) { | | |
|       reserved | 4 | '1111' |
|       playback_delay | 20 | uimsbf |
|     } | | |
|     if(expiration_included=1) { | | |
|       expiration | 32 | uimsbf |
|     } | | |
|     content_name_lingth | 8 | uimsbf |
|     content_name_text() | var | |
|     reserved | 4 | '1111' |
|     content_descriptors_length | 12 | uimsbf |
|     for(i=-;i<N; i++) { | | |
|       content_descriptor() | | |
|     } | | |
|   } | | |
|   reserved | 6 | '111111' |
|   descriptors_length | 10 | uimsbf |
|   for(i=0; i<M; i++) { | | |
|     descriptor() | | |
|   } | | |
| } | | |

FIG.17

| Syntax | No. of bits | Format |
|---|---|---|
| NRT_content_table_section ( ) { | | |
|     table_id | 8 | uimsbf |
|     section_syntax_indicator | 1 | '1' |
|     private_indicator | 1 | '1' |
|     reserved | 2 | bslbf |
|     section_length | 12 | uimsbf |
|     NRT_Channel_ID | 16 | uimsbf |
|     reserved | 2 | bslbf |
|     version_number | 5 | uimsbf |
|     current_next_indicator | 1 | 1 |
|     section_number | 8 | uimsbf |
|     last_section_number | 8 | uimsbf |
|     protocol_version | 8 | uimsbf |
|     num_contents_in_section | 8 | uimsbf |
|     for (j=0; j < num_contents_in_section; j++) { | | |
|         content_version | 32 | uimsbf |
|         content_id | 32 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | |
|         descriptors_length | 16 | uimsbf |
|         for (i=0; i < N; i++) { | | |
|             descriptor ( ) | | |
|         } | | |
|     } | | |
| } | | |

| Syntax | No. of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (j=0;j< num_services; j++) | | |
|   { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length | 3 | uimsbf |
|     short_service_name | 16*m | |
|     reserved | 2 | '11' |
|     service_category | 6 | uimsbf |
|     num_components | 5 | uimsbf |
|     IP_version_flag | 1 | bslbf |
|     source_IP_address_flag | 1 | bslbf |
|     service_destination_IP_address_flag | 1 | bslbf |
|     if (source_IP_address_flag) | | |
|       source_IP_address | 32 or 128 | uimsbf |
|     if (service_destination_IP_address_flag) | | |
|       service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |
|       num_component_level_descriptors | 4 | uimsbf |
|       for (k=0;k< num_components_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) { | | |
|       service_level_descriptor() | var | |
|     } | | |
|   } | | |
|   reserved | 4 | '1111' |
|   num_ensemble_level_descriptors | 4 | uimsbf |
|   for (n=0; n<num_ensemble_level_descriptors; n++) { | | |
|     ensemble_level_descriptor() | var | |
|   } | | |
| } | | |

```
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault ="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs ="unbounded"/>
      <xs:element name="FDT-Content-ID" type="xs:usignedShort" minOccurs="0" maxOccurs="unbounded"/>  ①
      <xs:anynamespace="##other" processContents="skip" minOccurs="0"maxOccurs ="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attributename="FEC-OTI-Max-Number-of-Encoding-Symbols" type="-xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence >
      <xs:element name="File-Content-ID" type="Content-ID-Type" minOccurs="0" maxOccurs ="unbounded"/>  ②
      <xs:any namespace="##other"processContents ="skip"minOccurs ="0"maxOccurs ="unbounded"/>
    </xs:sequence >
    <xs:attributename="Content-Location" type="xs:anyURI" use="required"/>
    <xs:attributename="TOI" type="xs:positiveInteger" use="required"/>
    <xs:attributename="Content-Length" type="xs:unsignedLong" use="required"/>
    <xs:attributename="Transfer-Length" type="xs:unsignedLong" use="optional"/>
    <xs:attributename="Content-Type" type="xs:string" use="optional"/>
    <xs:attributename="Content-Encoding" type="xs:string" use="optional"/>
    <xs:attributename="Content-MD5" type="xs:base64Binary" use="optional"/>
    <xs:attributename="FEC-OTI-FEC-Encoding-ID" type="xs:unsignedLong" use="optional"/>
    <xs:attributename="FEC-OTI-FEC-Instance-ID" type="xs:unsignedLong" use="optional"/>
    <xs:attributename="FEC-OTI-Maximum-Source-Block-Length" type="xs:unsignedLong" use="optional"/>
    <xs:attributename="FEC-OTI-Encoding-Symbol-Length" type="xs:unsignedLong" use="optional"/>
    <xs:attributename="FEC-OTI-Max-Number-of-Encoding-Symbols" type="xs:unsignedLong" use="optional"/>
    <xs:attributename="FEC-OTI-Scheme-Specific-Info" type="xs:base64Binary" use="optional"/>
    <xs:anyAttribute processContents ="skip"/>
  </xs:complexType >
  <xs:complexType name="Content-ID-Type">
    <xs:attribute name="Content-ID" type="xs:unsingedShort" use="required"/>
    <xs:attribute name="entry" type="xs:boolean " default="false" use="optional"/>  ③
    <xs:anyAttribute processContents="skip"/>
  </xs:complexType >
</xs:schema >
```

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType ">
    <xs:sequence >
      <xs:element name="File" type="File-Type" maxOccurs ="unbounded"/>
      <xs:element name="FDT-Content-ID" type="FDT-Content-ID-Type" minOccurs="0" maxOccurs="unbounded"/>
      <xs:any namespace="##other" processContents ="skip" minOccurs="0" maxOccurs="unbounded"/>
    </xs:sequence>                                                                                               ①
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type=" xs:unsignedLong" use="optional"/>
    <xs:attribute name="FEC-OTI-Encoding-Symbol-Length" type=" xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType>
  <xs:complexType name="File-Type">
    <xs:sequence>
      <xs:element name="File-Content-ID" type="Content-ID-Type" minOccurs="0" maxOccurs ="unbounded"/>
      <xs:any namespace="##other" processContents="skip" minOccurs="0" maxOccurs="unbounded"/>
    </xs:sequence >
    <xs:attribute name="Content-Location" type="xs:anyURI" use="required"/>
    <xs:attribute name="TOI" type="xs:positiveInteger" use="required"/>
    <xs:attribute name="Content- Length" type=" xs:unsignedLong" use="required"/>
    <xs:attribute name="Transfer- Length" type=" xs:unsignedLong" use="optional"/>
    <xs:attribute name="Content- Type" type="xs:string" use="optional"/>
    <xs:attribute name="Content- Encoding" type="xs:string" use="optional"/>
    <xs:attribute name="Content- MD5" type="xs:base64Binary" use="optional"/>
    <xs:attribute name="FEC-OTI-FEC-Encoding-ID" type=" xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type=" xs:unsignedLong" use="optional"/>
    <xs:attribute name="FEC-OTI-Max-Number-of-Encoding-Symbols" type=" xs:unsignedLong" use="optional"/>
    <xs:attribute name="FEC-OTI-Scheme-Specific-Info" type="xs:base64Binary" use="optional"/>
    <xs:anyAttribute processContents ="skip"/>
  </xs:complexType >
  <xs:complexType name="FDT-Content-ID-Type">  ②
    <xs:sequence>
      <xs:element name="Entry-Content-Location" type=xs:anyURI" minOccurs="0" maxOccurs="unbounded"/>
    </xs:sequence>
    <xs:attribute name="Content-ID" type="xs:unsingedShort" use="required"/>
    <xs:anyAttribute processContents="skip"/>
  <xs:complexType>
  <xs:complexType name="Content-ID-Type">
    <xs:attribute name="Content-ID" type="xs:unsingedShort" use="required"/>
    <xs:attribute name="entry" type="xs:boolean" default="false" use="optional"/>
    <xs:anyAttribute processContents ="skip"/>
  </xs:complexType >
</xs:schema >
```

| Syntax | No. of Bits | Format |
|---|---|---|
| tdo_trigger_table_section() { | | |
|     table_id | 8 | 0xTBD |
|     section_syntax_indicator | 1 | 0 |
|     private_indicator | 1 | 1 |
|     reserved | 2 | 11 |
|     section_length | 12 | uimsbf |
|     source_id | 16 | uimsbf |
|     reserved | 2 | 11 |
|     TTT_version_number | 5 | uimsbf |
|     current_next_indicator | 1 | 1 |
|     section_number | 8 | uimsbf |
|     last_section_number | 8 | uimsbf |
|     num_triggers_in_section | 8 | uimsbf |
|     for (i=0; i< num_triggers_in_section; i++) { | | uimsbf |
|         trigger_id | 32 | uimsbf |
|         trigger_time | 32 | uimsbf |
|         trigger_action | 16 | uimsbf |
|         trigger_description_length | 8 | uimsbf |
|         trigger_description_text | var | |
|         service_id_ref | 16 | uimsbf |
|         content_linkage | 32 | uimsbf |
|         num_trigger_descriptors | 8 | uimsbf |
|         for (j=0; j<num_bundle_descriptors; j++) { | | |
|             trigger_descriptor  () | var | |
|         } | | |
|     } | | |
| } | | |

FIG.27

| Syntax | No. of bits | Format |
|---|---|---|
| synchronized_data_packet(){ | | |
|     data_identifier | 8 | uimsbf |
|     sub_stream_id | 8 | uimsbf |
|     PTS_extension_flag | 1 | bslbf |
|     output_data_rate_flag | 1 | bslbf |
|     reserved | 2 | '11' |
|     synchronized_data_packet_header_length | 4 | uimsbf |
|     if (PTS_extension_flag=='1'){ | | |
|         reserved | 7 | '1111111' |
|         PTS_extension | 9 | uimsbf |
|     } | | |
|     for (i=0;i<N1;i++){ | | |
|         synchronized_data_private_data_byte | 8 | bslbf |
|     } | | |
|     for (i=0;i<N2;i++){ | | |
|         synchronized_data_byte | 8 | bslbf |
|     } | | |
| } | | |

FIG.28

| Syntax | No. of bits | Format |
|---|---|---|
| contentTypeDescriptor(){ | | |
|     descriptorTag | 8 | 0x72 |
|     descriptorLength | 8 | uimsbf |
|     for(i=0;i<descriptorLength;i++){ | | |
|         contentTypeByte | 8 | bslbf |
|     } | | |
| } | | |

FIG.29

| Syntax | No. Of bits |
|---|---|
| TS_program_map_section(){ | |
|    table_id | 8 |
|    section_syntax_indicator | 1 |
|    '0' | 1 |
|    reserved | 2 |
|    section_length | 12 |
|    program_number | 16 |
|    reserved | 2 |
|    version_number | 5 |
|    current_next_indicator | 1 |
|    section_number | 8 |
|    last_section_number | 8 |
|    reserved | 3 |
|    PCR_PID | 13 |
|    reserved | 4 |
|    program_info_length | 12 |
|    for(i=0;i<N;i++){ | |
|       descriptor() | |
|    } | |
|    for(i=0;i<N1;i++){ | |
|       steam_type | 8 |
|       reserved | 3 |
|       elementary_PID | 13 |
|       reserved | 4 |
|       ES_info_length | 12 |
|       for(i=0;i<N2;i++){ | |
|          descriptor() | |
|       } | |
|    } | |
|    CRC_32 | 32 |
| } | |

| Syntax | No. of Bits | Format |
|---|---|---|
| service_id_descriptor() { | | |
|    descriptor_tag | 8 | 0xC2 |
|    descriptor_length | 8 | uimsbf |
|    service_count | 8 | uimsbf |
|    for (i=0; i<service_count; i++) | | |
|       service_id | 16 | bslbf |
|       for (j=0; j< N; j++) { | | |
|          reserved | 8 | bslbf |
|       } | | |
| } | | |

FIG.30

| Syntax | No. Of bits |
|---|---|
| TS_program_map_section(){ | |
| table_id | 8 |
| section_syntax_indicator | 1 |
| '0' | 1 |
| reserved | 2 |
| section_length | 12 |
| program_number | 16 |
| reserved | 2 |
| version_number | 5 |
| current_next_indicator | 1 |
| section_number | 8 |
| last_section_number | 8 |
| reserved | 3 |
| PCR_PID | 13 |
| reserved | 4 |
| program_info_length | 12 |
| for(i=0;i<N;i++){ | |
| descriptor() | |
| } | |
| for(i=0;i<N1;i++){ | |
| steam_type | 8 |
| reserved | 3 |
| elementary_PID | 13 |
| reserved | 4 |
| ES_info_length | 12 |
| for(i=0;i<N2;i++){ | |
| descriptor() | |
| } | |
| } | |
| CRC_32 | 32 |
| } | |

| Syntax | No. of Bits | Format |
|---|---|---|
| Trigger_stream_descriptor() { | | |
| descriptor_tag | 8 | 0xC2 |
| descriptor_length | 8 | uimsbf |
| target_service_count | 8 | uimsbf |
| for (i=0; i<service_count; i++) { | | |
| target_service_id | 16 | bslbf |
| target_content_item_count | 8 | uimsbf |
| for(k=0; k<target_content_item_count; k++) | | |
| target_content_linkage | 32 | bslbf |
| } | | |
| for (j=0; j< N; j++) { | | |
| reserved | 8 | bslbf |
| } | | |
| } | | |

FIG.31

| | No. of bits | Identifier |
|---|---|---|
| application_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     test_application_flag | 1 | bslbf |
|     application_type | 15 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0;i<N;i++){ | | |
|         descriptor() | | |
|     } | | |
|     reserved_future_use | 4 | bslbf |
|     application_loop_length | 12 | uimsbf |
|     for(i=0;i<N;i++){ | | |
|         application_identifier() | | |
|         application_control_code | 8 | uimsbf |
|         reserved_future_use | 4 | bslbf |
|         application_descriptors_loop_length | 12 | uimsbf |
|         for(j=0;j<N;j++){ | | |
|             descriptor() | | |
|         } | | |
|     } | | |
|     CRC_32 | 32 | rpchof |
| } | | |

FIG.32

| Syntax | No. of Bits | Format |
|---|---|---|
| System_time_table_section(){ | | |
|     table_id | 8 | uimsbf |
|     section_syntax_indicator | 1 | '1' |
|     private_indicator | 1 | '1' |
|     reserved | 2 | '11' |
|     section_length | 12 | uimsbf |
|     table_id_extension | 16 | 0x0000 |
|     reserved | 2 | '11' |
|     version_number | 5 | '00000' |
|     current_next_indicator | 1 | '1' |
|     section_number | 8 | 0x00 |
|     last_section_number | 8 | 0x00 |
|     protocol_version | 8 | uimsbf |
|     system_time | 32 | uimsbf |
|     GPS_UTC_offset | 8 | uimsbf |
|     daylight_savings | 16 | uimsbf |
|     for (i=0;i<N;i++){ | | |
|       descriptor() | | |
|     } | | |
|     CRC_32 | 32 | rpchof |
| } | | |

FIG.51

| Syntax | No. Bits | Format |
|---|---|---|
| tdo_trigger_table_section() { | | |
|    table_id | 8 | 0xTBD |
|    section_syntax_indicator | 1 | '0' |
|    private_indicator | 1 | '1' |
|    reserved | 2 | '11' |
|    section_length | 12 | uimsbf |
|    source_id | 16 | uimsbf |
|    reserved | 2 | '11' |
|    TTT_version_number | 5 | uimsbf |
|    current_next_indicator | 1 | '1' |
|    section_number | 8 | uimsbf |
|    last_section_number | 8 | uimsbf |
|    num_triggers_in_section | 8 | uimsbf |
|    for (i=0; i< num_triggers_in_section; i++) { | | uimsbf |
|      trigger_id | 32 | uimsbf |
|      trigger_time | 32 | uimsbf |
|      trigger_type | 8 | uimsbf |
|      trigger_action | 16 | uimsbf |
|      trigger_description_length | 8 | uimsbf |
|      trigger_description_text | var | |
|      service_id_ref | 16 | uimsbf |
|      content_linkage | 32 | uimsbf |
|      target_trigger_id_ref | 32 | uimsbf |
|      num_trigger_descriptors | 8 | uimsbf |
|      for (j=0; j<num_trigger_descriptors; j++) { | | |
|         trigger_descriptor() | var | |
|      } | | |
|    } | | |
| } | | |

FIG.52

| Syntax | No. of Bits | Format |
|---|---|---|
| Content_Items_descriptor() { | | |
|     descriptor_tag | 8 | 0xC2 |
|     descriptor_length | 8 | uimsbf |
|     service_count | 8 | uimsbf |
|     for (i=0; i<service_count; i++) { | | |
|         service_id_ref | 16 | bslbf |
|         content_item_count | 8 | uimsbf |
|         for(k=0; k<content_item_count; k++) | | |
|             content_linkage | 32 | bslbf |
|     } | | |
|     for (j=0; j< N; j++) { | | |
|         reserved | 8 | bslbf |
|     } | | |
| } | | |

FIG.53

| Syntax | No. of Bits | Format |
|---|---|---|
| internet_location_descriptor() { | | |
|     descriptor_tag | 8 | 0xC9 |
|     descriptor_length | 8 | uimsbf |
|     reserved | 3 | '111' |
|     URL_count | 5 | uimsbf |
|     for (i=0; i<URL_count; i++) { | | |
|         URL_length | 8 | uimsbf |
|         URL() | var | |
|     } | | |
|     for (j=0; j< N; j++) { | | |
|     reserved | 8 | bslbf |
|     } | | |
| } | | |

FIG.60

| $b_7$ | $b_6$ | $b_5$ | $b_4$ | $b_3$ | $b_2$ | $b_1$ | $b_0$ | |
|---|---|---|---|---|---|---|---|---|
| 0 | 0 | 0 | 1 | 0 | 0 | 0 | 0 | EXT1 |
| 1 | 0 | 0 | 1 | 1 | 0 | 0 | 0 | 98h |
| $T_1$ | $T_0$ | 0 | $L_4$ | $L_3$ | $L_2$ | $L_1$ | $L_0$ | |
| URI_data() | | | | | | | | (variable length) |

| Type | Meaning |
|---|---|
| 00 | First segment of segmented command |
| 01 | Forbidden |
| 10 | Last segment of segmented command |
| 11 | Full URL delivered in one segment. |

FIG.61

| | No. of bits | Format | No. of Bytes |
|---|---|---|---|
| URI_data(){ | | | |
|    URI_type | 8 | uimsbf | |
|    for(k=0;k<L-1;k++){ | | | |
|       URI_character | 8 | uimsbf | 1 |
|    } | | | |
| } | | | |

FIG.62

| Element/Attribute (with @) | No. allowed | Data Type | Description & Value |
|---|---|---|---|
| TPT | | | |
|   @majorProtocolVersion | 1 | Integer, range 0..15 | Major Protocol Version |
|   @minorProtocolVersion | 0..1 | integer, range 0..15 | Minor Protocol version |
|   @id | 1 | anyURI | segment_id = domain_name/program_id |
|   @tptVersion | 1 | unsignedByte | Data version of this TPT |
|   @expireDate | 0..1 | dateTime | Date after which this TPT will not be used |
|   @serviceId | 0..1 | UnsignedShort | NRT service_id |
|   @baseURL | 0..1 | anyURI | Base URL for all relative URLs in TPT |
|   Capabilities | 0..1 | nrt:CapabilitiesType | Essential capabilities for this segment |
|   LiveTrigger | 0..1 | | Info on Internet live trigger delivery |
|     @URL | 1 | anyURI | URL of server for live triggers |
|     @deliveryType | 1 | Integer range 0..3 | Streaming\|long polling\|short polling |
|     @pollPeriod | 0..1 | UnsignedByte | Short polling period in seconds |
|   TDO | 1..N | | TDO for this segment |
|     @appID | 1 | unsignedShort | Application ID, for reference by trigger |
|     @appType | 0..1 | integer, range 0-15 | Application type (default: 0="TDO") |
|     @appName | 0..1 | string | Display name (for viewer launch consent) |
|     @globalId | 0..1 | anyURI | Globally unique app ID |
|     @appVersion | 0..1 | unsignedByte | Version of this app |
|     @testTDO | 0..1 | boolean | Flag for test TDO; default="false" |
|     @cookieSpace | 0..1 | UnsignedByte | Persistent storage needed; default=0 |
|     @expireDate | 0..1 | dateTime | Expire date for caching |
|     @availInternet | 0..1 | boolean | Default="true" |
|     @availBroadcast | 0..1 | boolean | Default="true" |
|     URL | 1..N | anyURI | TDO URL(s) -- first URL is entry point |
|     Capabilities | 0..1 | nrt:CapabilitiesType | Essential capabilities to present this TDO |
|     ContentItem | 0..N | | Content item used by this TDO |
|       URL | 1..N | anyURI | URL(s) of content items |
|       @updatesAvail | 0..1 | boolean | Default="false" |
|       @size | 0..1 | 24-bit integer | Size of content item, in kilobytes |
|       @availInternet | 0..1 | boolean | Default="true" |
|       @availBroadcast | 0..1 | boolean | Default="true" |
|     Event | 1..N | | Event targeted to this TDO |
|       @eventId | 1 | unsignedShort | Event ID, for reference by trigger |
|       @destination | 0..1 | unsignedByte | Targeted device type, e.g., HDTV, SDTV, external_1, etc. ; code values TBD |
|       @action | 1 | unsignedByte | ; code values TBD |
|       @diffusion | 0..1 | unsignedByte | Period for applying diffusion, in seconds |
|       Data | 0..1 | base64Binary | Data to be used by this TDO for stream-event |
|   UrlList | 0..1 | UrlList | List of potentially useful URLs |
|     TptUrl | 0..N | anyURI | URL of the TPT for a future segment |
|     NrtSignalingUrl | 0..1 | anyURI | URL of an NRT Signaling Server |

FIG.67

| Syntax | No. Bits | Format |
|---|---|---|
| tdo_trigger_data_bytes() { | | |
|     trigger_id | 32 | uimsbf |
|     trigger_time | 32 | uimsbf |
|     trigger_type | 8 | uimsbf |
|     trigger_action | 16 | uimsbf |
|     trigger_description_length | 8 | uimsbf |
|     trigger_description_text | var | |
|     service_id_ref | 16 | uimsbf |
|     content_linkage | 32 | uimsbf |
|     target_trigger_id_ref | 32 | uimsbf |
|     if (trigger_type == 0x04) | | |
|         associated_channel_PID | 13 | uimsbf |
|         reserved | 3 | uimsbf |
|         channel_name_length | 8 | uimsbf |
|         channel_name | var | |
|         webbookmark_valid_time | 32 | uimsbf |
|         webbookmark_expire_time | 32 | uimsbf |
|         webbookmark_title_length | 8 | uimsbf |
|         webbookmark_title_text | var | |
|         webbookmark_location | var | |
|         webbookmark_URL_length | 8 | uimsbf |
|         webbookmark_URL | var | |
|         thumbnail_URL_length | 8 | uimsbf |
|         thumbnail_URL | var | |
|     } | | |
| } | | |

FIG.71

| Syntax | No. Bits | Format |
|---|---|---|
| tdo_trigger_data_bytes() { | | |
|     trigger_id | 32 | uimsbf |
|     trigger_time | 32 | uimsbf |
|     trigger_type | 8 | uimsbf |
|     trigger_action | 16 | uimsbf |
|     trigger_description_length | 8 | uimsbf |
|     trigger_description_text | var | |
|     service_id_ref | 16 | uimsbf |
|     content_linkage | 32 | uimsbf |
|     target_trigger_id_ref | 32 | uimsbf |
|     if (trigger_type == 0x04) | | |
|         associated_channel_PID | 13 | uimsbf |
|         auto_start_mode | 1 | uimsbf |
|         reserved | 2 | uimsbf |
|         channel_name_length | 8 | uimsbf |
|         channel_name | var | |
|         webbookmark_valid_time | 32 | uimsbf |
|         webbookmark_expire_time | 32 | uimsbf |
|         webbookmark_title_length | 8 | uimsbf |
|         webbookmark_title_text | var | |
|         webbookmark_URL_length | 8 | uimsbf |
|         webbookmark_URL | var | |
|     } | | |
| } | | |

FIG.73

| WebBookmark addWebBookmark(Integer time, Channel channel, String title, DateAndTime validTime, DateAndTime expiryTime, String URL, String thumbnailURL) | | |
|---|---|---|
| Description | Add a new Web Bookmark to the collection. If the Web Bookmark cannot be added(e.g. because the value given for time lies outside of the length of the recording). This method SHALL return null. | |
| Arguments | *time* | The time at which the bookmark is set in seconds |
| Arguments | *channel* | The channel which the bookmark is set |
| Arguments | *title* | The title of Web Bookmark item |
| Arguments | *validTime* | The valid time to be accessed |
| Arguments | *expiryTime* | The expiry time of web bookmark. The web bookmark can not be removed automatically. |
| Arguments | *URL* | The location of web bookmark service. |
| Arguments | *thumbnailURL* | The location of thumbnail of web bookmark service. |

FIG.75

| WebBookmarkCollection readWebBookmark(String full_domain_name) | | |
|---|---|---|
| Description | Read a Web Bookmark from the collection in the local storage. This method SHALL return null. | |
| Arguments | full_domain_name | This argument is an optional. The browser can know the current domain. |

FIG.76

| readonly Integer length |
|---|
| The number of items in the collection |

FIG.77

```
Typedef Collection<WebBookmark> WebBookmarkCollection
```

FIG.78

| Boolean removeWebBookmark(WebBookmark webBookmark) | | |
|---|---|---|
| Description | Remove a Web Bookmark from the collection. If the Web Bookmark cannot be removed (e.g. because the value given for time lies outside of the length of the recording). This method SHALL return null. | |
| Arguments | *webBookmark* | An item of bookmark to be removed in the WebBookmark Collection. |

FIG.79

| Field Name | Type | Sample | Descriptions |
|---|---|---|---|
| Channel Number | String | "6-1" | CHANNEL NUMBER AT THE WEB BOOKMARK SETTING TIME |
| Channel Name | String | "ABC" | CHANNEL NAME AT THE WEB BOOKMARK SETTING TIME |
| Title | String | "CSI Miami" | TITLE OR TITLE INFORMATION OF A WEB BOOKMARK ITEM |
| Time | Date and Time | 2011.08.04 13:10 | TIME AT WHICH A WEB BOOKMARK IS SET |
| Valid Time | Date and Time | 2011.08.05 12:00 | TIME AT WHICH A WEB BOOKMARK ITEM IS AVAILABLE |
| Expiry Time | Date and Time | 2013.04.05 12:00 | TIME AT WHICH A WEB BOOKMARK ITEM IS DELETABLE FROM THE WEB BOOKMARK STORAGE UNIT AUTOMATICALLY |
| Location | URL | http://cnn.com/accident/update | URL WHERE A WEB BOOKMARK ITEM IS SAVED. THE WEB BOOKMARK LOCATION FIELD MAY BE USED LATER TO FIND THE LOCATION OF A PLACE WHERE A WEB BOOKMARK ITEM IS SAVED THROUGH A USER INPUT. |
| Thumbnail | URL | http://cnn.com/accident/update_thumbail.jpg | URL WHERE A THUMBNAIL OBTAINED BY CAPTURING A SCENE OF MAIN AV CONTENT DURING WEB BOOKMARK SETTING. WHEN DISPLAYING A WEB BOOKMARK STORAGE LIST ON A SCREEN, THE RECEIVER MAY USE A THUMBNAIL ACCORDING TO A THUMBNAIL LOCATION FIELD. |

FIG.103
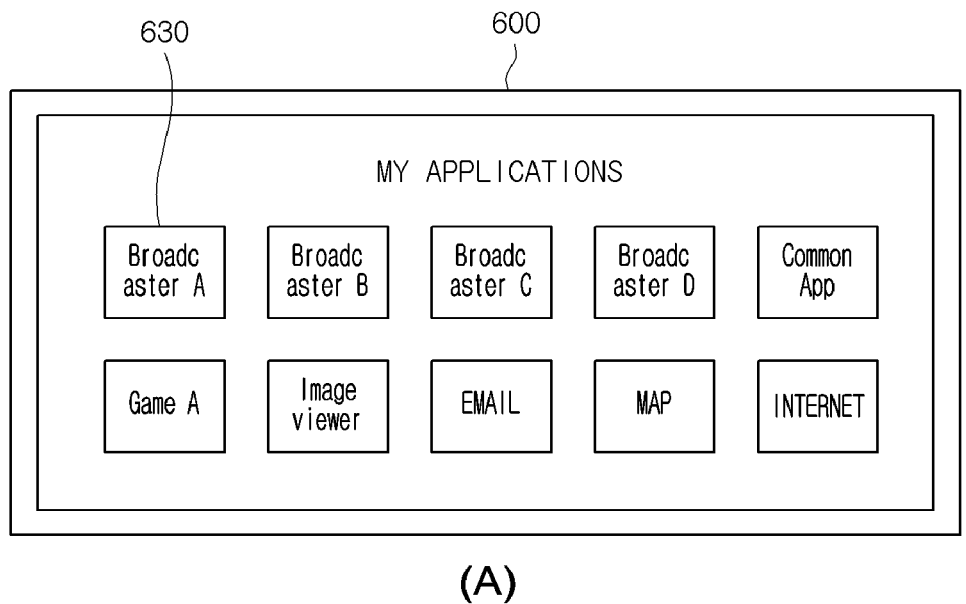
(A)
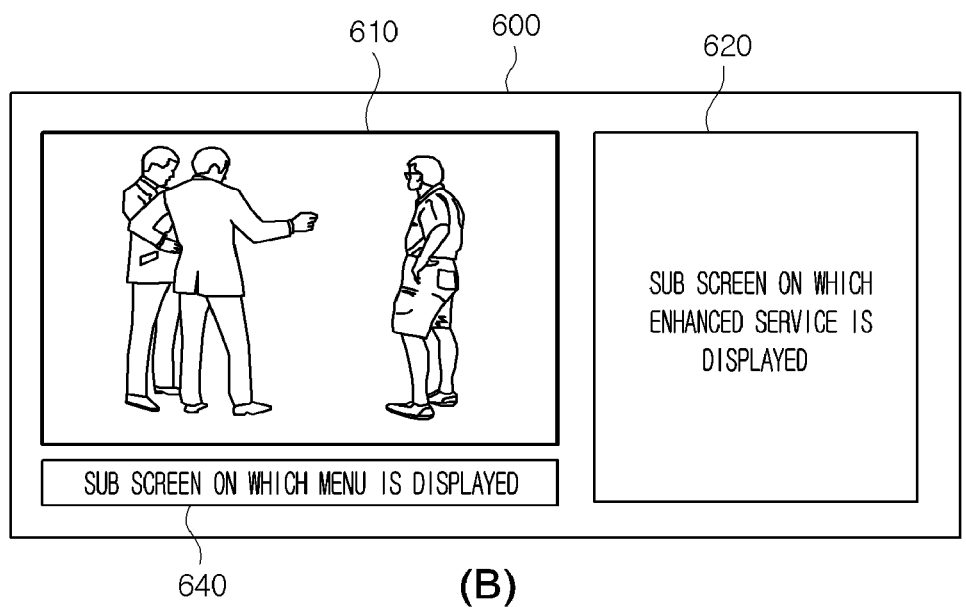
(B)

FIG.154
Terminal ID:0097383LV00
Model name: oooooo
firmware Version: 5.123
User ID: ARG2930
Age: 30
Gender: F
Region: KOREA OO CITY OO DONG
...
| Time | ch. | Cnnten ID | Title | Category | Content Time | ... |
|---|---|---|---|---|---|---|
| 20110818153940GMT | SBS | SC00384MGKE | GUARD BOSS EPISODE 1 | DRAMA | 30:49 | ... |
| ... | | | | | | |
| 20110818153932GMT | SBS | SC00384MGKE | GUARD BOSS EPISODE 1 | DRAMA | 46:40 | ... |
| 20110882180911GMT | SBS | SC00384MGKE | GUARD BOSS EPISODE 2 | DRAMA | 12:32 | ... |
| 20110824195024GMT | SBS | SC00384MGKE | GUARD BOSS EPISODE 3 | DRAMA | 11:33 | ... |
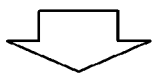
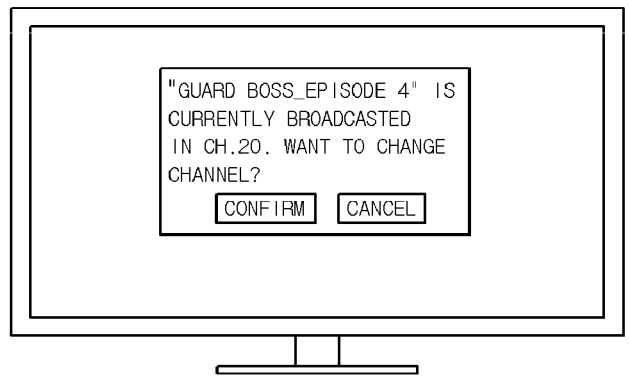

FIG.155

METHOD FOR RECEIVING BROADCAST SERVICE AND RECEPTION DEVICE THEREOF

This application is a Continuation of U.S. patent application Ser. No. 14/346,541 filed May 14, 2014, which is a National Stage entry of International Application No.: PCT/KR2012/007364 filed Sep. 14, 2012, and claims priority of U.S. Provisional Application No. 61/538,150 filed on Sep. 23, 2011, which are hereby incorporated by reference in its entirety.

TECHNICAL FIELD

The present disclosure relates to a method for receiving broadcast service and a reception device thereof.

BACKGROUND ART

A digital television (DTV) is now presented to offer various services in addition to a television (TV)'s original function such as playing video and audio. For example, broadcasting information such as Electronic Program Guide (EPG) may be provided to a user, and also, broadcasting services from at least two channels may be simultaneously provided to a user. Especially, since a receiving system of the DTV includes a large capacity of a storage device, and is connected to a data communication channel and the internet (through which two-way communication is available), more services become accessible through broadcast signals. Additionally, since services offered through broadcast signals become more diversified, needs for utilizing the diversified services accurately is increased.

Rather, since an image display device in each home is connected to a broadcast receiving device such as a settop box, it may play an uncompressed AV content that the broadcast receiving device provides. A broadcast receiving device receives content from a server called a multichannel video programming distributor (MVPD), and after extracting content from a broadcast signal received from the broadcast receiving device, the MVPD converts the extracted content into a signal of a format fit for transmission and provides the converted signal to the broadcast receiving device. In such a way, since an image display device less likely receives a broadcast signal directly through airwaves, a broadcasting station transmitting a broadcast signal requires a method of providing self-led enhanced service to the image display device.

DISCLOSURE OF THE INVENTION

Technical Problem

Embodiments provide a method of receiving and processing non-real-time (NRT) service and a method of transmitting NRT service.

Embodiments also provide a method of linking a content downloaded through NRT service with real-time broadcast service and a receiver thereof.

Embodiments also provide a transmission method for linking NRT service with real-time service without interfering with an existing receiver and a receiver thereof.

Technical Solution

In one embodiment, provided is a broadcast service receiving method of a broadcast receiving device. The method includes: receiving a trigger including location information of a bookmark target object; extracting the location information of the bookmark target object from the trigger; receiving bookmark target object related information including bookmark signaling data by using the location information of the bookmark target object; extracting the bookmark signaling data from the bookmark target object related information; when the bookmark signaling data is extracted, displaying that a bookmark target object is able to be bookmarked; when a user input for bookmarking the bookmark target object is received, saving the location information of the bookmark target object; and displaying location information of a saved bookmark target object at a predetermined time.

In another embodiment, provided is a broadcast service receiving method of a broadcast receiving device. The method includes: receiving bookmark signaling data including location information of a bookmark target object; when the bookmark signaling data is received, displaying that a bookmark target object is able to be bookmarked; when a user input for bookmarking the bookmark target object is received, saving the location information of the bookmark target object; and displaying location information of a saved bookmark target object at a predetermined time.

In further another embodiment, a broadcast receiving device includes: a display unit; a trigger receiving unit receiving bookmark signaling data including location information of a bookmark target object; a trigger processing unit, when the bookmark signaling data is transmitted, displaying a bookmark indicator notifying that a bookmark service for a bookmark target object is available on the display unit; a user input unit receiving a user input for bookmarking the bookmark target object; a bookmark storage unit saving the location information of the bookmark target object; and a bookmark module saving the location information of the bookmark target object in the bookmark storage unit when the user input unit receives a user input for bookmarking the bookmark target object and displaying the location information of the bookmark target object on the display unit at a predetermined time.

Advantageous Effects

According to an embodiment of the present invention, a content downloaded through NRT service may be linked with real-time broadcast service.

Additionally, according to an embodiment of the present invention, NRT service may be linked with real-time broadcast service without interfering with an existing receiver.

Furthermore, according to an embodiment of the present invention, broadcast service may be provided at an accurate timing.

BRIEF DESCRIPTION OF THE DRAWINGS

FIG. 5 is a view illustrating a bit stream section of a TVCT table section (VCT) according to an embodiment.

FIGS. 6 and 7 are views illustrating how to define a value of a service_type field according to an embodiment.

FIG. 8 is view of data_service_table_section) for identifying an application of NRT service and bit stream syntax of data_service_table_bytes in a DST section.

FIG. 11 is a view illustrating a method of signaling DSM-CC addressable section data by using VCT according to another embodiment of the present invention.

FIGS. 12 and 13 are views illustrating a bit stream syntax of NST according to an embodiment.

FIG. 14 is a view illustrating a bit stream syntax of NRT_component_descriptor (MH_component_descriptor) according to an embodiment.

FIG. 15 is a view illustrating a bit stream syntax of NRT component descriptor including NRT_component_data according to an embodiment.

FIG. 16 is a view illustrating a bit stream syntax of NRT-IT section for signaling NRT application according to an embodiment.

FIG. 17 is a view illustrating a syntax structure of bit stream for NRT section (NRT_content_table_section) according to an embodiment.

FIG. 18 is a view illustrating a bit stream syntax structure of an SMT session providing signaling information on NRT service data according to an embodiment.

FIG. 19 is a view illustrating an FDT schema for mapping a file and content_id according to an embodiment.

FIG. 20 is a view illustrating an FDT schema for mapping a file and content_id according to another embodiment.

FIG. 25 is a view illustrating a bit stream syntax of a trigger according to an embodiment.

FIG. 27 is a view illustrating a synchronized data packet structure of PES payload for transmitting trigger as bit stream syntax according to an embodiment.

FIG. 28 is a view illustrating a content type descriptor structure in tap( ) on DST according to an embodiment FIG. 29 is a view illustrating a syntax of PMT and service identifier descriptor according to an embodiment.

FIG. 30 is a view illustrating a trigger stream descriptor according to an embodiment.

FIG. 31 is a view of AIT according to an embodiment.

FIG. 32 is a view of STT according to an embodiment.

FIG. 51 is a view illustrating a bitstream syntax of a trigger configured according to another embodiment of the present invention.

FIG. 52 is a view illustrating a syntax of a content item descriptor according to an embodiment of the present invention.

FIG. 53 is a view illustrating a syntax of an internet location descriptor according to an embodiment of the present invention.

FIGS. 58 to 62 are views illustrating a method of transmitting a web bookmark service trigger by using DTV-CC according to an embodiment of the present invention.

FIG. 67 is a view illustrating a bitstream syntax of a web bookmark trigger configured according to an embodiment of the present invention.

FIG. 71 is a view illustrating a bitstream syntax of a trigger configured according to another embodiment of the present invention.

FIG. 73 is a view illustrating an addBookmark API among a web bookmark collection according to an embodiment of the present invention.

FIG. 75 is a view illustrating a readWebBookmark API among a web bookmark collection according to an embodiment of the present invention.

FIGS. 76 to 79 illustrate a web bookmark collection according to an embodiment of the present invention.

FIG. 103 is a screen when a content provider application is executed according to an embodiment.

FIG. 133 is a flowchart illustrating a method of controlling a video display device according to the embodiment.

FIG. 134 is a flowchart illustrating an advertisement alternative method according to an embodiment.

FIG. 135 is a flowchart illustrating an advertisement alternative method according to another embodiment.

FIG. 136 is a flowchart illustrating a scene related information displaying method according to an embodiment.

FIG. 137 is a user interface for selecting a scene related information displaying mode according to an embodiment.

FIG. 138 is flowchart illustrating a scene related information displaying method according to an embodiment.

FIG. 139 is a flowchart illustrating a user selection displaying method of scene related information according to an embodiment.

FIG. 140 is conceptual diagram illustrating a user selection displaying method of scene related information according to an embodiment.

FIG. 141 is a flowchart illustrating a method of displaying integrated scene related information according to an embodiment.

FIG. 142 is conceptual diagram illustrating a method of displaying integrated scene related information according to an embodiment.

FIG. 143 illustrates an integrated screen of sponsor advertisements of a main AV content.

FIG. 144 is a flowchart illustrating a method of saving rating setting information according to an embodiment. Fig.

Figure 145:
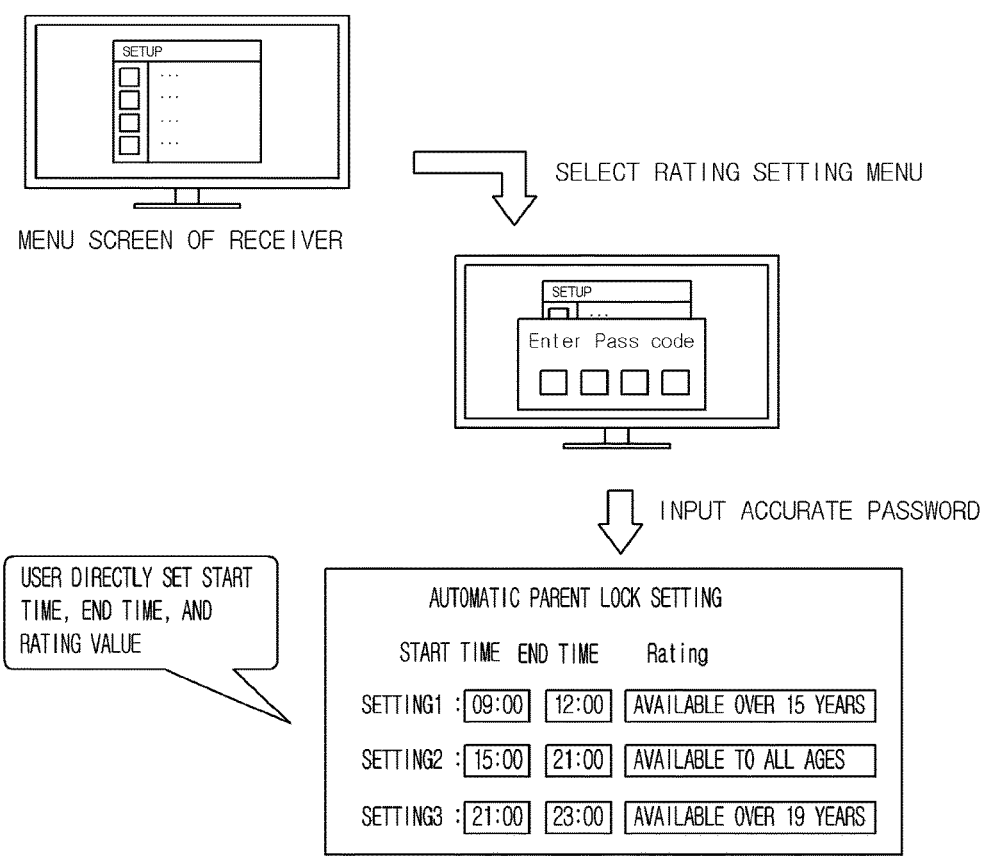

FIG. 145 is a user interface for saving rating setting information according to an embodiment.

Figure 146:
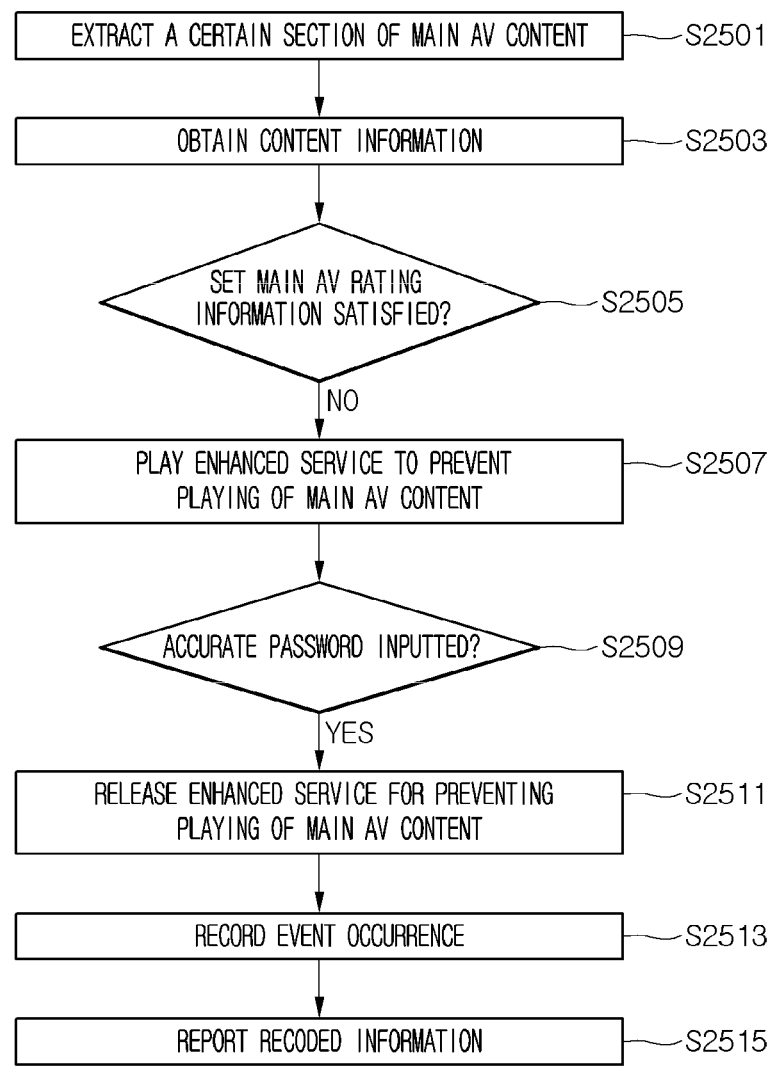

FIG. 146 is flowchart illustrating a method of playing a rating based main AV content according to an embodiment.

Figure 147:
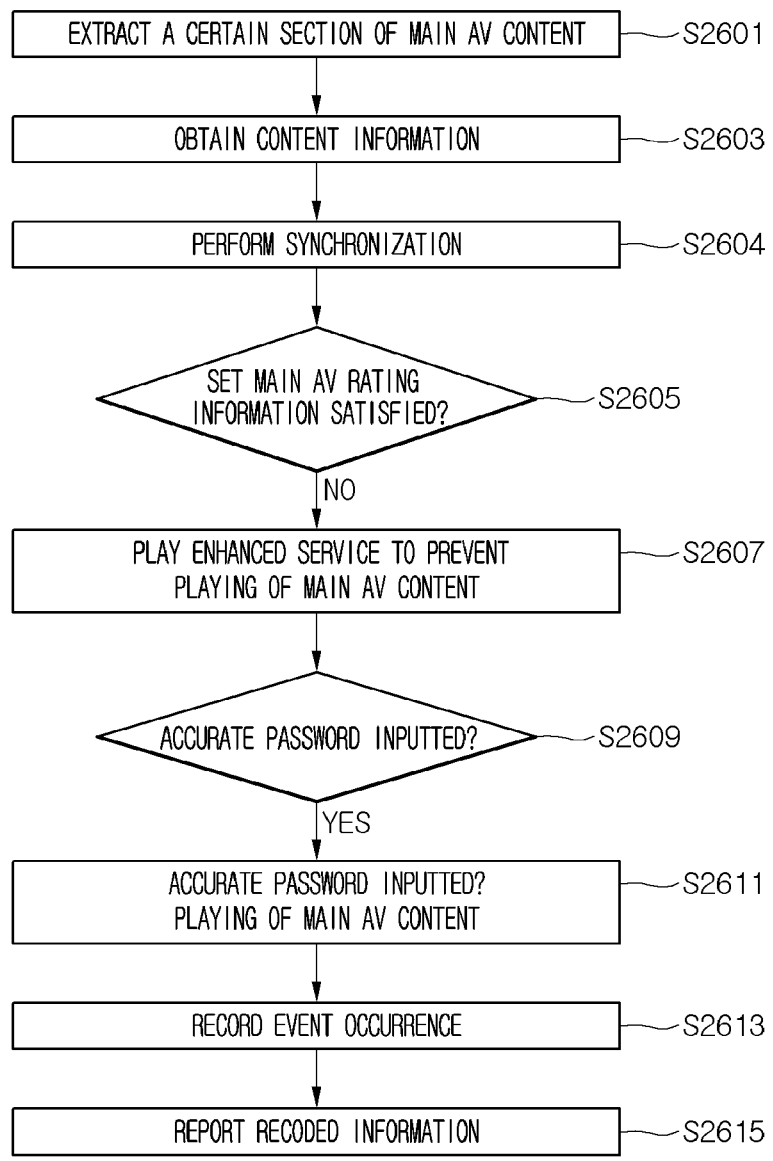

FIG. 147 is flowchart illustrating a method of playing a rating based main AV content according to another embodiment.

Figure 148:
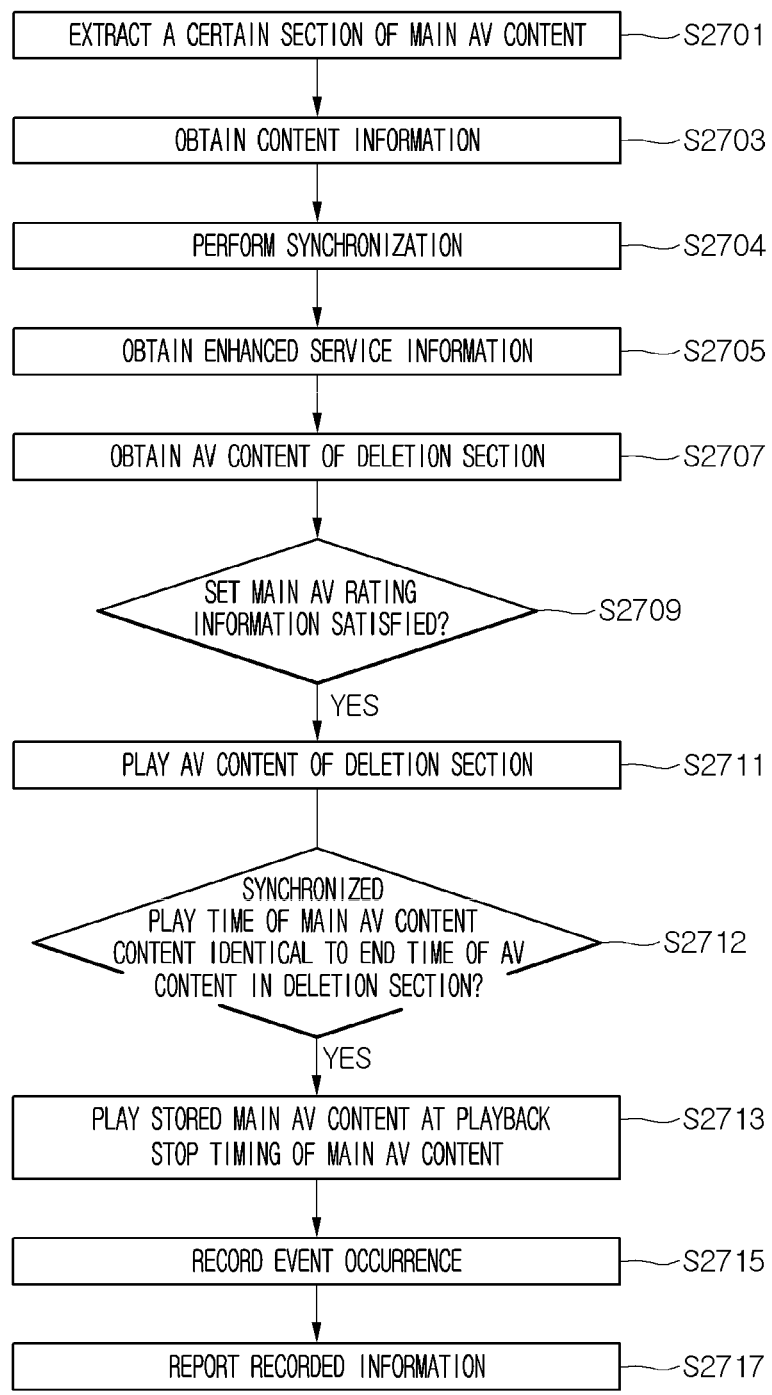

FIG. 148 is flowchart illustrating a method of playing a rating based main AV content according to another embodiment.

Figure 149:
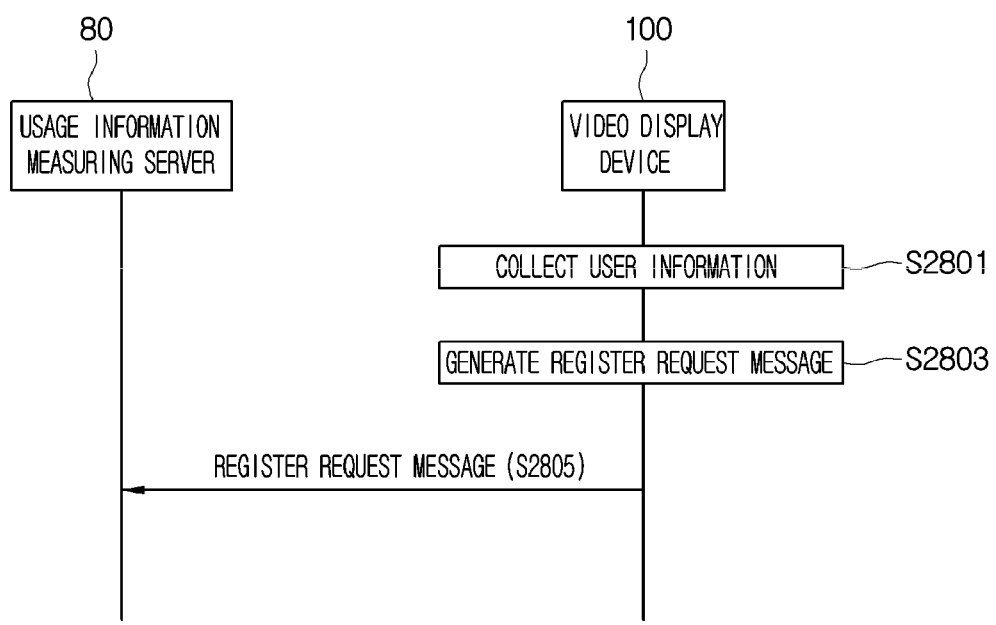

FIG. 149 is flowchart illustrating a method of registering to a usage information measuring server according to an embodiment.

Figure 150:
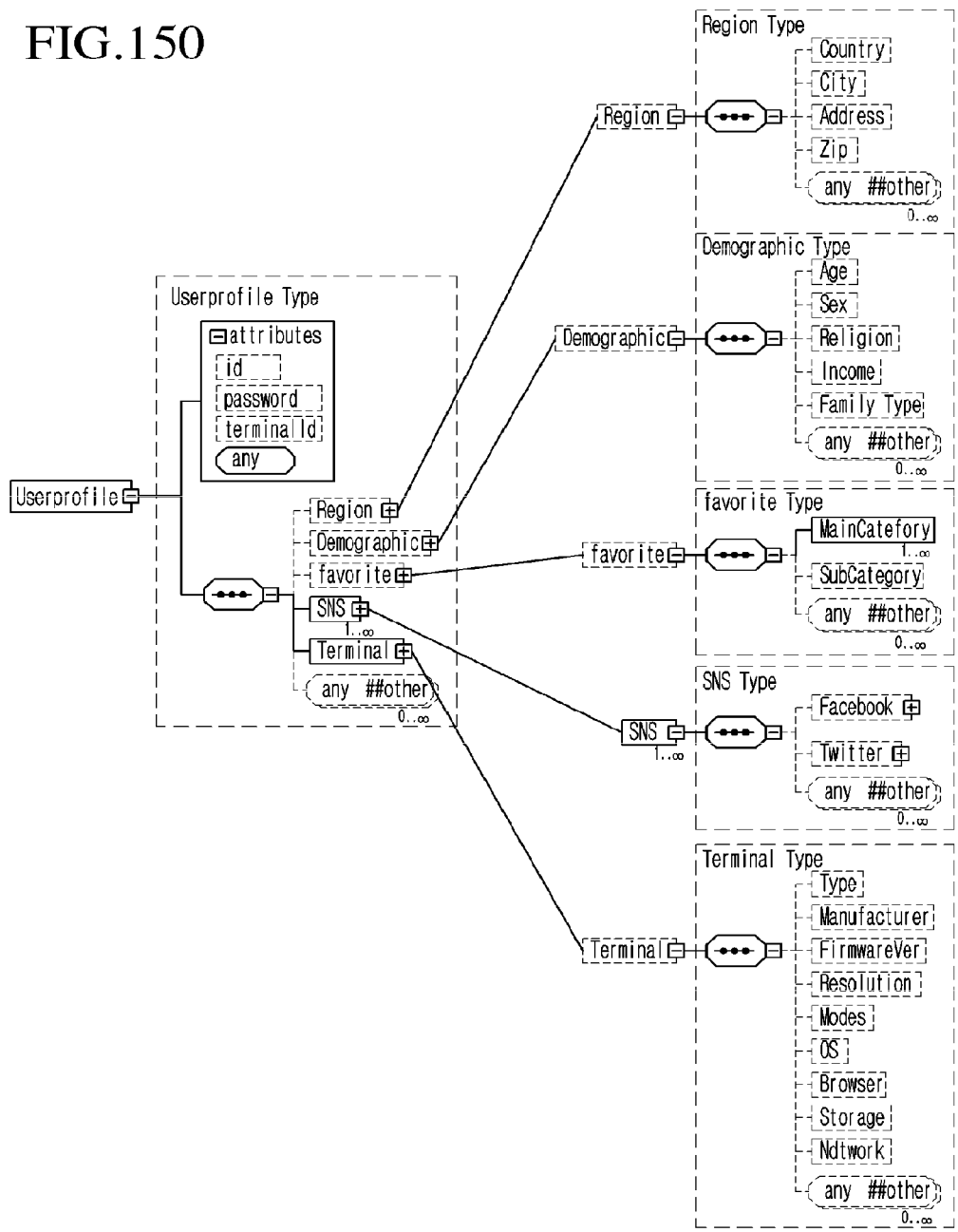

FIG. 150 is a view illustrating an XML schema of user information according to an embodiment.

Figure 151:
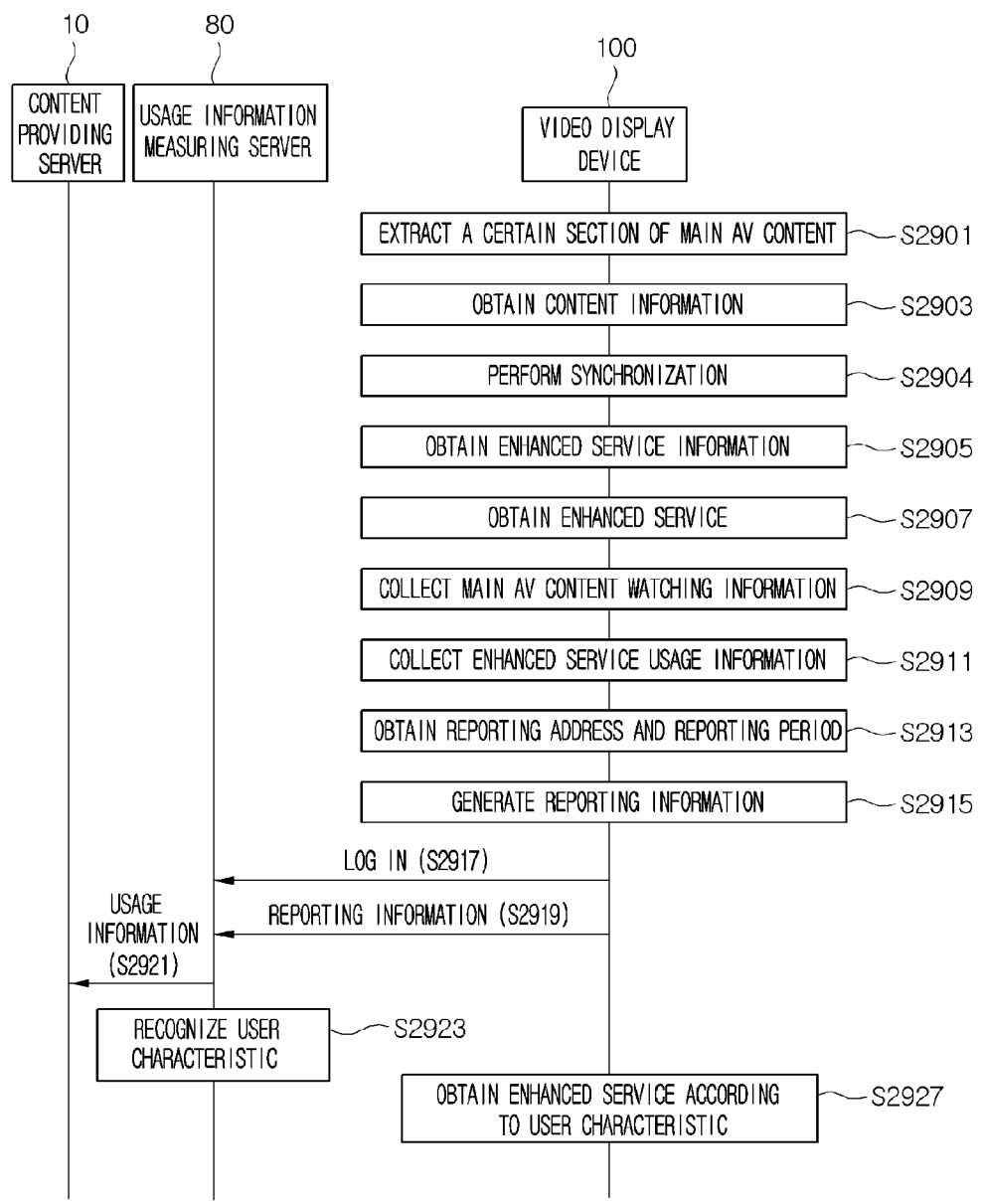

FIG. 151 is flowchart illustrating a method of obtaining, reporting, and using usage information according to an embodiment.

Figure 152:
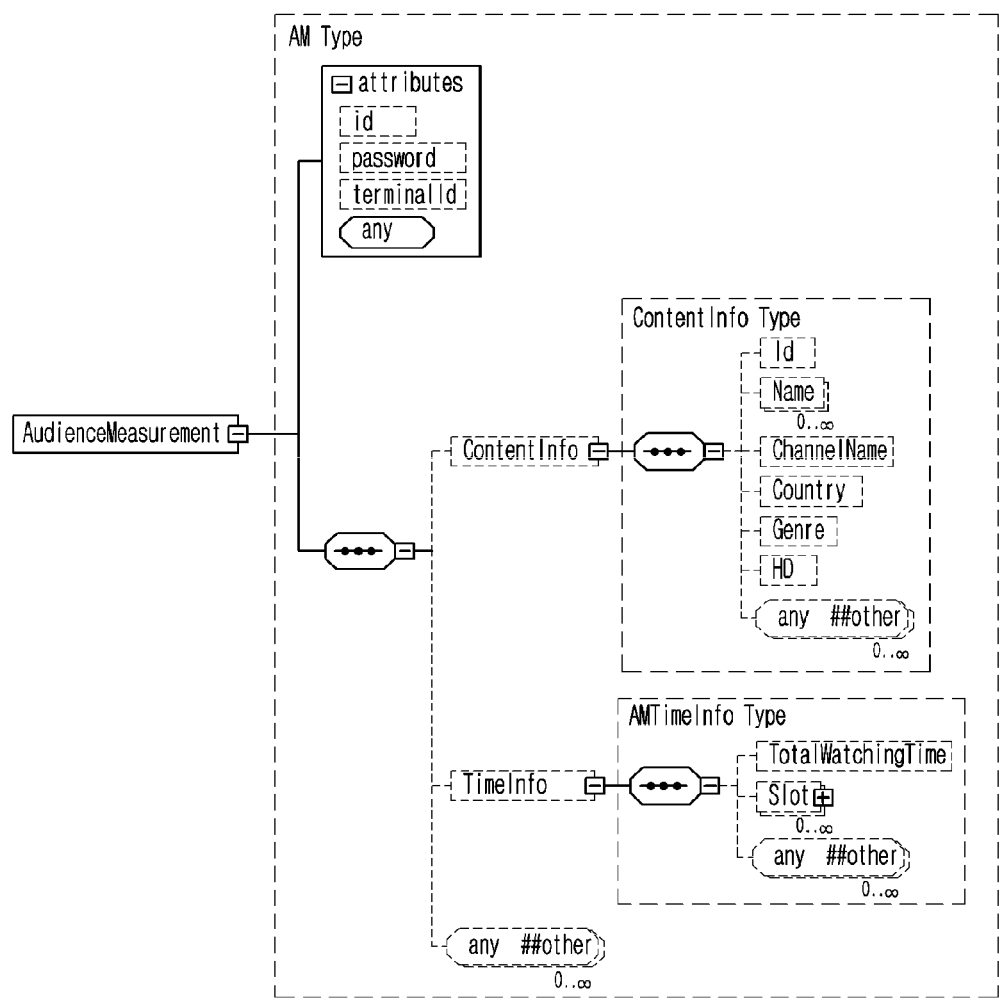

FIG. 152 is an XML schema of a main AV content watching information item according to an embodiment.

Figure 153:
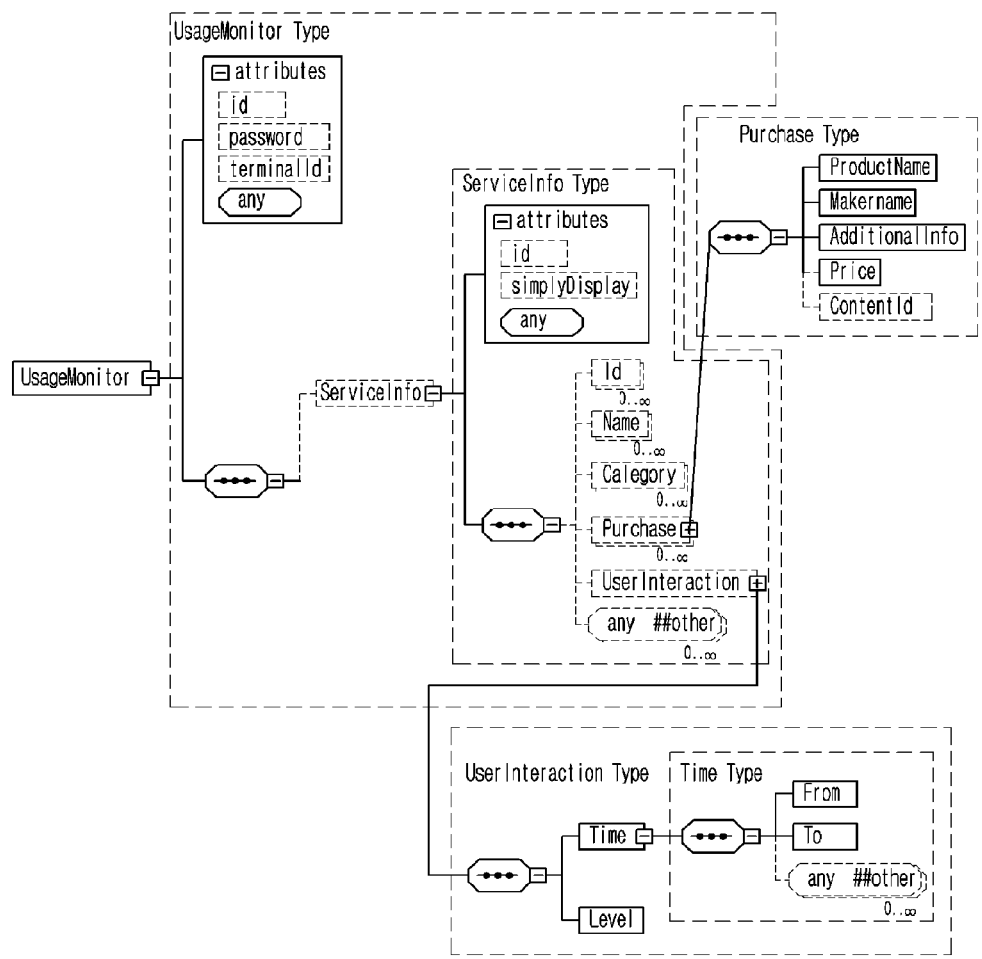

FIG. 153 is an XML schema of an enhanced service usage information item according to an embodiment.

FIGS. 154 to 157 are conceptual diagrams of a user characteristic based enhanced service according to an embodiment.

Figure 158:
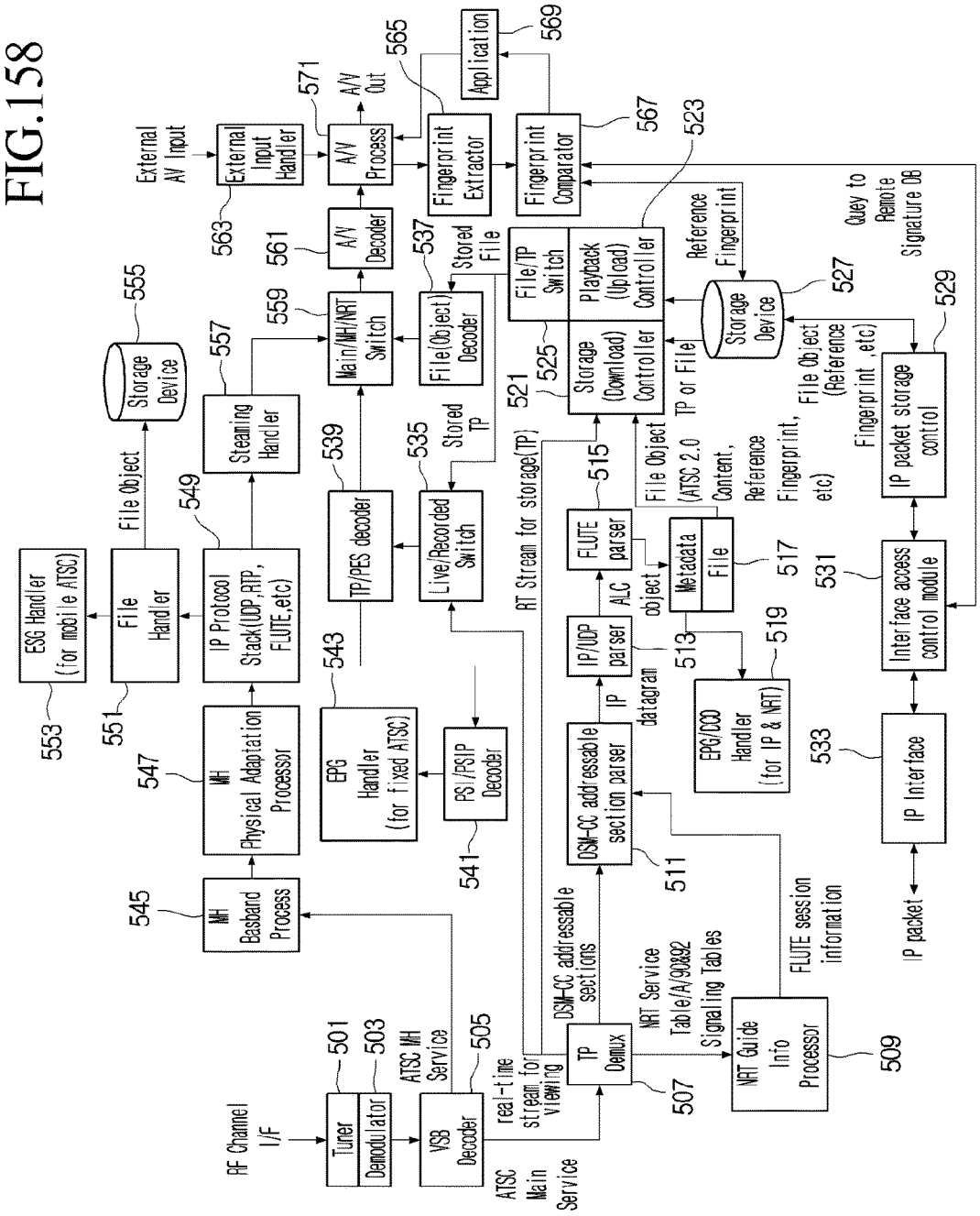

FIG. 158 is a block diagram illustrating a structure of a fingerprint based video display device according to another embodiment.

Figure 159:
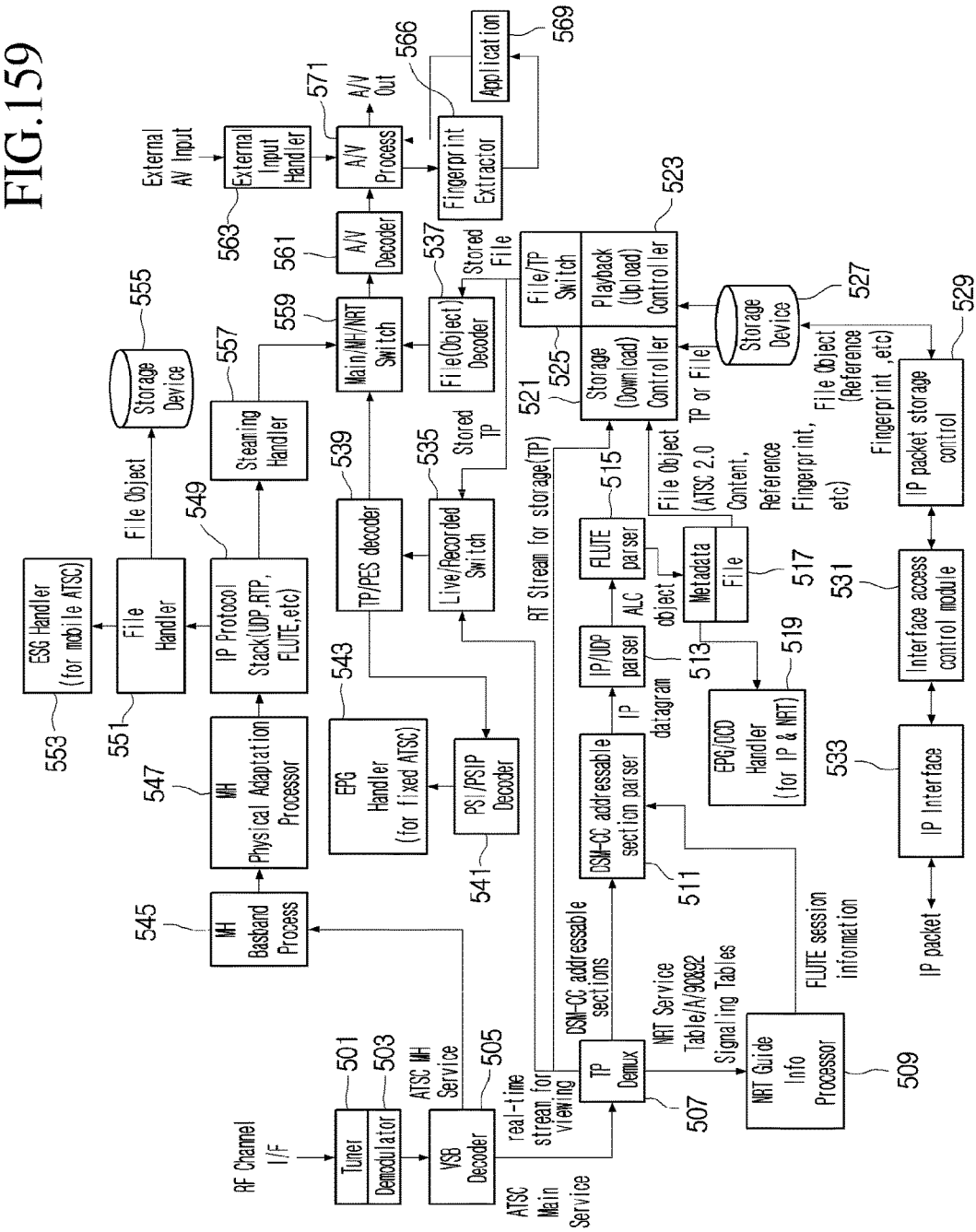

FIG. 159 is a block diagram illustrating a structure of a watermark based video display device according to another embodiment.

MODE FOR CARRYING OUT THE INVENTION

Preferred embodiments of the present invention will be described below in more detail with reference to the accompanying drawings. The configurations and operations of the present invention shown in and described with the accompanying drawings are explained as at least one example, and the technical idea of the present invention and its core configurations and operations are not limited thereby.

The terms used in the present invention are selected as currently used general terms if possible in the consideration of functions of the present invention but could vary according to intentions or conventions of those in the art or the advent of new technology. In certain cases, there are terms that are selected by an applicant arbitrarily, and in such a case, their meanings will be described in more detail in the specification. Accordingly, the terms used in the present invention should be defined on the basis of the meanings of the terms and contents over the present invention not the simple names of the terms.

Moreover, among the terms in the present invention, a real time (RT) service literally means a service in real time. That is, the service is time-restricted. In contrast, a non-real time (NRT) service is a service in NRT other than the RT service. That is, the NRT service is not restricted by time. Furthermore, data for NRT service is called NRT service data.

A broadcast receiver according to the present invention may receive NRT service through a medium such as a terrestrial wave, a cable, and the internet.

The NRT service may be saved in a storage medium of the broadcast receiver, and then may be displayed on a display device according to a predetermined time or at the user's request. The NRT service is received in a file format, and is saved in a storage medium according an embodiment. The storage medium may be an HDD embedded in the broadcast receiver according to an embodiment. As another example, the storage medium may be a Universal Serial Bus (USB) memory or an external HDD, which is connected to the broadcast receiving system.

Signaling information is necessary to receive files constituting the NRT service, save them in a storage medium, and provide a service to a user. The present invention may designate the above signaling information as NRT service signaling information or NRT service signaling data.

The NRT service includes Fixed NRT service and Mobile NRT service according to a method of obtaining IP datagram including NRT service signaling data. Especially, the Fixed NRT service is provided to a fixed broadcast receiver, and the Mobile NRT service is provided to a mobile broadcast receiver.

Figure 1:
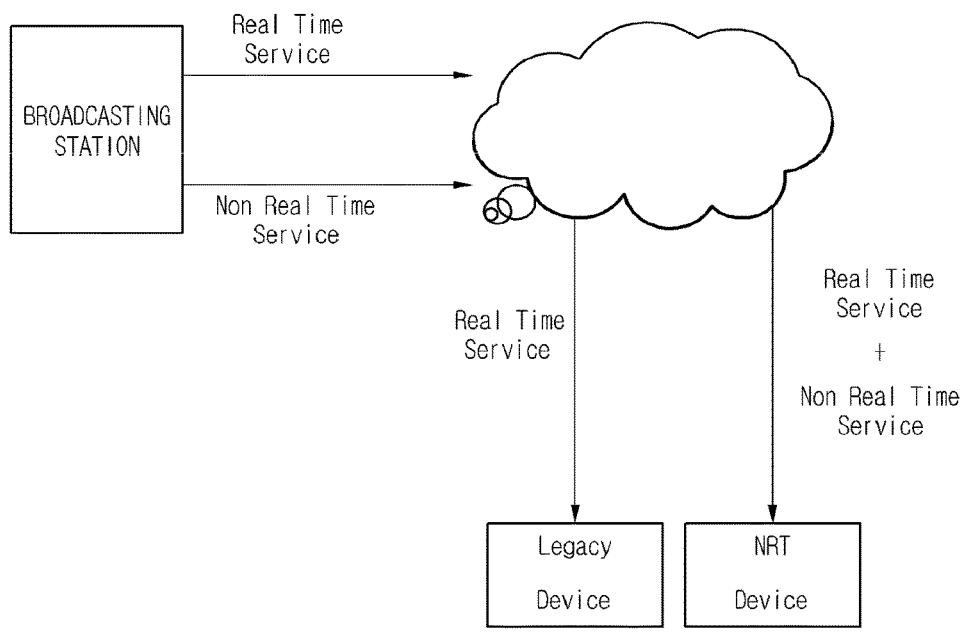
FIG. 1 is a conceptual diagram illustrating how RT service and NRT service are provided.

FIG. 1 is a conceptual diagram illustrating how RT service and NRT service are provided.

A broadcasting station transmits the RT service according to a traditional way, that is, like current terrestrial broadcasting (or mobile broadcasting). At this point, the broadcasting station transmits the RT service, and then, by using a remaining bandwidth during the transmission or an exclusive bandwidth, may provide the NRT service. That is, the RT service and NRT service are transmitted through the same or different channel. Accordingly, in order for a broadcast receiver to separate the RT service and the NRT service and save the separated NRT service in order to provide it to a user if necessary, service signaling information (or NRT service signaling data) is required. The NRT service signaling information (or NRT service signaling data) will be described in more detail later.

For example, a broadcasting station transmits broadcasting service data in real time and transmits news clip, weather information, advertisements, and Push VOD in non-real time. Additionally, the NRT service may be specific scenes, detail information of a specific program, and preview in real-time broadcasting stream in addition to news clip, weather information, advertisements, and Push VOD.

A typical broadcast receiver (i.e., a legacy device) may receive and process the RT service but may not receive and process the NRT service. That is, the typical broadcast receiver (i.e., a legacy device) is not influenced, in principle, by an NRT stream in a channel broadcasting RT service. That is, even when receiving NRT service, the typical broadcast receiver cannot process the received NRT service because it does not include a unit for processing it properly.

On the contrary, the broadcast receiver (i.e., an NRT device) of the present invention receives NRT service combined with RT service and properly processes the NRT service, so that it provides more various functions to a viewer than a typical broadcast receiver.

Figure 2:
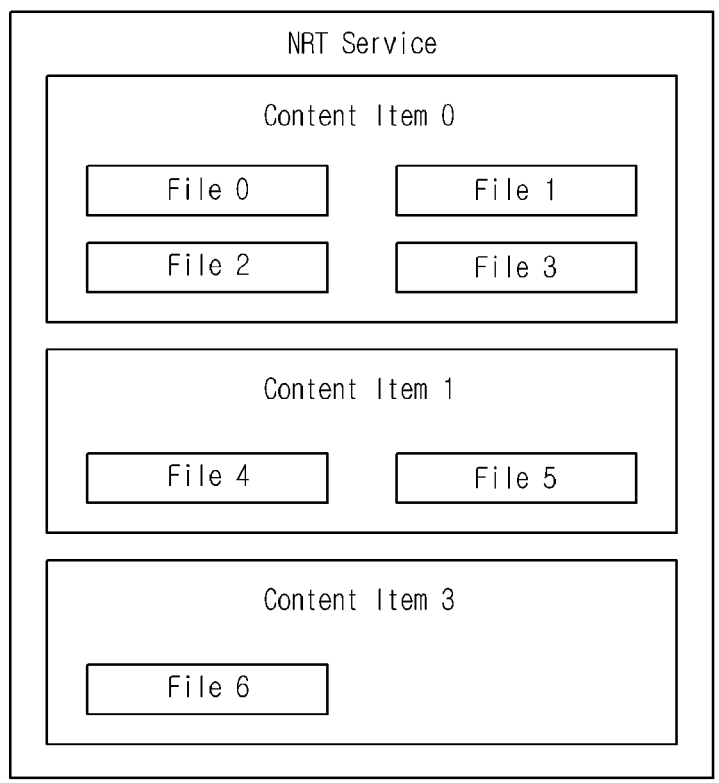
FIG. 2 is a view illustrating a structure of NRT service according to an embodiment.

FIG. 2 is a view illustrating a structure of NRT service according to an embodiment.

The NRT service includes at least one content item (or content or NRT content) as shown in FIG. 2, and the content item includes at least one file according to an embodiment. A file and object have the same meaning in the present invention.

The content item is a minimum unit playable independently. For example, news is provided in NRT. If the news includes business news, political news, and lift news, it may be NRT service, and each may be designated as a content item. Moreover, each of the business news, political news, and life news may include at least one file.

At this point, the NRT service may be transmitted in an MPEG-2 transport stream (TS) packet format through the same broadcasting channel as the RT service or an exclusive broadcasting channel. In this case, in order to identify the NRT service, a unique PID may be allocated to the TS packet of the NRT service data and then transmitted. According to an embodiment of the present invention, IP based NRT service data is packetized into an MPEG-2 TS packet and then transmitted.

At this point, NRT service signaling data necessary for receiving the NRT service data is transmitted through an NRT service signaling channel. The NRT service signaling channel is transmitted through a specific IP stream on an IP layer, and at this point, this specific IP stream may be packetized into an MPEG-2 TS packet and then transmitted. The NRT service signaling data transmitted through the NRT service signaling channel may include at least one of a Service Map Table (SMT), an NRT Service Table (NST), an NRT Content Table (NCT), an NRT Information Table (NRT-IT), and a Text Fragment Table (TFT). The NST or SMT provides access information on at least one NRT service operating on an IP layer, or the content items or files constituting the NRT service. The NRT-IT or NCT provides access information on the content items or files constituting the NRT service.

Additionally, NRT service signaling data including SMT (or NST) and NRT-IT (or NCT) may be included in a PSIP table on MPEG-2 TS or may be transmitted through an NRT service signaling channel on an IP layer in a virtual channel. Moreover, a plurality of NRT service data may be provided through one virtual channel.

The NRT-IT includes information describing a content downloadable to be saved in a receiving device. Information provided to the NRT-IT may include a content title (for example, the name of a downloadable program), available time for downloading content, content recommendation, availability of caption service, content identification, and other metadata.

Additionally, the TFT provides detailed description on a content item or service. The TFT may include a data structure supporting multi languages and, as a result, may represent detailed descriptions (e.g., each string corresponds to one language) in different languages. The text fragment table may be included in private sections having a table_id value (TBD) and may be identified by TFT_id. A TFT section may be included IP packets in a service signaling channel, and a multicast IP address (224.0.23.60) and a port (4937) may be allocated to the service signaling channel by IANA.

First, a receiver may identify whether a corresponding service is the NRT service with reference to a service_category field in the SMT, for example. Additionally, the receiver may uniquely identify the NRT service from the SMT through an NRT_service_id field.

Additionally, the NRT service may include a plurality of content items. The receiver may identify an NRT content item through a content_id field in the NCT or NRT-IT. In addition, the NRT content item and NRT service may be connected to each other by matching the NRT_channel_id field of the NCT to the NRT_service_id field.

Moreover, the NRT service may be transmitted through a FLUTE session and the receiver may extract FDT information from the FLUTE session. Then, content_id in the extracted FDT information is mapped into content_id of NCT or OMA-BCAST SG in order to confirm and receive the NRT service content that a user selects. If the mapping method is described briefly, for example, the receiver identifies each file constituting the NRT content item through the TOI and Content-Location fields in the FDT in the FLUTE session. Each TOI or the Content-Location and content item maps the content_ID of the FDT into the content_id field of the NCT or the content_id field of the OMA BCAST SG, so as to confirm and receive the NRT service content.

Figure 3:
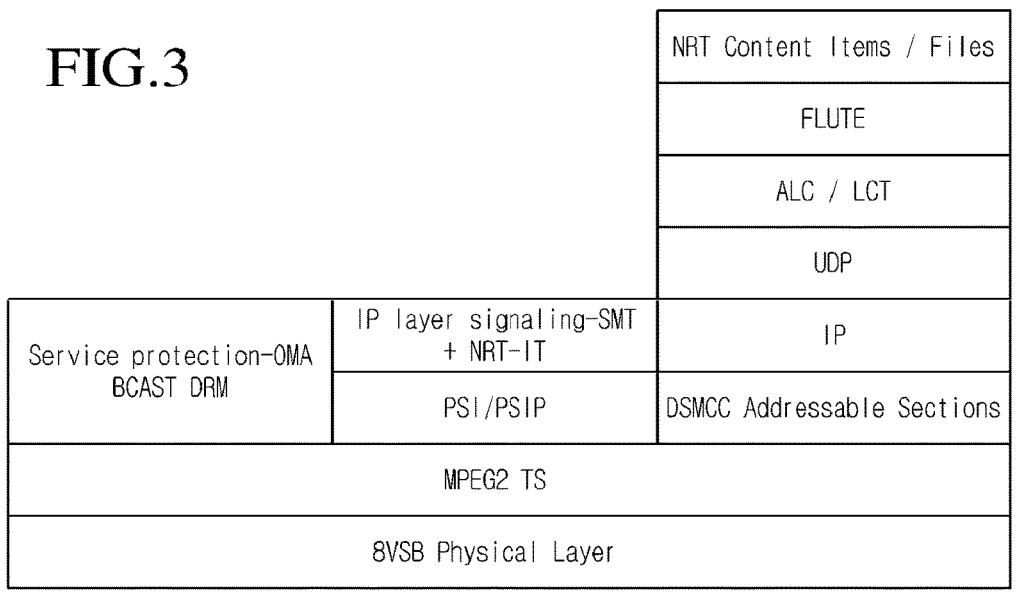
FIG. 3 is a view illustrating a protocol stack for NRT service according to an embodiment.

FIG. 3 is a view illustrating a protocol stack for NRT service according to an embodiment.

For Fixed NRT service, the NRT service of a file format is IP-packetized in an IP layer, and then, is transmitted in an MPEG-2 TS format through a specific channel.

Through an MPEG-2 based Program Specific Information (PSI) or Program and System Information Protocol (PSIP) table, for example, a VCT, it is determined whether there is NRT service in a virtual channel and identification information of NRT service is signaled.

According to an embodiment, the NRT service signaling channel, which transmits NRT service signaling data signaling the access information of the IP based NRT service, is IP packetized into a specific IP stream in the IP layer, and then, is transmitted in an MEPG-2 TS format.

That is, a broadcasting station packetizes the NRT content item or files according to a file transfer protocol method as shown in FIG. 3, and then, packetizes the packetized NRT content item or files in an Asynchronous Layered Coding (ALC) or Layered Coding Transport (LCT) method. Then, the packetized ALC or LCT data are packetized according to a UDP method. Then, the packetized UDP data is packetized according to the IP method again, and then, becomes IP data. Here, the IP data may include a File Description Table (FDT) having information on a File Delivery over Unidirectional Transport (FLUTE) session. The packetized IP data may be designated as IP datagram for convenience of description in the present invention.

Additionally, the IP datagram of NRT service is encapsulated in an addressable section structure and is packetized again in an MPET-2 TS format. That is, one addressable section structure has a section header and CRC checksum, which are added to one IP datagram. The format of the addressable section structure is matched to a Digital Storage Media Command and Control (DSM-CC) section format for private data transmission in terms of a structure. Accordingly, the addressable section may be designated as a DSM-CC addressable section.

Moreover, NRT service signaling data including at least one of SMT (or NST) and NRT-IT (or NCT) necessary for receiving NRT content/files may be transmitted through an NRT service signaling channel on an IP layer. Accordingly, the NRT service signaling data may be packetized according to an IP method in order to transmit it through the NRT service signaling channel on an IP layer. The NRT service signaling channel is encapsulated in the IP datagram having a well-known IP address and is multi-casted according to an embodiment.

Additionally, the NRT service signaling data may be included in Program Specific Information (PSI) or Program and System Information Protocol (PSIP) table section data and then transmitted. Moreover, the PSI table may include a Program Map Table (PMT) and a Program Association Table (PAT). The PSIP table may include a Virtual Channel Table (VCT), a Terrestrial Virtual Channel Table (TVCT), a Cable Virtual Channel Table (CVCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

Furthermore, as data for digital rights management and encryption of broadcasting service to protect the NRT service from illegal distribution and reproduction, BroadCast Services Enabler Suite Digital Rights Management (BCAST DRM) suggested by Open Mobile Alliance (OMA) may be used.

Moreover, the above mentioned Program Specific Information (PSI), Program and System Information Protocol (PSIP) table section data, DSM-CC addressable section data, and OMA BCAST DRM data are divided by a 184 byte unit, and then, a 4 byte MEPG header is added to each 184 bytes in order to obtain a 188 byte MPEG-2 TS packet. At this point, a value allocated to the PID of the MPEG header is a unique value identifying a TS packet for transmitting the NRT service and NRT service signaling channel.

MPEG-2 TS packets may be modulated in a predetermined transmission method in a physical layer, for example, an 8-VSB transmission method, and then, may be transmitted to a receiving system.

Figure 4:
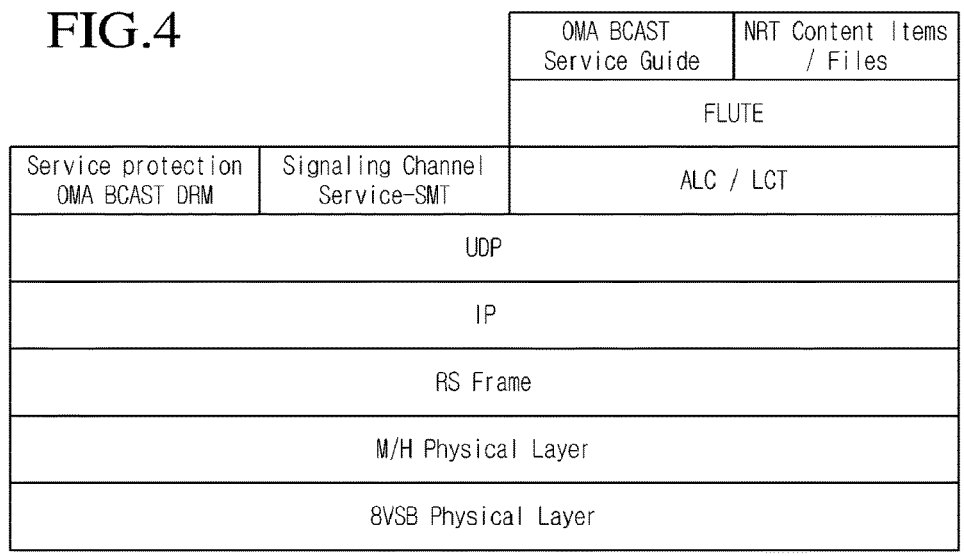
FIG. 4 is view illustrating one example of the protocol stack for mobile NRT service.

Moreover, FIG. 4 is a view illustrating a protocol stack for NRT service according to another embodiment.

FIG. 4 is view illustrating one example of the protocol stack for mobile NRT service. As shown in FIG. 4, an adaption layer is included between an IP layer and a physical layer. As a result, without using an MPEG-2 TS format, the IP datagram of mobile service data and IP datagram of signaling information may be transmitted.

That is, a broadcasting station packetizes the NRT content/files according to a file transfer protocol method as shown in FIG. 4, and then, packetizes them according to an Asynchronous Layered Coding (ALC)/Layered Coding Transport (LCT) method. Then, the packetized ALC/LCT data are packetized according to a UDP method. Then, the packetized ALC/LCT/UDP data is packetized again according to the IP method and becomes ALC/LCT/UDP/IP data. The packetized ALC/LCT/UDP/IP data may be designated as IP datagram for convenience of description in the present invention. At this point, OMA BCAST SG information undergoes the same process as the NRT content/file to constitute IP datagram.

Additionally, when NRT service signaling information (for example, SMT) necessary for receiving the NRT content/files is transmitted through a service signaling channel, the service signaling channel is packetized according to a User Datagram protocol (UDP) method, and the packetized UDP data is packetized again according to the IP method to become UDP/IP data. The UDP/IP data may be designated as IP datagram for convenience of description in the present invention. At the time, the service signaling channel is encapsulated in the IP datagram including Well-known IP destination address and well-known destination UDP port number, and is multi-casted according to an embodiment.

In addition, in relation to OMA BCAST DRM for service protection, a UDP header and an IP header are sequentially added to constitute one IP datagram.

The IP datagram of the NRT service, NRT service signaling channel, and mobile service data are collected in an adaption layer to generate a RS frame. The RS frame may include IP datagram of OMA BCAST SG.

The length (i.e., the number of rows) of a column in the RS frame is set by 187 bytes, and the length (i.e., the number of columns) of a row is N bytes (N may vary according to signaling information such as a transmission parameter (or TPC data).

The RS frame is modulated in a predetermined transmission method in a mobile physical layer (for example, VSB transmission method) and then is transmitted to a receiving system.

Moreover, whether the NRT service is transmitted is signaled through a PSI/PSIP table. As one example, whether the NRT service is transmitted is signaled to the VCT or TVCT.

FIG. 5 is a view illustrating a bit stream section of a TVCT table section (VCT) according to an embodiment.

Referring to FIG. 5, the TVCT table section has a table form of an MPEG-2 private section as one example, but is not limited thereto.

When the VCT and PID of the audio/video are parsed and then transmitted through the TVCT, the packet identification (PID) information may be obtained.

Accordingly, the TVCT table section includes a header, a body, and a trailer. A header part ranges from a table_id field to a protocol_version field. A transport_stream_id field is a 16 bit field and represents an MPEG-2 TS ID in a program association table (PAT) defined by a PID value of 0 for multiplexing. In a body part, a num_channels_in_section field is an 8 bit field and represents the number of virtual channels in a VCT section. Lastly, a trailer part includes a CRC_32 field.

First, the header part will be described as follows.

A table_id field (8 bits) is set with 0xC8 and identifies that a corresponding table section is a table section constituting TVCT.

A section_syntax_indicator field (1 bit) is set with 1 and represents that the section follows a general section syntax.

A private_indicator field (1 bit) is set with 1.

A section_length field (12 bits) describes that the number of bits remaining in the section to the last of the section from immediately after the section_length field. The value of the section_length field may not be greater than 1021.

A table_id_extension field (16 bits) may be set with 0x000.

A version_number field (5 bits) may have 0 and means the version number of VCT.

A current_next_indicator field (1 bit) represents that a corresponding table section is applicable currently if set with 1.

A section_number field (8 bits) indicates the number of corresponding table section among TVCT sections. In a first section of TVCT, section_number should be set with 0x00.

A last_section_number field (8 bits) means the table section of the last and highest number among TVCT sections.

A protocol_version field (8 bits) is a function that allows a table type delivering parameters having a different structure than one defined in a current protocol. Today, only one valid value of protocol_version is 0. The protocol_version having other than 0 may be used for the future version of the standard in order to recognize another table having a different structure.

Next, the body part will be described.

A num_channels_in_section field (8 bits) designates the numbers of virtual channels in the VCT section. The numbers are restricted by a table section length.

A short_name field (16 bits) represents the name of the virtual channel using 16 bit code value from 1 to 7 sequentially.

A major_channel_number field (10 bits) represents a major channel number related to a virtual channel defined by repetition in a "for" loop. Each virtual channel should relate to a major channel number and a minor channel number. The major channel number together with the minor channel number serve as a reference number of a virtual channel of a user.

A minor_channel_number field (10 bits) represent minor or sub channel numbers ranging from '0' to '999'. This field together with major_channel_number serves as the second of the number or a channel number of second part representing the right portion. The minor_channel_number is set with 0 if service_type is an analog television. When the service_type is an ATSC_digital_television or an ATSC_audio_only, it uses a minor number ranging from 1 to 99. A value of the minor_channel_number does not overlap that of the major_channel_number in a TVCT.

A modulation_mode field (8 bits) represents a modulation mode for carrier related to a virtual channel.

A carrier_frequency field (32 bits) has a recommendation value of 0. Although the field is used to identify a carrier frequency, it is not recommended.

A channel_TSID field (16 bits) is an unsigned integer field representing an MPEG-2 TS ID related to a TS containing an MPEG-2 program, which is reference by a virtual channel in a range from '0x0000' to '0xFFFF'.

A program_number field (16 bits) identifies an unsigned integer number related to a virtual channel defined in an MPEG-2 program association table (PAT) and a TS program map table (PMT). A virtual channel corresponding to analog service includes program_number of '0xFFFF'.

An ETM_location field (2 bits) describes the existence and location of an extended text message (ETM).

An access_controlled field (1 bit) indicates an access to events related to a virtual channel is controlled once it is set. If the flag is set with 0, an event access is not restricted.

A hidden field (1 bit) indicates that a user by a direct entry of a virtual channel number cannot access a virtual channel once it is set. A hidden virtual channel is omitted when a user surfs a channel, and is shown when the user accesses undefined or direct channel entry. A typical application of a hidden channel is a test signal and NVOD service. The hidden channel and its events may be shown on an EPG display according to a state of a hide_guide bit.

A hidden_guide field allows a virtual channel and its events to be displayed on an EPG display once it is set with 0 for a hidden channel. The bit is not related to a channel having no hidden bit set and thus non-hidden channels and their events are always displayed on an EPG display regardless of a state of a hide_guide bit. A typical application of a hidden channel, in which a hidden_guide bit set is set with 1, is a test signal and service easily obtainable through an application level pointer.

A service_type field (6 bits) represents a type of service transmitted from a virtual channel. FIGS. 6 and 7 are views illustrating how to define a value of a service_type field according to an embodiment. According to an embodiment, a service_type value (i.e., '0x04') shown in FIG. 6 means that service_type is ATSC_data_only_service and NRT service is transmitted through a virtual channel. According to another embodiment, a service_type value (i.e., '0x08') shown in FIG. 7 means that service_type is ATSC_nrt_service and a virtual channel provides NRT service satisfying the ATSC standard.

A source_id field (16 bits) represents the source of a program related to a virtual channel.

A descriptors_length field represents the total length (byte unit) of a descriptor for the following virtual channel.

A descriptor( ) field includes at least zero descriptor.

An additional_descriptors_length field represents a total length (byte unit) of the following VCT descriptor.

Lastly, in relation to the trailer part, a CRC_32 field is a 32 bit field and includes a cyclic redundancy check (CRC) value, which ensures zero output from registers of a decoder defined in an MPEG-2 system after processing an entire STT section.

FIG. 8 is view of data_service_table_section) for identifying an application of NRT service and bit stream syntax of data_service_table_bytes in a DST section. A broadcasting station NRT service data or NRT service signaling data, satisfying ASTC standard, may be transmitted through the DST table section of FIG. 8.

Hereinafter, semantic of fields including a data_service_table_section structure is as follows.

A table_id field (8 bits) as a field for type identification of a corresponding table section is a table section in which a corresponding table section constitutes DST through this field. For example, a receiver identifies that a corresponding table section is a table section constituting DST if a value of the field is OXCF.

A section_syntax_indicator field (1 bit) is an indicator defining a section format of DST, and the section format may be short-form syntax (0) of MPEG, for example.

A private_indicator field (1 bit) represents whether the format of a corresponding section follows a private section format and may be set with 1.

A private_section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields.

A version_number field (5 bits) represents the version number of DST.

A current_next_indicator field (1 bit) indicates whether a transmitted DST table section is applicable currently. If the field value is 0, it means that there is no table yet and the next table is valid.

A section_number field (8 bits) represents a section number in sections in which a corresponding table section constitutes a DST table. section_number of the first section in DST is set with '0x00'. The section_number is increased by one as the section of DST is increased.

A last_section_number field (8 bits) represents the last section number constituting a DST table, i.e., the highest section_number.

data_service_table_bytes represents a data block constituting DST, and its detailed structure will be described below.

A CRC_32 field is a 32 bit field and includes a cyclic redundancy check (CRC) value, which ensures zero output from registers of a decoder defined in an MPEG-2 system after processing an entire DST section.

Hereinafter, semantic of fields including a data_service_table_bytes structure is as follows.

An sdf_protocol_version field (8 bits) describes the version of a Service Description Framework protocol.

An application_count_in_section field (8 bits) represents the number of applications listed in a DST section.

A compatibility_descriptor( ) field represents that a corresponding structure includes a DSM-CC compatible descriptor. Its purpose is to signal compatible requirements of an application in a receiving platform in order to use a corresponding data service after determining its ability.

An app_id_byte_length field (16 bits) describes the number of bytes used for identifying an application.

An app_id_description field (16 bits) describes the format and semantic of the following application identification bytes. For example, a value of an app_id_description may be defined as Table 1.

TABLE 1

| Value | Application Identifier Format |
| --- | --- |
| 0x0000 | DASE application |
| 0x0001-0x7FFF | ATSC reserved |
| 0x8000-0xFFFF | User private |

An app_id_byte field (8 bits) represents a byte of an application identifier.

A tap_count field (8 bits) describes the number of Tap( ) structures used for corresponding application.

A protocol_encapsulation field (8 bits) describes a protocol encapsulation type used for transmitting a specific data element referenced by a Tap( ) field. A value of the protocol_encapsulation field is defined as Table 2.

TABLE 2

| Value | Encapsulated Protocol |
| --- | --- |
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |

TABLE 2-continued

| Value | Encapsulated Protocol |
|---|---|
| 0x0D | Asynchronous carousel scenario of the DSM-CC Download protocol encapsulated in DSM-CC sections |
| 0x0E | Reserved for harmonization with another standard body |
| 0x0E-0x7F | ATSC reserved |
| 0x80-0xFF | User defined |

An action_type field (7 bits) represents attribute of data referenced by a Tap( ).

A resource_location field (1 bit) describes a position of an association_tag field matching to an association_tag value listed in the next Tap structure. When a corresponding field is set with 0, association_tag exists in PMT of a current MPEG-2 program. Like this, when the corresponding field is set with 1, a matching association_tag exits in DSM-CC Resource Descriptor in a Network Resources Table of a corresponding data service.

A Tap( ) field may include information on searching a data element of an application state in a communication channel of a lower layer. An association_tag field in a Tap( ) field may include correspondence information between data elements of an application state. A value of an association_tag field in one Tap structure corresponds to a value of an association_tag field of one association tag descriptor in a current PMT. For example, a Tap( ) field may have a specific structure including fields of Table 3.

TABLE 3

| Syntax | No. of bits | Format |
|---|---|---|
| Tap ( ) { | | |
| tap_id | 16 | uimsbf |
| use | 16 | uimsbf |
| association_tag | 16 | uimsbf |
| selector( ) | | |
| } | | |

A tap_id field (16 bits) is used by an application to identify data elements. A value of tap_id has a range defined by values of app_id_byte fields related to Tap( ) in DST. A tap_id value is selected by a data service provider. Additionally, the tap_id value may be used for application to deal with a data element.

A Use field (16 bits) is used to specify a communication channel referenced by association_tag.

An association_tag field (16 bits) uniquely identifies one of a DSM-CC resource descriptor listed in a Network Resource Table or data elementary stream listed in PMT. A value of a corresponding field may be identical to an association_tag value of association_tag_descriptor.

A Selector( ) field describes a specific data element available in a communication channel or data elementary stream referenced by the association_tag field. Additionally, the selector structure may indicate a protocol required for a corresponding data element.

A tap_info_length field (16 bits) describes the number of bytes of descriptors in the next of a corresponding field.

A descriptor( ) field may include descriptor information according to a corresponding descriptor format.

An app_info_length field (8 bits) describes the number of bytes of the next descriptors of a corresponding field.

A descriptor( ) field may include descriptor information according to a corresponding descriptor format.

An app_data_length field (16 bits) describes the length of a byte unit of app_data_byte fields.

An app_data_byte (8 bits) field represents input parameters related to application and other private data fields in 1 byte.

A service_info_length field (8 bits) describes the number of byte units of the next descriptor.

A descriptor( ) field may include descriptor information according to a corresponding descriptor format.

A service_private_data_length field (16 bits) describes the length of a byte unit in private fields.

A service_private_data_byte field (8 bits) represents a private field in 1 byte.

Figure 9:
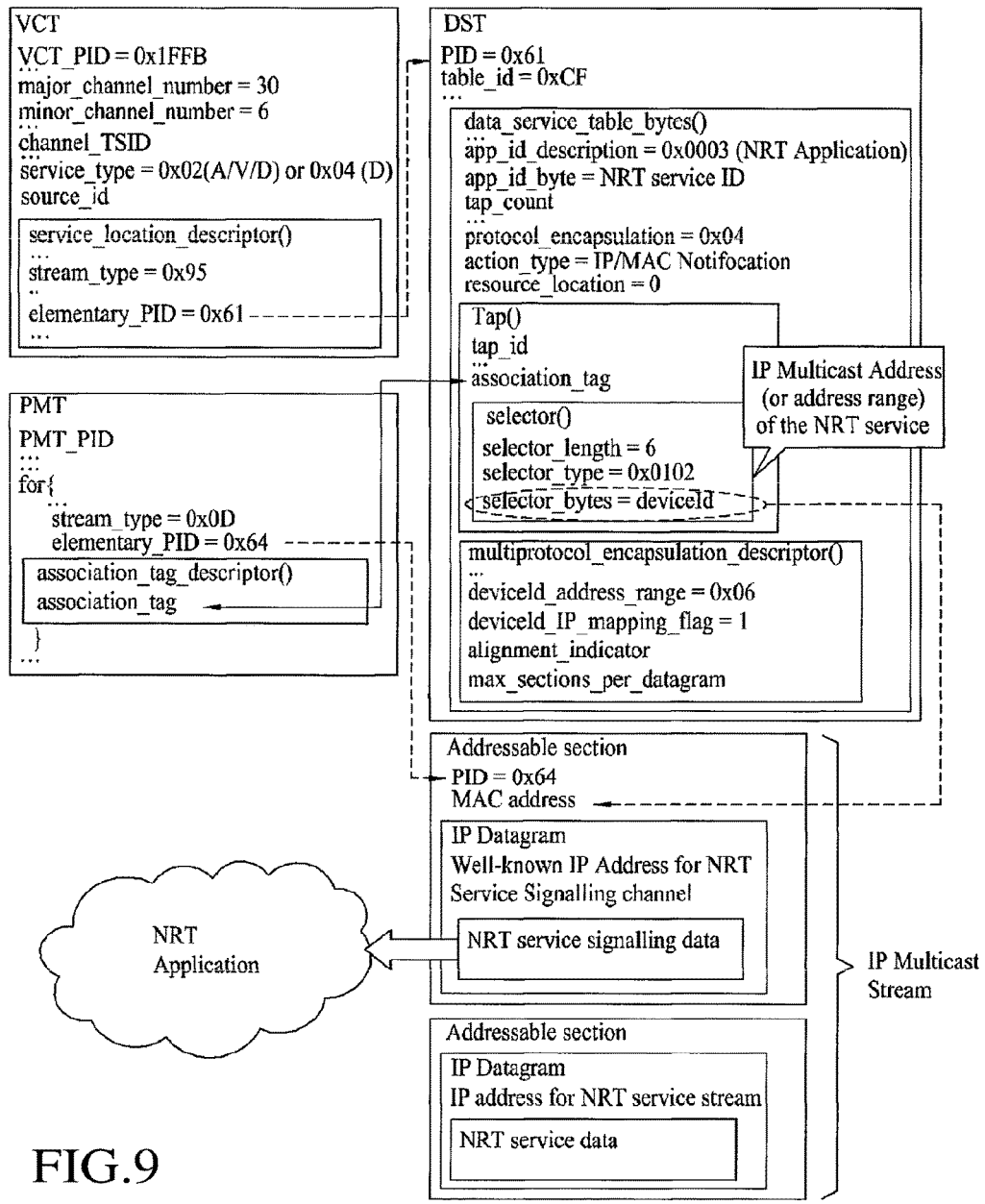
FIG. 9 is a view illustrating a method of receiving and providing NRT service in a receiving system by using ATSC A/90 standard for transmitting data broadcasting stream and ATSC A/92 standard for transmitting IP multicast stream.

FIG. 9 is a view illustrating a method of receiving and providing NRT service in a receiving system by using ATSC A/90 standard for transmitting data broadcasting stream and ATSC A/92 standard for transmitting IP multicast stream.

That is, information on stream constituting each virtual channel is signaled to service location descriptor of VCT or ES_loop of PMT. For example, as shown in FIG. 7 or 8, if VCT service type is 0x02 (i.e., digital A/V/Data), 0x04 (i.e., Data only), or 0x08 (i.e., NRT Only service), NRT service stream may be transmitted to the virtual channel. At this point, if 0x95 (i.e., DST transmission) is allocated to a stream_type field value in a service location descriptor (or ES loop of PMT), it means that broadcast is transmitted. If the stream_type field value has no value or is not 0x95, only typical A/V is transmitted. That is, if the stream_type field value in service location descriptor has 0x95, an Elementary_PID field value at this point is a PID value of a Data Service Table (DST). Accordingly, DST may be received through the Elementary_PID.

Through the DST, types of application and detailed information on data broadcasting stream transmitted through the channel may be obtained. The DST is used to identify NRT application (i.e., NRT service).

That is, the App_id_description field of DST defines the format and interpretation of the following application identification bytes. According to an embodiment, '0x0003' is allocated to the App_id_description field to identify NRT application. The above numerical value is just one example, and does not restrict the range of the rights of the present invention.

If the App_id_description field value is '0x0003', the next following Application_id_byte value becomes a Service ID value of the NRT application. A service ID for the NRT application may have a URI value uniquely identifying a corresponding service around the world.

After the NRT application is identified, PID of an MPEG-2 TS packet divided from the IP datagram of an NRT service signaling channel is searched through Tap information. Then, IP datagram transmitting a NRT service signaling channel may be obtained from MPEG-2 TS packets having PID obtained through the tap information, and NRT service signaling data may be obtained from the obtained IP datagram. At this point, the IP access information of the NRT service signaling channel may be well-known IP access information, i.e., well-known IP address and well-known UDP port number.

That is, if the Protocol_encapsulation field value in the DST is 0x04, asynchronous IP stream is transmitted, and if the Selector_type field value is 0x0102, a device_id value indicating destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

Then, the receiver receives NRT service data, i.e., NRT content item/files to save them in a storage medium or display them on a display device, on the basis of the extracted NRT service signaling data.

According to another embodiment, a Stream Type field value of DST may have new 0x96 instead of 0x95 to signal NRT service. This is because NRT service, i.e., new application, may malfunction when a typical receiver determines whether there is data broadcasting stream only on the basis of whether there is stream having a stream type of 0x95. In this case, with designating a stream newly, a typical receiver may disregard it to guarantee backwards compatibility.

Figure 10:
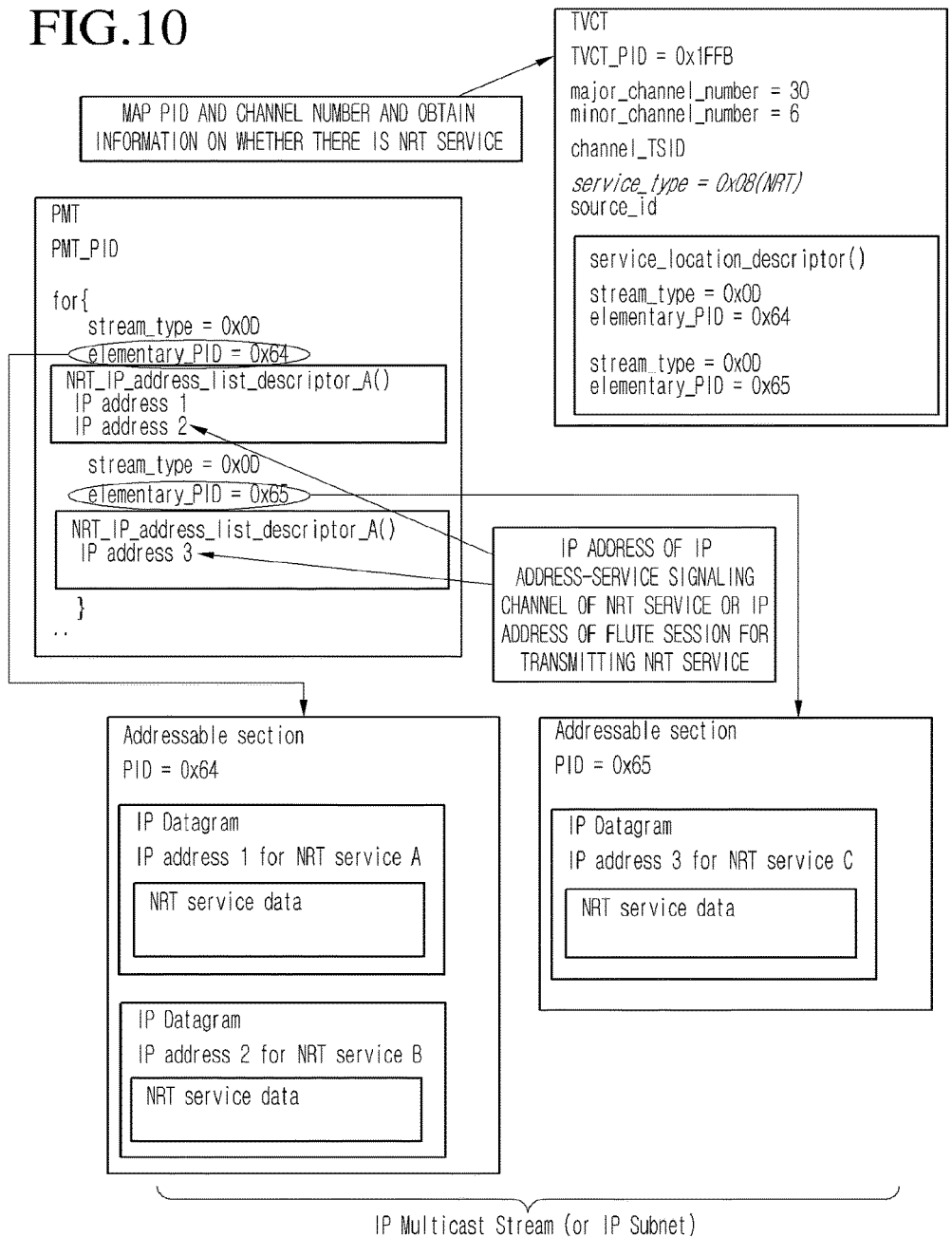
FIGS. 10 and 11 are views illustrating a method of signaling a DSM-CC addressable section data by using VCT according to another embodiment.
Figure 11:
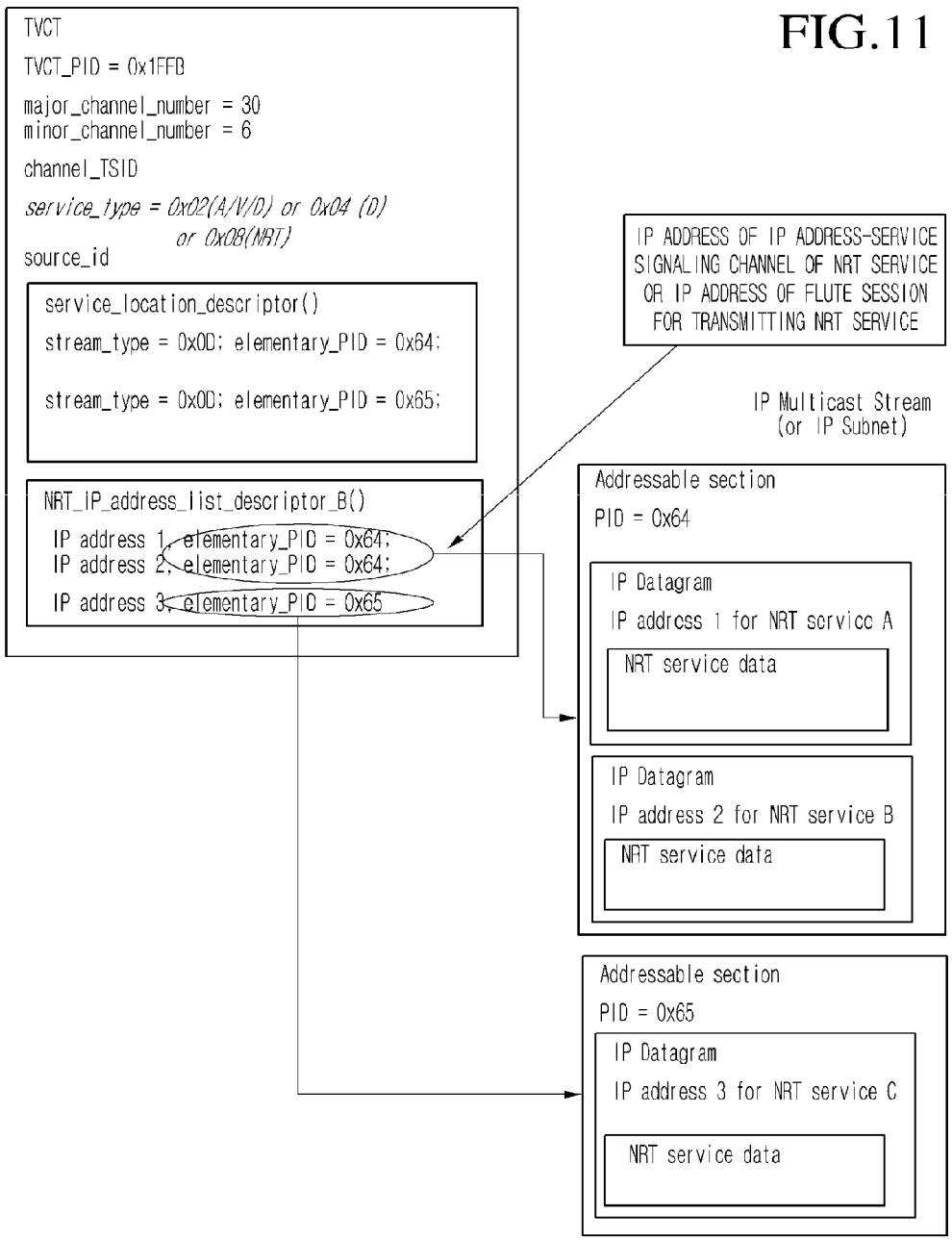

FIGS. 10 and 11 are views illustrating a method of receiving NRT service by using DSM-CC addressable section data according to another embodiment.

A data transmission method using DST is a standard for transmitting all kinds of IP datagram through digital broadcasting stream, and may be inefficient for the NRT service. Accordingly, FIGS. 10 and 11 illustrate a method of receiving the NRT service by signaling the PID of a specific stream including IP address information and section data of the IP datagram with respect to the NRT service through the data of the DSM-CC addressable section.

As shown in FIG. 10, the receiver may obtain information that NRT service stream is transmitted through the virtual channel when a service type of VCT (or TVCT) is 0x08 (i.e., NRT Only service). That is, the receiver may obtain information on whether there is NRT service according to service_type information by mapping the PID of a virtual channel into a channel number.

At this point, if 0x0D is allocated to a stream_type field value in service location descriptor of VCT (or ES loop of PMT), it means that DSM-CC stream is transmitted. An Elementary_PID field value at this point may be the PID value of a DSM-CC addressable section. Accordingly, the receiver receives a DSM-CC addressable section including NRT service data through Elementary_PID.

That is, the receiver may obtain the PID of the DSM-CC addressable section through VCT or PMT. Here, the receiver may obtain an NRT_IP_address_list_descriptor_A( ) field including an IP address of an NRT service signaling channel or an IP address of the FLUTE session for transmitting NRT service data, which corresponds to the PID obtained from PMT of the corresponding stream.

Moreover, the receiver may receive DSM-CC addressable section data from IP multicast stream or IP subnet on the basis of the IP address obtained from an NRT_IP_address_list_descriptor_A( ) field. The receiver may obtain a corresponding IP datagram including a specific NRT service (for example, A, B, or C) data by searching a DSM-CC addressable section having PID corresponding to the obtained elementary_PID from the received DSM-CC addressable section data.

FIG. 11 is a view illustrating a method of signaling a DSM-CC addressable section data by using VCT according to another embodiment.

As mentioned above, the receiver may obtain information that NRT service stream may be transmitted when a service_type in VCT is 0X02, 0X04 of 0X08. Also, the receiver may obtain elementary_PID having a stream type of 0X0D from the service_location_descriptor( ) field to receive the DSM-CC stream. Here, the receiver may obtain an NRT_I-P_address_list_descriptor_B( ) field including an IP address of an NRT service signaling channel or an IP address of the FLUTE session for transmitting NRT service data, which corresponds to the obtained elementary_PID.

Moreover, the receiver may receive DSM-CC addressable section data from IP multicast stream or IP subnet on the basis of the IP address obtained from an NRT_IP_address_list_descriptor_B( ) field. The receiver may obtain the IP datagram including specific NRT service (for example, A, B, or C) that it wants to receive from the received DSM-CC addressable section data by parsing the DSM-CC addressable section having PID corresponding to the obtained elementary_PID.

The processes for extracting NRT service signaling data and NRT service data are described as follows. Here, 0x08 is allocated to the service_type field value in VCT, and indicates that at least one NRT service is transmitted to a corresponding virtual channel.

That is, when the receiver is turned on and a channel is selected by default or a user through a tuner, the PSI/PSIP section handler obtains VCT and PMT from a broadcast signal received through the selected channel. Also, the PSI/PSIP section handler parses the obtained VCT to confirm whether there is NRT service. This is confirmed by checking the service_type field value in a virtual loop of the VCT. For example, when the service_type field value is not 0x08, the corresponding virtual channel does not transmit NRT service. At this point, since the virtual channel transmits existing service (i.e., legacy ATSC service), the receiver operates properly according to information in the virtual channel.

Additionally, in relation to a demultiplexing unit, if a service_type field value is 0x08 according to a control of a service manager, a corresponding virtual channel transmits NRT service. In this case, PID of DST is extracted by parsing a service location descriptor in a virtual channel loop of the VCT. Moreover, DST is received by using the extracted PID.

Moreover, the receiver confirms whether a corresponding service provided through a channel selected from the received DST is NRT service.

The NRT service is confirmed by an App_id_description field value.

According to an embodiment, '0x0003' is allocated to the App_id_description field to identify NRT application. The above numerical value is just one example, and does not restrict the range of the rights of the present invention.

If the App_id_description field value in the DST is '0x0003', the next following Application_id_byte value becomes a Service ID value of the NRT application (i.e., NRT service). Therefore, the service manager or PSI/PSIP section handler extracts Tap( ) to PID of an MEGP-2 TS packet separated from the IP datagram of the NRT service signaling channel after identifying the NRT application (i.e., NRT service). Then, stream PID including association_tag of the extracted Tap is extracted from PMT.

Also, the addressable section handler may recover the DSM-CC addressable section by removing decapsulation, i.e., an MPEG-2 header, after receiving MPEG-2 TS packets corresponding to the extracted stream PID.

Then, the receiver recovers the IP datagram transmitting an NRT service signaling channel by removing a section header and CRC checksum from the DSM-CC addressable section and obtains NRT service signaling data from the recovered IP datagram. Here, access information on the IP datagram transmitting the NRT service signaling channel is a well-known destination IP address and a well-known destination UDP port number.

That is, if the Protocol_encapsulation field value in the DST is 0x04, asynchronous IP stream is transmitted, and if the Selector_type field value is 0x0102, a device_id value indicating a destination address may be delivered through selector_bytes. multiprotocol_encaplsulation_descriptor is used to accurately interpret the selector_bytes value and the number of valid bytes in the device_id value is signaled. As a result, through the Tap information, an IP Multicast address (or address range) of the NRT service signaling channel, transmitted to the corresponding PID, is obtained.

Accordingly, a receiver accesses the Multicast address (or address range) to receive IP stream, i.e., IP packet, and then, extracts NRT service signaling data from the received IP packet.

The receiver receives NRT service data, i.e., NRT content item/files to save them in a storage medium or display them on a display device, on the basis of the extracted NRT service signaling data.

Moreover, the NRT service may be provided Dynamic Content Delivery (DCD) service according to an embodiment. The DCD service is service for transmitting content to a receiver periodically or at the user request, and the content is selected from a server according to receiver information. The DCD service supports a point-to-point method and a broadcast method in a communication means for content delivery, and the above NRT service is transmitted through an OMA BCAST method and one of the broadcast methods of the DCD service.

NRT service data may be transmitted through the DCD service of the OMA BCAST method. In this case, the receiver may obtain the DCD channel information to receive NRT service and may receive the NRT service through a corresponding DCD channel on the basis of the DCD channel information.

Moreover, the DCD channel information may be included in the NST and transmitted. For example, the receiver receives NST, and obtains DCD channel information through DCD bootstrap.

Additionally, the NST may include DCD channel metadata, received through a DCD administrative channel, for signaling of the DCD channel information. Accordingly, the receiver may obtain information on a channel for receiving NRT service and metadata through NST.

Accordingly, when NST including DCD channel information is transmitted, the receiver accesses the DCD channel through NST without transmission of the NRT service signal data, and then receives the NRT service.

Like this, if NST includes metadata of a channel for receiving NRT service, there are several advantages.

First, without receiving the NRT service signaling data on the basis of the service type of a virtual channel, service access speed may be increased by receiving channel metadata that directly receives NRT service from NST.

Additionally, update signaling for a channel change item may be performed in real time in a broadcast environment.

Moreover, access information in OMA BCAST SG may be obtained by referring to NST. For example, the receiver receives DCD channel meta data on the basis of the DCD channel information in NST, and obtains access information to receive NRT service on the basis of the NRT service signaling data and DCD channel metadata obtained from NST.

Lastly, NST including a list of NRT service related to another virtual channel may be transmitted. Accordingly, list information of the NRT service may be transmitted through a specific NRT service signaling channel on an IP layer not on a PSI or PSIP layer. Accordingly, in this case, backwards compatibility to PSI or PSIP may be reserved.

In addition, as mentioned above, the DCD channel information including the DCD channel metadata may be included in the access information of SG in OMA BCAST, and the access information corresponds to the NRT service information in NST. In more detail, the receiver may obtain NRT service information in NST from an access fragment of OMA BCAST SG. Accordingly, the receiver may obtain information on receiving NRT service by receiving NST corresponding to the obtained NRT service information.

Moreover, the NRT service transmitted through the DCD channel may be divided by a service category allocated. For example, the service category of the NRT service transmitted through the DCD channel may be identified by 0X0F.

FIGS. 12 and 13 are views illustrating a bit stream syntax of NST according to an embodiment.

Here, the corresponding syntax is created in an MPEG-2 private section format to help understanding, but the format of the corresponding data may vary. For example, the corresponding data may be expressed in a Session Description Protocol (SDP) format and signaled through a Session Announcement Protocol (SAP) according to another method.

NST describes service information and IP access information in a virtual channel for transmitting NST, and provides NRT broadcast stream information of a corresponding service by using an identifier of the NRT broadcast stream, i.e., NRT_service_id, in each service. Furthermore, the NST describes description information of each fixed NRT service in one virtual channel, and a descriptor area may include other additional information.

A table_id field (8 bits) as a field for type identification of a corresponding table section is a table section in which a corresponding table section constitutes NST through this field.

A section_syntax_indicator field (1 bit) is an indicator defining a section format of NST, and the section format may be short-form syntax (0) of MPEG, for example.

A private_indicator field (1 bit) represents whether the format of a corresponding section follows a private section format and may be set with 1.

A section_length field (12 bits) represents a remaining table section length after a corresponding field. Additionally, a value of this field does not exceed '0xFFD'.

A table_id_extension field (16 bits) is dependent on a table, and may be a logical part of a table_id field providing a range of the remaining fields. Here, a table_id_extension field includes an NST_protocol_version field.

The NST_protocol_version field (8 bits) shows a protocol version for notifying that NST transmits parameters having a different structure than other defined in a current protocol.

Currently, this field value is 0. If the field value is designated with other than 0 later, it is for a table having a different structure.

A version_number field (5 bits) represents the version number of NST.

A current_next_indicator field (1 bit) indicates whether a transmitted NST table section is applicable currently. If the field value is 0, it means that there is no table yet and the next table is valid.

A section_number field (8 bits) represents a section number in sections in which a corresponding table section constitutes a NST table.

section_number of the first section of an NRT Service Table (NST) is set with '0x00'. The section_number is increased by one each time a section of the NST is increased.

A last_section_number field (8 bits) represents the last section number constituting a NST table, i.e., the highest section_number. (Highest section_number)

A carrier_frequnecy field (32 bits) notifies a transmission frequency corresponding to a channel.

A channel_TSID field (16 bits) means a unique channel identifier of broadcast stream in which a corresponding NST section is currently transmitted.

A program_number field (16 bits) represents the number of a program related to a virtual channel.

A source_id field (16 bits) represents the source of a program related to a virtual channel.

A num_NRT_services field (8 bits) represents the number of NRT services in an NST section.

Additionally, NST provides information on a plurality of fixed NRT services by using a 'for' loop. Hereinafter, the same field information may be provided to each fixed NRT service.

An NRT_service_status field (2 bits) identifies a state of a corresponding mobile service. Here, MSB indicates whether a corresponding mobile service is active (1) or inactive (0), and whether the corresponding mobile service is hidden (1) or not (0). Here, if the mobile service is NRT service, a state of the corresponding NRT service is identified. Hidden service is mainly used for exclusive application and a typical receiver disregards it.

A SP_indicator field (1 bit) is a field representing service protection if the service protection applied to at least one of components necessary for providing meaningful presentation of a corresponding mobile service is set.

A CP_indicator field (1 bit) represents whether content protection of a corresponding NRT service is set. If the CP_indicator field value is 1, it means that the content protection is applied to at least one of components required to provide a meaningful presentation of a corresponding NRT service.

An NRT_service_id field (16 bits) is an indicator that uniquely identifies a corresponding NRT service in a range of a corresponding NRT broadcast. The NRT_service_id is not changed during the corresponding service. Here, if the service is terminated, in order to evade confusion, NRT_service_id for the service may not be used for another service until an appropriate time elapses.

A Short_NRT_service_name field (8*8 bits) displays a short name of the NRT service. If there is no short name of the NRT service, the field may be filled with a null value (for example, 0x00).

An NRT_service_category field (6 bits) identifies a type of service in the corresponding NRT service.

A num_components field (5 bits) displays the number of IP stream components in the NRT service.

If an IP_version_flag field (1 bit) is set with 0, it indicates that a source_IP_address field, an NRT_service_destination_IP_address field, and a component_destination_IP_address field are IPv4 addresses. If set with 1, a source_IP_address field, an NRT_service_destination_IP_address field, and a component_destination_IP_address field are IPv6 addresses.

A source_IP_address_flag field (1 bit) indicates when a flag is set that there is a source IP address value for corresponding NRT service to indicate source specific multicast.

An NRT_service_destination_IP_address_flag field (1 bit) indicates when a flag is set with 1 that there is an NRT_service_destination_IP_address field for providing a default IP address for components of a corresponding NRT service.

In relation to a source_IP_address field (128 bits), there is a corresponding field if source_IP_address_flag is set with 1, but there is no corresponding field if set with 0. If there is a corresponding field, the corresponding field includes a source IP address of all IP datagram transmitting components of the corresponding NRT service. A restricted use of a 128 bit long address of a corresponding field is for future use of IPv6, which is not currently used though. Source_IP_address becomes a source IP address of the same server transmitting all channels of a FLUTE session.

In relation to an NRT_service_destination_IP_address field (128 bits), if source_IP_address_flag is set with 1, there is a source_IP_address field, but if source_IP_address_flag is set with 0, there is no corresponding source_IP_address field. If there is no corresponding source_IP_address field, a component_destination_IP_address field exists for each component in a num_components loop. A restricted use of a 128 bit long address of a corresponding source_IP_address field is for future use of IPv6, which is not currently used though. NRT_service_destination_IP_Address is signaled if there is a destination IP address of a session level of the FLUTE session.

Additionally, NST provides information on a plurality of components by using a 'for' loop. An essential_component_indicator field (1 bit) indicates when a value of a corresponding value is set with 1 that a corresponding component is a necessary component for NRT service. If not, the corresponding component is a selected component.

A port_num_count field (6 bits) indicates numbers of UDP ports related to a corresponding UDP/IP stream component. Values of the destination UDP port numbers are increased by one, starting from a component_destination_UDP_port_num field value.

A component_destination_IP_address_flag field (1 bit) is a flag representing that there is a component_destination_IP_address field for corresponding component if set with 1.

In relation to component_destination_IP_address field (128 bits), if component_destination_IP_address_flag is set with 1, there is corresponding field, but if component_destination_IP_address_flag is set with 0, there is no corresponding field. If there is a corresponding field, the corresponding field includes a source IP address of all IP datagram transmitting components of the corresponding NRT service. A restricted use of a 128 bit long address of a corresponding field is for future use of IPv6, which is not currently used though.

A component_destination_UDP_port_num field (16 bits) represents a destination UDP port number for corresponding UDP/IP stream component.

A num_component_level_descriptors field (4 bits) provides the number of descriptors providing additional information on corresponding IP stream component.

A component_level_descriptors field identifies at least one descriptor providing additional information on a corresponding IP stream component.

A num_NRT_service_level_descriptors field (4 bits) represents the number of NRT service level descriptors for corresponding service.

NRT_service_level_descriptor( ) identifies no or at least one descriptor providing additional information on corresponding NRT service. Here, a specific service type for NRT service may be provided. The specific service type includes a portal service providing web content, push VOD, and A/V download.

A num_virtual_channel_level_descriptors field (4 bits) describes the number of virtual channel level descriptors for a corresponding virtual channel.

virtual_channel_level_descriptor( ) represents a descriptor providing additional information on a virtual channel that a corresponding NST describes.

Moreover, NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel.

Additionally, a destination port number is signaled through component_destination_UDP_port_num and the number of destination ports starting from component_destination_UDP_port_num may be additionally designated through port_num_count.

A plurality of channels may be configured for one destination IP address by designating a port in plurality. Here, one component designates a plurality of channels. However, it is desired to identify a channel through a destination IP address in general. Here, one channel is typically mapped into one component.

Content items/files for NRT service are transmitted through FLUTE, and corresponding FLUTE session information is signaled using access information on the NST table.

FIG. 14 is a view illustrating a bit stream syntax of NRT_component_descriptor (MH_component_descriptor) according to an embodiment.

NRT_component_descriptor( ) is shown in a component descriptor loop in each component of each NRT service in NST. Then, all parameters in a corresponding descriptor correspond to parameters used for components of NRT service.

Hereinafter, each field information transmitted through the NRT_component_descriptor of FIG. 14 will be described as follows.

A component_type field (7 bits) identifies an encoding format of a component. The identification value may be one of values allocated for payload_type of a RTP/AVP stream. Additionally, the identification value may be a dynamic value ranging from 96 to 127. Values of the field for components constituting media transmitted through RTP are identical to those in payload_type in an RTP header of IP stream transmitting a corresponding component.

An adding value of a component_type field in a range of 43 to 71 will be defined in the future version of the standard. When NRT service stream is transmitted based on FLUTE, in order to additionally signal parameters (described below) necessary for FLUTE session, 38 (which is component_type defined for a FLUTE component in ATSC) may be used, or 43 (i.e., an unallocated value) may be defined as component_type for new NRT transmission, and used.

A num_STKM_streams field (8 bits) identifies numbers of STKM streams related to a corresponding component.

A STKM_stream_id field (8 bits) identifies STKM stream having keys in order to decrypt the obtained corresponding protected component. Here, the STKM_stream_id field in the component descriptor for the STKM stream is referred.

An NRT_component_data (component_type) field provides at least one of encoding parameters necessary for expressing a corresponding component and other parameters. Here, a structure of an NRT_component_data element is determined by a value of a component_type field.

A File Delivery Table (FDT) of FLUTE sessions is used for delivering item lists of all content items, and provides sizes, data types, and other information of items related to obtain the items.

Accordingly, the present invention obtains information for accessing the FLUTE session transmitting a corresponding content by using NST, in order to receive a selected content from SG obtained by using NRT-IT. Moreover, the present invention maps information in a file transmitted through a corresponding FLUTE session into information on a content item of NRT-IT. In this case, identification of service including the selected content item is resolved through NRT_service_id of the NST.

NRT service is transmitted through FLUTE, and access information on the NST table is connected to FLUTE session information as follows.

Source_IP_address is a source IP address of the same server transmitting all channels of the FLUTE session.

NRT_service_destination_IP_Address is signaled if there is a destination IP address of a session level of the FLUTE session.

A component may be mapped into a channel in the FLUTE session, and an additional destination IP address (which is different from an IP address signaled by session) is signaled through component_destination_IP_address at each channel. Additionally, a destination port number is signaled through component_destination_UDP_port_num and the number of destination ports starting from component_destination_UDP_port_num may be additionally designated through port_num_count.

A plurality of channels may be provided to one destination IP address by designating a plurality of ports, and in such a case, one component designates a plurality of channels. However, it is recommended that a channel be distinguished through a destination IP address, and in such a case, one channel is mapped into one component.

component_attribute_byte may be used to signal an additional attribute of a component constituting a session. Additional parameters necessary for signaling a FLUTE session may be signaled through this.

In this regard, parameters for signaling the FLUTE session are required, and include definitely necessary required parameters and optional necessary parameters related to a corresponding FLUTE session. Firstly, the definitely necessary parameters include parameters such as a source IP address, the number of channels in the session, the destination IP address and port number for each channel in the session, the Transport Session Identifier (TSI) of the session, and the start time and end time of the session. The optional necessary parameters related to a corresponding FLUTE session include parameters such as FEC Object Transmission Information, some information that tells receiver in the first place, that the session contains files that are of interest and bandwidth specification.

The number of channels in the session may be explicitly provided, or may be obtained by adding up the number of streams constituting the session. Through the NST and component_descriptor, parameters such as start time and end time of the session, source IP address, destination IP address and port number for each channel in the session, Transport Session Identifier (TSI) of the session, and number of channels in the session may be signaled.

FIG. 15 is a view illustrating a bit stream syntax of NRT component descriptor including NRT_component_data according to an embodiment.

One NRT service may be included in multiple FLUTE sessions. Each session may be signaled using at least one NRT component descriptors depending on IP addresses and ports used for the session.

Hereinafter, each field of NRT_component_data will be described as follows.

A TSI field (16 bits) represents TSI of a FLUTE session.

A session_start_time field indicates a start time of the FLUTE session. If all values of the corresponding fields are 0, it means that a session started already.

A session_end_time field indicates an end time of the FLUTE session. If all values of the corresponding fields are 0, it means that a session continues infinitely.

A tias_bandwidth_indicator field (1 bit) indicates flags including Transport Independent Application Specific (TIAS) bandwidth information. If it indicates that the TIAS bandwidth field exists, a corresponding bit is set with 1, and if it indicates that the TIAS bandwidth field does not exist, the corresponding bit is set with 0.

In relation to an as_bandwidth_indicator field (1 bit), flags include Application Specific (AS) bandwidth information. If it indicates that the AS bandwidth field exists, a corresponding bit is set with 1, and if it indicates that the AS bandwidth field does not exist, the corresponding bit is set with 0.

An FEC_OTI_indicator field (1 bit) represents whether FEC object transmission information (OTI) is provided.

A tias_bandwidth field represents a TIAS maximum bandwidth.

An as_bandwidth field has an AS maximum bandwidth value.

An FEC_encoding_id field represents FEC encoding ID used in the corresponding FLUTE session.

An FEC_instance_id field represents FEC instance ID used in the corresponding FLUTE session.

Provided is a method of providing all Information necessary for receiving the FLUTE session by signaling the same parameters as above through FLUTE component data bytes, and of receiving files by obtaining information on all the files delivered through the FLUTE session that uses FDT received through the session.

This FLUTE component descriptor may be delivered through a Component_level_descriptor loop of NST. If the FLUTE channel is in plurality, since TSI and session_start_time, session_end_Time, i.e., parameters of a session level, should be signaled once, a FLUTE component descriptor may be transmitted only in one of components in several channels through a Component_level_descriptor loop.

FIG. 16 is a view illustrating a bit stream syntax of NRT-IT section for signaling NRT application according to an embodiment.

Information provided from NRT-IT includes a title of content (for example, a name of downloadable program), download available time and information, content advisories, caption service availability, content identification, and other metadata. One item of content may include at least one file. For example, an audio/video clip may be played in a JPEG thumbnail image used for displaying a screen.

An instance of NRT-IT may include data corresponding to an arbitrarily predetermined period, or may describe a NRT content starting at a predetermined time and ends at the indefinite future. Each NRT-IT represents a start time and a duration period that may be indefinite. Each NRT-IT instance may be divided into 256 sections. Each section includes information on a plurality of content items. Information of a specific content item cannot be divided and saved in at least two sections.

The downloadable content item, which is more extended than a period that at least one NRT-IT instance takes, is the first of NRT-IT. The content item description is saved in NRT_information_table_section ( ) in an availability order. Accordingly, when a value of last_section_number is greater than 0 (it means that NRT-IT is transmitted to a plurality of sections), all content item description in a specific section not the first section may have the same as or higher availability than the content item description of the next section.

Each NRT-IT identifies an NRT service related to a specific value of a valid service_id in a specific virtual channel during the period.

A table_id field (8 bits) is set with OxTBD to identify a table section that a corresponding table section constitutes NRT-IT.

A service_id field (16 bits) describes a service_id field related to NRT service showing a content item that the section describes.

An NRT_IT_version_number field (5 bits) is defined as a set in at least one NRT_content_table_section( ) having a common value with respect to service_id, current_next_indicator, protocol_version, and time_span_start fields. It identifies a version number of an NRT-IT instance. The version number is increased by 1 modulo 32 when a field of NRT-IT instance is changed.

A current_next_indicator field (1 bit) represents that a corresponding table section is applicable currently if set with 1.

A protocol_version field (8 bits) is set with 0. A function of protocol_version allows a table type having parameters in the future, which has a different structure than those defined in the current protocol. Currently, only one valid value of protocol_version is 0. A value other than 0 in protocol_version is used for the future version of standard to recognize other tables having different structures.

A time_span_start field (32 bits) represents a start time of an instance period represented in GPS sec from 00:00:00 UTC, Jan. 6, 1980. A time of day of time_span_start is set to 00 min of the time. A value 0 of time_span_start represents a period of an NRT-IT instance starting from a negative past. A value of time_span is identical at each section of multi-sectioned NRT-IT instance. Values of time_span_start and time_span_length are set not to overlap another NRT-IT instance of an IP subnet at a specified period.

A time_span_length field (11 bits) identifies a number of min starting at the time recognized at time_span_start that the instance covers. Once it is set, a value of time_span_length does not change in a value of time_span_start. If a value of time_span_length is 0, an NRT-IT instance covers an entire time starting from time_span_start at the indefinite future. When a value of time_span_start is 0, there is no meaning in time_span_length.

A value of time_span_start is identical at each section of multi-sectioned NRT-IT instance. Values of time_span_start and time_span_length are set not to overlap another NRT-IT instance of an IP subnet at a specified period.

A num_items_in_section field (8 bits) represents the number of content items described in an NRT-IT section.

A content_linkage field (16 bits) represents an identification number within a range from 0x0001 to 0xFFFF. 0x0000 is not used. content_linkage is a linkage function for two: this links at least one file of FLUTE FDT related to NRT service with metadata of NRT-IT and forms TF_id (identifier for Text Fragement in Text FragmentTable). A value of a content_linkage field corresponds to a value of an FDT-Cotent-Linkage element or a value of a File-Content-Linkage element in FLUTE FDT of each file related to a content item. A priority rule is applied when each content linkage value including a corresponding content linkage element in FLUTE FDT is matched.

A TF_availiable flag (Boolean flag) is set with 1 when Text Fragment exists in a Text Fragment Table of a service signaling channel. If Text Fragment is not included in a service signaling channel for the content item, a value of the TF_availiable field is set with 0.

If a low_lantency flag (Boolean flag) is set with 1, as a user waits, content is valid in a current digital transmission of sufficiently low delay time that collection attempts. If set with 0, a collection delay time becomes longer and a user interface suggests a post view to a user.

A playback_length_in_seconds (20 bits) is an integer representing a playing time of a content in sec. A content including texts and/or still images has a value of 0. In relation to a content including audio or audio/video content, playback_length_in_seconds represents a playing time of audio or audio/video content.

If a content_length_included flag (Boolean flag) is set with 1, a content_length field exists in the repetition in a 'for' loop. If set with 0, it indicates that the content_length field does not exist in the repetition in a 'for' loop.

If a playback_delay_included flag (Boolean flag) is set with 1, it indicates that a playback_delay field exists in the repetition in a 'for' loop. If set with 0, it indicates that the playback_delay field does not exist in the repetition in a 'for' loop.

If an expiration_included flag (Boolean flag) is set with 1, an expiration field exits in the repetition in a 'for' loop. If set with 0, it indicates that the expiration field does not exist in the repetition in a 'for' loop.

A duration (12 bits) field represents an expected cycle time of carousel including a referenced content item in a range of 1 to 2880 in min. A receiver uses a duration parameter determining a time taking for the referenced content capture.

playback_delay (20 bits) is represented with a number of the next sec of the first byte before playing a related content while incoming stream is buffered. A value of 0 represents playing starts immediately. When playback_delay is not set, a receiver collects a complete file or a file before playing.

An expiration field (32 bits) represents expiration time expressed in GPS sec from 00:00:00 UTC, Jan. 6, 1980. After expiration, the content is deleted from the memory. If it is not expired, the receiver uses a method that a company for managing a memory resource selects.

A content_name_length_field (8 bits) represents the length (byte unit) of content_name_text.

A content_name_text( ) field represents a content item title in a system having a plurality of string structures.

A content_descriptors_length field (12 bits) represents an entire length (byte unit) of content_descriptor providing additional information on a content level.

content_descriptor is a descriptor that is additionally applied to each content item.

descriptor_length (10 bits) represents an entire length (byte unit) of a descriptor.

A descriptor is generally applied to all content items described in the current NRT-IT section.

FIG. 17 is a view illustrating a syntax structure of bit stream for NRT section (NRT_content_table_section) according to an embodiment. Detailed description of each field in the NCT section is as follows.

In FIG. 17, a table_id field (8 bits) as the identifier of a table includes an identifier identifying NCT.

A section_syntax_indicator field (1 bit) is an indicator defining a section format of NCT.

A private_indicator field (1 bit) represents whether NCT follows a private section.

A section_length field (12 bits) represents the section length of NST.

An NRT_channel_id field (16 bits) represents a value uniquely identifying NRT service including content described in NCT.

A version_number field (5 bits) represents the version number of NCT.

A current_next_indicator field (1 bit) represents whether information in a corresponding NCT section is applicable currently or in the future.

A section_number field (8 bits) represents the section number of a current NCT section.

A last_section_number field (8 bits) represents the last section number of NCT.

A protocol_version field (8 bits) indicates a protocol version for allowing NCT, which transmits parameters having different structures then those defined in a current protocol. (An 8-bit unsigned integer field whose function is to allow, in the future, this NRT Content Table to carry parameters that may be structured differently than those defined in the current protocol. At present, the value for the protocol_version shall be zero. Non-zero values of protocol_version may be used by a future version of this standard to indicate structurally different tables.)

A num_contents_in_section field (8 bits) indicates the number of contents in the NCT. At this point, the number of contents represents the number of contents transmitted through a virtual channel that source_id specifies.

Later, a 'for' loop (or a content loop) is performed as many as the number of contents corresponding to the num_contents_in_section field value, to provide the detailed information of a corresponding content by each content.

A content_version field (32 bits) indicates the version number for content (or a file) having a specific content_id value. That is, let's assume that if content_id of a content that a receiver receives previously is 0x0010, the same content, i.e., its content_id value is 0x0010 is transmitted. At this point, if the content_version field value is different, the previously saved content is updated or replaced by receiving the newly announced content through the NCT. In this embodiment, the content_version field value means a series number representing a release version but may actually represent published (released) time directly. At this point, if the content_version field is difficult to represent publish time, a new field may be used to represent the published (released) time.

A content_id field (16 bits) indicates an identifier uniquely identifying the content (or file).

A content_available_start_time field (32 bits) and a content_available_end_time field (32 bits) represent a start time and end time of a FLUTE session transmitting the content.

An ETM_location field (2 bits) describes the existence and location of an extended text message (ETM).

A content_length_in_seconds field (30 bits) represents an actual play time of a corresponding content in sec unit when the content (or file) is an A/V file.

A content_size field (48 bits) represents the size of the content (or file) in byte unit.

A content_delivery_bit_rate field (32 bits) represents a bit rate at which the content (or file) is transmitted, and means a target bit rate. That is, when a service provider or broadcasting station transmits a corresponding content, the content_delivery_bit_rate field displays how wide a bandwidth is to be allocated. Accordingly, if a receiver uses content_size and content_delivery_bit_rate, the minimum time for receiving a corresponding content (or file) is obtained. That is, the time for receiving content is estimated and provided to a user. Also, the minimum receiving time is obtained by calculating (conent_size*8)/(content_delivery_bit_rate) and its unit is in sec.

A content_title_length field (8 bits) represents the length of content_title_text( ) in byte unit. If this field is used, the receiver knows how many bytes need to be read to obtain content_title_text ( ) information.

A content_title_text( ) field represents a content title in the format of a multiple string structure.

That is, the receiver uses the NCT to obtain configuration information on NRT content/file, and provides a guide for the NRT/file on the basis of the obtained configuration information on NRT content/file. Moreover, the receiver obtains access information of FLUTE session, which transmits the content/file selected by the guide, from NST, and receives the selected content by using the obtained FLUTE session access information.

Moreover, the present invention may include container information, encoding information, and decoding parameters of media objects, necessary for rendering of the content/files constituting NRT service, in the NCT, and then transmit it. Accordingly, a receiving system extracts the container information, the encoding information, and the decoding parameters of media objects by each content, necessary for rendering of the corresponding content/files, and uses them in rendering.

FIG. 18 is a view illustrating a bit stream syntax structure of an SMT session providing signaling information on NRT service data according to an embodiment.

Here, the corresponding syntax is created in an MPEG-2 private section format to help understanding, but the format of the corresponding data may vary.

The SMT describes signaling information (or signaling information of NRT service) and IP access information of a mobile service in Ensemble in which SMT is transmitted. The SMT uses Transport_Stream_ID, i.e., an identifier of broadcast stream including each service, and provides broadcasting stream information of a corresponding service. Furthermore, SMT includes description information of each mobile service (or NRT service) in one Ensemble, and includes other additional information in a descriptor area.

As mentioned above, the SMT session may be included as the IP stream format in the RS frame, and then, transmitted.

In this case, RS frame decoders of a receiver describe later decode inputted RS frames, and outputs the decoded RS frames as a corresponding RS frame handler. Moreover, each RS frame handler divides the inputted RS frame by a row unit to constitute M/H TP, and outputs it as an M/H TP handler.

In addition, examples of fields transmitted through SMT are as follows.

A table_id field (8 bits) is a field indicating a table type, and through this, it is confirmed that this table section is a table section in SMT. (table_id: An 8-bit unsigned integer number that indicates the type of table section being defined in Service Map Table (SMT)).

A section_syntax_indicator field (1 bit) is an indicator defining a session format of SMT, and its session format may be a short-form syntax ('0') of MPEG (section_syntax_indicator: This 1-bit field shall be set to '0' to always indicate that this table is derived from the "short" form of the MPEG-2 private section table).

A private_indicator field (1 bit) indicates whether SMT follows a private section (private_indicator: This 1-bit field shall be set to '1').

A section_length field (12 bits) represents the remaining session length of SMT after a corresponding field (section_length: A 12-bit field. It specifies the number of remaining bytes this table section immediately following this field. The value in this field shall not exceed 4093 (0xFFD)).

A table_id_extension field (16 bits) is dependent on a table, and may be a logical part of a table_id field providing a range of the remaining fields (table_id_extension: This is a 16-bit field and is table-dependent. It shall be considered to be logically part of the table_id field providing the scope for the remaining fields).

Here, a table_id_extension field includes an SMT_protocol_version field.

The SMT_protocol_version field (8 bits) shows a protocol version that allows SMT transmitting parameters having a different structure than those defined in a current protocol (SMT_protocol_version: An 8-bit unsigned integer field whose function is to allow, in the future, this SMT to carry parameters that may be structured differently than those defined in the current protocol. At present, the value for the SMT_protocol_version shall be zero. Non-zero values of SMT_protocol_version may be used by a future version of this standard to indicate structurally different tables).

An ensemble_id field (8 bits) includes values of '0x00' to '0x3F', as an ID value related to corresponding Ensemble (ensemble_id: This 8-bit unsigned integer field in the range 0x00 to 0x3F shall be the Ensemble ID associated with this Ensemble. The value of this field shall be derived from the parade_id carried from the baseband processor of physical layer subsystem, by using the parade_id of the associated Parade for the least significant 7 bits, and using '0' for the most significant bit when the Ensemble is carried over the Primary RS frame, and using '1' for the most significant bit when the Ensemble is carried over the Secondary RS frame).

A version_number field (5 bits) represents the version number of SMT. A current_next_indicator field (1 bit) indicates whether a transmitted SMT table session is applicable currently (current_next_indicator: A one-bit indicator, which when set to '1' shall indicate that the Service Map Table sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field (8 bits) represents a current SMT session number (section_number: This 8-bit field shall give the section number of this NRT Service Signaling table section. The section_number of the first section in an NRT Service Signaling table shall be 0x00. The section_number shall be incremented by 1 with each additional section in the NRT Service Signaling table).

A last_section_number field (8 bits) represents the last session number constituting an SMT table.

(last_section_number: This 8-bit field shall give the number of the last section (i.e., the section with the highest section_number) of the Service Signaling table of which this section is a part).

A num_services field (8 bits) indicates the number of services in an SMT session. (num_services: This 8 bit field specifies the number of services in this SMT section). At least one mobile service, at least one NRT service, or mobile and NRT services may be received through Ensemble having the SMT. If only NRT services are transmitted through the Ensemble having SMT, it may indicate the number of NRT services in the SMT.

Later, a 'for' loop (or a service loop) is performed as many times as the number of services corresponding to the num_service field value, to provide signaling information on a plurality of services. That is, signaling information of a corresponding service is displayed by each service in the SMT session. Here, the service may be mobile or NRT service. At this point, the following field information may be provided to each service.

A service_id field (16 bits) represents a value uniquely identifying a corresponding service (A 16-bit unsigned integer number that shall uniquely identify this service within the scope of this SMT section). The service_id of a service shall not change throughout the life of the service.

To avoid confusion, it is recommended that if a service is terminated, then the service_id for the service should not be used for another service until after a suitable interval of time has elapsed. Here, if the service is NRT service, the service_id may identify the NRT service.

A Multi_ensemble_service field (2 bits) identifies whether a corresponding service is transmitted through at least one Ensemble.

Additionally, the corresponding field identifies whether service is rendered as a portion of the service transmitted through a corresponding Ensemble. That is, if the service is NRT service, the filed identifies whether NRT service is transmitted through at least one Ensemble (multi_ensemble_service: A two-bit enumerated field that shall identify whether the Service is carried across more than one Ensemble. Also, this field shall identify whether or not the Service can be rendered only with the portion of Service carried through this Ensemble).

A service_status field (2 bits) identifies a state of a corresponding service. Here, MSB indicates whether a corresponding service is active (1) or inactive (0), and LSB indicates whether a corresponding service is hidden (1) or not (0). Here, when the service is NRT service, MSB of the service_status field indicates whether a corresponding NRT service is active (1) or inactive (0), and LSB indicates whether a corresponding NRT service is hidden (1) or not (0).

A SP_indicator field (1 bit) represents whether service protection of a corresponding service is set. If a SP_indicator field value is 1, service protection is applied to components required for providing meaningful presentation of a corresponding service.

A short_service_name_length field (3 bits) represents the length of a short service name in a short_service_name field in byte unit.

A short_service_name field represents a short name of a corresponding service (short_service_name: The short name of the Service, each character of which shall be encoded per UTF-8 [29]. When there is an odd number of bytes in the short name, the second byte of the last of the byte pair per the pair count indicated by the short_service_name_length field shall contain 0x00). For example, if the service is mobile service, a short name of the mobile service is displayed, and if it is NRT service, a short name of the NRT service is displayed.

A service_category field (6 bits) identifies a type category of a corresponding service. If a value of a corresponding field is set with a value indicating "informative only", it is dealt as an informative description for the category of the service. And, a receiver is required to test a component_level_descriptors( ) field of SMT in order to identify an actual category of the received service. The service_category field has an NTP time based component for services having video and/or audio component.

Especially, in regards to the present invention, if a service_category field value has '0x0E', a corresponding service indicates NRT service. In this case, it is indicated that signaling information of service currently described in an SMT session is signaling information of NRT service.

A num_services field (5 bits) indicates the number of IP stream components in this service.

IP_version_flag field (1 bit), when set to '0', shall indicate that source_IP_address, service_destination_IP_address, and component_destination_IP_address fields are IPv4 addresses. The value of '1' for this field is reserved for possible future indication that source_IP_address, service_destination_IP_address, and component_destination_IP_address fields are for IPv6. Use of IPv6 addressing is not currently defined.

A source_IP_address_flag field (1 bit) shall indicate, when set, that a source IP address value for this Service is present to indicate a source specific multicast.

When a service_destination_IP_address_flag field (1 bit) is set, it indicates that a corresponding IP stream component is transmitted through IP datagram having a different target IP address than service_destination_IP_address.

Accordingly, if the flat is set, a receiving system uses component_destination_IP_address as destination_IP_address, and disregards a service_destination_IP_address field in a num_channels loop (service_destination_IP_address_flag: A 1-bit Boolean flag that indicates, when set to '1', that a service_destination_IP_address value is present, to serve as the default IP address for the components of this Service).

In relation to the source_IP_address field (32 or 128 bits), if source_IP_address_flag is set with 1, interpretation is required, but if not set with 0, no interpretation is required.

When the source_IP_address_flag field is set with '1' and the IP_version_flag field is set with '0', this field indicates a 32 but IPv4 address representing a source of a corresponding circuit channel. If the IP_version_flag field is set with '1', this field indicates a 32 bit IPv6 address representing a source of a corresponding virtual channel (source_IP_address: This field shall be present if the source_IP_address_flag is set to '1' and shall not be present if the source_IP_address_flag is set to '0'. If present, this field shall contain the source IP address of all the IP datagram carrying the components of this Service. The conditional use of the 128 bit-long address version of this field is to facilitate possible use of IPv6 in the future, although use of IPv6 is not currently defined).

If the service is NRT service, the Source_IP_address field becomes a source IP address of the same server transmitting all channels of the FLUTE session.

In relation to the service_destination_IP_address field (32 or 128 bits), if service_destination_IP_address_flag is set with 1, interpretation is required, but if set with 0, no interpretation is required. When the service_destination_IP_address_flag field is set with '1' and the IP_version_flag field is set with '0', this field indicates a 32 bit destination IPv4 address for a corresponding virtual channel.

When the service_destination_IP_address_flag field is set with '1' and the IP_version_flag field is set with '1', this field indicates a 64 bit destination IPv6 address for a corresponding virtual channel. If the corresponding service_destination_IP_address cannot be interpreted, a component_destination_IP_address field in a num_components loop needs to be interpreted, and a receiving system uses component_destination_IP_address to access an IP stream component (service_destination_IP_address: This field shall be present if the service_destination_IP_address_flag is set to '1' and shall not be present if the service_destination_IP_address_flag is set to '0'. If this service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined). If the service is NRT service, the service_destination_IP_Address field is signaled with a destination IP address of a session level of the FLUTE session.

Additionally, SMT provides information on a plurality of components by using a 'for' loop.

Later, a 'for' loop (or a component loop) is performed as many times as the number of components corresponding to the num_components field value, to provide access information on a plurality of components. That is, access information on each component in a corresponding service is provided. At this point, the following field information on each component may be provided. Here, one component corresponds to one FLUTE session according to an embodiment.

An essential_component_indicator field (1 bit), when set to '1', shall indicate that this component is an essential component for the service. Otherwise, this field indicates that this component is an optional component).

A component_destination_IP_address_flag field (1 bit) shall indicate, when set to '1', that the component_destination_IP_address is present for this component.

A port_num_count field (6 bits) shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_estination_UPD_port_num field and shall be incremented by two, to allow for the RTCP streams associated with the RTP streams.

A component_destination_UDP_port_num (16 bits) represents the destination UDP port number for this UDP/IP stream component. For RTP streams, the value of component_estination_UDP_port_num shall be even, and the next higher value shall represent the destination UDP port number of the associated RTCP stream).

A component_destination_IP_address field (32 or 128 bits) shall be present if the component_destination_IP_address_flag is set to '1' and shall not be present if the component_destination_IP_address_flag is set to '0'. When this field is present, the destination address of the IP datagram carrying this component of the M/H Service shall match the address in this field. When this field is not present, the destination address of the IP datagram carrying this component shall match the address in the M/H_service_destination_IP_address field. The conditional use of the 128 bit-long address version of this field is to facilitate possible use of IPv6 in the future, although use of IPv6 is not currently defined.

A num_component_level_descriptors field (4 bits) indicates the number of descriptors providing additional information on a component level.

component_level_descriptor( ) fields are included in the component loop as many as a number corresponding to the num_component_level_descriptors field value, so that additional information on the component is provided.

A num_service_level_descriptors field (4 bits) indicates the number of descriptors providing additional information on a corresponding service level.

service_level_descriptor( ) fields are included in the service loop as many as a number corresponding to the num_service_level_descriptors field value, so that additional information on the service is provided. If the service is mobile service, additional information on the mobile service is provided, and if it is NRT service, additional information on the NRT service is provided.

A num_ensemble_level_descriptors field (4 bits) indicates the number of descriptors providing additional information on an ensemble level.

ensemble_level_descriptor( ) fields are included in the ensemble loop as many as a number corresponding to the num_ensemble_level_descriptors field value, so that additional information on the ensemble is provided.

Moreover, component_descriptor( ) as component_level_descriptors( ) may be provided to SMT of FIG. 18.

The component_descriptor( ) is used as one of ompo-nent_level_descriptors( ) of SMT, and describes additional signaling information of a corresponding component.

Accordingly, in relation to mobile NRT service, signaling information necessary for receiving a corresponding FLUTE session may be provided using the component descriptor of FIG. 14.

For example, if a component_type field value of the component descriptor of FIG. 14 is 38, a component_data (component_type) field provides data for FLUTE file delivery as shown in FIG. 15. Since each field description of FIGS. 14 and 15 is made above, overlapping descriptions will be omitted.

FIG. 19 is a view illustrating an FDT schema for mapping a file and content_id according to an embodiment. FIG. 20 is a view illustrating an FDT schema for mapping a file and content_id according to another embodiment. They represent an FDT instant level entry file designating method. NRT content includes a plurality of files. However, since each file has no mark, it is difficult to search a file related to NRT content. Accordingly, as shown in FIGS. 19 and 20, content_id is inserted into FDT in each file.

Hereinafter, an FDT instance level means, if a common attribute of all files declared in FDT needs to be defined, a level including a definition portion for the common attribute.

An FDT file level may mean a level including definition for an individual attribute of each file.

A receiver identifies whether a service transmitted through a corresponding channel is an SMT based NRT service. Additionally, the receiver identifies a content item and file of the corresponding NRT service.

As mentioned above, although the receiver may identify a file and content item in the NRT service, it does not have information on files of the content item and thus cannot match them. Accordingly, the receiver may not process the NRT service.

Accordingly, the present invention provides a method of identifying whether a content item is related. That is, a corresponding method shows what kinds of files are included in a content item. In this case, the receiver may properly process the received NRT service. Accordingly, the corresponding method may be designated on the basis of FDT information in FLUTE session transmitting NRT service. For example, each file constituting a content item is identified on the basis of a content-location and TOI field designated in the FLUTE session. content_id in FDT is matched to a content identifier (content_id) of NCT or a content identifier of content fragment in OMB BCAST SG.

Referring to FIGS. 19 and 20, a portion indicated with 1 declares a content identifier in an FDT-Instance level, and this declared content identifier is assigned to all files declared in a corresponding FDT-Instance. Of course, this information may be overridden by assigning a new content identifier in a file level. Or, if a specific file belongs to another content item not a content item defined in the FDT-Instance level, this may be notified through assigning a file level content_id described below. This embodiment expresses content_id in 16 bits.

In relation to a portion indicated with 2, when a file in the FDT Instance is included different content items with content_id declaration in a file level, this method signals which file, all files of a content item and content, belongs to which entry.

A portion 3 is a method of notifying whether a corresponding file for each file is an entry file. That is, a file corresponding to a root file, which is played first among several files constituting a content item or is necessarily executed first to access a content item is called an entry file, and represents a method of notifying this information. An entry attribute may be omitted, and its default value is false. When it is omitted, it means that a corresponding file is not an entry file. "Entry" is a head of a file that needs to be processed to execute the file. For example, "index.html" may be an "entry". Accordingly, an entry file may be set with "true" and other files are set with "false". Through the entry file, transmitting the same file repeatedly may be effectively controlled. Once a file is downloaded, the entry file indicates a file of content for another reference, so that there is no need to download it in another or an additional instance.

A specific file functions as an entry in a specific group as a group related to a file level signals whether entry is possible, but its corresponding role may fail in another group. When a content identifier is assigned in an FDT-instance level, a method of notifying an entry file may be considered as the following two methods.

1) A method of additionally assigning a file level content identifier to a file corresponding to an entry file and setting its entry attribute with true: in this case, a content identifier is duplicated in an FDT-Instance level and a file level, but has the most flexible structure. That is, although one of the File-level and FDT-instance level may designate content_id, if another content_id is designated together in the File-level and FDT-instance, the content_id of the File level has priority to that of the FDT-instance level.

2) like another embodiment of the FDT schema of FIG. 20, files functioning as an entry file may be directly referenced in content identifier definition in the FDT-instance level. For this, according to the embodiment of FIG. 20, FDT-Content-ID-Type is additionally defined for an FDT-instance level content identifier, and as shown in the portion 2, extends to include a content location of an entry file. In the case of the portion 2, an entry level is defined with its content_id. For example, each content_id shows which entry file exists.

In this method, content-location is duplicated so signaling may be problematic, but entry file configuration information may be immediately obtained by each content item.

Figure 21:
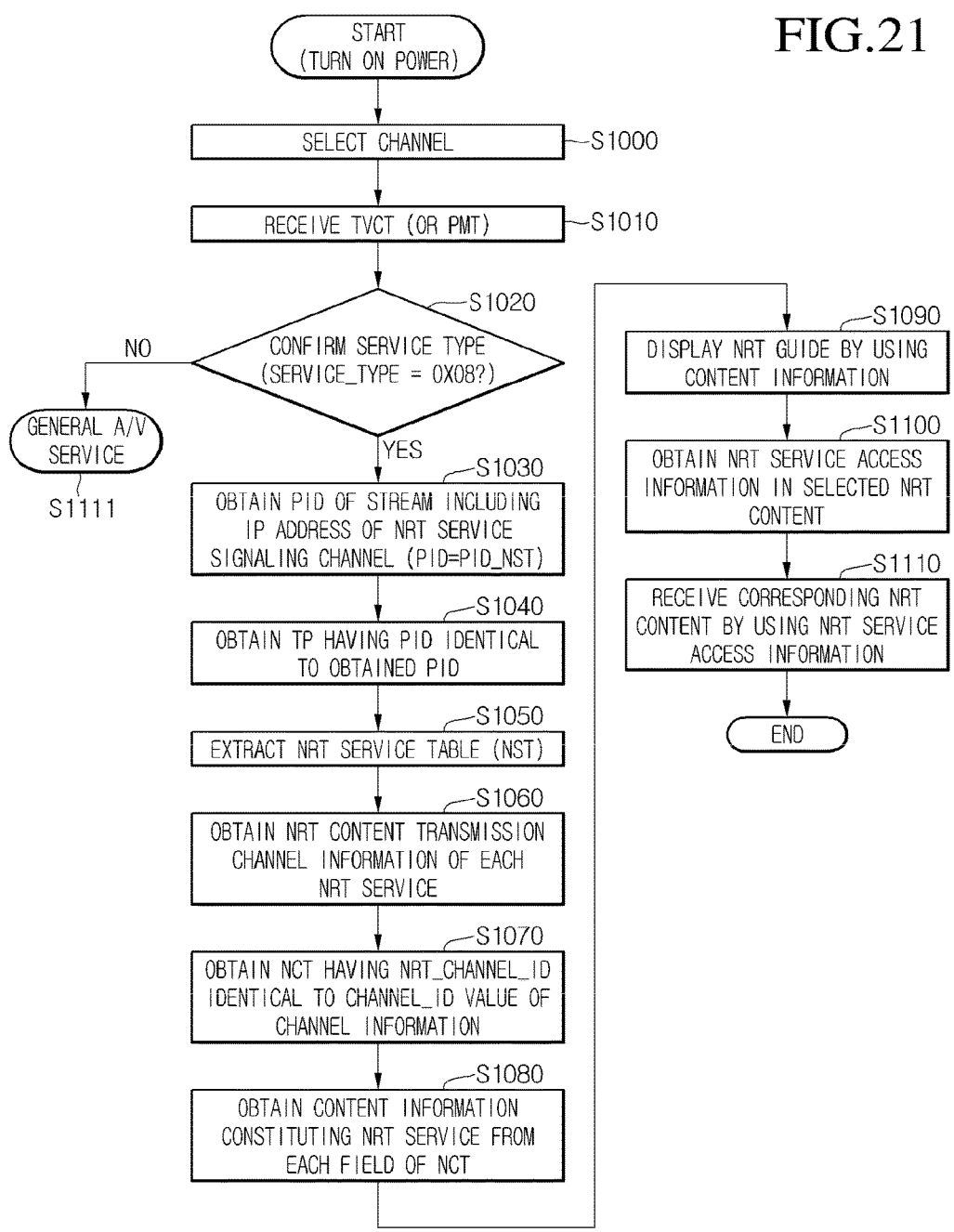
FIG. 21 is a flowchart illustrating an operation of a receiver according to an embodiment.

FIG. 21 is a flowchart illustrating an operation of a receiver according to an embodiment.

Referring to FIG. 21, according to an embodiment, a receiver receives NRT service signaling data through an NRT service signaling channel, displays NRT guide information on the basis of the received NRT service signaling data, and receives NRT service data for the selected NRT content, in order to provide NRT service.

First, once the receiver is turned on, a user selects a channel in operation S1000. Then, a physical transmission channel is turned according to the selected channel.

Then, VCT and PMT are obtained from a broadcast signal received through the tuned physical transmission channel in operation S1010. Then, it is confirmed in operation S1020 whether there is NRT service by parsing the obtained TVCT (VCT). This is confirmed by checking the service_type field value in a virtual loop of the VCT. For example, if a service_type field has 0x08, there is NRT service. Moreover, if not 0x08, since a corresponding virtual channel does not transmit the NRT service, a proper operation such as general A/V service may be performed according to information in the virtual channel in operation S5111.

Moreover, if it is determined that there is NRT service, since a corresponding virtual channel transmits NRT service, PID(PID-PID_NST) matching to a specific PID (PID_NST) of stream including a well known IP address for NRT service signaling channel address is obtained in operation S1030.

Moreover, the receiver receives a Transport Packet (TP) having the same PID as the obtained PID value (PID_NST) in operation S1040.

Then, the receiver extracts NRT service signaling data including a NRT service table (NST) from the received TP, or extracts an IP address for the NRT service signaling channel access from the received TP, in order to receive NRT service signaling data transmitted in another format through an IP layer in operation S1050.

Then, the receiver obtains channel information on NRT service data transmission by each NRT service from NST in operation S1060.

Then, the receiver obtains an NRT content table (NCT) including an NRT_channel_id field value identical to a value of Channel_id, an identifier of the obtained channel information, from the NRT service signaling data in operation S1070.

Then, the receiver obtains content information on NRT content constituting each NRT service from each field of the obtained NCT in operation S1080. For example, the content information may include at least one of content_delevery_bit_rate, content_available_start_time, content_available_end_time and content_title_text( ) fields according to an embodiment of the NCT.

Then, the receiver displays NRT guide information by using content information in operation S1090. A user may select NRT content to use or be received, from the displayed NRT guide information.

Then, the receiver obtains NRT service access information having the selected NRT content from NST in operation S1100. The NRT service access information may include channel information or IP address information for receiving NRT service data, for example.

Moreover, the receiver receives a corresponding NRT content in operation S5110 by using the obtained NRT service access information after accessing a channel or server for transmitting NRT service, and performs a proper operation according to the NRT content.

Figure 22:
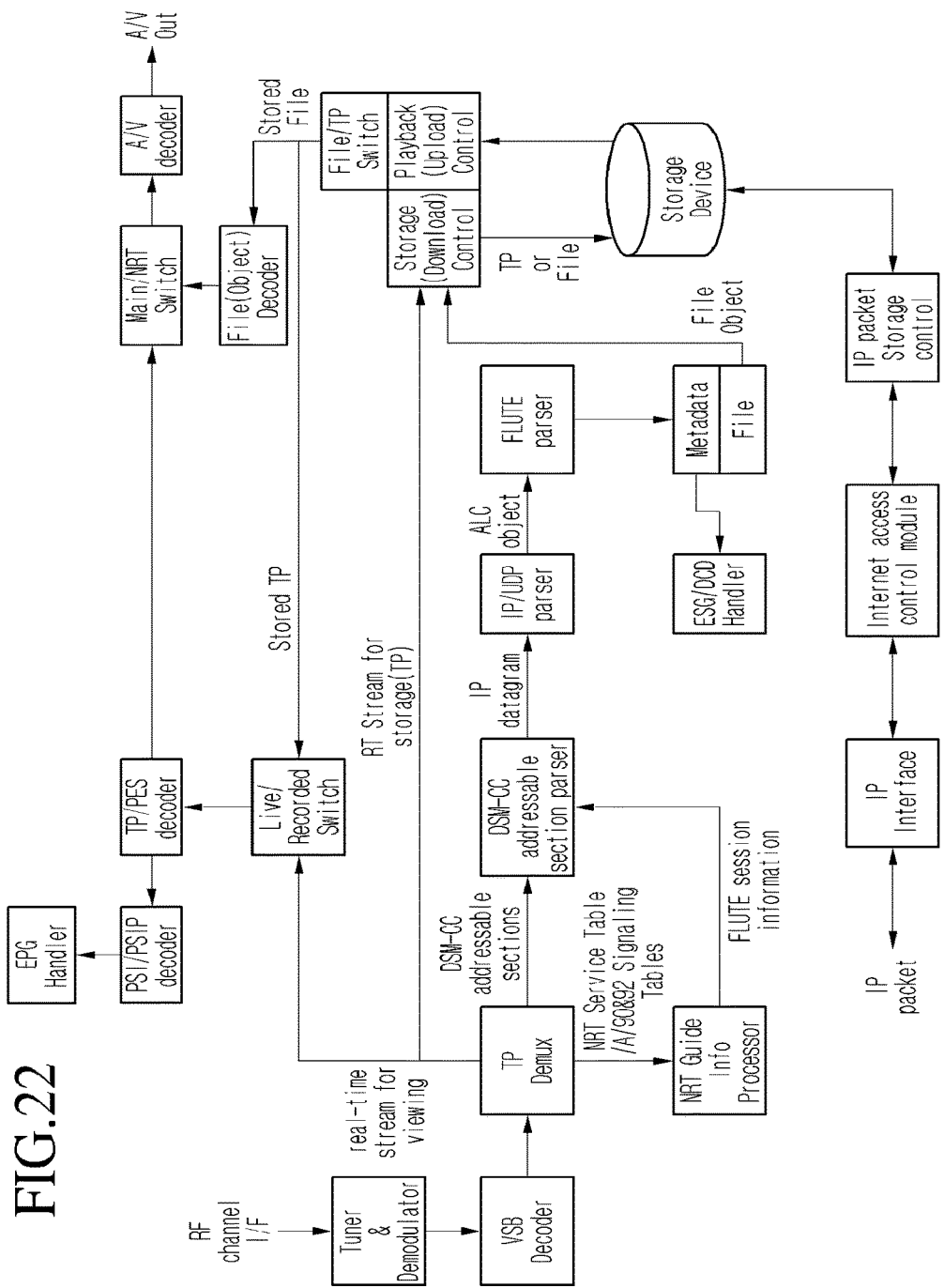
FIGS. 22 and 23 are views illustrating a receiving system receiving, saving, and playing an NRT content for NRT service according to another embodiment.
Figure 23:
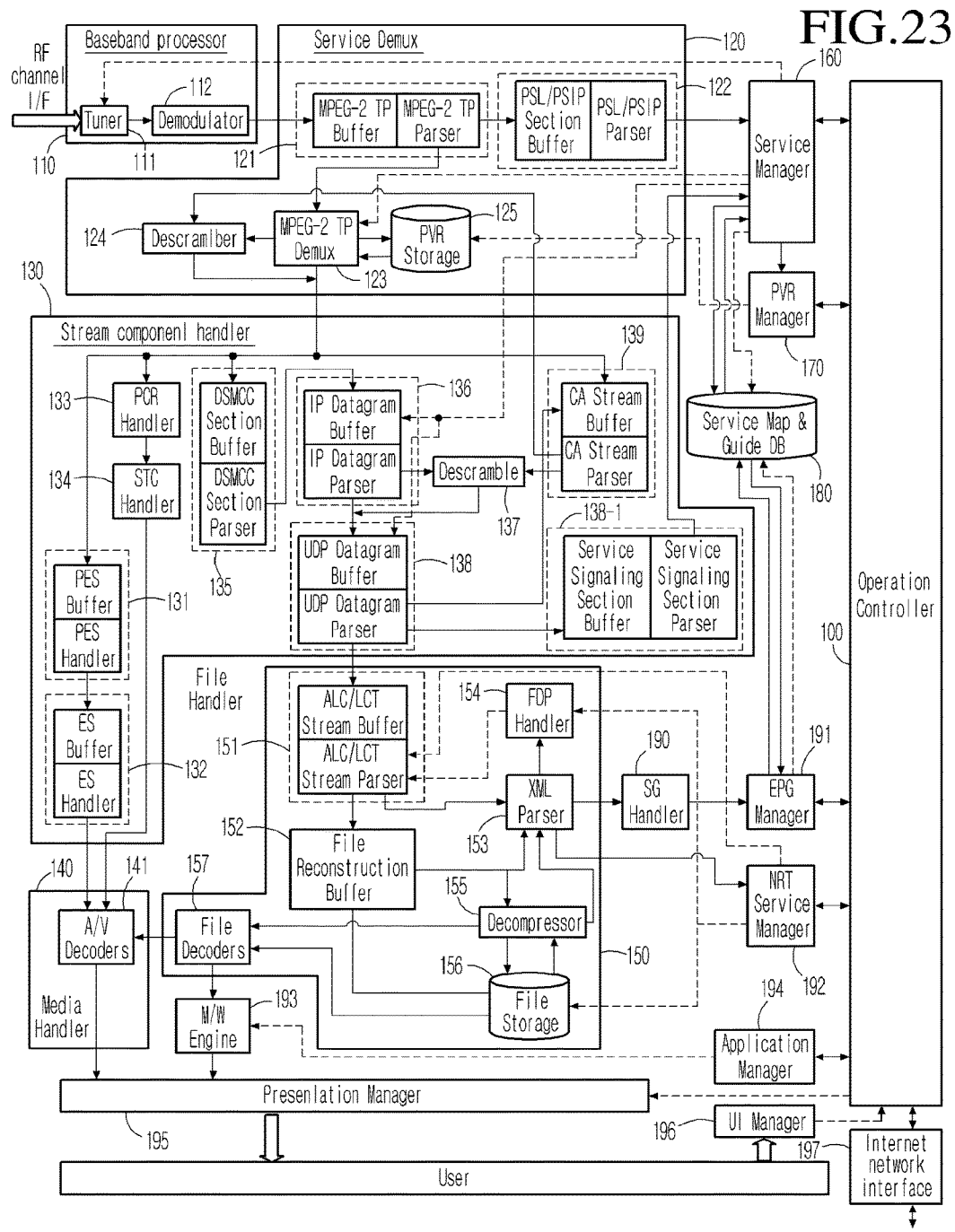

FIGS. 22 and 23 are views illustrating a receiving system receiving, saving, and playing an NRT content for NRT service according to another embodiment.

The receiver of FIG. 23 may include an operation controlling unit 100, a baseband processing unit 110, a service demultiplexer 120, a stream component handler 130, a media handler 140, a file handler 150, a service manager 160, a PVR manager 170, a first storage unit 180, an SG handler 190, an EPG manager 191, an NRT service manager 192, an application manager 194, a middleware engine 193, a presentation manager 195, and a User Interface (UI) manager 196.

The baseband processing unit 110 may include a tuner 111 and a demodulator. The service demultiplexer 120 may include an MPEG-2 TP handler 121, a PSI/PSIP handler 122, an MPEG-2 TP demultiplexer 123, a descrambler 124, and a second storage unit 125.

The stream component handler 230 may include a Packetized Elementary Stream (PES) demodulator 131, an Elementary Stream (ES) demodulator 132, a PCR handler 133, a STC handler 134, a DSM-CC addressable section handler 135, an IP datagram handler 136, a descrambler 137, a UDP handler 138, a service signaling section handler 138-1, and a Conditional Access System (CAS) 139.

The media handler 140 may include an A/V demodulator 141. The file handler 150 may include an ALC/LCT stream handler 151, a file reconstruction buffer 152, an XML parser 153, an FDT handler 154, a decompressor 155, a third storage unit 156, and a file decoder 157.

In FIG. 23, the tuner 111 tunes a broadcast signal of a desired channel among broadcast signals received through a terrestrial wave according to a control of the service manager 160, and then down-converts the tuned broadcast signal into an Intermediate Frequency (IF) signal to output it to the demodulator 112. The tuner 111 may receive real-time stream and non-real-time stream. The non-real-time stream is called an NRT stream in the present invention.

The demodulator 112 performs automatic gain control, carrier recovery, and timing recovery on a digital IF signal of a pass band inputted from the tuner 111, converts the digital IF signal into a baseband signal, and performs channel equalization. For example, when the broadcast signal is a VSB modulation signal, a VSB demodulation process is performed for automatic gain control, carrier recovery, and timing recovery.

The demodulated and channel-equalized data in the demodulator 112 is outputted to the MPEG-2 TP handler 121 in an MPEG-2 Transport Stream (TS) packet format.

The MPEG-2 TP handler 121 includes an MPEG-2 TP buffer and an MPEG-2 TP parser, and analyzes a TS header after temporarily saving an output of the demodulator 112. Then, if an output of the demodulator 112 is an A/V TS packet for real time or an NRT TS packet, it is outputted to the demultiplexer 123, and if it is a TS packet for PSI/PSIP table, it is outputted to the PSI/PSIP handler 122.

The PSI/PSIP handler 122 includes a PSI/PSIP section buffer and a PSI/PSIP parser, and after temporarily saving a TS packet outputted from the MPEG-2 TP handler 121, restores and parses a corresponding table from PSI/PSIP section data in a payload of the TS packet, with reference to a table identifier. At this point, it is determined whether one table includes one section or a plurality of sections through a table_id field, a section_number field, and a last_section_number field in a corresponding section. Also, sections having the same table identifier are collected to complete a corresponding table. For example, sections having a table identifier allocated to VCT are collected to complete VCT. Moreover, the parsed information of each table is collected by the service manager 160 to be saved in the first storage unit 180. Table information such as VCT, PAT, PMT, and DST are saved in the first storage unit through the above processes. The service manager 160 saves the table information in the first storage unit 180 in a service map and guide data format.

The demultiplexer 123, if the inputted TS packet is an A/V TS packet in real time, divides the TS packet into an audio TS packet and a video TS packet, and then outputs them into the PES decoder 131. If the inputted TS packet is an NRT TS packet, it is outputted to the DSM-CC handler 135. Additionally, the demultiplexer 123, if the TS packet includes a Program Clock Reference (PCR), outputs it to the PCR handler 133, and if it includes Conditional Access (CA) information, outputs it to the CAS 139. An NRT TS packet includes a TS packet having NRT service data and a TS packet having NRT service signaling channel. A unique PID for identifying the NRT service is allocated to a TS packet of the NRT service data, and PID of a TS packet including the NRT service signaling channel is extracted using DST and PMT.

The demultiplexer 123, if a payload of the inputted TS packet is scrambled, outputs it to the descrambler 124, and then, the descrambler 124 receives information (control words used for scramble) necessary for descramble from the CAS 139, and performs descramble on the TS packet.

The demultiplexer 123 saves an A/V packet in real time, inputted at the one request of temporary recording, scheduled recording, and time shift, in the second storage unit 125. The second storage unit 125 is a mass storage medium and may include HDD, for example. The second storage unit 125 performs downloading (i.e., saving) and updating (i.e., playing) according to a control of the PVR manager 170.

The demultiplexer 123 separates an audio TS packet and a video TS packet from the A/V TS packet updated from the second storage unit and then outputs them to the PES decoder 131 at the playing request.

The demultiplexer 123 is controlled by the service manager 160 and/or the PVR manager 170 to perform the above processes.

That is, if a service_type field value in VCT indicates that NRT service is transmitted, the service manger 160 extracts identification information of each NRT service from NRT_service_descriptor( ) received from a virtual channel loop of the VCT and saves it, and then extracts DST PID from a service location descriptor (or an ES loop of PMT) of the VCT to receive DST.

Then, NRT service is identified from the received DST, and PID of an MPEG-2 TS packet including the NRT service signaling channel is extracted to receive the identified NRT service by using DST and PMT. The extracted PID is outputted to the demultiplexer 123. The demultiplexer 123 outputs MPEG-2 TS packets corresponding to PID, outputted from the service manager 160, to the addressable section handler 135.

The PCR is a time reference value used for time synchronization of audio ES and video ES in the A/V decoder 141. The PCR handler 133 restores PCR in the payload of the inputted TS packet and outputs it to the STC handler 134. The STC handler 134 restores System Time Clock (STC), i.e., a reference clock of a system, from the PCR, and outputs it to the A/V decoder 141.

The PES decoder 131 includes a PES buffer and a PES handler, and after temporarily saving an audio TS packet and a video TS packet, removes a TS header from the TS packet to restore audio PES and video PES. The restored audio PES and video PES are outputted to the ES decoder 132. The ES decoder 132 includes an ES buffer and an ES handler, and removes each PES header from audio PES and video PES to restore audio ES and video ES, i.e., pure data. The restored audio ES and video ES are outputted to the A/V decoder 141.

The A/V decoder 141 decodes the audio ES and video ES through each decoding algorithm to restore a previous state of compression, and then outputs it to the presentation manager 195. At this point, time synchronization is performed when audio ES and video ES are decoded according to the STC. As one example, an audio decoding algorithm includes at least one an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm. A video decoding algorithm includes at least one of an MPEG 2 video decoding algorithm, an MPEG 4 video decoding algorithm, an H.264 decoding algorithm, an SVC decoding algorithm, and a VC-1 decoding algorithm.

The CAS 139 includes a CA stream buffer and a CA stream handler, and after temporarily saving a TS packet outputted from the MPEG-2 TP handler or service protection data restored and outputted from a UDP datagram handler 138, restores information (for example, control words used for scramble) necessary for descramble from the saved TS packet or service protection data. That is, Entitlement Management Message (EMM) and Entitlement Control Message (ECM) in the payload of the TS packet are extracted and information necessary for descramble is obtained by analyzing the extracted EMM and ECM. The ECM may include a control word (CW) used in scramble. At this point, the control word may be encrypted using an encryption key. The EMM may include an encryption key and qualification information of corresponding data. Information necessary for descramble obtained from the CAS 139 is outputted to the descrambler 124 and 137.

The DSM-CC section handler 135 includes a DSM-CC section buffer and a DSM-CC section parser, and after temporarily saving a TS packet outputted from the demultiplexer 123, restores an addressable section in the payload of the TS packet. After resaving IP datagram by removing a header and CRC checksum of the addressable section, the restored IP datagram is outputted to the IP datagram handler 136.

The IP datagram handler 136 includes an IP datagram buffer and an IP datagram parser. After buffering IP datagram delivered from the DSM-CC section handler 135, the IP datagram handler 136 extracts and analyzes a header of the buffered IP datagram to restore UDP datagram from the payload of the IP datagram, and then, outputs it to the UDP datagram handler 138.

At this point, if the IP datagram is scrambled, the scrambled UDP datagram is descrambled in the descrambler 137 and then is outputted to the UDP datagram handler 138. As one example, the descrambler 137 receives information (e.g., a control word used for scramble) necessary for descramble from the CAS 138 and performs descramble on the UDP datagram to output it to the UDP datagram handler 138.

The UDP datagram handler 138 includes an UDP datagram buffer and a UDP datagram parser. After buffering IP datagram delivered from the IP datagram handler 136 or the descrambler 137, the UDP datagram handler 138 extracts and analyzes a header of the buffered UDP datagram to restore the data included in the payload of the UDP datagram. At this point, if the restored data is service protection data, it is outputted to the CAS 139; if the restored data is NRT service signaling data, it is outputted to the service signaling section handler 138-1; and if the restored data is NRT service data, it is outputted to the ALC/LCT stream handler 151.

That is, access information on the IP datagram transmitting the NRT service signaling channel is a well-known destination IP address and a well-known destination UDP port number.

Accordingly, the IP datagram handler 136 and the UDP datagram handler 138 include a well-known destination IP multicast address and a well-known destination UDP port number, and extracts an IP multicast stream transmitting an NRT service signaling channel, i.e., NRT service signaling data, to output it to the service signaling section handler 138-1.

Moreover, the service signaling section handler 138-1 includes a service signaling section buffer and a service signaling section parser, and restores and parses NST from the NRT service signaling data to output it to the service manager 160. When the NST is parsed, access information of the FLUTE session that transmits content/files constituting NRT service and signaling information necessary for rendering the NRT service may be extracted. For example, information necessary for rendering content/files of the NRT service, transmitted from the NST to each FLUTE session, may be extracted. Information necessary for rendering the content/files of the NRT service may include container information, encoding information, or decoding parameters of a media object.

The parsed information from the NST is collected by the service manager 160, and then, saved in the first storage unit 180. The service manager 160 saves the extracted information from the NST in the first storage unit 180 in a service map and guide data format. As another example, the NRT service manager 182 may serve as the service manager 160. That is, the parsed information from the NST is collected by the NRT service manager 192, and then, saved in the first storage unit 180.

The ALC/LCT stream hander 151 includes an ALC/LCT stream buffer and an ALC/LCT stream parser, and after buffering data having an ALC/LCT structure outputted from the UDP datagram handler 138, analyzes a header and header extension of an ALC/LCT session from the buffer data. On the basis of the analysis result of the header and header extension of the ALC/LCT session, if data transmitted to the ALC/LCT session has an XML structure, it is outputted to the XML parser 153. If the data has a file structure, after being temporarily saved in the file reconstruction buffer 152, it is outputted to the file decoder 157 or saved in the third storage unit 156. The ALC/LCT stream handler 151 is controlled by the NRT service manager 192 if data transmitted to the ALC/LCT session is data for NRT service. At this point, if data transmitted to the ALC/LCT session is compressed, after decompressed in the decompressor 155, it is outputted to at least one of the XML parser 153, the file decoder 157, and the third storage unit 156.

The XML parser 153 analyzes XML data transmitted through the ALC/LCT session, and if the analyzed data is for a file based service, it is outputted to the FDT handler 154. If the analyzed data is for service guide, it is outputted to the SG handler 190.

The FDT handler 154 analyzes and processes a file description table of the FLUTE protocol through an ALC/LCT session. The FDT handler 154 is controlled by the NRT service manager 192 if the received file is for NRT service.

The SG handler 190 collects and analyzes data for service guide transmitted in the XML structure and then output it to the EPG manager 191.

The file decoder 157 decodes a file outputted from the file reconstruction buffer 152, a file outputted from the decompressor 155, or a file uploaded from the third storage unit 156 through a predetermined algorithm, thereby outputting it to the middleware engine 193 or the A/V decoder 141.

The middleware engine 193 interprets and executes data having a file structure, i.e., application. Moreover, the application may be outputted to a screen or speaker through the presentation manager 195. The middleware engine 193 is a JAVA based middleware engine according to an embodiment.

The EPG manager 191 receives service guide data from the SG handler 190 according to a user input, and then, converts the received service guide data into a display format to output it to the presentation manager 195. The application manager 194 performs general managements on processing application data received in the format such as a file.

The service manager 160 collects and analyzes PSI/PSIP table data or NRT service signaling data transmitted to an NRT service signaling channel to create a service map, and then stores it in the first storage unit 125. Additionally, the service manager 160 controls access information on NRT service that a user wants, and also controls the tuner 111, the demodulator 112, and the IP datagram handler 136.

The operation controller 100 controls at least one of the service manager 160, the PVR manger 170, the EPG manager 191, the NRT service manager 192, the application manager 194, and the presentation manager 195 according to a user command, and thus, performs a function that a user wants.

The NRT service manager 192 performs general management on NRT service transmitted in a content/file format through the FLUTE session on an IP layer.

The UI manager 196 delivers a user input to the operation controller 100 through UI.

The presentation manager 195 provides to a user through at least one of a speaker and a screen at least one of audio/video data outputted from the A/V decoder 141, file data outputted from the middleware engine 193, and service guide data outputted from the EPG manager 191.

Moreover, one of the service signaling section handler 138-1, the service manager 160, and the NRT service manager 192 obtains content constituting the NRT service or IP access information on the FLUTE session transmitting a file, from a FLUTE session loop of NST (or an a component loop of NST). Additionally, the one obtains FLUTE level access information from component_descriptor( ) received in the component loop of the NST.

Then, the ALC/LCT stream handler and the file decoder 157 access the FLUTE file delivery session by using the obtained FLUTE level access information to collect files in the session. Once the files are collected, they constitute one NRT service. This NRT service may be stored in the third storage unit 156, or outputted to the middleware engine 193 or the A/V decoder 141 to be displayed on a display device.

The third storage unit 158, i.e., a storage medium saving a file such as NRT service data, may be shared with the second storage unit 125, or may be separately used.

Figure 24:
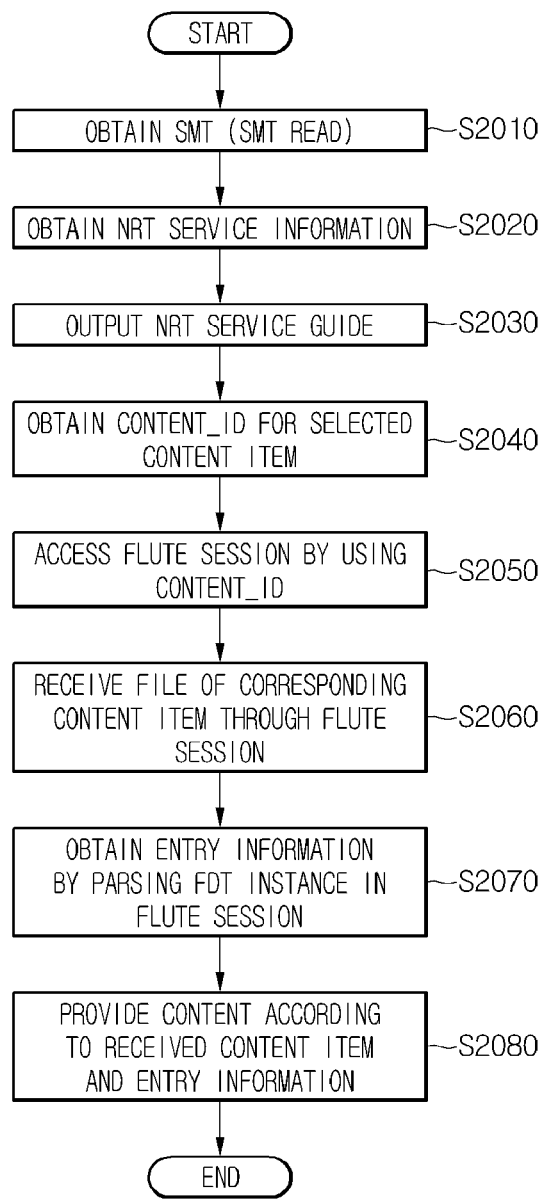
FIG. 24 is a flowchart illustrating a method of a receiver to receive and provide NRT service according to an embodiment.

FIG. 24 is a flowchart illustrating a method of a receiver to receive and provide NRT service according to an embodiment.

The receiver may obtain NRT service signaling information through an NRT service signaling channel or by receiving IP datagram in the case of mobile NRT service, and obtains SMT from the NRT service signaling information in operation S2010.

Then, the receiver obtains NRT service information from SMT in operation S2020. The NRT service information may be obtained by parsing NRT_service_info_descriptor in a service level descriptor loop. The obtained NRT service information may include requirement information on an application type for each NRT service or other NRT services.

Later, the receiver outputs NRT service guide on the basis of the obtained NRT service information in operation S2030. The NRT service guide may include application and service category information on each service. Additionally, detailed information may be further displayed on the basis of each field of NRT service info descriptor. The detailed information may include capacity information on corresponding NRT service according to a storage_requirement field or audio or video codec information on corresponding NRT service according to an audio_codec_type or video_codec_type field. A user may select NRT service to receive and use it on the basis of the information in the service guide.

Then, the receiver obtains identifier (content_id) for content items constituting the selected NRT service from NCT in operation S2040. The receiver obtains NRT_service_id corresponding to the selected NRT service from SMT, obtains NCT having the same NRT_channel_id value as the obtained NRT_service_id, and obtains an identifier (content_id) for content items constituting a corresponding NRT service through the obtained NCT.

Then, the receiver accesses the FLUTE session to receive a file constituting the corresponding content item by using the obtained content item identifier (content_id) in operation S2050. Since each file constituting the content item is matched to TOI or a content location field of FDT in the FLUTE session, the receiver receives a file of a corresponding content item by using the FLUTE session in operation S2060. The receiving of the file may include receiving a corresponding file or object when a Content-ID attribute field for a corresponding file is identical to the obtained content_id after reading FDT in a corresponding FLUTE session.

Additionally, the receiver parses FDT instances in a corresponding FLUTE session to obtain a list of files corresponding to the content item. Moreover, the receiver obtains entry information including a list of files serving as an entry among lists of files.

Lastly, the receiver provides NRT service to a user on the basis of the receiver content item and the list of files corresponding thereto or entry information in operation S2080.

The content downloaded through the NRT service may be used at the timing that a user wants, being separated from real-time broadcasting.

Additionally, after transmitting NRT service in advance and saving it in a receiver, a broadcasting station may designate a content item of the corresponding NRT service, which is executed at the timing of when a specific real-time broadcasting is transmitted or the NRT service is displayed. According to an embodiment of the present invention, the NRT service may include content, which is downloaded in advance linking with real-time broadcasting and executed at the specific timing. Additionally, according to an embodiment of the present invention, the NRT service may include content, which is prepared in advance to execute specific NRT service at the specific timing. An NRT service content triggered at the specific timing linked with real-time broadcasting to execute a specific action for a specific NRT service is called a Triggered Declarative Object (TDO). Accordingly, an NRT service application is classified as a non-real time declarative object (NDO) or a triggered declarative object (TDO) according to whether it is executed at the specific timing.

According to an embodiment of the present invention, a broadcasting station may transmit trigger information on trigging the TDO. The trigger information may include information on performing a specific action for a specific TDO at the specific timing.

Additionally, the trigger information may include trigger signaling data (trigger signaling information) for signaling a trigger, and trigger data constituting a trigger. Additionally, data stream transmitting trigger data may be designated as trigger stream. Also, the trigger data may mean itself.

Such a trigger may include at least one of a trigger identifier for identifying a trigger, a TDO identifier for identifying NRT service for trigger, and action information and trigger time on TDO.

The trigger identifier may be an identifier uniquely identifying a trigger. For example, a broadcasting station may include at least one trigger in broadcasting program information of a predetermined time provided through EIT. In this case, the receiver may perform an action on the trigger target TDO at the timing designated for each trigger on the basis of at least one trigger. At this point, the receiver may identify each trigger by using a trigger identifier.

A TDO identifier may be an identifier for identifying an NRT service content, i.e., a target of trigger. Accordingly, the TDO identifier may include at least one of a trigger NRT service identifier (NRT_service_id), content linkage (content_linkage), and URI or URL of an NRT content item entry. Moreover, the TDO identifier may include a target identifier (target_service_id) for identifying a trigger target TDO described later.

Additionally, TDO action information may include information on action for TDO of a trigger target. The action information may be at least one of execution, termination, and extension commands of the target TDO. Additionally, the action information may include commands for generating a specific function or event in the target TDO. For example, if the action information includes the execution command of the target TDO, a trigger may request the activation of the target TDO to the receiver. Additionally, when action information an extend command of a target TDO, a trigger may instruct a receiver to extend the target TDO. Also, when action information includes a terminate command of a target TDO, a trigger may instruct a receiver to terminate the target TDO. In such a manner, a broadcasting station may control a TDO operation in a receiver according to a real-time broadcast content through a trigger.

Moreover, a trigger time may mean a time designated for performing (trigging) an action designated for the target TDO. Additionally, the trigger time may be synchronized with video stream in a specific virtual channel in order to link NRT service with real-time broadcasting. Accordingly, the broadcasting station may designate a trigger time with reference to PCR that video stream refers. Accordingly, the receiver may trigger TDO at the timing that the broadcasting station designates with reference to PCR that video stream refers. Moreover, the broadcasting station may signal a trigger with a trigger identifier in a header of video stream in order to transmit accurate trigger time.

Additionally, the trigger time may be designated with UTC time. In the case of UTC time, the trigger time is not a relative time but an absolute time.

The trigger time may be accurate trigger timing or may include an approximate start time. Moreover, the receiver may prepare an action for target TDO in advance before accurate trigger timing by receiving approximate time. For example, the receiver may prepare TDO execution in advance so that TDO operates smoothly at the trigger time.

FIG. 25 is a view illustrating a bit stream syntax of a trigger according to an embodiment.

Here, trigger or trigger data is in a trigger table form, and a corresponding syntax is in an MPEG-2 private section form to help understanding. However, the format of corresponding data may vary. For example, the corresponding data may be expressed in a Session Description Protocol (SDP) format and signaled through a Session Announcement Protocol (SAP) according to another method.

A table_id field is set with OXTBD arbitrarily, and identifies that a corresponding table section is a table section constituting a trigger.

A section_syntax_indicator field is set with 1 and indicates that the section follows a general section syntax.

A private_indicator field is set with 1.

A section_length field describes that the number of bits remaining in the section to the last of the section from immediately after the section_length field.

A source_id field represents the source of a program related to a virtual channel.

A TTT_version_number field represents version information of a trigger. Additionally, the version information of a trigger represents the version of a trigger protocol. The trigger version information may be used for determining where there is change in a trigger structure or a trigger itself. For example, the receiver determines that there is no trigger change if the trigger version information is identical. Additionally, the receiver determines that there a trigger change if the trigger version information is different. For example, the trigger version information may include a plurality of version numbers, and the receiver may determine whether there is a trigger change on the basis of some of the plurality of version numbers.

A current_next_indicator field represents that a corresponding table section is applicable currently if set with 1.

A section_number field indicates a number of a corresponding table section.

A last_section_number field means a table section of the last and highest number among sections.

A num_triggers_in_section field means the number of triggers in a corresponding table section. The number of triggers in one session may be one or in plurality. Additionally, the next 'for' loop is performed as many times as the number of triggers.

A trigger_id field represents an identifier uniquely identifying a trigger.

A trigger_time field represents a time for which a trigger is performed. Moreover, this field may not be included in the session, and in this case, the trigger time may be a time designated from broadcasting stream as mentioned above.

A trigger_action field represents action information of a trigger performed at the trigger time. A trigger action may include at least one of a preparation command for target TDO, a target TDO execution command, a target TDO extension command, and a target TDO termination command. The trigger action may further include a command generating a specific command or event.

A trigger_description_length field represents the length of trigger_description_text.

A trigger_description_text field represents description for a corresponding trigger in a text format.

A service_id_ref field represents an identifier identifying a target TDO of a trigger. Accordingly, for example, a service_id_ref field may indicate an NRT_service_id field of SMT or NST to identify NRT service of a trigger target TDO.

A content_linkage field represents an identifier identifying a target TDO content item of a trigger. For example, a content_linkage field may indicate a content_linkage field of NRT-IT or NCT to identify a target TDO content item of a trigger. Additionally, a service_id_ref field and a content_linkage field may be included in a class for indicating one target TDO.

A num_trigger_descriptors field represents the number of trigger descriptors.

A trigger_descriptor( ) field represents a descriptor including information on a trigger.

When a trigger is in a table format of the MPEG-2 private section, a broadcasting station may transmit one trigger according to a virtual channel.

A first method of a broadcasting station to transmit a trigger may include transmitting 0X1FF stream including the trigger table, i.e., PSIP basic PID. The first method may distinguish the trigger table from other tables by allocating table_id of the trigger table.

Moreover, a second method of transmitting a trigger includes allocating PID corresponding to a trigger table to a Master Guide Table (MGT) and transmitting a corresponding PID stream having the trigger table. The second method processes all tables in a corresponding PID stream by using the trigger table.

Moreover, according to an embodiment, at least one of trigger and trigger signaling information is transmitted through an MPEG-2 Packetized Elementary Stream (PES) in order to designate the accurate timing synchronized with video and audio as a trigger time.

Here, the video and audio synchronization of MPEG-2 PES will be described as follows. A receiver decoder operates in synchronization with a time stamp of a transmitter encoder. The encoder has a main oscillator, called a System Time Clock (STC), and a counter. The STC is included in a specific program and a main clock of program for video and audio encoders.

Moreover, if a video frame or an audio block occurs in an encoder input, STC is sampled. A sampling value and a constant value as much as delay of the encoder and decoder buffers are added to generate display time information, i.e., Presentation Time Stamp (PTS) and then are inserted into the first portion of a picture or audio block. When frame reordering occurs, Decode Time Stamp (DTS) representing a time at which data needs to be decoded in a decoder is inserted. Except for the frame reordering of the B picture, DTS and PTS are same. DTS is additionally required in the case of the frame reordering. When DTS is used, there is PTS always. They may be inserted at an interval of less than about 700 msec. Additionally, it is defined in ATSC that PTS and DTS are inserted at the starting portion of each picture.

Moreover, an output of an encoder buffer includes a time stamp such as Program Clock Reference (PCR) in a transport packet level. Moreover, a PCT time stamp occurs at an interval of less than 100 msec, and is used for synchronizing STC of a decoder and STC of an encoder.

Moreover, video stream and audio stream may have each PTS or DTS corresponding to a common STC, for synchronization of audio stream and the decoder. Accordingly, PTS and DTS indicate when audio stream and video stream are played at each decoding unit, and are used to synchronize audio and video.

For example, a decoder of receiver outputs a PES packet in the received TS stream as a video PES depacketizer, and outputs a PCR value inserted in a TS packet header to a PCR counter. The PCR counter counts 100 of the PCR value and outputs it to a comparison unit. Moreover, the video PES depacketizer outputs a header of a PES packet to a DTS/PTS extractor, buffers Elementary Stream, i.e., image data to be displayed, in an Elementary Stream Buffer&Decoder. The DTS/PTS extraction unit extracts DTS and PTS values from the PES packet header and outputs them to the comparison unit. The comparison unit, if the PCR value inputted from the PCR counter becomes a DTS value or the PCR value of 100 becomes a PTS value, outputs each signal for that to a decoding/display control unit. The decoding/display control unit receives a signal that the PCR value becomes the DTS value from the comparison unit, and decodes the image data buffered in the elementary stream buffer & decoder to store them in a decoded stream memory. Additionally, the decoding/display control unit displays the decoded image data stored in the decoded stream memory through a display unit when receiving the signal that the PCR value becomes the PTS value from the comparison unit Accordingly, MPEG-2 PES includes PTS and DTS in its header, which synchronize data transmitted during data transmission with one elementary stream (ES) or presentation time between a plurality of ES. This is called a synchronized data stream method.

That is, according to an embodiment, a broadcasting station includes trigger data or trigger stream in the payload of PES and designates trigger time as a PTS value of the PES packet header by using the above synchronized data stream method. In this case, the receiver may trigger a target TDO at the accurate timing according to the PCR value that PTS of PES including a trigger refers. Accordingly, a broadcasting station may synchronize a trigger at the accurate timing of audio and video presentation that the broadcasting station is to trigger by using the PTS of the PES packet header designated as a trigger time and the PTS of the audio and video PES packet header.

Moreover, in relation to the header of the PES stream packet including a trigger, a stream_type value may be 0x06 to indicate a synchronized data stream method, stream_id may indicate a identifier of a predetermined stream, and PES_packet_length may indicate the length of PES stream including the payload of PES stream.

Figure 26:
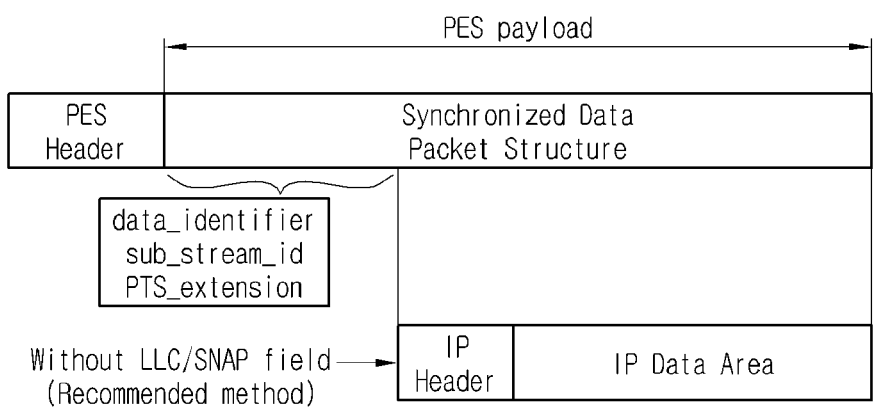
FIG. 26 is a view illustrating a PES structure according to a synchronized data stream method including a trigger according to an embodiment.

FIG. 26 is a view illustrating a PES structure according to a synchronized data stream method including a trigger according to an embodiment.

As shown in FIG. 26, PES of the synchronized data stream method may include a PES header and PES payload.

The PES payload may include a synchronized data packet structure. As mentioned above, the trigger including a trigger table or another type of data may be included in the PES payload of FIG. 26 and then transmitted. Additionally, a broadcasting station may packetize the trigger in an IP datagram format, and may include and transmit the packetized trigger in an IP data area.

FIG. 27 is a view illustrating a synchronized data packet structure of PES payload for transmitting trigger as bit stream syntax according to an embodiment.

As shown in FIGS. 26 and 27, the trigger may be included in the synchronized data packet structure and then transmitted. Detailed description of each field in the structure is as follows.

A data_identifier field is an identifier identifying a type of data included in a PES data packet. This may be set with 0X22 according to a type.

A sub_stream_id field is an identifier (user private) settable by a user.

A PTS_extention_flag field indicates whether there is a PTS_extention field. If this field value is 1, the PTS_extension field may be in the PES_data_packet field. Additionally, this field may be 0 when there is no PTS_extension field.

An output_data_rate_flag field may be set with 0.

A syncnronized_data_packet_header_length field represents the length of an optical field in the PES packet header. This field may be included If the PTS_extention_flag field is 1, and represents the length including synchroziced_data_privete_data_byte(s).

A PTS_extension field extends PTS delivered from the header of a corresponding PES packet. This field may include 9 bit Program Clock Reference (PCR) extension information. Additionally, a receiver may extend the PTS resolution of synchronized data from 11.1 µs (90 kHz), i.e., the MPEG-2 standard, to 37 ns (27 MHz).

A synchronized_data_private_data_byte field represents a payload byte of a synchronized PES packet. If the protocol_encapsulation of DST represents one of synchronized datagram, IP datagram not including LLC/SNAP, and multiprotocol including LLS/SNAP, the synchronized_data_byte field may include one unique datagram. Accordingly, when LLC/SNAP is used, an 8 byte LLC/SNAP header may be shown in only the first 8 byte synchronized_data_byte of the PES packet.

Accordingly, if a broadcasting station includes a trigger in a synchronized data stream (stream_type) of PES and transmits it, a receiver may extract trigger stream from the payload of PES. Additionally, the receiver may perform an action on a target TDO by using the PTS value of the PES header as a trigger time. Accordingly, TDO may be triggered at the accurate timing of a frame unit by synchronizing a trigger on the basis of PTS, i.e., a reference time for presentation synchronization of video and audio. Additionally, when a trigger time is designated with PTS, video and audio synchronization may be easily obtained.

Moreover, trigger signaling information on obtaining trigger stream is transmitted according to an embodiment. A receiver receives trigger signaling information and obtains trigger stream in the synchronized data stream of PES on the basis of the received trigger signaling information.

A method of transmitting trigger signaling information to obtain trigger stream transmitted using synchronized data streaming may vary. One of the following methods is used to transmit trigger signaling information: 1. a transmission method through DST; 2. a transmission method through a service id descriptor; 3. a transmission method through a trigger stream descriptor; and 4. a transmission method by defining a stream type of trigger stream.

According to an embodiment, trigger signaling information may be transmitted through DST for NRT service. DST is a table session for transmitting data service. Since its description and description for its data_service_bytes( ) are identical to those of FIG. 8, overlapping description will be omitted.

The DST may include signaling data for receiving each Elementary Stream (ES) constituting data service. Accordingly, trigger signaling data for receiving trigger stream may be included in DST.

Moreover, each data service may include at least one application, and each application may in an application identification structure including an application identifier such as app_id. Moreover, each application may include at least one data element constituting a corresponding application or data stream.

Accordingly, in order to transmit trigger stream through data service, a broadcasting station includes one trigger stream in a specific virtual channel and transmits it. Moreover, the broadcasting station may include one trigger stream in each application and transmit it. Accordingly, embodiments for transmitting trigger signaling information will be described according to two methods.

When one trigger stream is included a virtual channel, a data service for transmitting trigger stream is called a trigger service. In this case, a broadcasting station may allocate a fixed service identifier (service ID) to a trigger service.

Accordingly, a receiver may identify that one trigger stream is transmitted to a virtual channel when the service identifier has 0X01 as a fixed value.

Here, the broadcasting station may include trigger signaling information in an application identification structure in DST and transmit it.

For example, the broadcasting station adds 0x0001 as an App_id_description field value of DST to set a value that means interactive application for linking NT service such as TDO with a real-time broadcast Additionally, app_id_byte_length may use 3 bytes (0x0003) and app_id_byte may be allocated with 0x01 to indicate that corresponding data service includes trigger stream signaling information.

Accordingly, the receiver receives DST through the above method, and may identify tap( ) including trigger signaling information when app_id_byte_length is 0x0003, app_iddescription is 0x0001, and app_id_byte is 0x01. The receiver extracts trigger signaling information including an association_tag value from the identified tap( ) structure, and association_tag_descriptor receives stream having the same PID as the extracted association_tag from data elementary stream (ES) listed in PMT extracted from broadcasting stream in order to receive trigger stream.

As mentioned above, NRT service is signaled through SMR or NST, and may be uniquely identified through 16 bit service identifier (sevice_id). Additionally, content items constituting NRT service may be identified through conent_lengate or a content identifier in NCT or NRT-IT. Accordingly, trigger service may be transmitted like NRT service by extending app_id_byte through DST. For example, app_id_byte may include data combining a service identifier (service id) field of trigger service and a content_linkage field. Accordingly, the first 16 bits of app_id_byte correspond to a service id field in SMT or NST, and the later 32 bits correspond to a content linkage field in NCT or NRT-IT.

As above, the broadcasting station may include trigger signaling information in tap( ) and transmits it through an application identification structure of DST when one stream is included in each channel.

Moreover, according to an embodiment, trigger signaling information may be transmitted through a protocol_encapsulation field of DST. For example, if app_id_byte_length in DST is set with 0x0000, app id is not allocated. If protocol_encapsulation has 0x0F, it indicates that trigger signaling information is included in a corresponding tap( ) structure. Accordingly, a receiver may receive trigger signaling information from the corresponding tap( ) structure if app_id_byte_length is 0x0000 and protocol_encapsulation is 0x0F. Through this, a PID value on PMT indicating trigger stream is obtained and trigger stream is received as mentioned above.

Moreover, according to another embodiment, trigger signaling information may be transmitted through a content type descriptor field of DST.

As shown in FIG. 28, a content type descriptor structure in tap( ) on DST according to an embodiment is as follows.

A descriptorTag may have 0x72 to represent contentTypeDescriptor.

A descriptorLenth field represents the total length of a descriptor in a byte unit.

A contentTypeByte field represents a MIME media type value of data referenced by tap connected to the descriptor. The MIME media type is defined in 5 of RFC2045 section [8].

Accordingly, a content type descriptor may be added to a tap( ) structure including trigger signaling information according to an embodiment. Accordingly, a receiver may receive trigger signaling information from the corresponding tap( ) structure if app_id_byte_length is 0x0000 and content type descriptor of the tap( ) structure corresponds to the predetermined content. Through this, a PID value on PMT indicating trigger stream is obtained and trigger stream is received as mentioned above. The MIME media type may be designated with a specific type to identify that there is trigger service signaling information through a content type descriptor.

As mentioned above, one NRT service may be a trigger service for transmitting trigger stream and may transmit respectively different stream to content items in the trigger service. In this case, each application may include one trigger stream.

Accordingly, an embodiment may include trigger stream in each content item of NRT service and may transmit it. In this case, the above-mentioned application identification structure may be used. For example, if app_id_byte_length is 0x0003, it indicates that trigger stream is transmitted through one NRT service by using one service identifier. If app_id_byte_length is 0x0007, it indicates that trigger stream is transmitted by each content item by using a service identifier and content linkage. If defined as above, each trigger stream may be transmitted in correspondence to each NRT service or content item. Since the next stage of a method of transmitting and receiving trigger stream is identical to that of transmitting one trigger stream for each virtual channel, overlapping description will be omitted.

FIG. 29 is a view illustrating a syntax of PMT and service identifier descriptor according to an embodiment.

As shown in FIG. 29, a Program Map Table (PMT) represents information of a program broadcasted in each channel. A Program AssociationTable (PAT), in which 'packet ID' is defined as '0x00' and transmitted, may receive PMT by parsing 'packet ID' of PMT.

Moreover, a service identifier descriptor may be included in a descriptor loop for each ES of PMT. Then, it may include list information of services in each program element.

A structure of the service identifier descriptor will be described as follows.

A descriptor_tag field indicates that the descriptor is service_id_descriptor( ) and may have 0xC2.

A descriptor_length field represents a byte unit length from this field to the termination of the descriptor.

A service_count field indicates the number of services in a program element having the descriptor.

A service_id field indicates a service identifier in a program element having the descriptor.

According to an embodiment, trigger stream may be transmitted through a well-known IP address. Moreover, in order to signal a trigger, a broadcasting station may include a specific service identifier (service id, for example, 0x01) corresponding trigger stream in a service identifier descriptor and may transmit it. That is, trigger signaling information on receiving trigger stream may be transmitted through a service identifier descriptor. Accordingly, if a service identifier of service_id_descriptor in an ES descriptor loop in an ES loop of PMT is 0x01, the receiver determines that elementray_PID in the ES loop is PID indicating trigger stream and receives the trigger stream through the PID.

FIG. 30 is a view illustrating a trigger stream descriptor according to an embodiment. According to an embodiment, a trigger may be signaled using a trigger stream descriptor. Like the above service identifier descriptor, the trigger stream descriptor may be included in an ES descriptor loop in an ES loop of PMT. Accordingly, if there is trigger stream, a trigger stream descriptor may exist in an ES descriptor loop. If identifying a trigger stream descriptor, a receiver may receive trigger stream by obtaining PID of the trigger stream from elementary_PID in a corresponding ES loop.

Like this, a trigger stream descriptor for transmitting trigger signaling information may include at least one of a service identifier (target service id) of TDO, a trigger target in trigger stream, and an IP address list transmitting trigger stream. The trigger stream descriptor of FIG. 30 is provided according to an embodiment and its structure will be described as follows.

A descriptor_tag field indicates a trigger_stream_descriptor if set with a predetermined value.

A descriptor_length field represents a byte unit length from this field to the termination of the descriptor.

A target_service_count field represents the number of target NRT service (TOD) of at least one trigger in trigger stream.

A target_service_id field represents a service identifier (service_id) of target NRT service (TOD) of at least one trigger in trigger stream. A receiver may identify a service identifier (service_id) before receiving trigger stream by using the target_service_id field.

A target_content_item_count field represents the number of target NRT service content items of at least one trigger in trigger stream.

A target_content_linkage field represents a target NRT service content item linkage (content_linkage) of at least one trigger in trigger stream.

Moreover, a trigger stream descriptor is provided according to an embodiment, and thus, it is apparent that it may include additional information or have another configuration. For example, when one trigger stream is transmitted for each channel, a content item field may be omitted. Additionally, at least one of a trigger stream identification information field and a profile information field may be added to identify trigger stream.

A broadcasting station may transmit list information of trigger target NRT service such as TDO by using the trigger stream descriptor. Additionally, the broadcasting station may transmit trigger signaling information by using the target_service_id and targe_content_linkage fields if there is another trigger according to a content item. Additionally, a trigger stream descriptor may further include a list of IP address information or port numbers transmitting trigger stream.

According to an embodiment, a broadcasting station designates a stream type and transmits trigger signaling information. A receiver extracts trigger signaling information by using a stream type from PMT and receives trigger stream through the trigger signaling information. For example, 0x96, one of stream types set preliminarily at the present, may be designated as trigger stream. In this case, a typical receiver has no information that a stream type is 0x96 and thus may not process trigger stream and disregard it. Accordingly, backwards compatibility for sub model receiver is guaranteed.

According to an embodiment, a trigger may be included in an Application information Table (AIT) for transmitting application information in data broadcasting such as Multimedia Home Platform (MHP) or Advanced Common application platform (ACAP), and may be transmitted. FIG. 31 is a view of AIT according to an embodiment.

Moreover, according to another embodiment a trigger may be included in a descriptor of STT to refer to a System Time Table (STT) as a trigger time, and then transmitted. FIG. 32 is a view of STT according to an embodiment.

Figure 33:
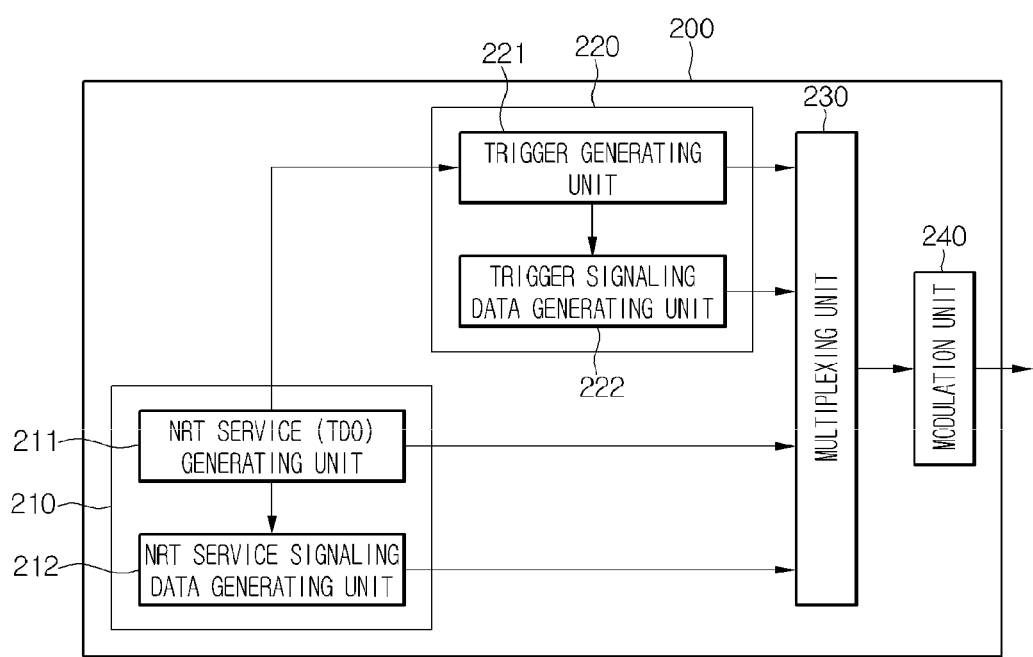
FIG. 33 is a block diagram illustrating a transmitter for transmitting TDO and a trigger according to an embodiment.

FIG. 33 is a block diagram illustrating a transmitter for transmitting TDO and a trigger according to an embodiment.

Referring to FIG. 33, the transmitter 200 includes an NRT service transmitting unit 210, a trigger transmitting unit 220, a multiplexing unit 230, and a demodulation unit 240. The NRT service transmitting unit 210 includes an NRT service (TDO) generating unit 211 and an NRT service signaling data generating unit 212. The trigger transmitting unit 220 includes a trigger generating unit 221 and a trigger signaling data generating unit 222.

The NRT service (TDO) generating unit 211 receives data for NRT service generation from a service provider to generate the NRT service, packetizes the generated NRT service into IP datagram, and then packetized the packetized IP datagram into a transmission packet (TP). The packetized NRT service data is transmitted to the multiplexing unit 230.

The NRT service generating unit 211 transmits metadata including channel information about NRT service in transmission and service_id, to the NRT service signaling data generating unit 212. Additionally, if the generated NRT service is TDO, the NRT service generating unit 211 extracts trigger information including a trigger time for triggering TDO, identification information, and trigger action information of a target TDO, and then transmits it to the trigger generating unit 221.

The NRT service signaling data generating unit 212 generates NRT service signaling data for receiving NRT service by using the NRT service metadata, and packetizes the generated NRT service signaling data to the transmission packet (TP) to transmit it to the multiplexing unit 230.

Additionally, the trigger generating unit 221 generates trigger data by using trigger information of the TDO received from the NRT service (TDO) generating unit. The generated trigger data is packetized into a transmission packet to transmit it to the multiplexing unit 230. Moreover, the trigger generating unit 221 transmits metadata for receiving a trigger such as the packet identifier (PID) of the transmitted trigger data to the trigger signaling data generating unit 222.

The trigger signaling data generating unit 22 generates trigger signaling data on the basis of the received metadata, and packetizes the trigger signal in data into a transmission packet to transmit it to the multiplexing unit 230.

The multiplexing unit 230 multiplexes the received transmission packets by each channel, and then transmits the multiplexed signal to the modulation unit 240.

The modulation unit 240 modulates the multiplexed signal and transmits it to the external. The modulation method may vary, and the present invention is not limited thereto.

Figure 34:
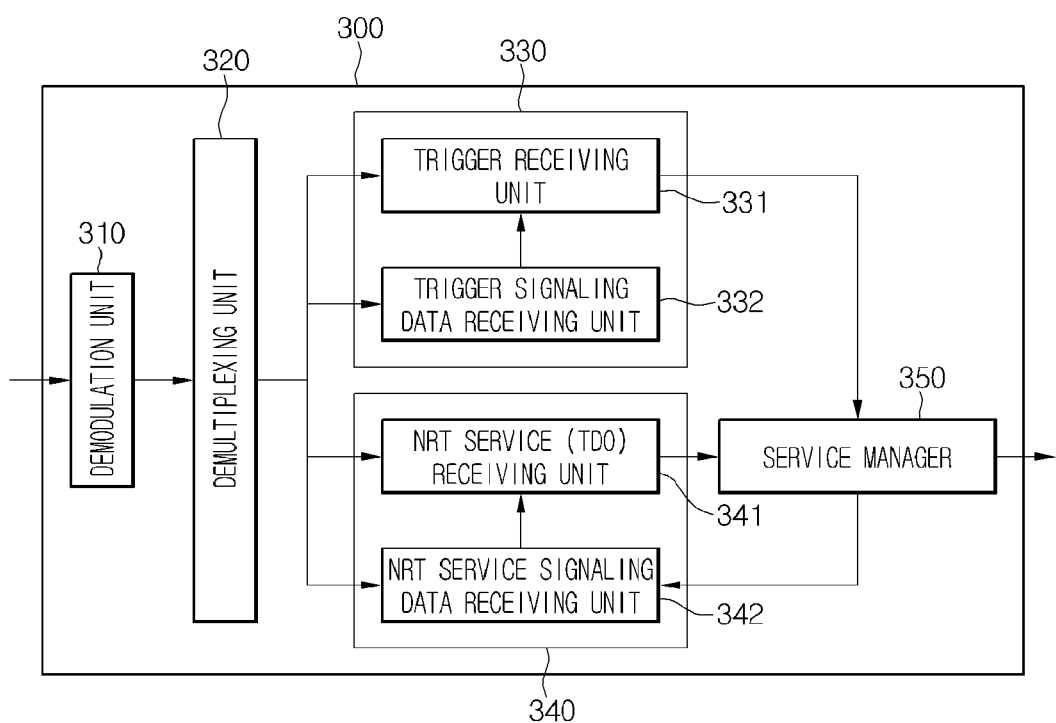
FIG. 34 is a block diagram illustrating a receiver for receiving TDO and a trigger according to an embodiment.

FIG. 34 is a block diagram illustrating a receiver for receiving TDO and a trigger according to an embodiment.

Referring to FIG. 34, the receiver 300 includes a demodulation unit 310a, a demultiplexing unit 320, a trigger processing unit 330a, an NRT service processing unit 340a, and a service manager 350a. The trigger processing unit 330a includes a trigger receiving unit 331 and a trigger signaling data receiving unit 332. The NRT service processing unit 340a includes an NRT service (TDO) receiving unit 341a and an NRT service signaling data receiving unit 342a.

The demodulation unit 310a receives a modulated signal from the transmitter 200, and demodulates the received signal according to a predetermined demodulation method to transmit it to the demultiplexing unit 320.

The demultiplexing unit 320 demultiplexes the demodulated signal to restore an original transmission packet for each channel to transmit them to each receiving unit of the trigger processing unit 330a or the NRT service processing unit 340a.

The NRT service signaling data receiving unit 342a receives and restores the packetized NRT service signaling data from the multiplexing unit 320 to extract information on NRT service, and then transmits it to the NRT service (TDO) receiving unit 341a. The NRT service (TDO) receiving unit 341a receives transmission packets of NRT service from the multiplexing unit 320 by using information on receiving NRT service, and restores it as service data to transmit it to the service manager 350a.

Moreover, the NRT service signaling data receiving unit 332 receives and restores the packetized trigger signaling data from the multiplexing unit 320, extract information on receiving a trigger, and then, transmits it to the trigger receiving unit 331. The trigger receiving unit 331 receives transmission packets including a trigger from the multiplexing unit 32 by using information on receiving a trigger, and restores trigger data to transmit it to the service manager 350a.

The service manager 350a receives at least one of trigger data or NRT service (TDO) data from the trigger processing unit 330a or the NRT processing unit 340a. Moreover, the service manager 350a performs and applies a trigger action on a trigger target TDO at the trigger timing, so that a trigger action on TDO is performed.

Figure 35:
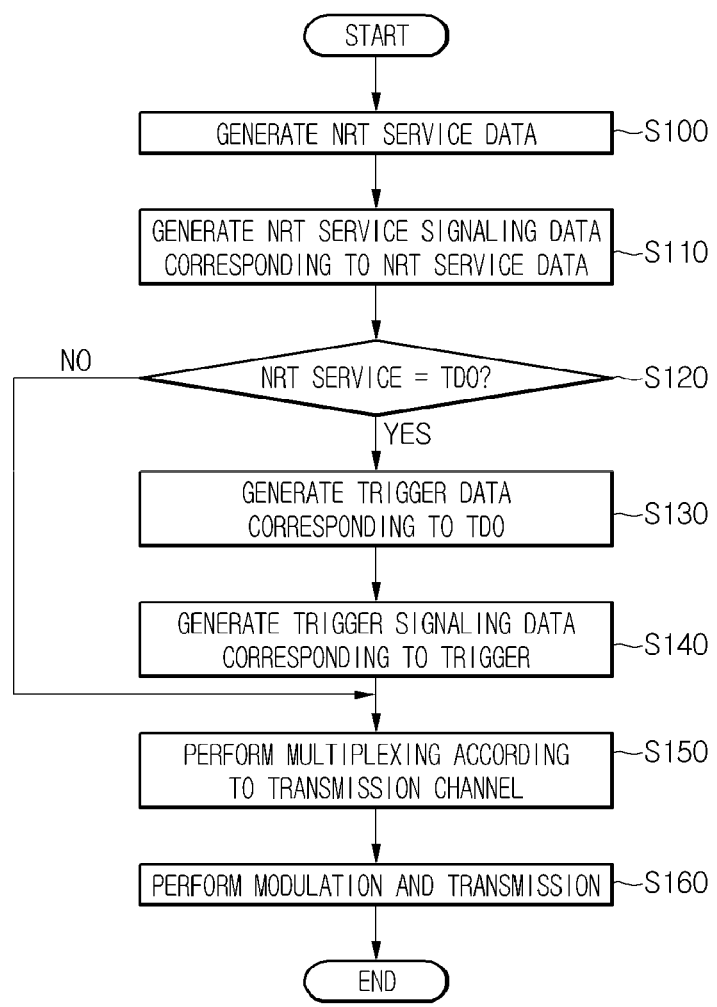
FIG. 35 is a flowchart illustrating a trigger transmitting method according to an embodiment.

FIG. 35 is a flowchart illustrating a trigger transmitting method according to an embodiment.

Referring to FIG. 35, the NRT service generating unit 211 generates NRT service data by receiving NRT service data from external or on the basis of data received from the NRT service provider in operation S100. Moreover, the NRT service generating unit 211 packets the generated data into a transmission packet. Additionally, the NRT service generating unit 211 transmits information on receiving transmission packets including NRT service to the NRT service signaling data generating unit 212.

Then, the NRT service signaling data generating unit 212 generates the above described NRT service signaling data and packetizes it into a transmission packet in operation S110.

Moreover, the NRT service generating unit 211 determines whether the generated NRT service is a trigger declarative object, i.e., TDO in operation S120.

Additionally, if the generated NRT service is TDO, the NRT service generating unit 211 transmits trigger information including a trigger time for triggering TDO, trigger action, target TDO identification information, to the trigger generating unit 221, and the trigger generating unit 211 generates trigger data by using the received triggered information in operation S130. The generated trigger data is packetized into a transmission packet and transmitted to the multiplexing unit. For example, a target service identifier for target TDO and trigger action information applied to a target service may be inserted into a packetized stream, i.e., the payload of PES, and then transmitted. Additionally, trigger time information is designated into a PTS or DTS format, inserted into the payload or header of PES, and then is transmitted. When the synchronized data streaming method is used, PTS of trigger stream and PTS of video and audio stream are synchronized to set the accurate play timing.

Moreover, the trigger signaling data generating unit 222 generates trigger signaling data for identifying and receiving a trigger transmitted from the trigger generating unit 221 and packetized the generated trigger signaling data into a transmission packet to transmit it to the multiplexing unit in operation S140. Here, the trigger signaling data may include a trigger stream descriptor or a service identifier descriptor, inserted in a program map table, and may include a packet identifier of trigger stream corresponding to each descriptor. Additionally, trigger signaling data may include a packet identifier of trigger stream in a TAP structure of DST.

Later, the multiplexing unit 230 multiplexes at least one of transmission-packetized NRT service data, NRT service signaling data, trigger data, and trigger signaling data by each transmission channel and then transmits it to the modulation unit 240.

Moreover, the modulation unit 240 performs modulation to transmit the multiplexed signal and transmits it to external receiver or a broadcasting network in operation S160.

Figure 36:
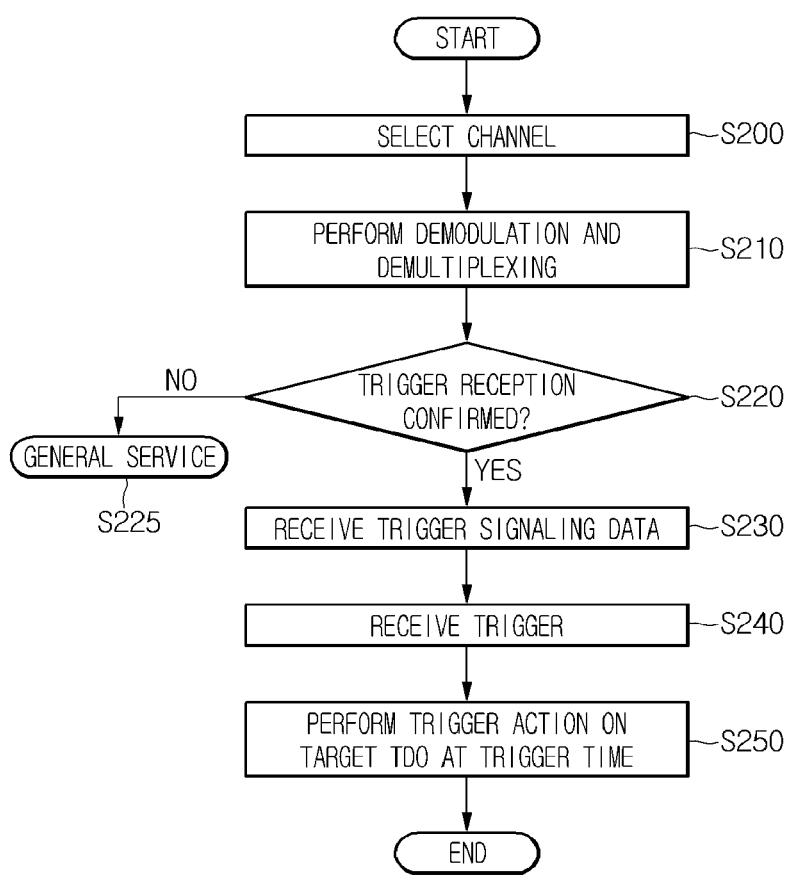
FIG. 36 is a flowchart illustrating an operation of a receiver 300 according to an embodiment.

FIG. 36 is a flowchart illustrating an operation of a receiver 300 according to an embodiment.

First, when the receiver 300 is turned on, a channel is selected by a user or a predetermined channel is selected in operation S200. The demodulation unit 310*a* demodulates the received signal from the selected channel, and the demultiplexing unit 320 demultiplexes the demodulated signal by each transmission channel. Also, the NRT service receiving unit 341*a* and the NRT service signaling data receiving unit 342*a* receive NRT service data and transmit it to the service manager 350*a* as described above.

Then, the trigger signaling data receiving unit 332 or the NRT service signaling data receiving unit 342*a* confirms whether trigger reception is possible in operation s220. The trigger reception confirmation may use one of the above-mentioned methods. That is, the trigger signaling data receiving unit 332 or the NRT service signaling data receiving unit 342*a* uses one of a method of confirming PID corresponding to a trigger in MGT or PSIP based PID, a method of using a tap structure of DST, a method of using a service identifier descriptor or a trigger stream descriptor, a method of using a trigger stream type, and a method of using AIT or STT, in order to confirm whether trigger reception is possible.

Moreover, when it is confirmed that trigger reception is possible, the trigger signaling data receiving unit 332 receives a transmission packet including trigger signaling data to restore the trigger signaling data, and then transmits it to the trigger receiving unit 331 in operation S230.

Later, the trigger receiving unit 331 extracts trigger data from the received transmission packet by using the trigger signaling data, and transmits it to the service manager 350*a* in operation S240. For example, the trigger receiving unit 331 may receive trigger stream by using a packet identifier corresponding to the trigger stream descriptor. Additionally, the trigger receiving unit 331 extracts trigger information from trigger stream and transmits it to the service manager 350*a*. Additionally, if the received trigger stream is PES, PTS in the header of PES is extracted as a trigger time, and a target service identifier and trigger action in the payload of PES are extracted, in order to transmit them to the service manager 350*a.j*

Moreover, the service manager 350*a* performs a trigger action on a target TDO at the trigger timing, so that a trigger action on TDO is performed in operation S250. Especially, if the PTS of PES is a trigger time, the PTS of trigger stream is synchronized with the PTS in the header of audio and video stream, to satisfy the accurate play timing.

Figure 37:
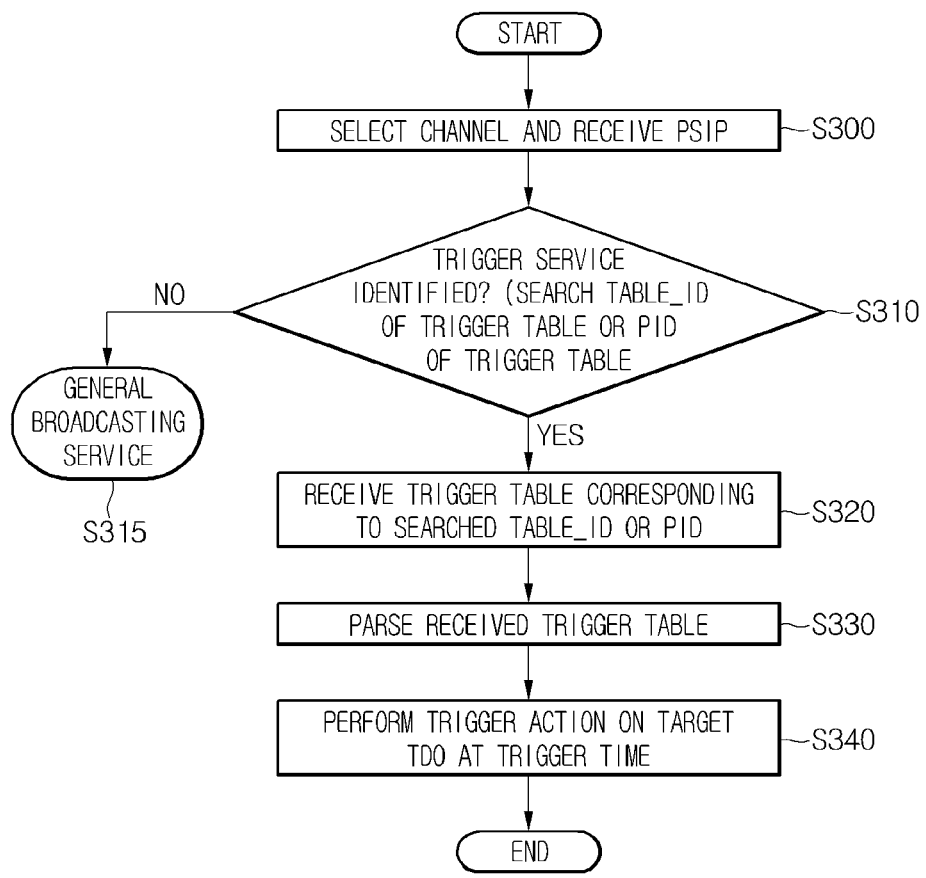
FIG. 37 is a flowchart illustrating a trigger receiving method by using a trigger table according to an embodiment.

FIG. 37 is a flowchart illustrating a trigger receiving method by using a trigger table according to an embodiment.

The demodulation unit 310*a* receives and demodulates a broadcast signal for selected channel. Moreover, the trigger signaling data receiving unit 332 receives a PSIP table through the demultiplexing unit 320 and determines whether there is a trigger table in the received table to identify a trigger service in operation S310. The trigger signaling data receiving unit 332 searches PID allocated to a trigger table from an MGT or PSIP based table, or searches a table corresponding to Table_id allocated to a trigger table to identify a trigger service.

If the trigger service is not identified, the receiver 300 provides general broadcasting services.

Moreover, if the trigger service is identified, the trigger receiving unit 331 receives the searched trigger table and parses it in operations S320 and S330.

Then, the service manger 350*a* receives trigger information including trigger time, trigger action, and target TDO identification information parsed in the trigger table, and performs a corresponding trigger action on a corresponding TDO at the corresponding trigger timing in operation S340.

Figure 38:
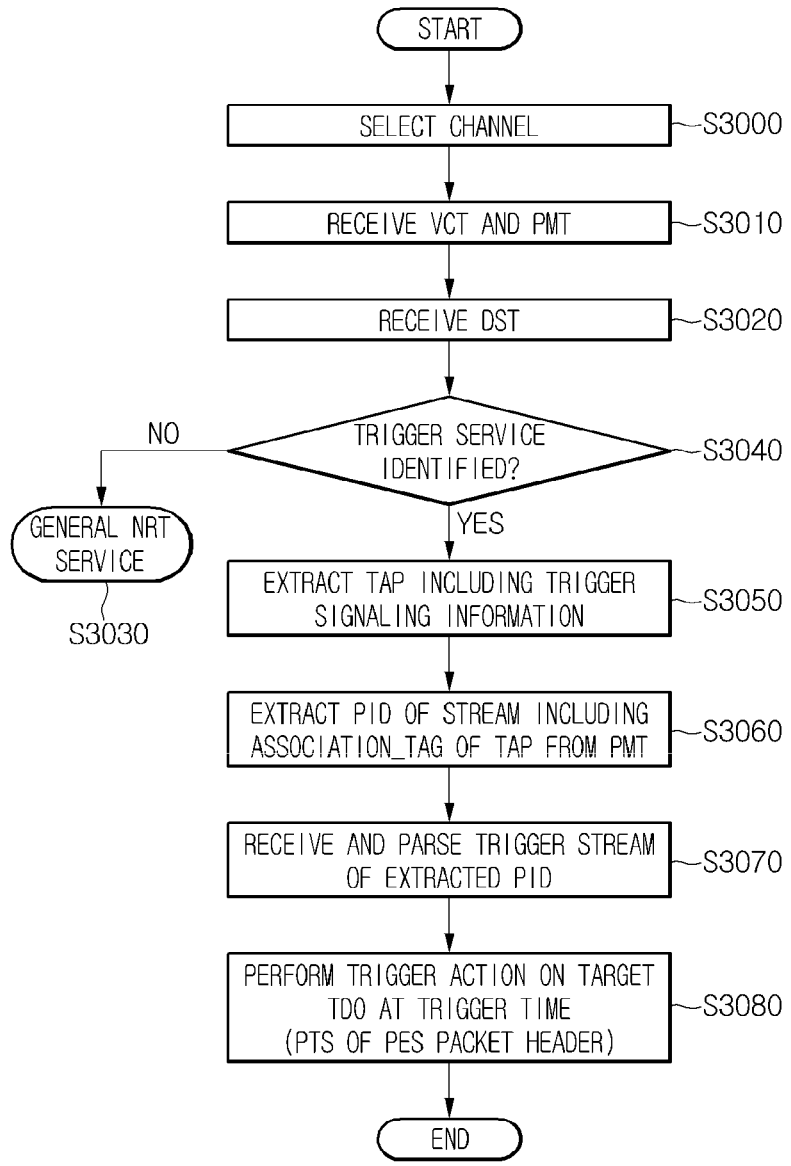
FIG. 38 is a flowchart illustrating an operation of a receiver when trigger signaling information and trigger are transmitted using DST according to an embodiment.

FIG. 38 is a flowchart illustrating an operation of a receiver 300 when trigger signaling information and trigger are transmitted using DST according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310*a* and the demultiplexing unit 320 in operation S3010. Then, the PSI/PSIP section handler or the trigger signaling data receiving unit 332 or the NRT service signaling data receiving unit 342*a* parses the obtained VCT and PMT to confirm whether there is NRT service.

For example, when the service_type field value of VCT is not 0x04 or 0x08, since the corresponding virtual channel does not transmit NRT only service, the receiver 300 operates properly according to information in the virtual channel. However, even though the service_type field value does not mean NRT only service, the corresponding virtual channel may include NRT service. This case is called adjunct NRT service included in the corresponding virtual channel, and the receiver 300 may perform the same process as the case of receiving NRT service.

Then, the NRT service signaling data receiving unit 342*a* or the trigger signaling data receiving unit 332 determines that NRT service is received through a corresponding virtual channel if a service_type field value is 0x04 or 0x08. In this case, if a stream_type field value in a service location descriptor of VCT (or an ES loop of PMT) is 0x95 (i.e., DST transmission), DST is received using an Elementary_PID field value in operation S3020. This may be performed in the demultiplexing unit 320 according to a control of the service manager 350*a*.

Also, the trigger signaling data receiving unit 342*a* identifies a trigger service from the received DST in operation S3040. A method of identifying a trigger service uses one of a method of identifying a specific value allocated to app_id_description and app_id_byte by using an application identification structure, a method of identifying a specific value allocated to a protocol_encapsulation field, and a method of identifying tap including a content type descriptor.

If the trigger service is not identified from the received DST, since trigger data transmits general NRT service through a corresponding virtual channel, the receiver 300 operates properly according to NRT service in the corresponding virtual channel in operation S3030.

Moreover, when the trigger service is identified from DST, the trigger signaling data receiving unit 332 extracts tap from DST including trigger signaling information (PID of trigger stream) in operation S3060.

Then, the trigger signaling data receiving unit 332 extracts stream PID from PMT including association_tag of the extracted Tap in operation S3070.

The trigger receiving unit 331 receives MPEG-2 TS packets corresponding to the extracted stream PID, and removes decapsulation, i.e., TS header, to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S3070.

Then, the service manager 350*a* performs an action on the target TDO at the trigger timing by using the PTS of the PES packet header including a trigger as the trigger timing in operation S3080. Here, the target TDO may be NRT service indicated by the parsed target TDO identifier. Additionally, the action may be one of preparation, execution, extension, and termination commands provided from the parsed trigger action information.

Figure 39:
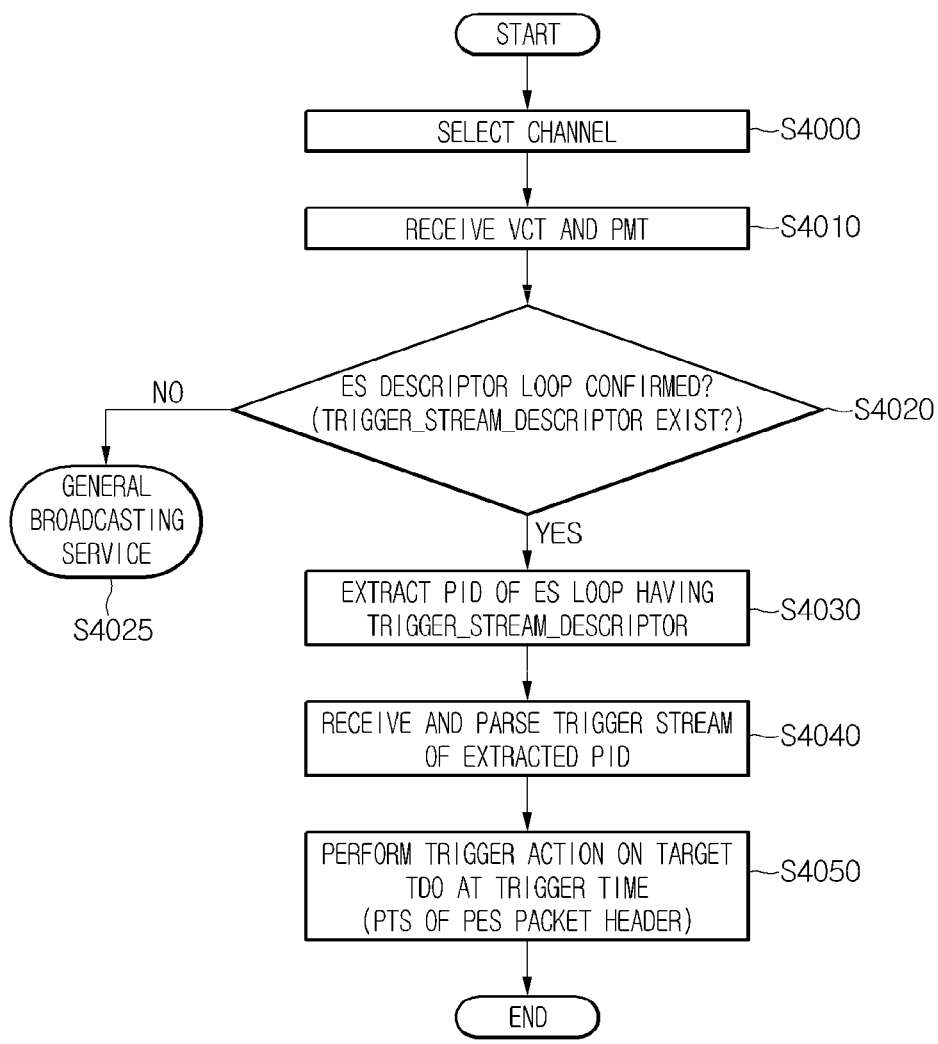
FIG. 39 is a flowchart illustrating an operation of a receiver when a trigger is transmitted using a trigger stream descriptor according to an embodiment.

FIG. 39 is a flowchart illustrating an operation of a receiver 300 when a trigger is transmitted using a trigger stream descriptor according to an embodiment.

When a physical transmission channel is selected in operation S3000 and a channel selected by a tuner is tuned, the receiver 300 obtains VCT and PMT from a broadcast signal received through the tuned physical transmission channel by using the demodulation unit 310*a* and the demultiplexing unit 320 in operation S4000. The broadcast signal includes VCT and PMT, and the trigger signaling data receiving unit 332 or the PSI/PSIP section handler parses the obtained VCT and PMT.

Also, the trigger signaling data receiving unit 332 confirms whether a trigger is transmitted from the VCT and PMT to a corresponding virtual channel. For this, the trigger signaling data receiving unit 332 determines whether there is the Trigger_stream_descriptor in the ES descriptor loop corresponding to a corresponding virtual channel in operation S4020. Whether there is Trigger_stream_descriptor is determined by using whether a stream_type value is 0x06 (synchronized data streaming) and a descriptor_tag field of a corresponding descriptor is identical to a value set to correspond to a trigger stream descriptor after searching descriptors in an ES descriptor loop.

If it is determined that Trigger_stream_descriptor is not identified from PMT and thus there is no Trigger_stream_descriptor, since a corresponding virtual channel does no transmit a trigger, the receiver 300 operates properly according to broadcast service in the corresponding virtual channel in operation S4025.

Then, if there is Trigger_stream_descriptor, the trigger signaling data receiving unit 332 extracts Elementary_PID in the corresponding ES loop of PMT in operation S4030. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The stream_type of a PES packet including trigger stream may be 0x06 representing synchronized data stream. The trigger receiving unit 331 parses at least one of PTS of a PES packet header from the restored PES stream, a target TDO identifier in trigger stream, a trigger identifier, or trigger action information in operation S4040.

Then, the service manager 350*a* performs an action on the target TDO at the trigger timing by using the PTS of the PES packet header including a trigger as the trigger timing in operation S4050. Here, the target TDO may be NRT service indicated by the parsed target TDO identifier. Additionally, the action may be one of preparation, execution, extension, and termination commands provided from the parsed trigger action information.

Figure 40:
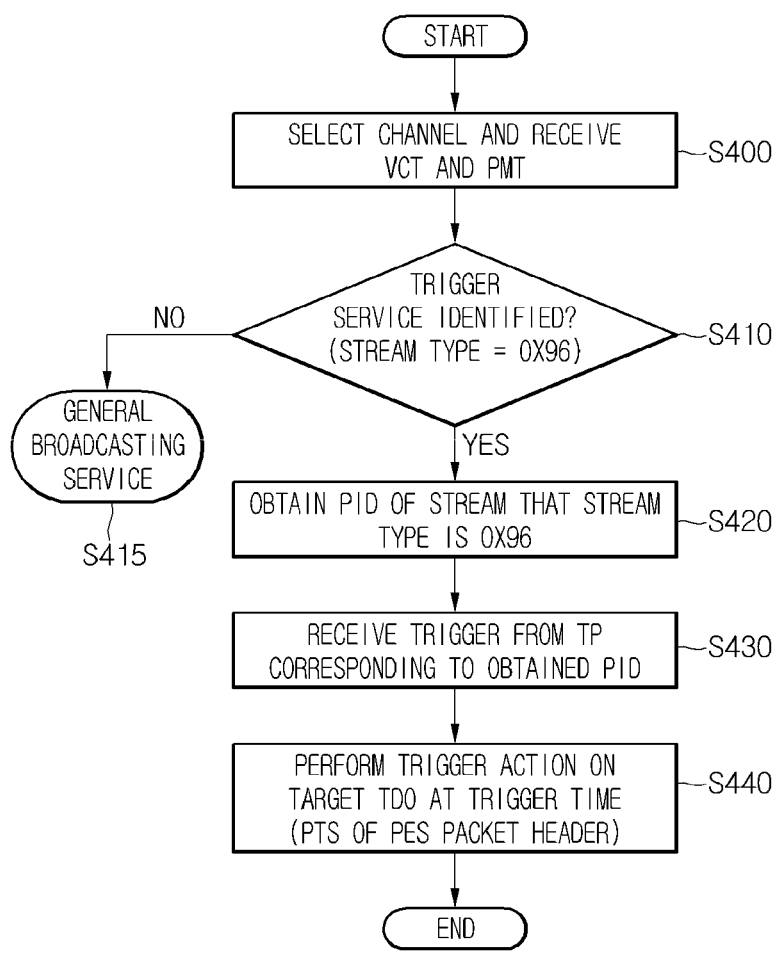
FIG. 40 is a flowchart illustrating an operation of a receiver when a trigger is transmitted using a stream type according to an embodiment.

FIG. 40 is a flowchart illustrating an operation of a receiver when a trigger is transmitted using a stream type according to an embodiment.

When a physical transmission channel is selected and a channel selected by a tuner is tuned, the receiver 300 obtains VCT and PMT from a broadcast signal received through the tuned physical transmission channel by using the demodulation unit 310*a* and the demultiplexing unit 320. The broadcast signal includes VCT and PMT, and the trigger signaling data receiving unit 332 or the PSI/PSIP section handler parses the obtained VCT and PMT in operation S400.

Also, the trigger signaling data receiving unit 332 confirms whether a trigger is transmitted from the VCT and PMT to a corresponding virtual channel. For this, the trigger signaling data receiving unit 332 determines whether there is 0x96, i.e., the specific stream type in the ES descriptor loop corresponding to a corresponding virtual channel in operation S410.

If it is determined that 0x96 is not identified from stream type and thus there is no stream type, since a corresponding virtual channel does no transmit a trigger, the receiver 300 operates properly according to broadcast service in the corresponding virtual channel in operation S415.

Then, if the stream type is 0x96, the trigger signaling data receiving unit 332 extracts Elementary_PID in the corresponding ES loop of PMT in operation S420. The extracted stream PID may be a PID value of stream including trigger stream.

Then, the trigger receiving unit 331 receives MPEG-2 TS packets corresponding to the extracted stream PID, and performs decapsulation (i.e., removes a TS header) to restore PES stream including trigger stream. The trigger receiving unit 331 parses at least one of PTS of a PES packet header from the restored PES stream, a target TDO identifier in trigger stream, a trigger identifier, or trigger action information in operation S430.

Then, the service manager 350a performs an action on the target TDO at the trigger timing by using the PTS of the PES packet header including a trigger as the trigger timing in operation S440. Here, the target TDO may be NRT service indicated by the parsed target TDO identifier. Additionally, the action may be one of preparation, execution, extension, and termination commands provided from the parsed trigger action information.

Figure 41:
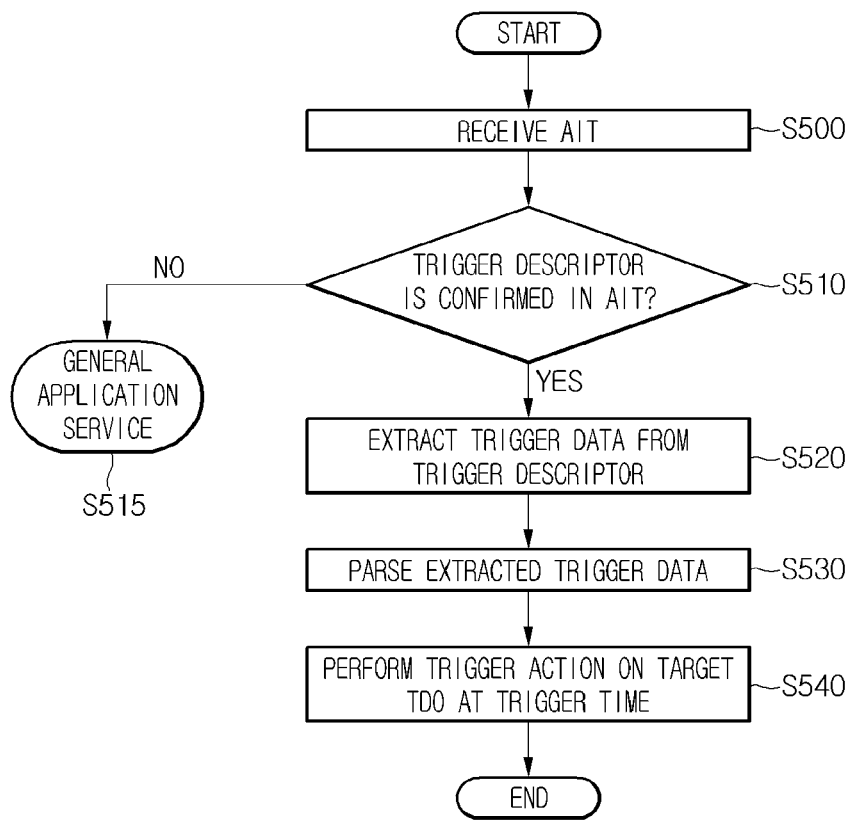
FIG. 41 is a flowchart illustrating an operation of a receiver when a trigger is transmitted using AIT according to an embodiment.

FIG. 41 is a flowchart illustrating an operation of a receiver when a trigger is transmitted using AIT according to an embodiment.

The trigger signaling data receiving unit 332 receives AIT by using the demodulation unit 310a and the demultiplexing unit 320 in operation S500.

Also, the trigger signaling data receiving unit 332 confirms whether a trigger is transmitted from AIT. For this, the trigger signaling data receiving unit 332 confirms whether there is a trigger descriptor in AIT in operation S510.

If it is determined that there is no trigger descriptor, since a corresponding application does not include a trigger, the receiver 300 operates properly according to corresponding application service in operation S515.

Also, if there is a trigger descriptor, the trigger receiving unit 332 extracts trigger data from the trigger descriptor and parses the extracted trigger data to transmit it to the service manager 350a in operation S530.

Then, the service manager 350a performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Figure 42:
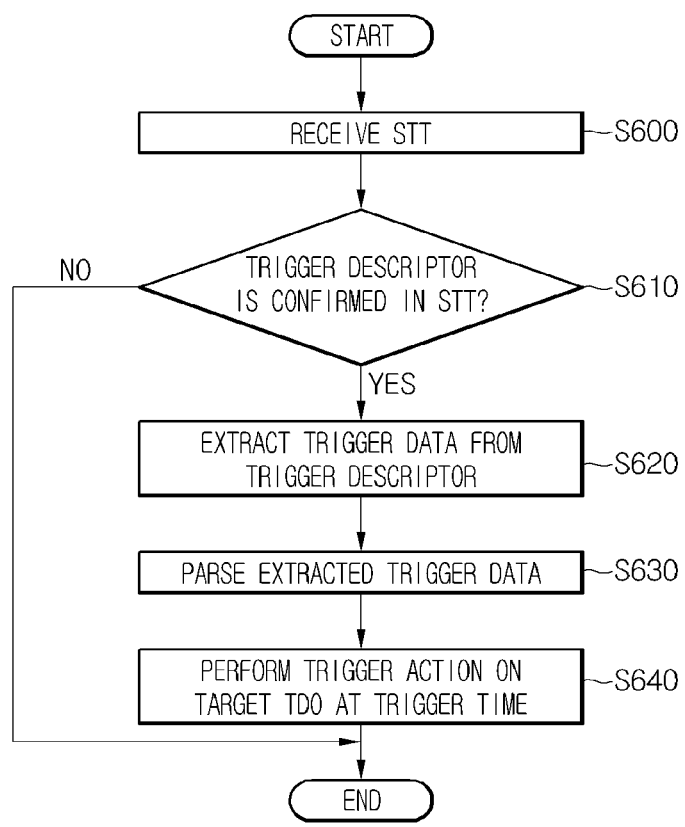
FIG. 42 is a flowchart illustrating an operation of a receiver when a trigger is transmitted using STT according to an embodiment.

FIG. 42 is a flowchart illustrating an operation of a receiver when a trigger is transmitted using STT according to an embodiment.

The trigger signaling data receiving unit 332 receives STT by using the demodulation unit 310a and the demultiplexing unit 320 in operation S600.

Also, the trigger signaling data receiving unit 332 confirms whether a trigger is transmitted from STT. For this, the trigger signaling data receiving unit 332 confirms whether there is a trigger descriptor in STT in operation S610.

If it is determined that there is no trigger descriptor, since a corresponding STT does not include a trigger, the receiver 300 operates properly according to a broadcast signal in operation S615.

Also, if there is a trigger descriptor, the trigger receiving unit 332 extracts trigger data from the trigger descriptor and parses the extracted trigger data to transmit it to the service manager 350a in operation S630.

Then, the service manager 350a performs an action on the target TDO at the trigger timing by using the parsed trigger data in operation S540. Here, the target TDO may be NRT service indicated by the parsed target TDO identifier. Additionally, the action may be one of preparation, execution, extension, and termination commands provided from the parsed trigger action information.

Hereinafter, a triggering data transmission pattern is described with reference to FIGS. 43 and 44 according to an embodiment of the present invention. Especially, a transmission pattern of Activation Triggering Data (MTD) is described.

According to an embodiment, triggering data including a triggering action set to a value corresponding to activation may be activation triggering data. The activation triggering data triggers (execute) the activation of an object corresponding to a target service identifier.

Figure 43:
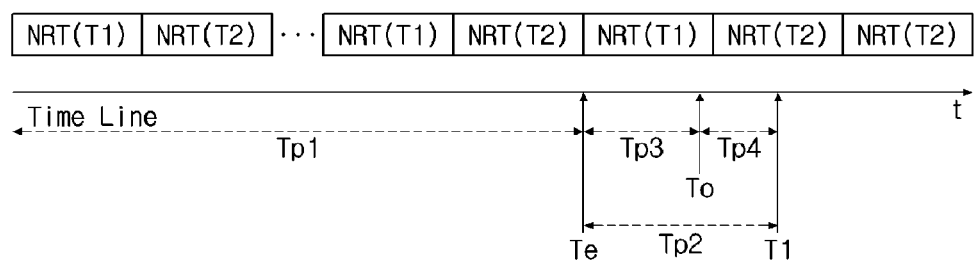
FIG. 43 is a timing diagram according to an embodiment of the present invention.

FIG. 43 is a timing diagram according to an embodiment of the present invention.

As shown in FIG. 43, since the transmitter 200 does not know when the receiver 300 changes a channel, when the receiver 300 is power on, and when the receiver 300 selects a channel where a corresponding NRT service exists, the transmitter 200 may transmit download contents transmitted in an NRT way through terrestrial broadcasting periodically and repeatedly.

For this reason, the transmitter 200 may also transmit activation triggering data periodically. However, when activation triggering data are transmitted in a very short period, a transmission band may be wasted and overhead may occur because the receiver 300 needs to check the activation triggering data periodically. On the contrary, when activation triggering data are transmitted in a very long period, even if the receiver 300 receives NRT data corresponding to the activation triggering data, it may not activate the received NRT data. Accordingly, a proper transmission timing of the activation triggering data is required.

Referring to FIG. 43, an activation time T1 indicates a time at which the activation of NRT T1 service is triggered. An effective time Te indicates a time at which the NRT T1 starts to be transmitted lastly before the activation time T1. A transmission period change time To indicates a time at which a period of transmitting activation triggering data is changed. The transmission period change time To is a time parameter that the transmitter 200 determines. A time window Tp1 indicates a time prior to the effective time Te. A time window Tp2 indicates a time between the effective time Te and the activation time T1. A time window Tp3 indicates a time between the effective time Te and the transmission period change time To. A time window Tp4 indicates a time between the transmission period change time To and the activation time T1.

In order to execute the NRT T1 service at the activation time T1, the receiver 300 may need to complete the reception and storage of the NRT T1 service before the activation time T1 and then may receive activation triggering data for the NRT T1 service. For this, if the receiver 300 tunes a channel transmitting the NRT T1 service before the effective time Te and maintains a corresponding channel until the reception completion of the NRT T1 service, it may save the NRT T1 service before the activation time T1. Accordingly, even when activation triggering data are transmitted in the time window Tp2, since the receiver 300 does not receive the NRT T1 service, the transmission of the activation triggering data in the time window Tp2 may be meaningless.

However, if the receiver 300 tunes a channel transmitting the NRT T1 service in the time window Tp1 and performs channel changing to another channel after the NRT T1 service is received completely, as the receiver 300 performs channel changing to a channel transmitting the NRT T1 service in the time window Tp2, it may have the NRT T1 service. Accordingly, the transmitter 200 may be required to transmit activation triggering data in the time window Tp2.

Moreover, the transmitter 200 may transmit activation triggering data by distinguishing the time window Tp3 and the time window Tp4 from each other using the transmission period change time To. Since a time of the time window Tp4 is left until the NRT T1 service is executed before the time period change time To, the transmitter 200 transmits activation triggering data in a long period. At this point, the transmitter 200 may transmit activation triggering data in a period of n*Tp4.

On the other hand, since there is little time left between the transmission period change time To and the activation time T1 until the NRT T1 service is executed, the transmitter 200 transmits activation triggering data in a short period. At this point, the transmitter 200 may transmit activation triggering data as many times as a short period transmission count M. At this point, the short period P(Tp4) may be [Tp4/M]. [ ] indicates a Gaussian symbol. The short period transmission count M may be designed in consideration of a channel change time. Accordingly, when the receiver 300 performs channel changing to a channel providing the NRT T1 service before the activation time T1 by P(Tp4), the NRT T1 service may be provided normally.

As the receiver 300 enters a channel providing the NRT T1 service between T1-P(Tp4) and the activation time T1, the NRT T1 service may not be provided normally. However, due to a very short time, it is less likely to occur. Additionally, this case may be compensated by maintenance triggering data described later.

As mentioned above, although the effective time Te is prior to the transmission period change time To, the present invention is not limited thereto. That is, the transmission period change time To may be prior to the effective time Te.

Figure 44:
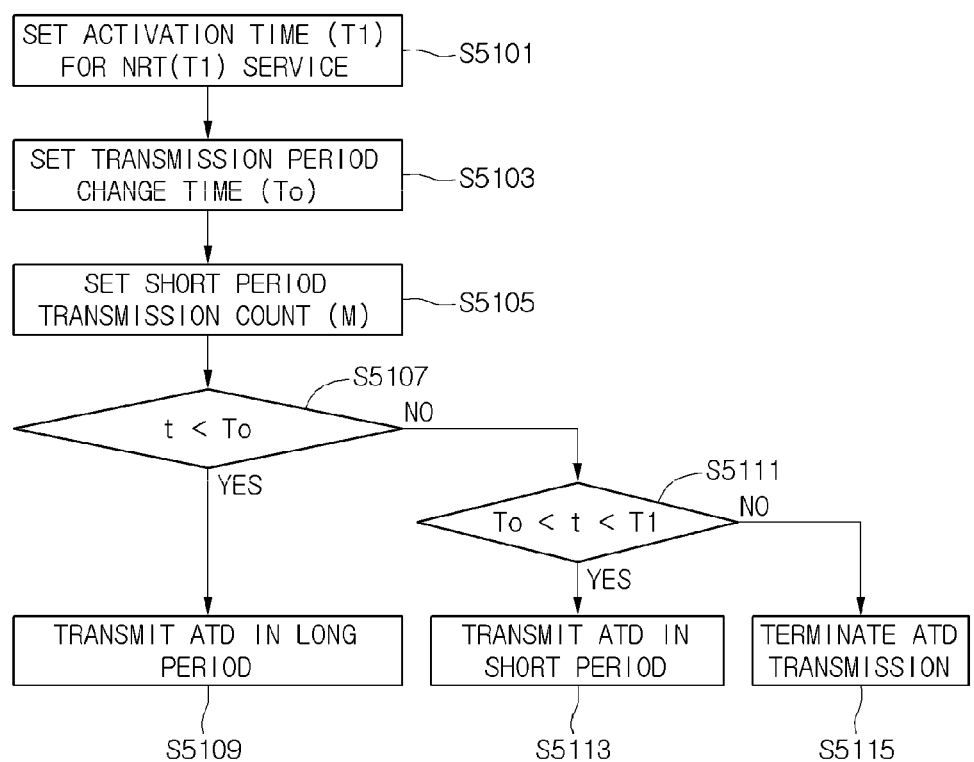
FIG. 44 is a flowchart illustrating an activation trigger data transmitting method according to an embodiment of the present invention.

FIG. 44 is a flowchart illustrating an activation triggering data transmitting method according to an embodiment of the present invention.

First, the trigger transmission unit 220 sets an activation time T1 of an NRT T1 service, that is, a target object, in operation S5101, sets a transmission period change time To in operation S5103, and sets a short period transmission count M in operation S5105.

When a current system time t is prior to the transmission period change time To in operation S5107, the trigger transmission unit 220 transmits activation triggering data for the NRT T1 service in a long period in operation S5109. At this point, the trigger transmission unit 220 may transmit activation triggering data in a period of n*Tp4.

When the current system time t is subsequent to the transmission period change time To and prior to the activation time T1 of the NRT T1 service in operation S5511, the trigger transmission unit 220 transmits activation triggering data for the NRT T1 service in a short period in operation S5113.

When the current system time t is subsequent to the activation time T1 of the NRT (T1) service in operation S5511, the trigger transmission unit 220 terminates the transmission of activation triggering data for the NRT (T1) service in operation S5115.

In FIG. 44, the current system time t is compared to the transmission period change time To or the activation time T1 of the NRT T1 service. Accordingly, the time references of the current system time t, the transmission period change time To, and the activation time T1 of the NRT(T1) service need to be the same. For example, the current system time t, the transmission period change time To, and the activation time T1 of the NRT(T1) service all may be the UTC time.

If the activation time T1 of the NRT(T1) is given as a PTS, since the PTS uses a PCR as reference, the current system time t may correspond to an STC. This may be applied to a time comparison mentioned in this specification.

Hereinafter, referring FIGS. 45 to 47, a triggering data transmission pattern is described according to another embodiment of the present invention. Especially, a transmission pattern of maintenance triggering data (MTD) is described.

According to an embodiment, triggering data including a trigger action set to a value corresponding to maintenance may be maintenance triggering data.

If an object corresponding to a target service identifier of maintenance triggering data is activated already, maintenance trigger information may trigger the maintenance of the activation of the object. Then, if an object corresponding to the target service identifier of maintenance triggering data is not activated yet, maintenance trigger information may trigger the activation of the object.

Figure 45:
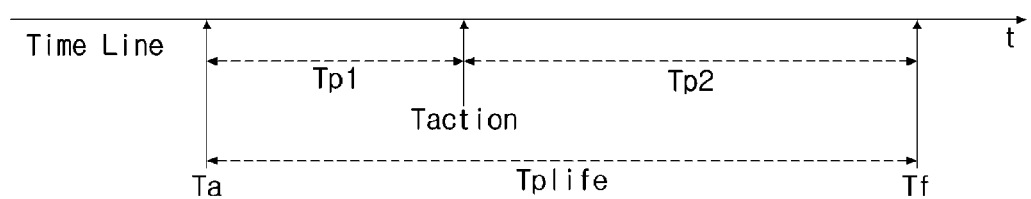
FIG. 45 is a timing diagram according to another embodiment of the present invention.

FIG. 45 is a timing diagram according to another embodiment of the present invention.

In FIG. 45, an activation time Ta indicates an activation time of a TDO and a termination time Tf indicates a termination time of a TDO. An additional action time Taction indicates a time at which another additional action for TDO is triggered (activated) after the activation time Ta and before the termination time Tf. A time window Tplife indicates a time between the activation time Ta and the termination time Tf, especially, the lifetime of a TDO. A time window Tp1 indicates a time between the activation time Ta and the additional action time Taction. A time window Tp2 indicates a time between the additional action time Taction and the termination time Tf.

When the receiver 300 changes a tuning channel from a channel A into a channel B and then returns to the channel A, it may need to re-execute a TDO executed before. Or, when NRT content TDO corresponding to the channel A is pre-stored in the receiver 300, and the receiver 300 returns to the channel A after the activation time Ta of the TDO, the receiver 300 may need to execute the TDO. For this case, the transmitter 200 may transmit maintenance triggering data according to an embodiment of the present invention.

If the receiver 300 downloads and stores corresponding NRT content in advance, it may require MTD in the following case. That is, after the receiver 300 changes a tuning channel from the channel A into the channel B and then returns to the channel A in the time window Tplife, it may require MTD. Additionally, when the receiver 300 is powered on after powered off in the channel A and then returns to the channel A in the time window Tplife, it may require MTD. After the receiver 300 changes a tuning channel from the channel A into the channel B in the time window Tplife and then returns to the channel A in the time window Tplife, it may require MTD. When the receiver 300 is powered on after powered off in the channel A in the time window Tplife and then returns to the channel A in the time window Tplife, it may require MTD.

When the MTD is required, the transmitter 200 may continuously transmit the MTD in the time window Tplife, so as to allow a TDO relating to the MTD to be re-executed. A transmission period Pmtd of the MTD may be set in consideration of a time for power on/off and a time at which a channel change occurs.

Moreover, FIG. 45 exemplarily illustrates the case that a TDO action occurs one time at a Taction time in the time window Tplife. In this case, the transmitter 200 may configure MTD having the same format as ATD and transmit them in the time window Tp1. Additionally, the transmitter 200 may configure MTD having a format in which a specific additional action is added to ATD and then may transmit them. In a time window Tp2 after the TDO action occurs, the transmitter 200 may configure MTD having the same format as triggering data corresponding to the TDO action and then may transmit them, or may configure MTD having a format in which a specific additional action is added to triggering data corresponding to the TDO action and then may transmit them.

Figure 46:
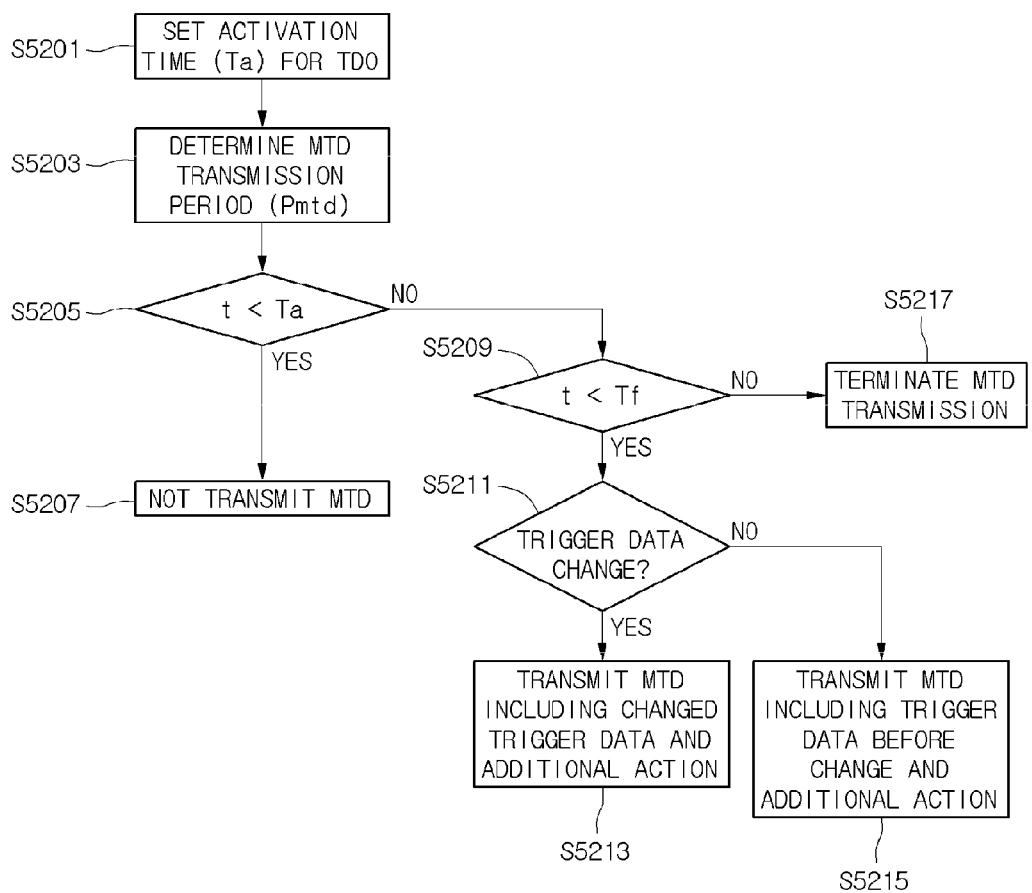
FIG. 46 is a flowchart illustrating a maintenance triggering data transmitting method according to an embodiment of the present invention.

FIG. 46 is a flowchart illustrating a maintenance triggering data transmitting method according to an embodiment of the present invention.

A trigger transmission unit 220 sets an activation time Ta for TDO, that is, a target object, in operation S5201.

The trigger transmission unit 220 determines a transmission period Pmtd of MTD for a target object in operation S5203. The transmission period Pmtd of MTD may be set to a predetermined value. Additionally, the transmission period Pmtd of MTD may be set in consideration of a channel change time of the receiver 300 or a time for power on/off of the receiver 300.

When the current system time t is prior to the activation time Ta of a target object in operation S5205, the trigger transmission unit 220 does not transmit MTD for the target object in operation S5207.

Moreover, when the current system time t is subsequent to the activation time Ta of the target object in operation S5205 and is prior to the termination time Tf of the target object in operation S5209, the trigger transmission unit 220 confirms a change of triggering data in operation S5211.

If the triggering data is changed, the trigger transmission unit 220 transmits the changed triggering data and maintenance triggering data including an additional action in operation S5213.

If the triggering data is not changed, the trigger transmission unit 220 transmits the triggering data prior to the change and maintenance triggering data including an additional action in operation S5215.

Moreover, when the current system time t is subsequent to the termination time Tf of the target object in operation S5209, the trigger transmission unit 220 terminates the transmission of the maintenance triggering data in operation S5217.

Figure 47:
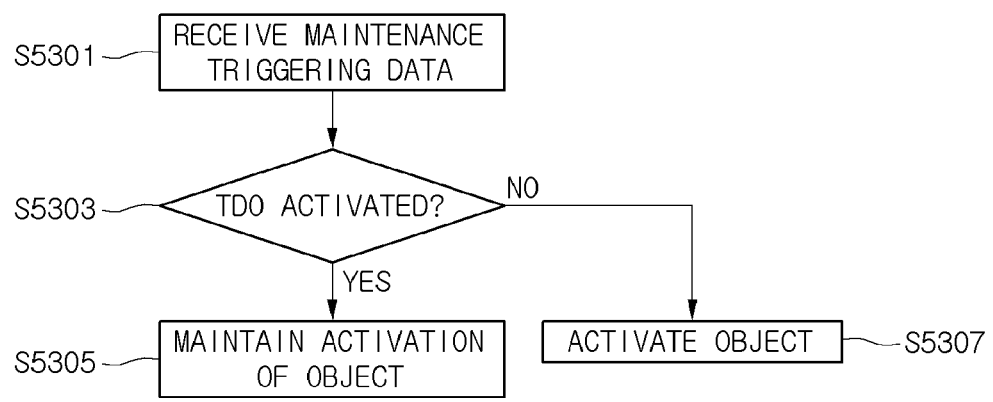
FIG. 47 is a view illustrating a maintenance trigger receiving method according to an embodiment of the present invention.

FIG. 47 is a view illustrating a maintenance trigger receiving method according to an embodiment of the present invention.

First, the trigger receiving unit 331 of the receiver 300 receives maintenance triggering data in operation S5301. The reception of maintenance triggering data may be performed according to the above-mentioned various embodiments.

If an object corresponding to the target service identifier of maintenance triggering data is activated already in operation S5303, the service manager 350a of the receiver 300 maintains the activation of the object in operation S5305.

If the object corresponding to the target service identifier of maintenance triggering data is not activated yet in operation S5303, the service manager 350a of the receiver 300 activates the object in operation S5307.

Hereinafter, a triggering data reception timing is described with reference to FIGS. 48 to 50 according to an embodiment of the present invention. Especially, a reception timing of preparation triggering data (PTD) is described.

According to an embodiment, triggering data including a trigger action set to a value corresponding to preparation may be preparation triggering data. A target service identifier and a preparation trigger time for preparation may be obtained through parsing of preparation triggering data. The preparation triggering data triggers the preparation of an object corresponding to a target service identifier.

The transmitter 200 may provide preparation triggering data, that is, a trigger for the following pre-operation, in order for a TDO requiring a pre-operation before an activation time.

When a task for downloading downloadable content linked to a TDO in advance is required after internet connection is checked, preparation triggering data may be transmitted.

Additionally, when a TDO is required to be activated in the background because it takes a long time to generate a user interface, preparation triggering data may be transmitted. This may correspond to when decoding is requested in advance because there are many data such as picture data used for generating a user interface or when it takes a long time to generate a user interface through metadata relating to a TDO. Or, this may correspond to when downloading of a web-based TDO is required in advance.

In order to check access availability to a server in advance or perform connection with a server in advance because a TDO to be activated is a TDO requiring a linkage with a server through a network, preparation trigging data may be transmitted.

The above pre-operations may be combined with each other.

Figure 48:
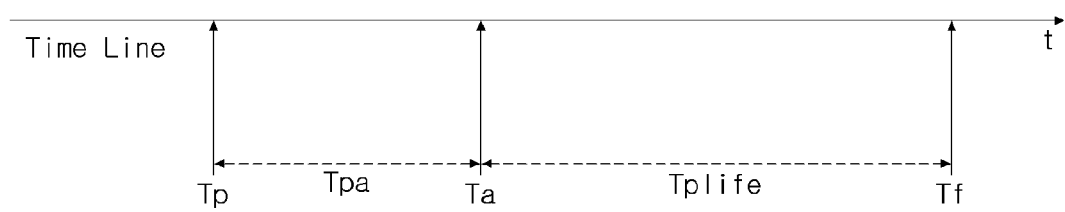
FIG. 48 is a timing diagram according to an embodiment of the present invention.

FIG. 48 is a timing diagram according to an embodiment of the present invention.

In FIG. 48, a preparation trigger time Tp indicates a time at which the preparation of a TDO is triggered by PTD. An activation time Ta indicates an activation time of a TDO and a termination time Tf indicates a termination time of a TDO.

A time window Tpa indicates a time between the preparation trigger time Tp and the activation time Ta and a time window Tplife indicates a time between the activation time Ta and the termination time Tf.

The time window Tpa may vary according to a pre-operation or a corresponding pre-operation.

When the receiver 300 receives preparation triggering data relating to content downloading, it may be better to download content as soon as possible. For this, the transmitter 200 may transmit preparation triggering data having a preparation trigger time set to 0. This is, when the receiver 300 receives the preparation triggering data having a preparation trigger time set to 0, it may start to download content immediately.

The receiver 300 may trigger preparation for a TDO when PTD for a TDO requiring downloading of content for activation is not received or immediately before the activation time Ta. When downloading content is necessary to activate a TDO but content is not downloaded yet, the receiver 300 may not activate a TDO at the activation time Ta or may perform downloading of content after activation. If a TDO action includes such information, the receiver 300 may determine the activation of a TDO on the basis of the TDO action.

The transmitter 200 may set a preparation trigger time Tp for a TDO requiring UI generation or network check according to a type of the TDO. The transmitter 200 may continuously transmit PTD having a trigger time set to Tp in the time window Tpa.

The receiver 300 compares the preparation trigger time Tp and a current system time, and if the current system time is subsequent to the preparation time Tp, upon receiving PTD, the receiver 300 may start to prepare a TDO so as to complete the preparation of the TDO as soon as possible before the activation time Ta.

Figure 49:
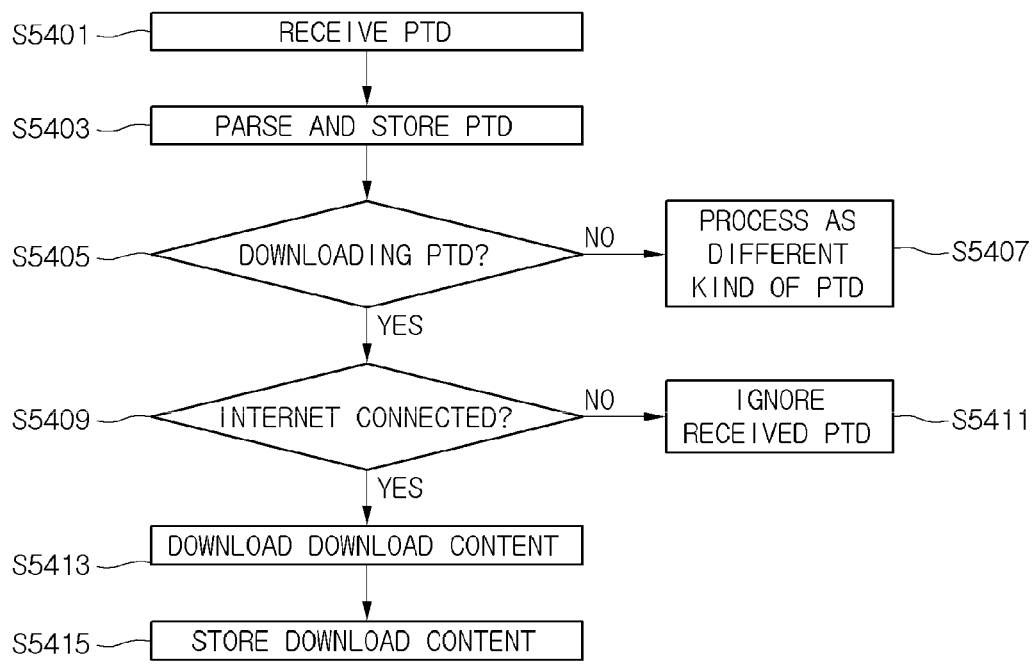
FIG. 49 is a flowchart illustrating a preparation trigger receiving method according to an embodiment of the present invention.

FIG. 49 is a flowchart illustrating a preparation trigger receiving method according to an embodiment of the present invention.

Especially, FIG. 49 illustrates a method of processing downloading preparation triggering data.

First, the trigger receiving unit 331 of the receiver 300 receives preparation triggering data in operation S5401, and parses and stores the received preparation triggering data in operation S5403. The reception of preparation triggering data may be performed according to the above-mentioned various embodiments for receiving triggering data.

If the received preparation triggering data is not the downloading preparation triggering data in operation S5405, the service manager 350a processes the received preparation triggering data as a different kind of preparation triggering data in operation S5407.

If the received preparation triggering data is the downloading preparation triggering data in operation S5405, the service manager 350a confirms internet connection in operation S5409.

If the internet connection is abnormal, the service manager 350a ignores the received PTD in operation S5411. In order to reduce the load for processing continuously received downloading PTD, the service manager 350a may not delete the received PTD while ignoring them. Once a TDO relating to the downloading PTD is terminated, the service manager 350a may delete the received PTD.

If the internet connection is normal, the service manager 350a starts to download content at the trigger time of the received preparation triggering data in operation S5413. At this point, the service manager 350a activates a TDO corresponding to the target service identifier of the received preparation triggering data in the background so as to allow the activated TDO to download content. Additionally, the service manager 350a provides a target service identifier and a downloading URL to a download manager, so that the download manager downloads content.

The activated TDO or download manager stores the downloaded content in operation S5415. Moreover, if the download manager downloads content, it stores the downloaded content in relation to the target service identifier.

Figure 50:
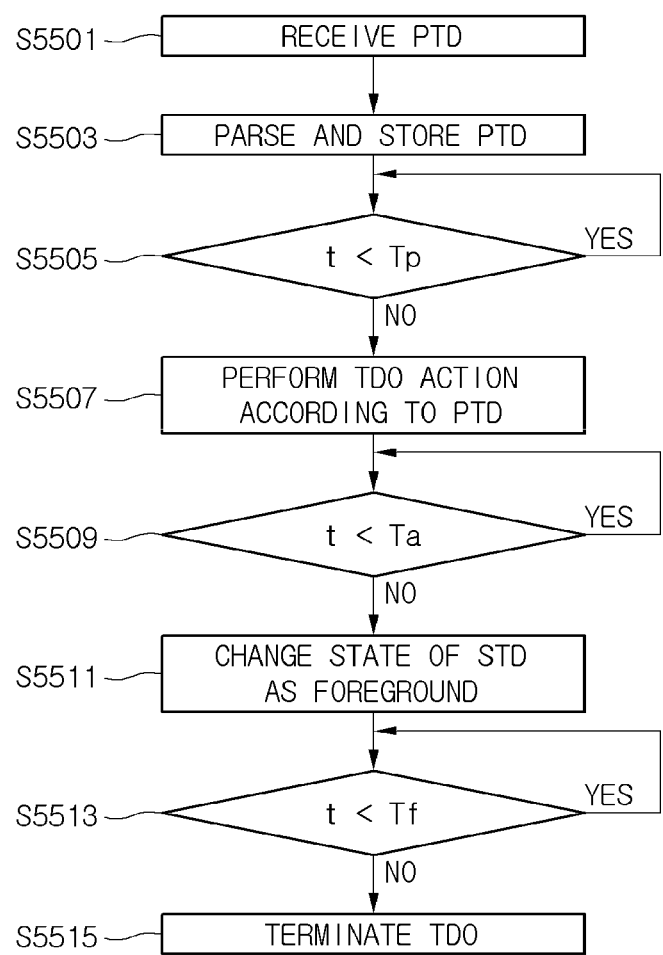
FIG. 50 is a flowchart illustrating a preparation trigger receiving method according to another embodiment of the present invention.

FIG. 50 is a flowchart illustrating a preparation trigger receiving method according to another embodiment of the present invention.

Especially, FIG. 50 illustrates a method of processing PTD requiring the background activation of a TDO to prepare the TDO.

First, the trigger receiving unit 331 of the receiver 300 receives preparation triggering data in operation S5501, and parses and stores the received preparation triggering data in operation S5503. The reception of preparation triggering data may be performed according to the above-mentioned various embodiments for receiving triggering data. A target service identifier and preparation trigger time may be obtained through parsing of the received preparation triggering data.

When a current system time t is subsequent to a preparation trigger time Tp, the service manager 350a activates a TDO corresponding to the target service identifier of preparation triggering data in the background in operation S5507. That is, when the reception time of PTD is prior to the preparation trigger time Tp and the preparation trigger time Tp arrives, the service manager 350a activates a TDO in the background. Moreover, That is, when the reception time of PTD is subsequent to the preparation trigger time Tp, the service manager 350a activates the TDO in the background immediately. At this point, even when the tuning channel of the receiver 300 is changed, the service manager 350a does not terminate the TDO and maintains the background state.

When the current system time t is subsequent to the activation time Ta of a TDO, the service manager 350a changes a state of the TDO into the foreground in operation S5511. Especially, when the receiver 300 returns to a service channel of the TDO between the activation time Ta of the TDO and the termination time Tf of the TDO, the service manager 350a changes a state of the TDO into the foreground.

When the current system time t is subsequent to the termination time Tf of a TDO in operation S5513, the service manager 350a terminates the TDO in operation S5515. Especially, if there is a TDO that is activated in the background state and is not changed into the foreground state, the service manager 350a terminates the TDO. At this point, the service manager 350a is necessary to know a termination time of a corresponding TDO. For this, ATD may include a termination time of a corresponding TDO.

Thus, a trigger may be classified as a preparation trigger, an activation trigger, and a maintenance trigger according to its characteristic.

That is, the preparation trigger is delivered to the receiver 300 prior to the activation trigger, and represents a pre-trigger that allows the receiver 300 to perform the preparation for a function performed through the activation trigger. The receiver 300 may perform a trigger action smoothly at an accurate time through the preparation trigger.

The activation trigger is a trigger for allowing a receiver to perform a specific function relating to a state change of a TDO such as execution or termination of a TDO at a specific time.

The maintenance trigger is a trigger for allowing the receiver 300 to instruct or guide a method of processing the trigger when the receiver 300 misses a trigger execution time designated by an activation trigger. In a broad sense, a maintenance trigger collectively means a trigger used for the lifecycle management of a trigger.

Through a combination of three kinds of triggers, the receiver 300 completes preparation necessary for an action that an activation trigger indicates, prior to a triggering time that an activation trigger indicates, so that it may perform a smooth action at an accurate time. Additionally, if the receiver 300 enters a corresponding channel immediately before/after a triggering point and thus cannot perform a trigger, this may be handled through a maintenance trigger. Accordingly, a trigger having such a configuration may provide a method of performing a trigger optically under various actual watching environments.

A method of identifying such three triggers and a cross-reference method between three triggers will be described later.

FIG. 51 is a view illustrating a bitstream syntax of a trigger configured according to another embodiment of the present invention.

The trigger according to the syntax shown in FIG. 51 further includes a trigger type field trigger_type, a reference target trigger identifier field target_trigger_id_ref, an opaque data length field opaque_data_length, and an opaque data field opaque_data, compared to the trigger, compared to a trigger following the syntax shown in FIG. 25.

The trigger type field trigger_type indicates a type of trigger. For example, a trigger where a value of the trigger type field is 0x00 may indicate "Reserved for future use". Triggers where values of trigger type fields are 0x01, 0x02, 0x03, and 0x04 may indicate a preparation trigger, an activation trigger, a maintenance trigger, and a web bookmark trigger, respectively.

In order to distinguish the preparation trigger, the activation trigger, and the maintenance trigger, another method other than using a trigger type field may be used.

For example, according to an embodiment, triggering data may not have a trigger type field, and the preparation trigger, the activation trigger, and the maintenance trigger may be distinguished through a trigger_action field. That is, when the trigger_action field has a value corresponding to a preparation trigger, the receiver 300 may identify the received trigger as a preparation trigger. Additionally, when the trigger_action field has a value corresponding to an activation trigger, the receiver 300 may identify the received trigger as an activation trigger. When the trigger_action field has a value corresponding to a maintenance trigger, the receiver 300 may identify the received trigger as a maintenance trigger.

According to another embodiment, triggering data may not have a trigger type field, and a trigger_action field value corresponding to a maintenance trigger may be identical to a trigger_action field value corresponding to an activation trigger. Instead of this, the activation trigger may be identified as an activation trigger or a maintenance trigger according to whether a target TDO is activated. For example, if a target TDO of the received activation trigger is not activated yet, the receiver 300 may identify the received activation trigger as an activation trigger and may activate the target TDO at a trigger time designated by the received activation trigger. On the other hand, if a target TDO of the received activation trigger is activated already, the receiver 300 may identify the received activation trigger as a maintenance trigger and may maintain the activation of a target TDO.

According to another embodiment, triggering data may not have a trigger type field, and a trigger_action field value corresponding to a maintenance trigger may be identical to a trigger_action field value corresponding to an activation trigger. Instead of this, the activation trigger may be identified as an activation trigger or a maintenance trigger according to whether a trigger time elapses. For example, if a trigger time of the received activation trigger does not arrive yet, the receiver 300 may identify the received activation trigger as an activation trigger and may activate the target TDO at a trigger time designated by the received activation trigger. On the other hand, if a trigger time of the received activation trigger arrives already, the receiver 300 may identify the received activation trigger as a maintenance trigger. At this point, if a target TDO of a trigger is not activated yet, the receiver 300 may activate the target TDO immediately. If the target TDO of the received activation trigger is activated already, the receiver 300 may maintain the activation of the target TDO. When a trigger including a reference target trigger identifier field target_trigger_id_ref is a preparation trigger or a maintenance trigger, the reference target trigger identifier field may include a trigger identifier trigger_id of an activation trigger relating to a preparation trigger or a maintenance trigger. If a trigger including a reference target trigger identifier field target_trigger_id_ref is activation trigger is an activation field, the reference target trigger identifier field may include a trigger identifier trigger_id of a preparation trigger or a maintenance trigger. Through this, the receiver 300 may refer to an activation trigger when processing a preparation trigger or a maintenance trigger. Additionally, the receiver 300 may refer to a preparation trigger or a maintenance trigger when processing an activation trigger. Through this, metadata necessary or used for actual trigger execution does not need to be all included in an activation trigger, and may be distributed and arranged through a preparation trigger. Through this, a stream for activation trigger may be maintained to be compact as far as possible.

An opaque_data_length field may indicate the length of opaque data.

An opaque_data field indicates NRT service content, that is, data read and processed by a Declarative Object (DO).

Since a trigger processor of a receiver cannot read or process opaque data directly, the receiver may process the opaque data using a DO by executing the DO.

Thus, according to an embodiment, when three types of linked triggers have different trigger ids, the receiver 300 may recognize another trigger linked to one trigger through the reference target trigger identifier field.

Thus, according to another embodiment, when three types of linked triggers have the same id, the receiver 300 may recognize another trigger linked to one trigger through an id having the same value. For example, since the receiver 300 identifies a type of a trigger received through a trigger type field, a preparation trigger relating to an activation trigger may be recognized through a trigger id of each trigger.

The following describes the meaning of a trigger action field trigger action in a preparation trigger according to an embodiment of the present invention.

A preparation trigger where a value of the trigger action field is 0x00 may indicate "reserved for future use".

The preparation trigger where a value of the trigger action field is 0x01 may instruct the receiver 300 to prepare a content item for activation trigger in advance. At this point, the preparation may indicate downloading. The receiver 300 may download a content item designated by a preparation trigger in advance. This content item may be obtained through a broadcasting network or may be received through an IP network. In this case, content to be downloaded in advance may be designated by a service identifier field and a content linkage field of a preparation trigger. Additionally, a list of contents to be downloaded in advance may be designated by an SMT and an NRT-IT, or may be designated by a descriptor of a trigger. Additionally, location information of content to be downloaded in advance may be designated by an SMT, an NRT-IT, and an FDT, or may be designated by a descriptor of a trigger. Their specific methods will be described later.

The preparation trigger where a value of the trigger action field is 0x02 may instruct the receiver 300 to load a content item for activation trigger in advance. Through this, the receiver 300 may recognize that an execution time of a trigger action that the activation trigger instructs is imminent and may load a necessary content item in advance. In this case, content to be loaded in advance may be designated by a service identifier field and a content linkage field of a preparation trigger. Additionally, a list of contents to be loaded in advance may be designated by an SMT and an NRT-IT, or may be designated by a descriptor of a trigger. Additionally, information of content to be loaded in advance may be designated by an SMT, an NRT-IT, and an FDT, or may be designated by a descriptor of a trigger. Their specific methods will be described later.

The preparation trigger where a value of the trigger action field is 0x03 may instruct the receiver 300 to preset connection with a server. The receiver 300 may preset connection with a server designated by a preparation trigger. An address of a server to be connected may be designated through an internet location descriptor in a trigger.

The following describes the meaning of a trigger action field trigger action in an activation trigger according to an embodiment of the present invention.

The activation trigger where a value of the trigger action field is 0x00 may indicate "reserved for future use".

The activation trigger where a value of the trigger action field is 0x01 may instruct the receiver 300 to execute a target TDO of the activation trigger. According to an embodiment, upon receiving the activation trigger where a value of the trigger action field is 0x00, the receiver 300 may execute the target TDO immediately. According to another embodiment, upon receiving the activation trigger where a value of the trigger action field is 0x00, the receiver 300 may display to a user that the target TDO is executable and, when a target TDO execution command is received from the user, the receiver 300 may execute the target TDO.

The activation trigger where a value of the trigger action field is 0x02 may instruct the receiver 300 to terminate a target TDO of the activation trigger. Upon receiving the activation trigger where a value of the trigger action field is 0x02, the receiver 300 may return a resource or may not return a resource as terminating the target TDO according to an implementation of the receiver 300. In the case that a resource is not returned, if re-execution is performed in a short period, execution speed may be improved.

The activation trigger where a value of the trigger action field is 0x03 may instruct the receiver 300 to notify a user that a target TDO of the activation trigger is executable. On receiving the activation trigger where a value of the trigger action field is 0x03, the receiver 300 may perform such notification only once or perform such notification in a period such as 5 min.

The activation trigger where a value of the trigger action field is 0x04 may instruct the receiver 300 to suspend a target TDO of the activation trigger. On receiving the activation trigger where a value of the trigger action field is 0x04, the receiver 300 may suspend an operation of the target TDO and may return the target TDO to a standby state. Moreover, the receiver 300 may hide all UIs of the target TDO. "Suspend" is different from "termination" and a TDO suspended by an additional trigger or a user's command may be executed again or terminated.

The activation trigger where a value of the trigger action field is 0x05 may instruct the receiver 300 to wake up a suspended target TDO designated by an activation trigger. A trigger instructing a suspended target TDO to wake up may be identical to a trigger instructing a target TDO to be executed.

The activation trigger where a value of the trigger action field is 0x06 may instruct the receiver 300 to hide a target TDO of the activation trigger. On receiving the activation trigger where a value of the trigger action field is 0x06, the receiver 300 may hide the target TDO from a screen while maintaining an operation of the target TDO.

The activation trigger where a value of the trigger action field is 0x07 may instruct the receiver 300 to show a target TDO of the activation trigger. On receiving the activation trigger where a value of the trigger action field is 0x07, the receiver 300 may show the target TDO while maintaining an operation of the target TDO.

In an embodiment relating to activation information acquisition, while performing an action designated by a preparation trigger, the receiver 300 obtains from an NRT-IT the information necessary for activation (e.g., execution, suspension, termination, notification to a user that a target TDO is executable, wake up, target TDO display, etc.) of a target TDO designated by a preparation trigger, saves the target TDO, and saves the activation information together with the target TDO in a local memory. In addition to the case that the receiver 300 performs an action designated by a preparation trigger, the receiver 300 may obtain information for activation of a target TDO from the received NRT-IT and may save the activation information together with the target TDO in a local memory. The receiver 300 receiving an activation trigger may obtain, from the local memory, activation information for a target TDO designated by the activation trigger and may activate the target TDO designated by the activation trigger by referring to the activation information.

In another embodiment relating to activation information acquisition, the receiver 300 receiving an activation trigger may obtain information for activation of a target TDO from the received NRT-IT, and may activate the target TDO designated by the activation trigger by referring to the activation information.

The following describes the meaning of a trigger action field trigger action in a maintenance trigger according to an embodiment of the present invention.

The maintenance trigger where a value of the trigger action field is 0x00 may indicate "reserved for future use".

The maintenance trigger where a value of the trigger action field is 0x01 may instruct the receiver 300 to execute a target TDO of the maintenance trigger immediately. On receiving the maintenance trigger where a value of the trigger action field is 0x01, the receiver 300 may execute the target TDO immediately if the target TDO is not executed yet and may maintain the execution of the target TDO if the target TDO is executed already. The receiver 300 may display to a user that the target TDO is executable immediately, and may execute the target TDO if a target TDO execution command is received from a user as an additional condition. When a TDO is continuously used in a specific time window, a corresponding TDO may be immediately executed and used through this action.

The maintenance trigger where a value of the trigger action field is 0x02 may instruct the receiver 300 to be ready to launch a target TDO of the maintenance trigger. On receiving the maintenance trigger where a value of the trigger action field is 0x02, the receiver 300 may execute the preparation of the target TDO immediately if the target TDO is not ready yet and may maintain the preparation of the target TDO if the target TDO is ready.

The maintenance trigger where a value of the trigger action field is 0x03 may instruct the receiver 300 to notify a user of TDO availability of the maintenance trigger. On receiving the maintenance trigger where a value of the trigger action field is 0x03, the receiver 300 may provide notification about the target TDO availability immediately if the target TDO availability is not notified to a user yet and may maintain the notification about the target TDO availability if the target TDO availability is notified to a user already. The receiver 300 may perform such notification only once or perform such notification in a period such as 5 min.

The maintenance trigger where a value of the trigger action field is 0x04 may instruct the receiver 300 to unload all the related resources relating to the target TDO of the maintenance trigger. On receiving the maintenance trigger where a value of the trigger action field is 0x04, the receiver 300 may unload corresponding resources immediately if all the resources relating to the target TDO of the maintenance trigger are not unloaded and may maintain unloading of corresponding resources when the unloading of the corresponding resources is performed already. Through this, if a designated TDO is not to be used for a while, this trigger returns all resources that a receiver uses for the designated TDO currently thereby not affecting the execution of another TDO to be used later. If a corresponding TDO is in execution, the receiver 300 terminates a target TDO and returns a resource.

The maintenance trigger where a value of the trigger action field is 0x05 may instruct the receiver 300 to terminate a target TDO of the maintenance trigger immediately. On receiving the maintenance trigger where a value of the trigger action field is 0x05, the receiver 300 may terminate the target TDO immediately if the target TDO is not terminated yet and may maintain the termination of the target TDO if the target TDO is terminated already. On receiving the maintenance trigger where a value of the trigger action field is 0x02, the receiver 300 may return a resource or may not return a resource as terminating the target TDO according to an implementation of the receiver 300. In the case that a resource is not returned, if re-execution is performed in a short period, execution speed may be improved.

The maintenance trigger where a value of the trigger action field is 0x06 may instruct the receiver 300 to ignore a trigger designated by the maintenance trigger.

The maintenance trigger where a value of the trigger action field is 0x07 may instruct the receiver 300 to continuously execute a target TDO of the maintenance trigger. On receiving the maintenance trigger where a value of the trigger action field is 0x07, the receiver 300 may maintain the execution of the target TDO if the target TDO is executed already and may not execute the target TDO if the target TDO is not executed yet.

In an embodiment relating to maintenance information acquisition, while performing an action designated by a preparation trigger, the receiver 300 obtains from the received NRT-IT the information necessary for maintenance (e.g., immediate execution, notification to a user that a target TDO is executable, resource return, termination, ignorance, execution continuity, etc.) of a target TDO designated by a preparation trigger, saves the target TDO, and saves the maintenance information together with the target TDO in a local memory. In addition to the case that the receiver 300 performs an action designated by a preparation trigger, the receiver 300 may obtain information for maintenance of a target TDO from the received NRT-IT and may save the maintenance information together with the target TDO in the local memory. The receiver 300 receiving a maintenance trigger may obtain, from the local memory, maintenance information for a target TDO designated by the maintenance trigger and may maintain the target TDO designated by the maintenance trigger by referring to the maintenance information.

In another embodiment relating to maintenance information acquisition, the receiver 300 receiving a maintenance trigger may obtain information for maintenance of a target TDO from the received NRT-IT and may maintain the target TDO designated by the maintenance trigger by referring to the maintenance information.

The following describes the meaning of a trigger time field trigger_time in a preparation trigger according to an embodiment of the present invention.

A delivery time of a preparation trigger may be greatly ahead of a delivery time of an activation trigger. The delivery trigger may provide approximate time information on a future triggering time. Accordingly, it may be considered that the time information on a preparation trigger is set to the UTC time instead of referencing a PCR.

The trigger time of a preparation trigger may indicate at least one of start time, end time, and scheduled activation time.

First, the trigger time of a preparation trigger may indicate the action start time of a preparation trigger. For example, when the preparation trigger instructs the receiver 300 to download content items for activation trigger in advance, the trigger time may indicate the start time of downloading.

The trigger time of a preparation trigger may indicate a deadline at which a preparation trigger action is to be terminated. In this case, an action of a preparation trigger needs to be terminated until a trigger time of the preparation trigger so that an activation trigger linked to the preparation trigger is processed normally. Accordingly, the receiver 300 starts an action of the preparation trigger so as to terminate the action of the preparation trigger before a trigger time of the preparation trigger.

Moreover, the trigger time of the preparation trigger may indicate a scheduled activation time. That is, the transmitter 200 may provide to the receiver 300 an approximately scheduled triggering time of the activation trigger linked to the preparation trigger. In this case, an actual accurate timing may be provided through a trigger time of an activation trigger.

Thus, the trigger time of the preparation trigger may indicate a time window of a preparation action to secure the timely activation of a target TDO designated by a preparation trigger, other than indicating an accurate performance time of a preparation trigger.

Moreover, if the preparation trigger does not include a trigger time, the receiver 300 may perform a preparation trigger immediately.

The following describes the meaning of a trigger time field trigger_time in a maintenance trigger according to an embodiment of the present invention.

A maintenance trigger may be delivered after the triggering time of an activation trigger. Since the maintenance trigger may be seen as providing a processing method for a corresponding trigger, the trigger time of a maintenance trigger may require lower timing accuracy than the trigger time of an activation trigger. Accordingly, it may be considered that the time information on a maintenance trigger is set to the UTC time instead of referencing a PCR.

The trigger time of a maintenance trigger may indicate one of start time and end time.

The trigger time of a maintenance trigger may indicate a time at which an action of a maintenance trigger starts. If a current system time is subsequent to a trigger time of a received maintenance trigger, the receiver 300 may perform an action of a maintenance trigger immediately. If a trigger time such as start time is not designated in a maintenance trigger, the receiver 300 may recognize that an execution time is over and may execute an action of a maintenance trigger immediately.

The trigger time of a maintenance trigger may indicate an end time at which an action of a maintenance trigger ends. In this case, if a current system time is subsequent to a trigger time of a received maintenance trigger, a corresponding trigger is not valid and the receiver 300 is not supposed to perform a designated action. If the end time is not designated, the receiver 300 may regard a valid time of a corresponding trigger as limitless.

Therefore, the trigger time of a maintenance trigger may designate a time window in which an action of a maintenance trigger is performed.

Next, a content item designating method for a preparation trigger and an activation trigger according to various embodiments of the present invention will be described.

In an embodiment for content item designation, the transmitter 200 may designate a content item for a preparation trigger and an activation trigger as an identifier for identifying a target TDO of a trigger. As described above, an identifier for identifying a target TDO of a trigger may correspond to a combination of a service_id_ref field and a content_linkage field.

As described above, the transmitter 200 may provide location information of a content item designated as a TDO identifier through an SMT, an NRT-IT, and an FDT. In more detail, the transmitter 200 provides information on a service channel corresponding to a service_id_ref field in a trigger through an SMT. Information on the signaling channel may be provided through information on a destination address and a destination port in an SMT. Moreover, the transmitter 200 provides a list of content items belonging to a service corresponding to the service_id_ref field through an NRT-IT. A list of content items may be provided through a list of content_linkage in an NRT-IT. The transmitter 200 provides an FDT including information on at least one file for each content item through a service channel corresponding to the service_id_ref field in a trigger. Information on each file may further include TOI and Content-Location fields.

In another embodiment for content item designation, the transmitter 200 may designate a list of content items for a preparation trigger and an activation trigger as in a form of a descriptor. The content item descriptor may be included in the trigger_descriptor( ) field of a trigger. The transmitter 200 may designate a list of content items for a preparation trigger and an activation trigger through a content item descriptor together with a target TDO identifier and may designate the list only through a content item descriptor instead of designating the list through a target TDO identifier. One example of such a descriptor is described with reference to FIG. 52.

FIG. 52 is a view illustrating a syntax of a content item descriptor according to an embodiment of the present invention.

As shown in FIG. 52, the content item descriptor includes a descriptor tag field descriptor_tag, a descriptor length field descriptor_length, a service count field service_count, a service identifier field service_id, a content item count field content_item_count, and a contnet linkage field content_linkage.

The descriptor tag field descriptor_tag may be an 8-bit unsigned integer to distinguish this descriptor as a content item descriptor.

The descriptor length field descriptor_length field may be an 8-bit unsigned integer to define the length from a field immediately following this field to the end of a content item descriptor.

The service count field service_count indicates the number of services included in a content item descriptor. The service identifier field service_id indicates the identifier of a service included in a content item descriptor. Accordingly, the content item descriptor may include a plurality of service identifier fields as many as the number corresponding to a service count field.

The content item count field content_item_count indicates the number of content items for a service corresponding to the service identifier field service_id. The content linkage field content_linkage indicates the identifier of a content item. Accordingly, the content item descriptor may include a plurality of content linkage fields as many as the number corresponding to a content item count field in relation to each service.

Such a method may be used when a content item used in a trigger is transmitted in an NRT format, and at this point, each content item may be uniquely identified in a combination of an NRT Service ID and a Content linkage value. In the same manner as in the previous embodiment, the transmitter 200 may provide location information of a content item designated as a TDO identifier through an SMT, an NRT-IT, and an FDT.

In another embodiment for content item designation, the transmitter 200 may designate a list of content items for a preparation trigger and an activation trigger as in a form of a descriptor. The transmitter 200 may designate contents transmitted by using such an internet location descriptor through a broadcast network and an IP network as a contend item for a trigger. The internet location descriptor may be included in the trigger_descriptor( ) field of a trigger. The transmitter 200 may designate a list of content items for a preparation trigger and an activation trigger through an internet position descriptor together with a target TDO identifier and may designate the list only through an internet position descriptor instead of designating the list through a target TDO identifier. One example of such an internet location descriptor is described with reference to FIG. 53.

FIG. 53 is a view illustrating a syntax of an internet location descriptor according to an embodiment of the present invention.

As shown in FIG. 53, the internet location descriptor includes a descriptor tag field descriptor_tag, a descriptor length field descriptor_length, a URL count field URL_count, a URL length field URL_length, and a URL( ) field.

The descriptor tag field descriptor_tag may be an 8-bit unsigned integer to distinguish this descriptor as an internet location descriptor. For example, this field may have a value of 0xC9.

The descriptor length field descriptor_length may be an 8-bit unsigned integer to define the length from a field immediately following this field to the end of an internet location descriptor.

The URL count field URL_count may be a 5-bit unsigned integer to indicate the number of pairs of URL length fields and URL fields in an internet location descriptor. That is, the internet location descriptor includes a plurality of URL length fields whose number corresponds to a URL count field and a plurality of URL fields whose number corresponds to a URL count field.

The URL length field URL_length may be an 8-bit unsigned integer to indicate the length of the URL( ) field immediately following this field.

The URL( ) field is a character string indicating a Uniform Reference Locator (URL). When the URL( ) field indicates Relative URL or absolute tag URI, a corresponding URL may be seen as content transmitted only through a FLUTE of an NRT. In other cases, a corresponding URL may be seen as a content only transmitted through a broadcast network, a content transmitted through an IP network, or a content transmitted through both a broadcast network and an IP network.

Figure 54:
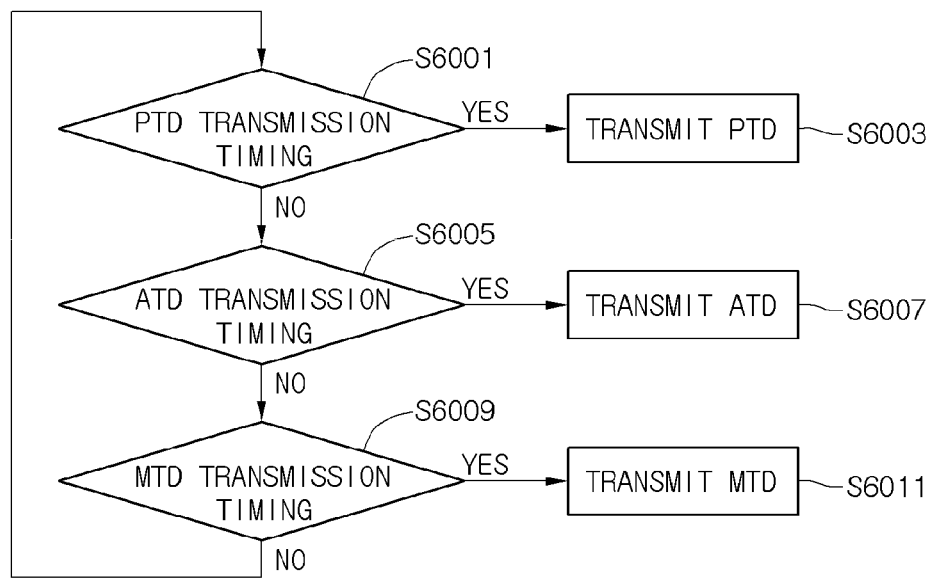
FIG. 54 is a flowchart illustrating a trigger transmitting method according to another embodiment of the present invention.

FIG. 54 is a flowchart illustrating a trigger transmitting method according to another embodiment of the present invention.

The transmitter 200 transmits a preparation trigger in operation S6003 at the transmission timing of the preparation trigger in operation S6001, transmits an activation trigger in operation S6007 at the transmission timing in operation S6005, and transmits a maintenance trigger S6011 at the transmission timing of the maintenance trigger in operation S6009.

A trigger may be transmitted through a PSIP table or a synchronized data stream.

Trigger transmission through a PSIP table may be understood through FIG. 37, FIG. 41, and FIG. 42. For example, according to an embodiment, a trigger may be included in a stream whose PSIP Base PID is Ox1FF and transmitted. In this case, the table ID of a trigger table may be uniquely allocated to be distinguished from another table. According to another embodiment, a trigger may be allocated through a Master Guide Table, and delivered through a stream corresponding to an identified PID. In this case, all tables in a corresponding stream may be regarded as a trigger table.

Trigger transmission based on a synchronized data stream may be understood through FIG. 38, FIG. 39, and FIG. 40. Since the synchronized data stream provides accurate synchronization with another stream through a PTS, the trigger transmission based on synchronized data stream may provide higher timing accuracy than trigger transmission through a PSIP table.

In relation to a preparation trigger, an activation trigger, and a maintenance trigger, according to an embodiment, a preparation trigger, an activation trigger, and a maintenance trigger may be included in one stream and transmitted.

According to another embodiment, the transmitter 200 may deliver a preparation trigger through a PSIP table, and may transmit an activation trigger and a maintenance trigger through a synchronized data stream. A time at which a preparation trigger is provided may be considerably earlier than a time at which an activation trigger needs to be performed. According to an embodiment, a time at which a preparation trigger is provided may be a few hours, a few days, or a few weeks earlier than a time at which an activation trigger needs to be performed. A preparation trigger may be required for the receiver 300 to download an activation trigger related content item in advance through a broadcast network or an IP network. Due to characteristics of such a preparation trigger, a preparation trigger may not require timing accuracy in a scene unit unlike an activation trigger. Accordingly, in order to secure timing accuracy in a scene unit of an activation trigger, a method of maintaining a stream containing an activation trigger to be compact if possible may be considered. For this purpose, the transmitter 200 may separate a preparation trigger as an additional table through an existing PSIP signaling stream and then may deliver it. A table containing a preparation trigger may include a preparation trigger and then may be delivered through a PSIP stream, and an additional table id may be allocated to a preparation trigger.

According to another embodiment, the transmitter 200 may transmit a preparation trigger and a maintenance trigger in a PSIP table format, and may transmit an activation trigger on the basis of a synchronized data stream. Since a maintenance trigger serves to instruct or guide the receiver missing a trigger time about a method of dealing with a corresponding trigger, it may not be required to be performed accurately at a specific time. Accordingly, a maintenance trigger may require lower timing accuracy than an activation trigger. Accordingly, a method of separating a maintenance trigger from an activation trigger and transmitting it with a preparation trigger may be considered. In this case, the transmitter 200 may bind a preparation trigger and a maintenance trigger as one table and then may transmit the one table. Moreover, the transmitter 200 may allocate different table IDs to a table for preparation trigger and a table for maintenance trigger and may transmit a preparation trigger and a maintenance trigger through the two tables distinguished by the different table IDs.

Then, an operating method of a receiver 300 according to an embodiment of the present invention will be described with reference to FIGS. 55 to 57.

Figure 55:
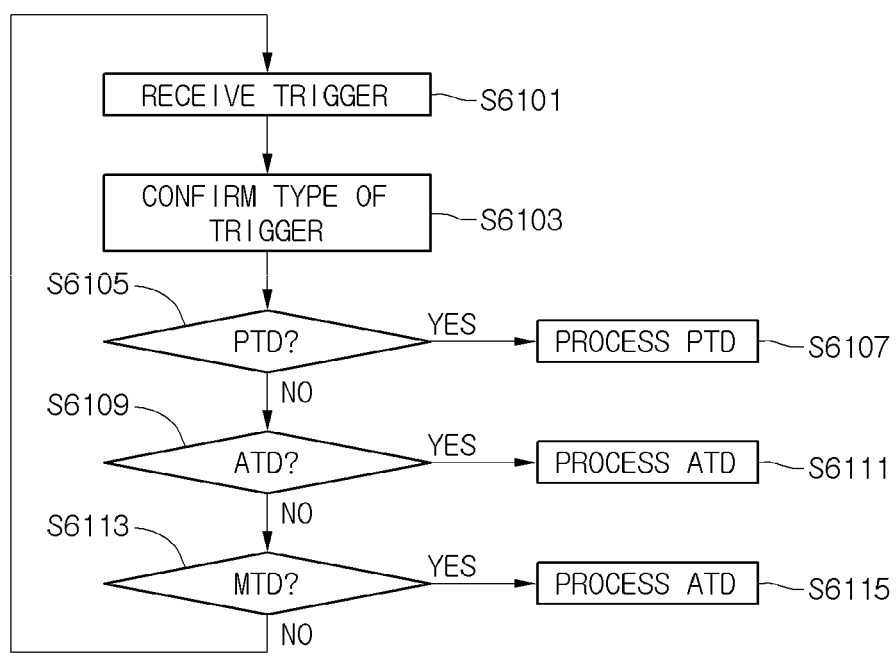
FIG. 55 is a flowchart illustrating an operating method of a receiver according to an embodiment of the present invention.
Figure 56:
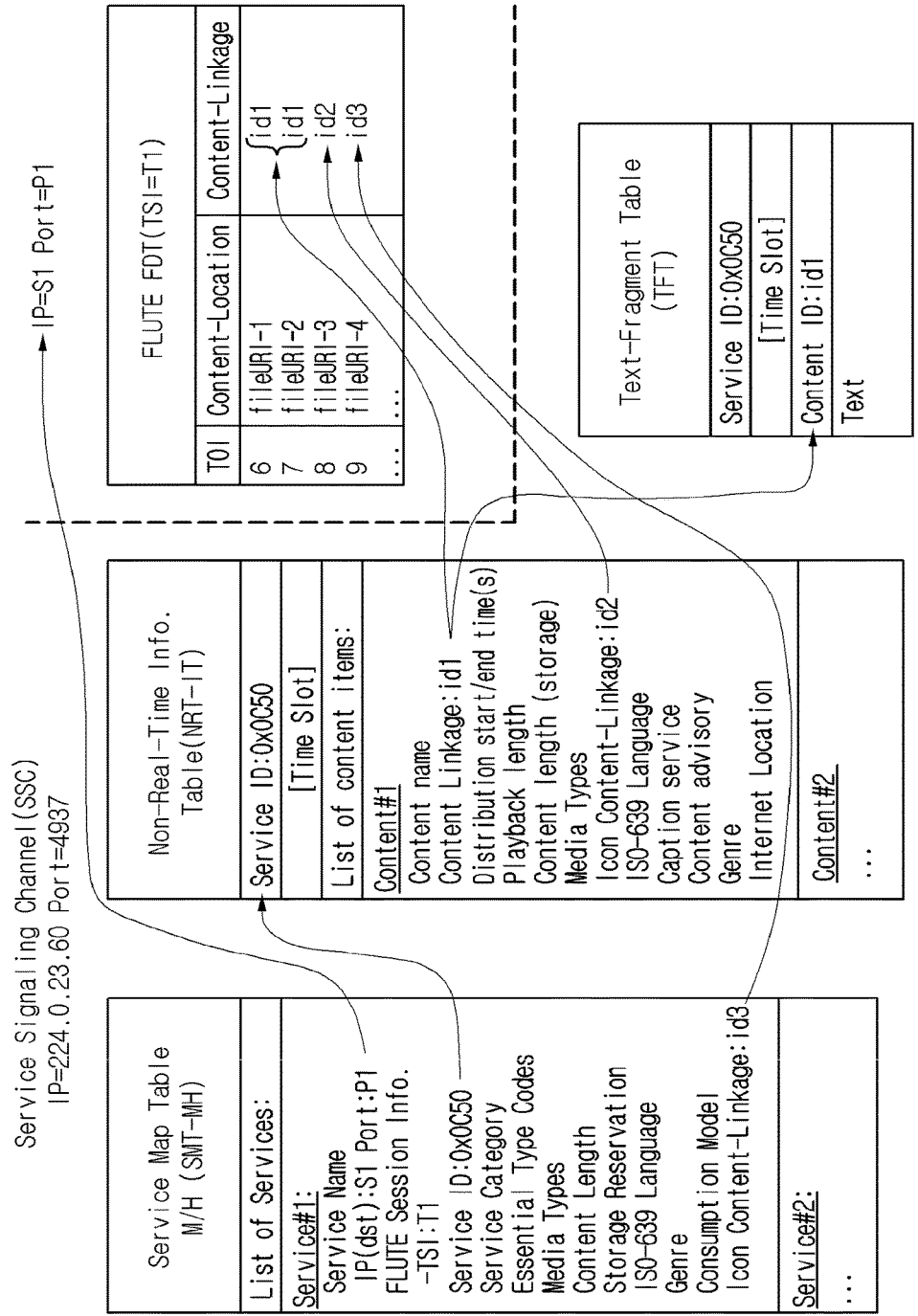
FIG. 56 is a view illustrating a method of a receiver to recognize location information of a content item according to an embodiment of the present invention.

FIG. 55 is a flowchart illustrating an operating method of a receiver according to an embodiment of the present invention.

The receiver 300 receives a trigger in operation S6101. Especially, receiver 300 may receive a trigger in the same manner as shown in FIGS. 36 to 42.

The receiver 300 confirms a type of the received trigger in operation S6103. The receiver 300 may confirm a type of the received trigger in the same manner as described above. For example, the receiver 300 may confirm a type of a trigger through at least one of a trigger type field trigger_type and a trigger action field trigger_action in the trigger. Additionally, the receiver 300 may confirm a type of a trigger on the basis of whether a target TDO is activated or whether a trigger time elapses.

If the received trigger is a preparation trigger in operation S6105, the receiver 300 processes the received preparation trigger in operation S6107. The processing of the preparation trigger by the receiver 300 was described in relation to a trigger action field of a preparation trigger. A state of a TDO may be changed through such processing of a preparation trigger.

According to an embodiment, when a preparation trigger triggers downloading of a content item, the receiver 300 may recognize content item location information through an SMT, an NRT-IT, and an FDT and then may download a content item through the recognized location information. In more detail, the receiver 200 may obtain channel information corresponding to a service identifier in the preparation trigger, from an SMT. At this point, the channel information may include an IP address and a port number. Moreover, the receiver 200 may obtain a list of content identifiers content linkage belonging to a service corresponding to the service identifier in the preparation trigger, from an NRT_IT. The receiver 200 may recognize a content linkage field in a trigger, a content linkage field in a content_items_descriptor ( ) field in a trigger, or a plurality of content_linkage fields corresponding to a service identifier in an NRT-IT, as an identifier of a content item to be downloaded. The receiver 200 may recognize the content locations corresponding to content identifiers in an NRT-IT or the content locations corresponding to a content identifier in a trigger by using a FLUTE FDT received through the IP address and the port number of an SMT. If an NRT_it has the internet location information of a content item, the receiver 200 may recognize the location information of a content item through the NRT_IT.

According to another embodiment, when a preparation trigger triggers downloading of a content item, the receiver 300 may recognize the location information of a content item to be downloaded from an internet location descriptor in the preparation trigger and then may download the content item through the recognized location.

Again, FIG. 55 will be described.

If the received trigger is an activation trigger in operation S6109, the receiver 300 processes the received activation trigger in operation S6511. The processing of the activation trigger by the receiver 300 was described in relation to a trigger action field of an activation trigger. A state of a TDO may be changed through such processing of an activation trigger.

If the received trigger is a maintenance trigger in operation S6113, as shown in FIG. 47, the receiver 300 processes the received maintenance trigger in operation S6115.

Figure 57:
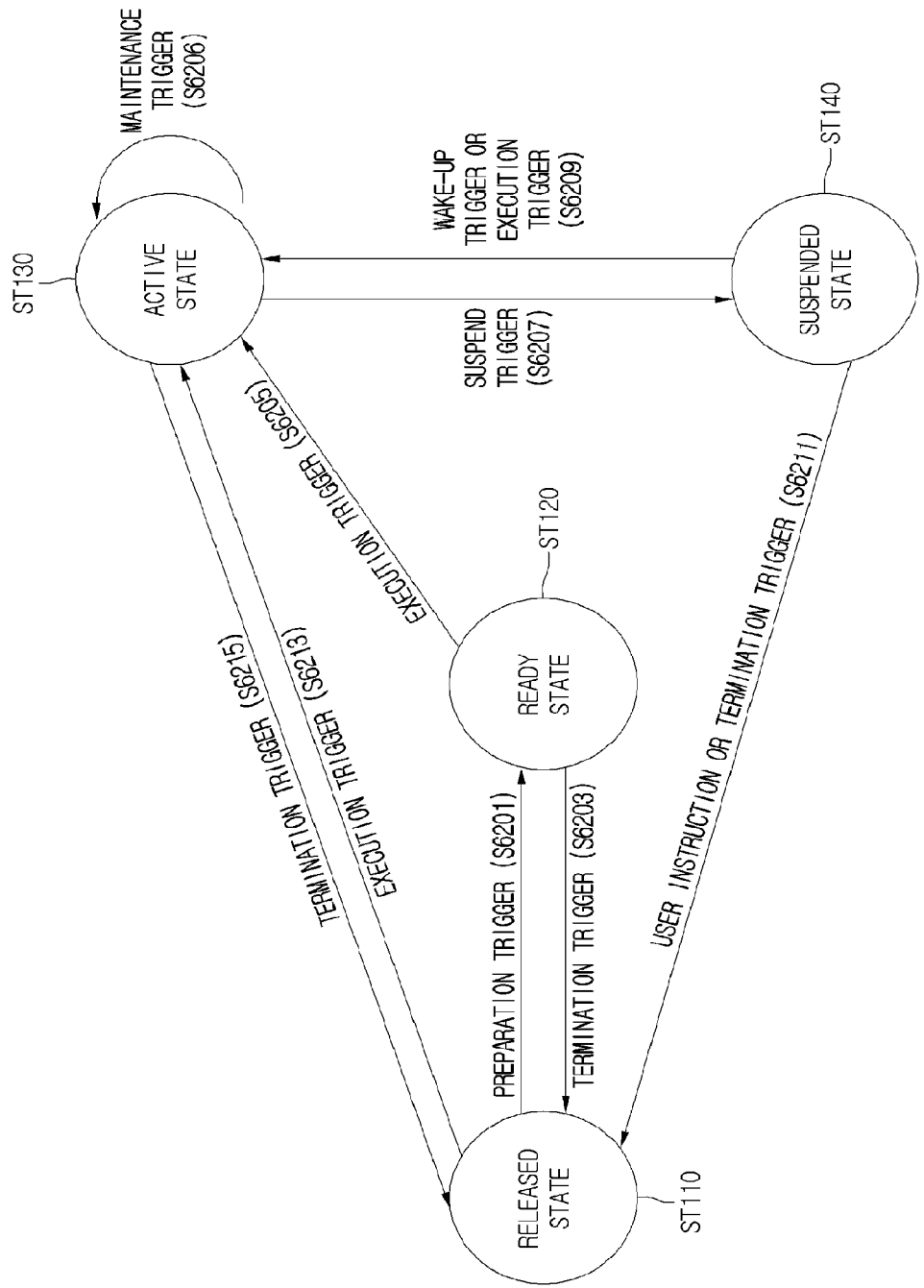
FIG. 57 is a TDO state transition diagram illustrating a method of processing a trigger by a receiver according to an embodiment of the present invention.

FIG. 57 is a TDO state transition diagram illustrating a method of processing a trigger by a receiver according to an embodiment of the present invention.

As shown in FIG. 57, a target TDO is in one of a released state ST110 such as a non-ready state, a ready state ST120, an active state ST130, and a suspended state ST140.

If the receiver 300 receives a preparation trigger and a target TDO of the preparation trigger is in the released state ST110, it prepares the target TDO and puts its state in the ready state ST120 in operation S6201.

If the receiver 300 receives a termination trigger where a value of a trigger action field is 0x02 and a target TDO of the termination trigger is in the ready state ST120, it terminates the target TDO and puts its state in the released state ST110 in operation S6203.

If the receiver 300 receives an execution trigger where a value of a trigger action field is 0x01 and a target TDO of the execution trigger is in the ready state ST120, it executes the target TDO and puts its state in the active state ST130 in operation S6205.

If the receiver 300 receives a maintenance trigger where a value of a trigger action field is 0x01 and a target TDO of the maintenance trigger is in the active state ST120, it maintains a state of the target TDO as the active state ST130 in operation S6206.

If the receiver 300 receives a suspension trigger where a value of a trigger action field is 0x04 and a target TDO of the suspension trigger is in the active state ST130, it suspends the target TDO and puts its state in the suspended state ST140 in operation S6207.

If the receiver 300 receives an additional trigger such as a wake up trigger or an execution trigger or a target TDO of the additional trigger is in the suspended state ST140, it executes the target TDO again and puts its state in the active state ST130 in operation S6209.

If the receiver 300 receives a termination trigger where a value of a trigger action field is 0x02 and a target TDO of the termination trigger is in the suspended state ST140, it terminates the target TDO and puts its state in the released state ST110 in operation S6211. Additionally, when the receiver 300 receives a user instruction such as an instruction for exiting a channel relating to a target TDO, it may terminate the target TDO and puts its state in the released state ST110.

If the receiver 300 receives an execution trigger where a value of a trigger action field is 0x01 and a target TDO of the execution trigger is in the released state ST110, it executes the target TDO and puts its state in the active state ST130 in operation S6213.

If the receiver 300 receives a termination trigger where a value of a trigger action field is 0x02 and a target TDO of the termination trigger is in the active state ST130, it terminates the target TDO and puts its state in the released state ST110 in operation S6215.

With reference to FIGS. 58 to 62, the following describes a method of transmitting a web bookmark service trigger by using DTV-CC according to an embodiment of the present invention.

FIGS. 58 to 62 are views illustrating a method of transmitting a web bookmark service trigger by using DTV-CC according to an embodiment of the present invention.

Figure 58:
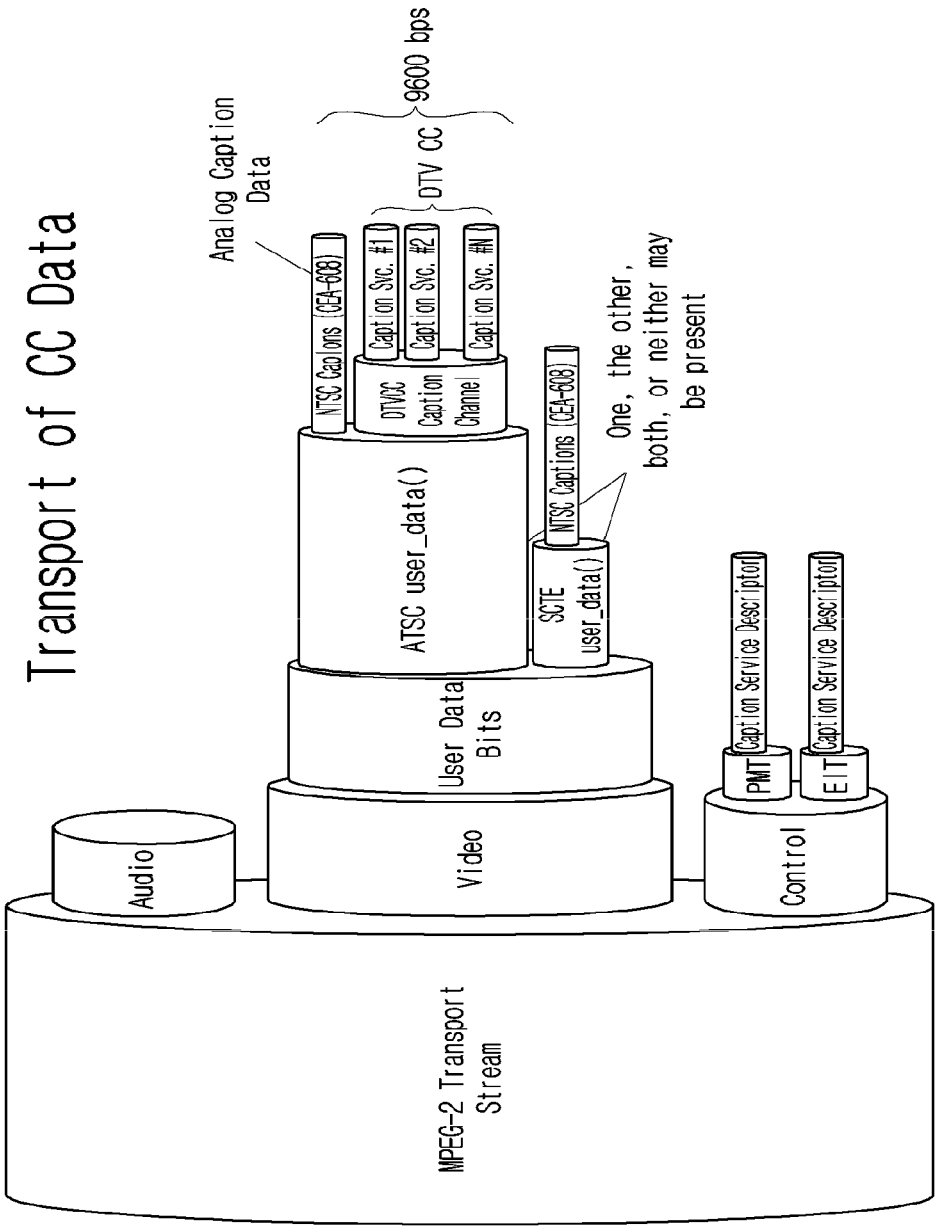

As shown in FIG. 58, MPEG-2TS includes an audio stream Audio, a video stream Video, and a control stream Control. A Digital TV Closed Caption (DTV-CC) included in the header of video stream and transmitted follows the CEA-708-D standard and may include string information.

Figure 59:
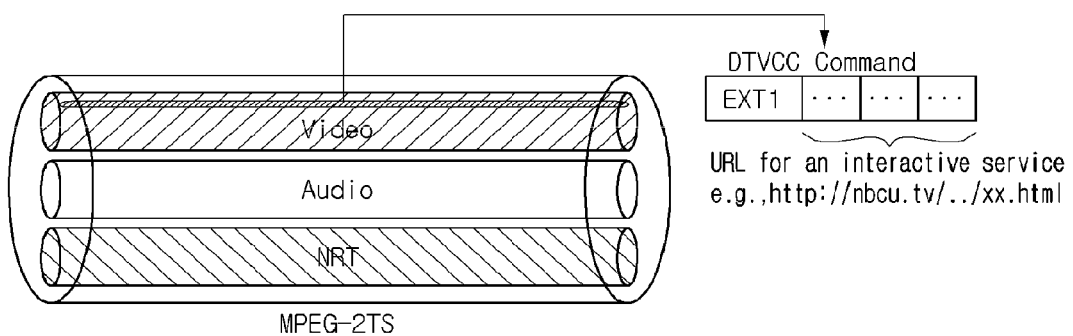

As shown in FIG. 59, the header of a video stream included in MPEG-2TS includes the DTV-CC. The DTV-CC may be configured with a plurality of services and a number may be allocated to each of the plurality of services. For example, Maim Audio Language may be displayed on a screen by a first service Service number 1 and, if Secondary Language needs to be transmitted together with main audio language, an adjunct service Service number2 may be used and also the first service and the second service may configure the DTV-CC.

A receiver may know which packet needs to be received through signaling information of the transmission header of the DTV-CC, that is, data in a text format, and each of a plurality of audio languages may be signaled by an Audio Language Descriptor such as a PMT and a Caption Service Descriptor of each of a PMT or EIT loop.

Various types of characters may be transmitted through the DTV-CC. For example, the DTV-CC may transmit normal characters and extended characters. The extended characters, as specially created characters, as shown in FIG. 58, may be identified by allowing the first code of a DTC-CC Command to be an "EXT1" code. The DTV-CC Command transmitting extended characters may include extended character code after the "EXT1" code.

Referring to FIG. 60, a Uniform Reference Indicator (URI)String may carry various types of URISTRINGS together with the "EXT1" code. The above-mentioned extended character may include a long string by using a code not displayed on a screen or not in use and a receiver may recognize an extended character including a string not displayed on a screen as an URL. When the receiver recognizes an extended character as a URL, it may request an XML file via HTTP by using a received extended character. A server generates a requested XML file or transmits an XML file generated in advance and saved, in response to the XML file request via HTTP, so that it may support interactive service corresponding to a current time. In such a way, the DTV-CC may transmit only the URL by using an extended character not displayed on a screen or not in use, and the receiver may obtain the XML file by using the URL.

The URL that a receiver uses to obtain an XML file may be transmitted through URIString. As shown in FIG. 60, URIString may be defined by four types. When a value of a URIString type is '00', it indicates that a corresponding segment is the first segment of a segment command. When a value of a URIString type is '01', it indicates 'Forbidden'. When a value of a URIString type is '10', it indicates that a corresponding segment is the last segment of a segment command. When a value of a URIString type is '11', it indicates that a corresponding segment transmits an entire URL.

As shown in FIG. 61, the URIString may be transmitted in a format of URI_data( ) through an extended character included in the DTV-CC. URI_data( ) may include a syntax indicating a trigger and usage measurement. URI_data( ) may include an URI_type field and an URI_character field.

The URI_type field is an 8-bit unsigned integer and indicates a type of URI included in a command and transmitted. When a value of the URI_type field is '0x00-0x3F', it may indicate preparation for use in the CEA standards. When a value of the URI_type field is '0x40-0x7F', it may indicate preparation for use in the ATSC standards. When a value of the URI_type field is '0x80-0xFF', it may indicate preparation for future allocation in the CEA standards. A receiver may ignore instances of an URIString command indicating an unrecognized type. If the URI transmits two segments, the URI_type field in each of the two segments may be the same.

After the receiver receives an XML file, the received XML file may be reinterpreted according to a predetermined rule. At this point, the information interpreted by the receiver includes trigger information and TDO information, and may further include information described below with reference to FIG. 62.

FIG. 62 is a view illustrating a TDO Parameter Table Structure.

A TPT indicates a root element of the TPT. One TPT element describes all programming segments or a partial programming segment according to a time.

MajorProtocolVersion, as a 3-bit integer, indicates a major version number of table definition. The major version number for this version of this standard shall be set to 1. Receivers are expected to discard instances of the TPT indicating major version values they are not equipped to support.

MinorProtocolVersion, as a 4-bit integer, indicates a minor version number of table definition. The minor version number for this version of the standard shall be set to 0. Receivers are expected to not discard instances of the TPT indicating minor version values they are not equipped to support.

Id indicates that a corresponding URL uniquely identifies an interactive programming segment relating to a corresponding TPT. Id string may be locator_part of a trigger corresponding thereto.

tptVersion, as an 8-bit integer, indicates a version number of a TPT element identified by an id attribute. tptVersion may be increased each time there is a change by a TPT.

expireDate indicates an expiration time and date of information included in a corresponding TPT instance. expireDate may be an optional attribute of a TPT element. If the receiver caches the TPT, it can be re-used until the expireDate.

serviceId, as an optional 16-bit integer, indicates NRT service_id relating to an interactive service described in a corresponding TPT instance.

baseURL, as an optional attribute, provides a related basic URL before a related URL shown in a corresponding TPT and may provide the complete URLs of corresponding files.

Capabilities, as an optional element, indicates a capacity necessary for meaningful presentation of an interactive service relating to a corresponding TPT. An entire description of a syntax or semantic of a Capabilities element may be found in the ATSC NRT standard [NRT].

LiveTrigger, as an optional complex type, specifies information used for a case of a dynamic active time zone.

URL, as an essential attribute of a LiveTrigger element, indicates the URL of a server that is to provide a trigger of a live active time zone.

deliveryType, as an optional attribute of a LiveTrigger element, indicates a protocol (HTTP short polling, long polling, or streaming) used for a receiver to receive an updated trigger.

pollPeriod, as an optional attribute of a LiveTrigger element, indicates a time in sec used as a polling period when a receiver retrieves an updated trigger from a server by using a short polling.

A TDO element, a child element of a TPT element, indicates an application TDO providing part of interactive service while a corresponding segment is described by a corresponding TPT instance.

appID, as an essential 16-bit integer, identifies an application TDO within a corresponding TPT range.

appType, as an optional 8-bit integer, indicates an application format type. A default value should be 0 and indicates a TDO following a specification defined by corresponding standards.

appName, as an optional attribute of a TDO element, indicates a human-readable name displayable on a viewer when viewer's permission is obtained to launch a corresponding application TDO.

globalID, as an optional attribute of a TDO element, indicates a globally unique identifier of a corresponding application TDO.

appVersion, as an optional attribute of a TDO element, indicates a version number of a TDO. A value of appVersion may be increased each time a TDO identified by globalID is changed.

testTDO, as an optional boolean attribute, is only for a testing purpose of a TDO when it has a value of 'true' and is ignored by a typical receiver.

cookieSpace, as an optional 8-bit integer, indicates a space of kilobytes unit that is required for a TDO to store permanent data between invocations.

frequencyOfUse, as an optional 4-bit integer, indicates how frequently a TDO is used on broadcast to provide a guide for TDO cache space management to a receiver. The meaning of a corresponding code value may be TBD.

expireDate, as an optional attribute of a TDO element, indicates a data and time at which a receiver safely removes a corresponding application and related resources.

A value of "true" for an optional attribute of availInternet indicates that a corresponding TDO is downloadable through the internet. A value of "false" indicates that a corresponding TDO is un-downloadable through the internet. If there is no attribute displayed, a default value may be "true".

A value of "true" for an optional attribute of availBroadcast indicates that a corresponding TDO is extractable from a broadcast. A value of "false" indicates that a corresponding TDO is inextricable from a broadcast. If there is no attribute displayed, a default value may be "true".

URL element: an instance of each URL element, that is, a child element of a TDO element, identifies a file, that is, part of an application TDO.

Capabilities, as an optional child element of a TDO element, indicates a capacity necessary for meaningful presentation of a corresponding TDO. An entire description of a syntax or semantic of a Capabilities element may be found in the ATSC NRT standard [NRT].

ContentItem, as an optional element of a TDO element, indicates a content item including at least one data file that a TDO requires.

URL element: each instance of a URL element, that is, a child element of a ContentItem element, identifies a file, that is, part of a content item.

updatesAvail indicates that an optional Boolean attribute of a ContentItem element indicates whether a content item is updated sometimes, that is, whether a content item includes a fixed file or whether a content item is real-time data feed. If the value is "true", a content item may be updated sometimes. If the value is "false", a content item may not be updated. A default value may be "false".

Size indicates, as an optional attribute of a ContentItem element, indicates a kilobytes level size of a content item.

Event indicates, as a child element of a TDO element, indicates an event using a corresponding TDO as a target.

eventID, as an essential 16-bit integer attribute of an Event element, uniquely identifies a corresponding event within a corresponding TDO element. A corresponding event may be referenced to an activation message through a combination of appID and eventID.

Destination, as an optional attribute of an Event element, indicates a target device type such as a main screen or second screen device for a corresponding event. Details may be TBD.

Moreover, "definition" of such an attribute serves as a place holder and details on how "definition" is supported by second screen devices are undefined.

Action, as an essential attribute of an Event element, indicates a TDO operation type applied when an event is activated. An operation value includes register, suspend-execute, terminate-execute, terminate, suspend, and stream-event.

A value of "register", if possible, may mean that a resource of an application is obtained and pre-cached.

A value of "suspend-execute" may mean that execution of another application in execution currently is suspended and a corresponding application is launched. A target application may be suspended and a receiver may start a corresponding application from a previous state.

A value of "terminate-execute" may mean that execution of another application in execution currently is terminated and a corresponding application is launched. A target application may be terminated and a receiver may start a corresponding application from a previous state.

A value of "terminate" may mean the termination of a corresponding application.

A value of "suspend" may mean the suspension of a corresponding application. A state of an UI and an application engine may need to be reserved until it starts again.

"stream-event" may mean that when data are provided, an appropriate operation (a specific action defined by a corresponding application) is performed by using data.

diffusion, as an optional 8-bit integer attribute of an Event element, indicates a period T of a time in seconds. The purpose of a diffusion parameter may be for a smooth server loading peak. A receiver may calculate an arbitrary period within a range from 0 to T, and in order to retrieve a content referenced by URLs in a corresponding TPT, may delay transfer after accessing an internet server.

Data, as a child element of an optional Event element, provides data relating to a corresponding event. When a corresponding event is activated, a target application may read such data and may use the read data to execute a desired operation. In order for a TDO, data may be transmitted in a binary format to fit for the TDO. A structure including binary data may vary according to a TDO of each of a broadcaster or a service provider.

According to another embodiment of the present invention, data, that is, a child element of an Event element, may include web bookmark service data. When web bookmark service data are included in a Data field, a receiver may recognize web bookmark service only by executing a TDO through TPT and then may display the recognized web bookmark service on a display unit. At this point, the web bookmark service recognition of the receiver may be performed regardless of whether a trigger including the location information of a TDO is received. Hereinafter, although not shown in the drawings, an operation of a receiver is described according to another embodiment of the present invention will be described.

When a channel is selected according to a user input, the receiver receives a trigger. The trigger may include an URIString of iTV message. The receiver may extract the address of a TPT server including TDO information by using the URIString of iTV message included in a trigger. The receiver may receive the TDO information, for example, a TDO XML file, from a TPT server. The receiver may extract a content and a TDO related content included in the above-mentioned Event element by parsing a TDO XML file. Then, the receiver may execute a corresponding TDO according to a predetermined time.

When web bookmark service data are included in a data field in an Event element during the execution of a corresponding TDO, the receiver may deliver the web bookmark service data in the data field to the corresponding TDO. The web bookmark service data may include information that a receiver may display on a display unit, for example, the address of a widget application or the address of a webpage. Upon receiving the web bookmark service data in the data field, after executing a web bookmark service, the corresponding TDO may display on a display unit that the web bookmark service is being provided. According to another embodiment of the present invention, even when there is no data for web bookmark service in a trigger in the DTVCC, a TDO XML file is extracted by using a TPT server address included in the trigger, and then, the fact that a web bookmark service could be provided may be recognized through the Event element in the TDO XML file and displayed.

UrlList, as an optional element of a TPT, includes a list of URLs that the receiver uses.

TptUrl, as an optional element, includes the URL of a TPT for future segment. When various TptUrl elements are included, a plurality of TptUrl elements may be arranged according to an order in which corresponding segments in broadcast appear.

NrtSignalingUrl, as an optional element, includes the URL of a server through which a receiver obtains NRT signaling tables for all NRT virtual channels in a broadcast stream including a corresponding segment by using a request protocol defined in a TBD section of a corresponding document.

Then, a protocol stack for web bookmark service according to an embodiment of the present invention is described with reference to FIG. 63.

Figure 63:
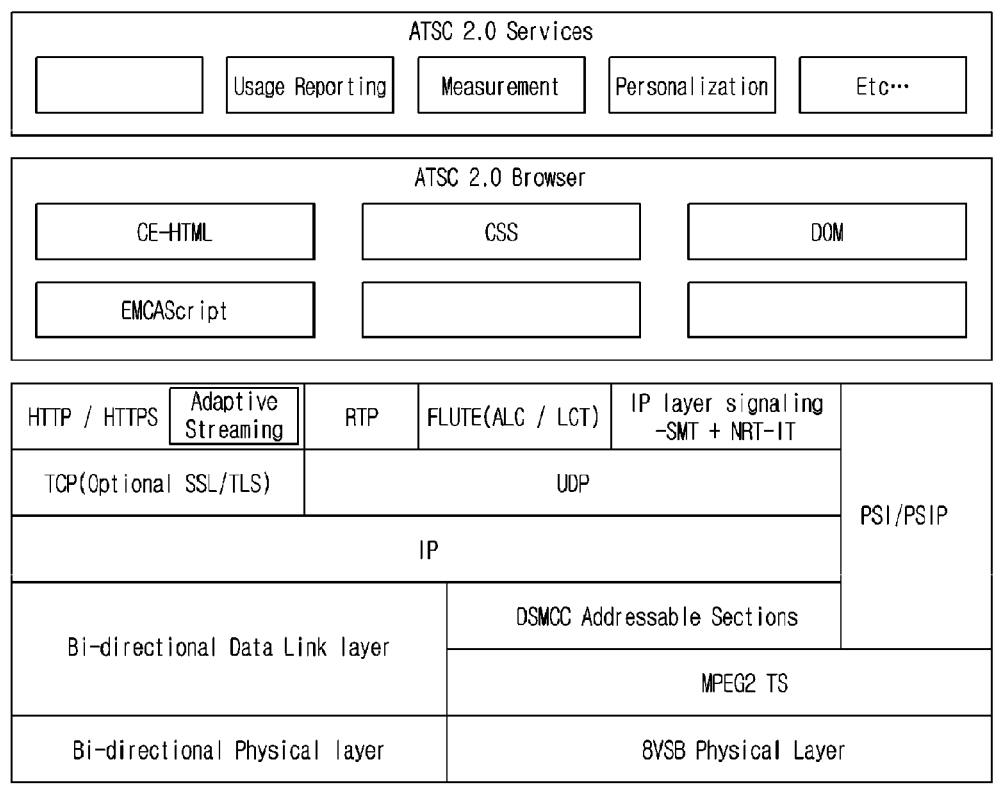
FIG. 63 is a view illustrating a protocol stack for web bookmark service configured according to an embodiment of the present invention.

FIG. 63 is a view illustrating a protocol stack for web bookmark service configured according to an embodiment of the present invention.

A receiver may support an ATSC browser environment in order to provide ATSC service. The ATSC service may include web bookmark service, usage reporting service, measurement service, and personalization service. In order for the receiver to provide the ATSC service in the ATSC browser environment, a broadcasting station may packetize NRT content items or files according to a protocol type such as that shown in FIG. 58 and then may transmit the packetized NRT content items or files to the receiver.

A protocol stack such as that shown in FIG. 63 may combine an ATSC broadcast protocol stack and a broadband protocol stack and may be connected to an ATSC browser environment of the receiver. Accordingly, the receiver may access a lower-level ATSC broadcast protocol stack and broadband protocol stack by using a native application and an ATSC browser environment. The native application and ATSC browser of the receiver may require a newly extended or modified browser environment in addition to APIs or functions newly defined to allow existing APIs or functions defined by the Open IPTV Forum (OIPF) and Hybrid Broadcast Broadband TV (HbbTV) to be fit for an ATSC broadcasting environment.

Figure 64:
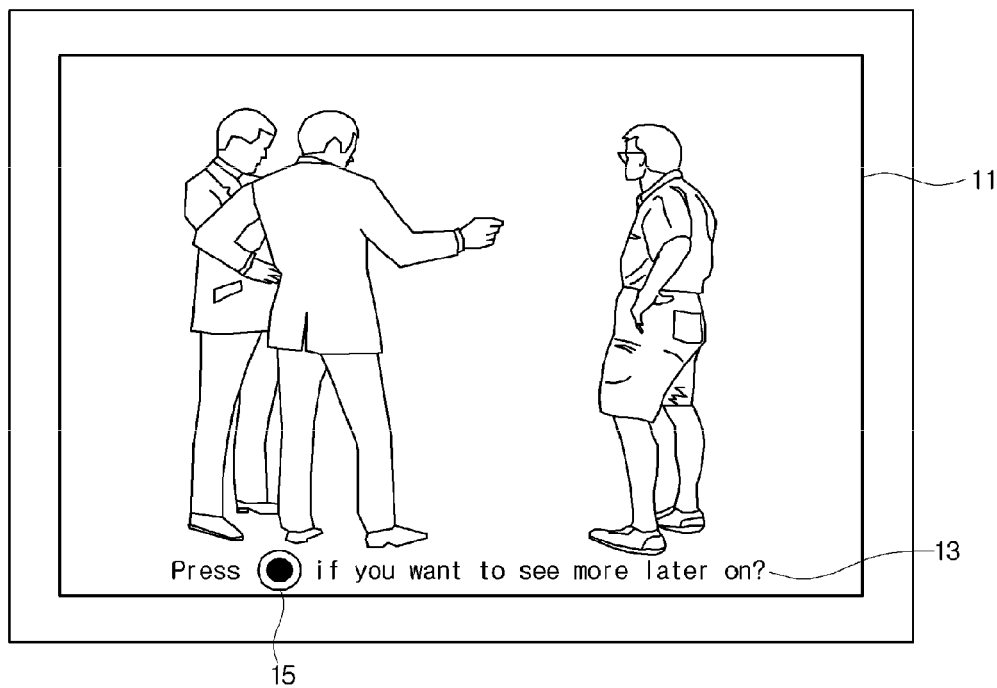
FIGS. 64 to 66 are views illustrating a display unit of a receiver to provide web bookmark service according to an embodiment of the present invention.
Figure 65:
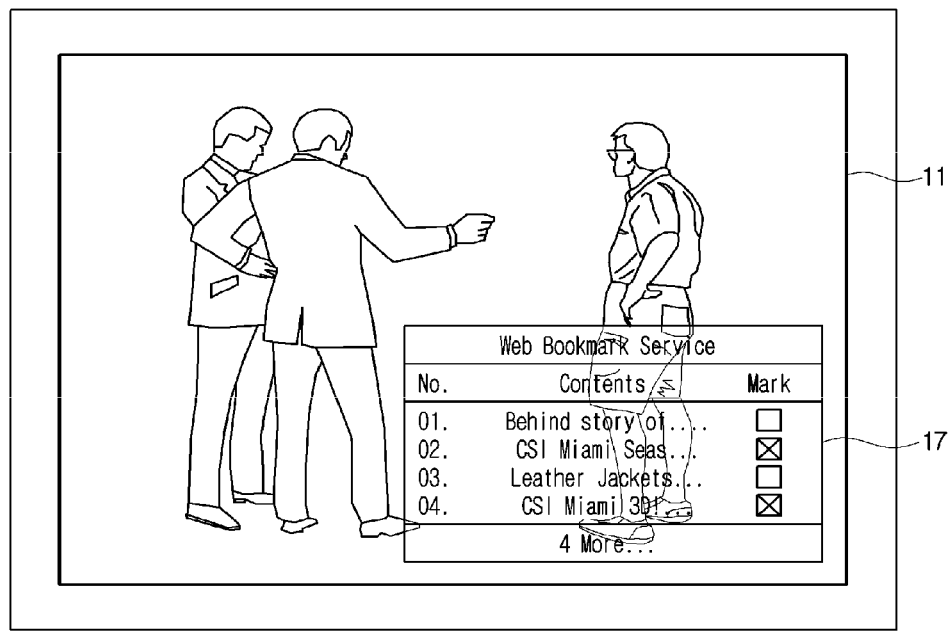
Figure 66:
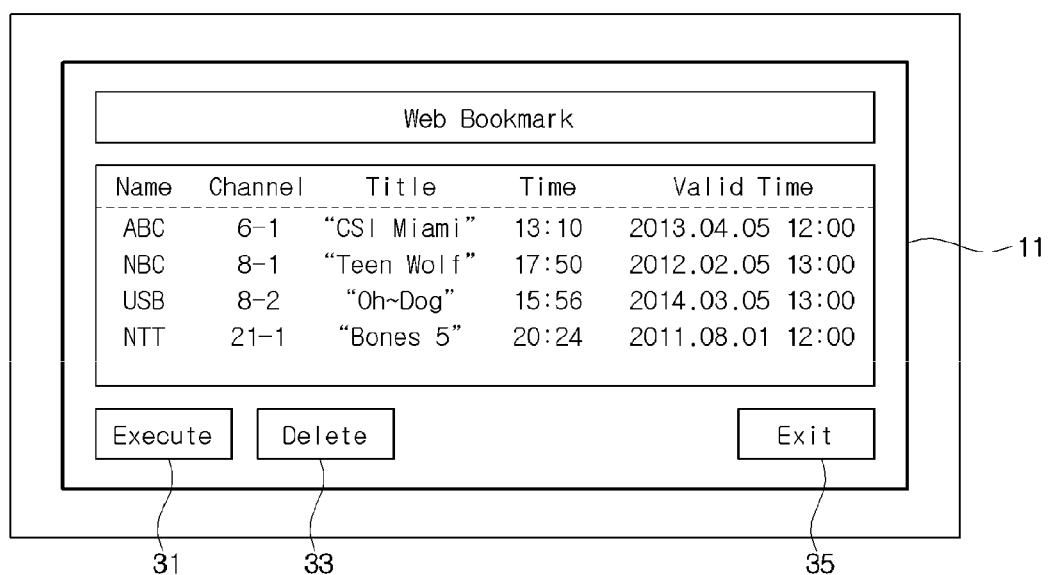

Then, a method of a receiver to provide web bookmark service according to an embodiment of the present invention will be described with reference to FIGS. 64 to 66. FIGS. 64 to 66 are views illustrating a display unit of a receiver to provide web bookmark service according to an embodiment of the present invention.

Referring to FIG. 64, the receiver may display main AV content such as a specific channel or specific program according to a user selection through the display unit 11.

A broadcaster may transmit signals about scene related information, that is, enhanced information relating to the main AV content that the receiver displays to the receiver.

Upon receiving a signal notifying that a web bookmark service on the scene related information is available from among the signals on the scene related information, the receiver may display a web bookmark indicator 13 notifying that the web bookmark service on the scene related information is available through the display unit 11, and the present invention is not limited thereto. The signal notifying that the web bookmark service on the scene related information is available may be web bookmark service trigger information.

The web bookmark indicator 13 may include a web bookmark button 15 for receiving a user input. A user may receive a user input for selecting the web bookmark button 15 to web-bookmark scene related information and may input the received user input into a receiver. For example, a user may select the web bookmark button 15 through a remote controller.

On the other hand, when a user does not intend to use a web bookmark service on corresponding scene related information, the web bookmark button 15 may not be selected. If the receiver does not receive a user input for selecting the web bookmark button 15 for a predetermined time after the web bookmark indicator 13 including the web bookmark button 15 is displayed on the display unit 11, it may not web-bookmark corresponding scene related information and may stop displaying the web bookmark indicator 13, but the present invention is not limited thereto.

Referring to FIG. 65, when a user selects the web bookmark button 15, a receiver may display a web bookmark service window 17. The web bookmark service window 17 may include identification information of scene related information. If there is at least one scene related information, the web bookmark service window 17 may include the number No. of scene related information, identification information Contents of each scene related information, and a scene related information selection item such as each scene related information selection mark, but the present invention is not limited thereto. For example, when a user identifies scene related information through identification information and selects scene related information web-bookmarked through a selection mark is selected, the receiver may bookmark corresponding scene related information.

The receiver may web-bookmark scene related information by saving a web bookmark item of the scene related information, for example. The web bookmark item may include a web bookmark identifier, a scene related information description, a scene related information available time, a capture image of main AV content corresponding to scene related information, but the present invention is not limited thereto.

Referring to FIG. 66, after a designated time, for example, after the execution of main AV content is terminated, a receiver may execute a web bookmark application at the time that advertisement is outputted. When the receiver executes the web bookmark application, the display unit 11 may display a web bookmark application execution window. The web bookmark application execution window may display at least one of identification information (name) of a broadcasting station providing main AV content, channel information (Channel) transmitted through main AV content, title information (Title) of scene related information, a time (Time) that a receiver web-bookmarks corresponding scene related information, a valid time (Valid time) at which web bookmark service is used with respect to corresponding scene related information, but the present invention is not limited thereto.

Moreover, the web bookmark application may provide at least one of an execute button 31, a delete button 33, a terminate button 35, but the present invention is not limited thereto. The execute button 31 may mean a button for executing scene related information. The delete button 33 may mean a button for deleting a bookmark of corresponding scene related information. The end button 35 may mean a button for ending a web bookmark application.

In such a way, since the receiver provides web bookmark service, this provides convenience to a user such that the user may save location information of an enhanced service related to main AV content in execution currently through the web bookmark service and, when the main AV content execution is terminated, may execute the adjunct service by using a location information list of the enhanced service.

FIG. 67 is a view illustrating a bitstream syntax of a web bookmark trigger configured according to an embodiment of the present invention.

A trigger following the syntax shown in FIG. 67 indicates a web bookmark trigger, and hereinafter, a description of a field included in a trigger following the syntax shown in FIG. 51 is omitted.

An associated_channel_PID field (13 bits) indicates a PID value for identifying a channel relating to a corresponding web bookmark trigger.

A channel_name_length field (8 bits) indicates the length of channel_name.

A channel_name field indicates a related channel title.

When a value of a trigger type field is 0x04, the following content may be included in a bitstream syntax of a trigger.

A webbookmark_valid_time field (32 bits) indicates a valid time at which web bookmark service is available.

A webbookmark_expire_time field (32 bits) indicates an expiration time at which web bookmark service expires.

A webbookmark_title_length field (8 bits) indicates the length of webbookmark_title.

A webbookmark_title_text field indicates document data describing corresponding web bookmark service.

A webbookmark_location field includes the location of web service.

A webbookmark_URL_length field (8 bits) indicates the length of webbookmark_URL.

A webbookmark_URL field indicates the URL of a TDO notifying that web bookmark service is available.

A thumbnail_URL_length field (8 bits) indicates the length of thumbnail_URL_length.

A thumbnail_URL field includes the location of a thumbnail web bookmarked together with a capture image of main AV content.

Figure 68:
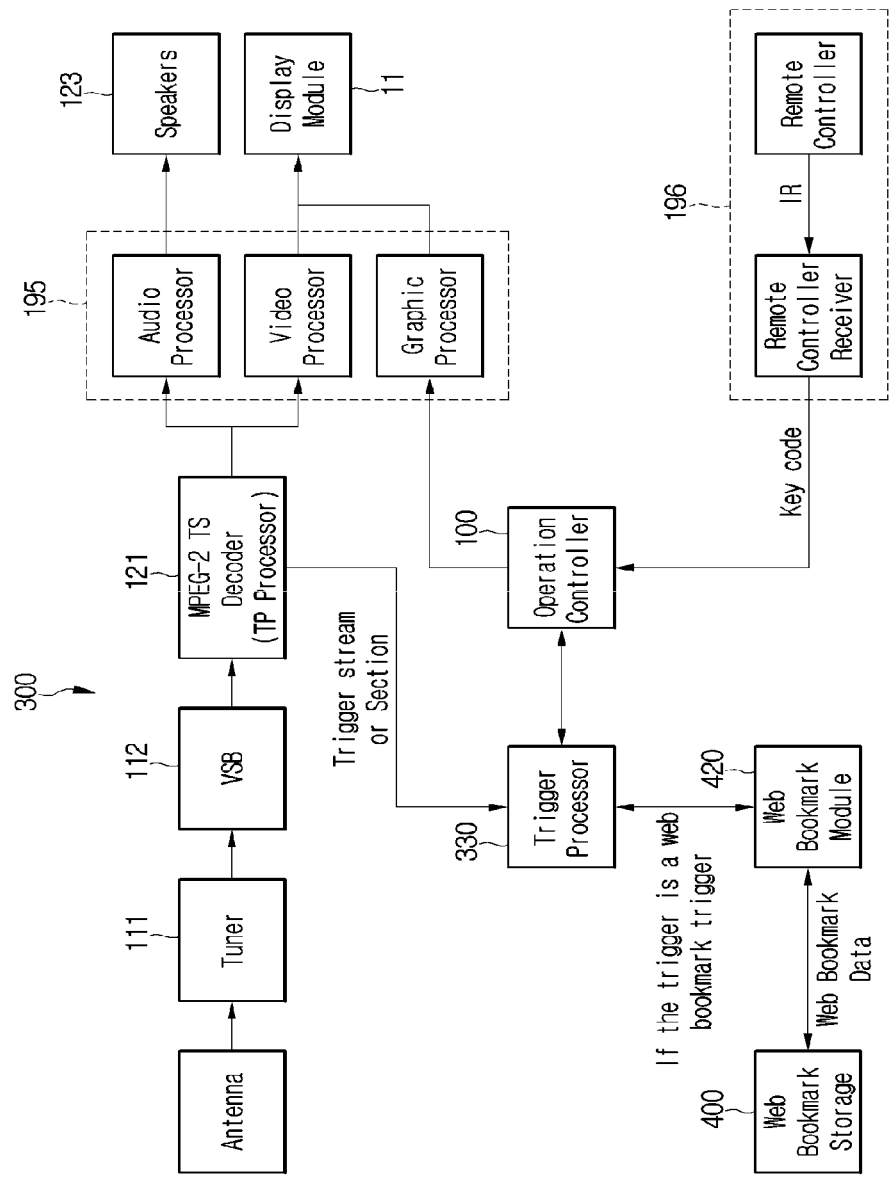
FIG. 68 is a view illustrating a structure of a receiver processing web bookmark service according to an embodiment of the present invention.
Figure 69:
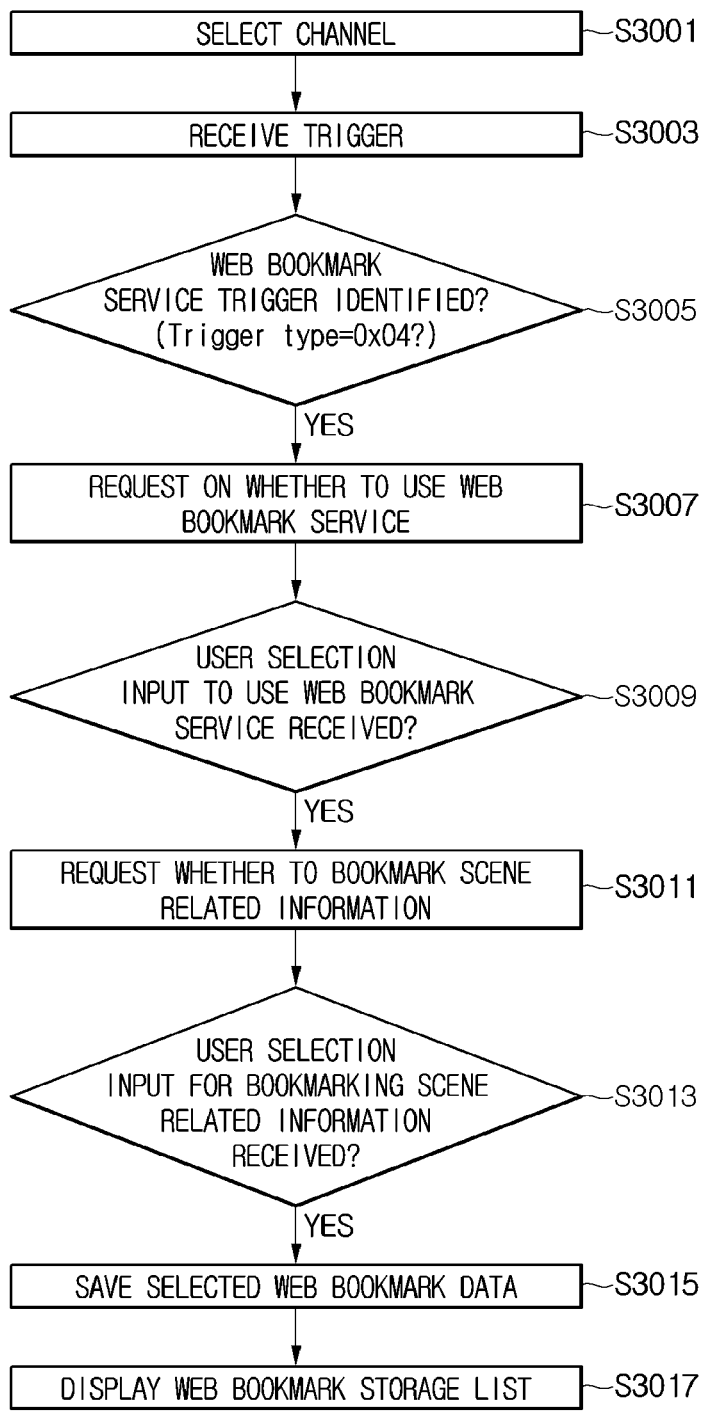
FIG. 69 is a flowchart illustrating a method of a receiver to process web bookmark service according to an embodiment of the present invention.

Referring to FIGS. 68 and 69, a web bookmark trigger processing method of a receiver according to an embodiment of the present invention will be described.

FIG. 68 is a view illustrating a structure of a receiver processing web bookmark service according to an embodiment of the present invention.

The receiver 300 includes a tuner 111, a demodulator 112, an MPEG-2 TP handler 121, a trigger processing unit 333, a web bookmark module 420, a web bookmark storage unit 400, an operation control unit 100, a UI manager 196, a presentation manager 195, a speaker 123, and a display unit 11. Hereinafter, a description of the above-mentioned same configuration is omitted.

The MPEG-2 TP handler 121 extracts a trigger stream from PES packets received through the tuner 111 and the demodulator 112. The MPEG-2 TP handler 121 may transmit the extracted trigger stream to the trigger processing unit 330a.

The trigger processing unit 330a processes the trigger stream transmitted from the MPEG-2 TP handler 121. The trigger processing unit 330a may determine whether the received trigger stream is a web bookmark service trigger. When the trigger stream transmitted from the MPEG-2 TP handler 121 is the web bookmark service trigger, the trigger processing unit 330a may transmit a web bookmark service availability notification command to the operation control unit 100 so as to allow the display unit 11 to display a web bookmark indicator 13.

Additionally, when a user selects the web bookmark button 15 included in the web bookmark indicator 13 displayed on the display unit 11, the trigger processing unit 330a may transmit triggering data included in the web bookmark service trigger to the web bookmark module 420. At this point, the trigger processing unit 330a may capture a scene of main AV content displayed when a user selects the web bookmark button 150.

The web bookmark module 420 performs a device native function of the receiver 300 for saving and deleting triggering data transmitted from the trigger processing unit 330a.

For example, when a user selects the execute button 31 of a web bookmark application, the web bookmark module 420 may transmit the triggering data transmitted from the trigger processing unit 300 to the web bookmark storage unit 400. Additionally, when a user selects the delete button 33 of a web bookmark application, the web bookmark module 420 may delete a corresponding web bookmark saved in the web bookmark storage unit 400.

According to another embodiment of the present invention, when a user selects the web bookmark button 15 in the web bookmark indicator 13 displayed on the display unit 11, the web bookmark module 420 may transmit the triggering data transmitted from the trigger processing unit 300 to the web bookmark storage unit 400, but the present invention is not limited thereto.

The web bookmark storage unit 400 may save triggering data. The web bookmark storage unit 400 may save an image that the trigger processing unit 330a captures together as a thumbnail of a web bookmark, and the present invention is not limited thereto.

Upon receiving information providing a notification about the reception of a web bookmark service trigger from the trigger processing unit 330a, the operation control unit 100 may control the display unit 11 so that the display unit 11 displays the web bookmark indicator 13 notifying that a web bookmark service about scene related information is available.

Additionally, if the operation control unit 100 receives a user input, for example, key code information of a remote controller, from the UI manager 196, it may transmit corresponding key code information to the trigger processing unit 330a.

If the display unit 11 receives a control signal from the operation control unit 100, it may display the web bookmark indicator 13 notifying that a web bookmark service about scene related information is available.

FIG. 69 is a flowchart illustrating a method of a receiver to process web bookmark service according to an embodiment of the present invention.

The receiver selects a specific channel according to a user input in operation S3001. The receiver may execute real-time content such as a live broadcast according to a user input or may execute NRT content such as VOD, but the present invention is not limited thereto. The receiver may display a specific channel or specific program selected by a user. A user may input a user input for selecting a specific channel through the UI manager 196 of the receiver into the receiver.

The receiver receives a trigger transmitted from a broadcaster in operation S3003. The MPEG-2 TP handler 121 may extract a trigger stream from a signal transmitted from a broadcaster and then may transmit the extracted trigger stream to the trigger processing unit 330a. At this point, the trigger transmitted from a broadcaster may be received through an NRT.

The trigger processing unit 330a of the receiver may determine whether the received trigger is a web bookmark service trigger in operation S3005. When a value of a trigger type field in the trigger is 0x04, the trigger processing unit 330a may determine a corresponding trigger as a web bookmark service trigger.

As described above, the web bookmark service trigger may mean information notifying that a web bookmark service about scene related information relating to a current channel or program is available. The web bookmark service may be NRT service.

When a corresponding trigger is a web bookmark service trigger, the trigger processing unit 330a transmits a request on whether to use web bookmark service to the operation control unit 100 in operation S3007. The operation control unit 100 may control the presentation manager 195, so that the display unit 11 displays the request on whether to use web bookmark service on a screen. The display unit 11 may display the web bookmark indicator 13 on a screen as described with reference to FIG. 64.

When the receiver receives a user selection input for web bookmark service usage in operation S3009, it transmits a request on whether to web bookmark scene related information to the operation control unit 100 in operation S3011. A user may reply with a user selection input in response to the request on whether to use web bookmark service displayed on a screen. The user selection input about a request on whether to use web bookmark service, for example, may mean that a user selects the web bookmark button 15 displayed on the display unit 11 in a corresponding scene.

When the web bookmark button 15 is selected, the UI manager 196 may transmit key code information of a user input to the operation control unit 100. Then, when the operation control unit 100 transmits corresponding key code information to the trigger processing unit 330a, the trigger processing unit 330a may transmit triggering data to the web bookmark module 420.

The web bookmark module 420 may transmit a request on whether to bookmark corresponding scene related information to the operation control unit 100 through the trigger processing unit 330a in correspondence to a user selection input on whether to use web bookmark service, and the operation control unit 100 may control the presentation manager 195 so that the display unit 11 displays the request on whether to bookmark corresponding related information on a screen. The display unit 11 may display a web bookmark service window 17 on a screen as described with reference to FIG. 65.

When a user selection input for bookmarking scene related information is received in operation S3013, the web bookmark module 420 saves the web bookmark data corresponding to the selected scene related information in the web bookmark storage unit 400 in operation S3015. The user selection input for bookmarking scene related information, for example, may mean a user input for selecting at least one scene related information after a user identifies at least one scene related information relating to a corresponding scene through the web bookmark service window 17. The web bookmark module 420 may transmit web bookmark data among corresponding triggering data to the web bookmark storage unit 400 according to a user input. An operation that the receiver transmits web bookmark data to the web bookmark storage unit 400 may mean a web bookmark operation and, at this point, one or more bookmark data saved may be defined as web bookmark items, respectively.

The web bookmark module 420 may receive user selection input information for bookmarking scene related information through the operation control unit 100 and then may save a web bookmark item of corresponding scene related information in the web bookmark storage unit 400. The web bookmark storage unit 400 may save corresponding triggering data and a capture image of a corresponding scene together. Operation S3003 to operation S3015 may be repeated.

The display unit 11 displays a web bookmark storage list at a predetermined time in operation S3013. The predetermined time, for example, may mean a time that a user selects or a time that execution of a main AV item is terminated, but the present invention is not limited thereto. The web bookmark storage list may include location information such as the URL of enhanced service, that is, web-bookmarked scene related information, and a thumbnail of a corresponding scene, but the present invention is not limited thereto.

Although not shown in the drawing, a user may identify enhanced services from the displayed web bookmark storage list by using identification information of a corresponding enhanced service and may select at least one enhanced service from among them. The receiver may access a corresponding enhanced service by using location information of an enhanced service that a user selects and then may receive and execute the corresponding enhanced service.

FIGS. 68 and 69 illustrates a native device of a receiver provides web bookmark service by using direct web bookmark trigger data through a native application according to an embodiment of the present invention, and also according to another embodiment of the present invention below, when a receiver receives a TDO in advance and saves it, a method of using triggering data transmitted from a broadcasting station through at least one of a TDO module, that is, a software module included in the receiver, and a native application of the receiver will be described.

Figure 70:
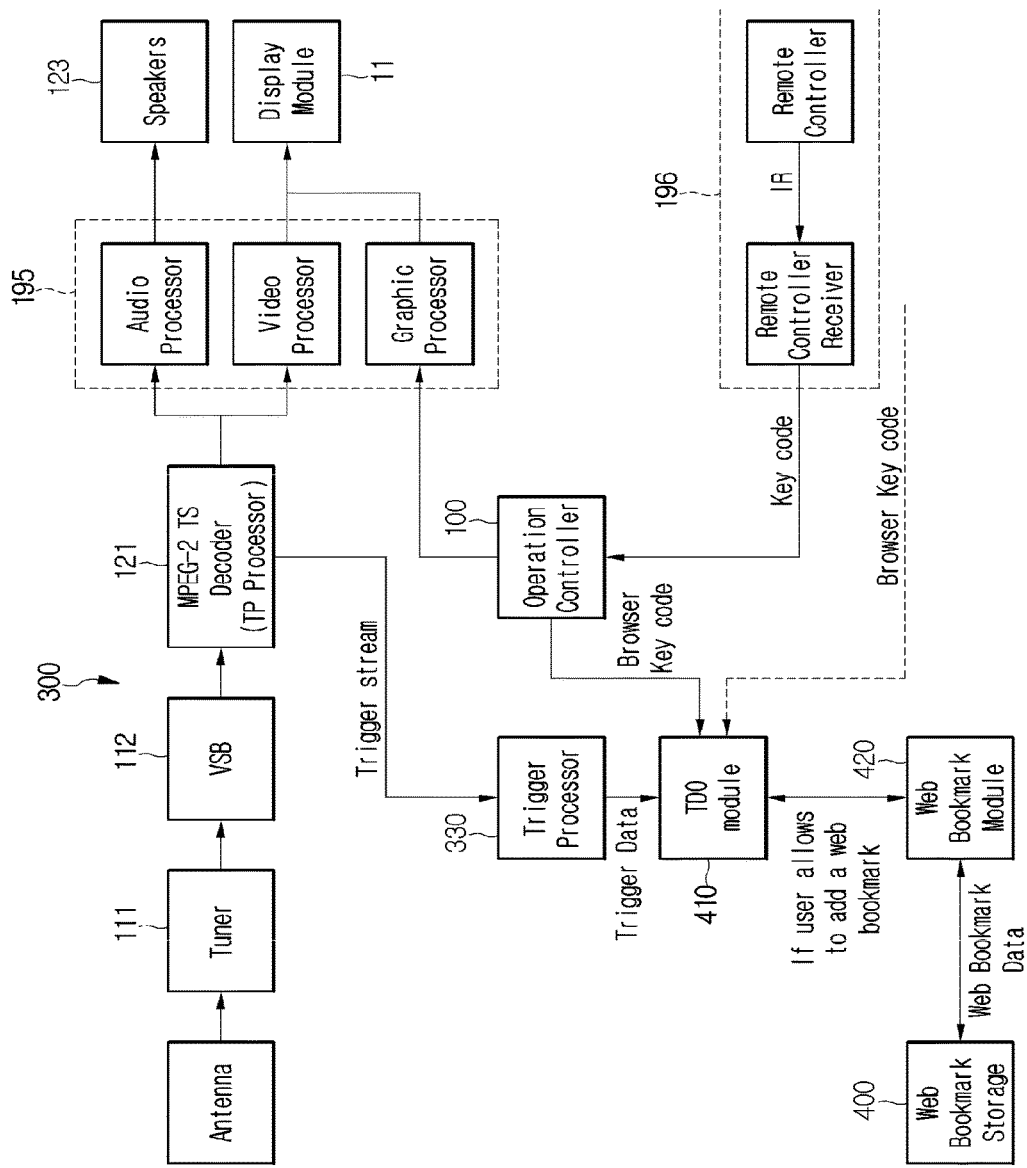
FIG. 70 is a view illustrating a structure of a receiver processing web bookmark service by executing a DO according to an embodiment of the present invention.

FIG. 70 is a view illustrating a structure of a receiver processing web bookmark service by executing a DO according to an embodiment of the present invention. The receiver shown in FIG. 70 further includes a TDO module 410 compared to the receiver shown in FIG. 68. Hereinafter, a description of the same configuration of the receiver described with reference to FIG. 68 is omitted.

The TDO module 410 processes a corresponding TDO. The TDO module 410 may transmit triggering data included in a trigger stream that the trigger processing unit 330a transmits. The TDO module 410 may receive information notifying that a type of corresponding triggering data is a web bookmark service trigger, from the trigger processing unit 330a. After receiving the triggering data transmitted from the trigger processing unit 330a, the TDO module 410 may determine whether a type of corresponding triggering data is a web bookmark service trigger but the present invention is not limited thereto.

When a user selects the web bookmark button 15, the TDO module 410 may execute a corresponding TDO. The TDO module 410 may extract a corresponding TDO by using target TDO information included in the triggering data and then may execute the extracted TDO. Before a user selects the web bookmark button 15, if the corresponding TDO is executed already, the TDO module 410 does not need to execute the corresponding TDO again. Hereinafter, referring to FIG. 71, a bitstream syntax of a web bookmark trigger for TDO execution is described.

FIG. 71 is a view illustrating a bitstream syntax of a trigger configured according to another embodiment of the present invention. A trigger following the syntax shown in FIG. 71 further includes an auto_start_mode field compared to a trigger following the syntax shown in FIG. 67.

A webbookmark_URL field may mean the URL of a location where an ATSC 2.0 or NRT content item is saved. As described above, the webbookmark_URL field included in a web bookmark trigger may mean location information of a TDO notifying that there is a web bookmark service available for a corresponding scene of corresponding main AV content.

Hereinafter, in order for the TDO module 410 to directly execute a web bookmark TDO, a trigger_action field of a preparation trigger where a value of a trigger type field is 0x01 is defined by the following values and described.

A preparation trigger where a value of the trigger action field is 0x00 may indicate "reserved for future use".

A preparation trigger where a value of the trigger_action field is 0x01 means that content items necessary for a trigger action are prepared in advance. When a value of the trigger_action field in a preparation trigger is 0x01, the receiver may receive contents items in advance necessary for a trigger action through a broadcast network or an IP network.

A preparation trigger where a value of the trigger_action field is 0x02 means that content items necessary for a trigger action are preloaded. When a value of the trigger_action field in a preparation trigger is 0x02, the receiver may preload contents items necessary for performing an activation trigger. At this point, a preparation trigger may be provided before the time that an activation trigger is performed.

A preparation trigger where a value of the trigger_action field is 0x03 may mean, when it requires a linkage with a server in order for a trigger action, a trigger notifying that a receiver is to be linked with a server in advance (Establishing server connections). The receiver may obtain the address of a server necessary for connection through an internet location descriptor.

A preparation trigger where a value of the trigger_action field is 0x04 means that a TDO is executable immediately in a state where a receiver is capable of executing the TDO (Loading content items).

Or, in order to execute a web bookmark TDO immediately, the TDO module 410 may execute a pre-trigger first and then may execute an execution trigger.

Or, as described above, the TDO module 410 may confirm that a value of the trigger type field is 0x04 and then may execute a TDO immediately.

An auto_start_mode field (1 bit) indicates whether to execute a webbookmark_URL field included in a corresponding web bookmark trigger. The auto_start_mode field may be a flag. If a value of the auto_start_mode field is 0x1, since the receiver executes the webbookmark_URL field included in a corresponding web bookmark trigger immediately, for example, the TDO module 410 may execute a corresponding TDO immediately. If a corresponding TDO is executed already, the TDO module 410 may operate according to the life cycle of a TDO.

Again, FIG. 70 will be described.

The TDO module 410 may display the web bookmark indicator 230 on the display unit 11 by executing a TDO. Additionally, the TDO module 410 may display the web bookmark service window 17 on the display unit 11 by executing a TDO, and may receive a user selection input through the operation control unit 100.

When a user selects web bookmark storage, the TDO module 410 may transmit a web bookmark item to the web bookmark module 420. The TDO module 410 may use Javascript APIs so as to transmit a web bookmark item to the web bookmark module 420.

The TDO module 410 may provide a web bookmark item list to a user by executing a web bookmark application. Additionally, the TDO module 410 may transmit at least one web bookmark item that a user selects through a web bookmark application to the web bookmark module 420.

Figure 72:
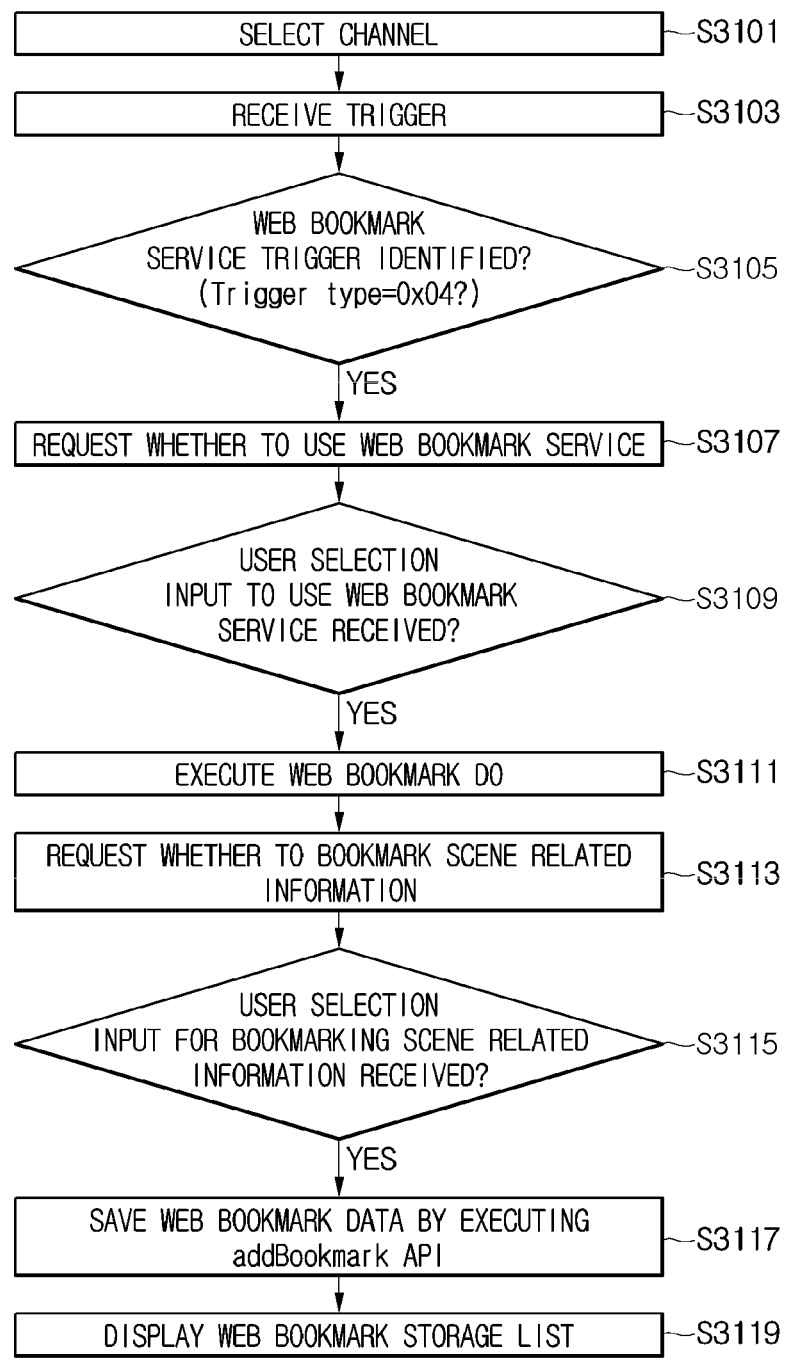
FIG. 72 is a flowchart illustrating a method of a receiver to process web bookmark service by executing a DO according to an embodiment of the present invention.

FIG. 72 is a flowchart illustrating a method of a receiver to process web bookmark service by executing a DO according to an embodiment of the present invention. Hereinafter, a description of the same content described with reference to FIG. 69 is omitted.

The receiver selects a specific channel according to a user input in operation S3101.

The receiver receives a trigger transmitted from a broadcaster in operation S3103.

Then, the receiver may determine whether the received trigger is a web bookmark service trigger in operation S3105. At this point, when a value of a trigger type field in the trigger is 0x04, the trigger processing unit 330a of the receiver may identify that a type of a corresponding trigger is a web bookmark service trigger, as a device native function.

Or, when the trigger processing unit 330a transmits triggering data to the TDO module 410, the TDO module 410 may identify that a corresponding trigger is a web bookmark service trigger by using a value of a trigger type field. At this point, the trigger processing unit 330a may execute a corresponding TDO by identifying the location of a TDO from a value of a webbookmark_URL field in trigger data.

Or, if a corresponding TDO is executed already before the trigger processing unit 330a receives a trigger, the trigger processing unit 330a may transmit a corresponding trigger to the TDO module 410 immediately. At this point, the trigger processing unit 330a transmits a corresponding trigger to the TDO module 410 by using a DOM Event. The TDO module 410 may identify that a corresponding trigger is a web bookmark service trigger by using opaque data.

When a corresponding trigger is a web bookmark service trigger, the receiver displays a request on whether to use web bookmark service on the display unit 100 in operation S3107. When the trigger processing unit 330a of the receiver identifies a web bookmark service trigger, the trigger processing unit 330a may transmit a request on whether to use web bookmark service to the operation control unit 100.

Or, the TDO module 410 may identify a web bookmark service trigger by using a value (0x04) of a trigger type field included in a trigger or may identify a web bookmark service through opaque data of an activation trigger where a value of a trigger type field is 0x02. The case that a web bookmark service is identified through opaque data of an activation trigger may include the case that a target TDO of a trigger capable of using web bookmark service in a specific scene of main AV content in playback currently is notified. Opaque data of an activation trigger that the TDO module 410 uses may include the opaque data described with reference to FIG. 71.

Or, if a corresponding TDO is executed already before the trigger processing unit 330a receives a trigger, the corresponding TDO may receive an event for web bookmark service at all times. When a web bookmark trigger is transmitted to the trigger processing unit 330a, the TDO module 410 may use an interface necessary for an ATSC compatible browser to receive an event for web bookmark service. Hereinafter, an API that the TDO module 410 uses to receive a web bookmark service related event will be described.

The API that the TDO module 410 uses to receive a web bookmark service related event may include a void addWebBookmarkEventListener(String channelNumber, EventListener listener) function and a removeWebBookmarkEventListener(String channelNumber) function. When the TDO module 410 uses the addWebBookmarkEventListener (String channelNumber, EventListener listener) function where a callback function such as a listener is registered as a factor, the trigger processing unit 330a receiving a web bookmark trigger may call a callback function registered by recognizing a web bookmark trigger as a DOM Event of a web browser, for example, a listener. When the TDO module 410 does not process an Event on web bookmark service or execution of a corresponding TDO is terminated, the TDO module 410 may use the removeWebBookmarkEventListener function.

Or, the API that the TDO module 410 uses to receive a web bookmark service related event may include a void addWebBookmarkEventListener(EventListener listener) function and a void removeWebBookmarkEventListener (EventListener listener) function. Since the receiver knows a current domain and a service unique identifier in use currently, for example, a PID or a channel number, a channelNumber may be omitted from an API used to receive a web bookmark service related event.

Or, when a corresponding TDO is in execution, the trigger processing unit 330a does not process the received web bookmark service trigger and generates an Event, so that it may transmit the corresponding Event to the TDO module 410. At this point, the trigger processing unit 330a, for example, may transmit triggering data to the TDO module 410 in a format of row data by using a function onWebBookmarkArrived(String rawData) function.

On the other hand, when a corresponding TDO is in execution, the trigger processing unit 330a processes all the row data of the received web bookmark service trigger and then may transmit related information to the TDO module 410. At this point, the trigger processing unit 330a may recognize a web bookmark service trigger by using at least one of a function onWebBookmarkArrived(String channel- Number, String channelName, String title, DateAndTime validTime, DateAndTime expiryTime) function, a function onWebBookmarkArrived(WebBookmarkCollection webBookmarkItems) function, and a function onWebBookmarkChanged(WebBookmarkCollection webBookmarkItems) function but the present invention is not limited thereto.

The trigger processing unit 330a may transmit information, such as a channel number, a channel name, a title, an effective time and an expiration time, to the TDO module 410 by using an onWebBookmarkArrived(String channelNumber, String channelName, String title, DateAndTime validTime, DateAndTime expiryTime) function.

Or, the trigger processing unit 330a may transmit web bookmark collection information extracted from an web bookmark service trigger by using the onWebBookmarkArrived(WebBookmarkCollection webBookmarkItems) function. The web bookmark collection is to transmit at least one web bookmark item simultaneously and may include related information such as a channel number and a title on each web bookmark item. If the web bookmark collection information is transmitted to the TDO module 410, the TDO module 410 may add or display a plurality of web bookmark items simultaneously and may save the plurality of web bookmark items by a user selection input.

Or, the trigger processing unit 330a may transmit web bookmark service related information extracted from a web bookmark service trigger that is gradually version-updated and repeatedly transmitted during a predetermined period by using the onWebBookmarkChanged(WebBookmarkCollection webBookmarkItems) function. The onWebBookmarkChanged function may be called only when a version of a web bookmark service trigger is upgraded.

Then, when the receiver receives a user selection input for web bookmark service usage in operation S3109, it executes a corresponding web bookmark TDO in operation S3511. A user may reply with a user selection input in response to the request on whether to use web bookmark service displayed on a screen. The user selection input for web bookmark service usage, for example, may include the case that a user selects the web bookmark button 15.

When a user selects the web bookmark button 15, the operation control unit 100 may execute a corresponding TDO by transmitting the received user selection input to the TDO module 410 only when the TDO is not executed.

Then, the TDO module 410 transmits a request on whether to bookmark scene related information to the operation control unit 100 in correspondence to the user selection input on whether to use web bookmark service according to an operation of a corresponding TDO in operation S3113. The display unit 11 may display above-mentioned the web bookmark service window 17 on a screen.

When the TDO module 410 receives the user selection input for bookmarking scene related information in operation S3115, the web bookmark module 420 saves the web bookmark data corresponding to the selected scene related information in the web bookmark storage unit 400 in operation S3117. At this point, the web bookmark data may include a thumbnail, that is, a capture image of a corresponding scene. At this point, the TDO module 410 may require a javascript API such as an addBookmark API to use a device native function of the web bookmark module 420 through a TDO operation. Hereinafter, referring to FIG. 73, an addBookmark API required to execute a device native function through a TDO operation is described.

FIG. 73 is a view illustrating an addBookmark API among a web bookmark collection according to an embodiment of the present invention.

Referring to FIG. 73, the addBookmark API may mean an API for adding a new web bookmark to a web bookmark collection such as a web bookmark storage list. If the Web Bookmark cannot be added (e.g. because the value given for time lies outside of the length of the recording). This method SHALL return null.

The addBookmark API may include an argument, such as a time, a channel, a title, an expiration time, a URL, and a thumbnail URL, but the present invention is not limited thereto.

A time argument Integer indicates a time that a web bookmark starts.

A channel argument channel indicates a channel that a web bookmark starts.

A title argument String indicates the title of a web bookmark item.

An effective time argument DatdAndTime indicates a time that web bookmark service is accessible.

An expiration time argument DateAndTime indicates a time that a web bookmark expires. The web bookmark may not be automatically removed. The effective time argument and the expiration time argument may be represented a data and a time.

The URL argument indicates the location of web bookmark service.

A thumbnail URL argument String indicates the location of a thumbnail of web bookmark service.

Again, referring to FIG. 72 again, the display unit 11 displays a web bookmark storage list at a predetermined time in operation S3119.

Although not shown in the drawing, a user may identify enhanced services from the displayed web bookmark storage list by using identification information of a corresponding enhanced service and may select at least one enhanced service from among them. The web bookmark module 420 of the receiver may delete or execute a web bookmark item that a user selects from a web bookmark storage list regardless of a channel.

According to an embodiment of the present invention described with reference to FIG. 72, when a receiver receives and saves a TDO in advance, a TDO module included in the receiver may control an operation for saving a web bookmark by using triggering data transmitted from a broadcasting station, and a native device of the receiver may manage web bookmark service, so that a user may delete or select and execute a web bookmark regardless of a channel. On the other hand, according to another embodiment of the present invention below, when a receiver receives and saves a TDO in advance, a method of a TDO module included in the receiver to manage overall web bookmark service by using triggering data will be described.

Figure 74:
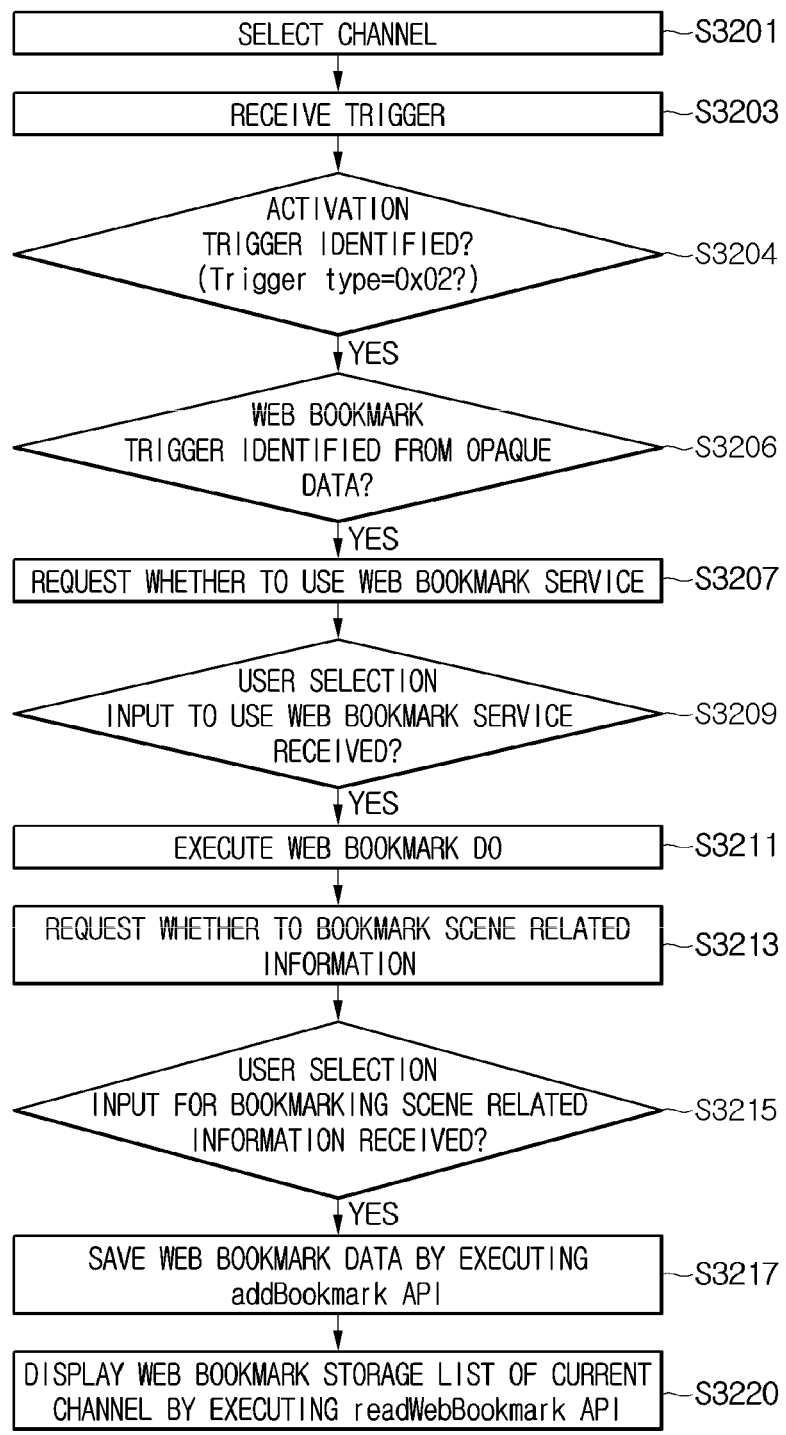
FIG. 74 is a flowchart illustrating a method of a DO to execute web bookmark service according to an embodiment of the present invention.

FIG. 74 is a flowchart illustrating a method of a DO to execute web bookmark service according to an embodiment of the present invention. Hereinafter, a description of the same content described with reference to FIG. 72 is omitted and only differences will be described.

The receiver selects a specific channel according to a user input in operation S3201.

The receiver receives a trigger transmitted from a broadcaster in operation S3203.

If the trigger is an activation trigger in operation S3204, the receiver determines from opaque data whether the activation trigger is a trigger for activating a TDO providing web bookmark service in operation S3206. When a value of a trigger type field in the received trigger is 0x02, the trigger processing unit 330*a* may identify that a type of a corresponding trigger is an activation service trigger, as a device native function. The trigger processing unit 330*a* may transmit an activation trigger to the TDO module 410 for executing a corresponding TDO. The TDO module 410 reads trigger information on web bookmark service included in opaque data by executing a TDO, and by using this, may provide web bookmark service.

Operation S3204 and operation S3206 shown in FIG. 74 perform the same function as operation S3105 shown in FIG. 72, and as described in operation S3105 of FIG. 72, the trigger processing unit 330*a* of a receiver, as a device native function, may identify that a type of a corresponding trigger is a web bookmark service trigger when a value of a trigger type field included in a trigger is 0x04.

When it is identified as a trigger for web bookmark service execution, the TDO module 410 displays a request on whether to use web bookmark service on the display unit 11 in operation S3207.

Then, when the TDO module 410 receives the user selection input for web bookmark service usage in operation S3209, it executes a corresponding web bookmark TDO in operation S3211.

Then, the TDO module 410 transmits a request on whether to bookmark scene related information to the operation control unit 100 in correspondence to the user selection input on whether to use web bookmark service according to an operation of a corresponding TDO in operation S3113.

When the TDO module 410 receives the user selection input for bookmarking scene related information in operation S3215, the web bookmark module 420 saves the web bookmark data corresponding to the selected scene related information in the web bookmark storage unit 400 in operation S3217. The TDO module 410 may save web bookmark data through the web bookmark module 420 by using a javascript API such as an addBookmark API.

Then, the TDO module 410 displays a web bookmark storage list of a current channel at a predetermined time through the display unit 11 in operation S3220. The TDO module 410 may display only a web bookmark storage list on a current channel through the display unit 11. Due to browser security issues, the TDO module 410 may not display a web bookmark storage list on another channel other than a current channel. Additionally, the web bookmark module 420 may provide only information included in a domain due to browser security issues.

In order for the TDO module 410 to display a web bookmark storage list of a current channel on the display unit 11, the TDO module 410 may be able to control the web bookmark module 420 to access the web bookmark storage unit 400. That is, the TDO module 410 may require a javascript API such as a readWebBookmark API to use a device native function of the web bookmark module 420 through a TDO operation.

The TDO module 410 may call the readWebBookmark API to control the web bookmark module 410. When the TDO module 410 calls the readWebBookmark API, the web bookmark module 420 may return web bookmark data on the channel selected in operation S3201 to the TDO module 410. Since the web bookmark module 420 obtains the channel number and the domain of a channel where a browser of ATSC 2.0 is being executed through the browser, it may extract web bookmark data on a current channel from the web bookmark storage unit 400.

Since the TDO module 410 provides web bookmark data by executing a TDO, the receiver may provide user's convenience by providing selective web bookmark service to a user.

Hereinafter, referring to FIG. 75, a readWebBookmark API required to execute a device native function through a TDO operation is described.

FIG. 75 is a view illustrating a readWebBookmark API among a web bookmark collection according to an embodiment of the present invention.

Referring to FIG. 75, the readWebBookmark API(String full_domain_name) may read a web bookmark from the web bookmark collection saved in the web bookmark storage unit 400. Then, such a method should return NULL.

The readWebBookmark API may include an argument, such as a full domain name Full_domain_name, but the present invention is not limited thereto.

The full domain name argument is an optional item and a browser may knows a current domain.

Hereinafter, a web bookmark collection is described with reference to FIGS. 76 to 79 according to an embodiment of the present invention. The web bookmark collection may further include FIGS. 73 and 75 in addition to FIGS. 76 to 79.

FIGS. 76 to 79 illustrate a web bookmark collection according to an embodiment of the present invention.

According to an embodiment of the present invention, the web bookmark collection may be designed by using Annex K. ECMAScript Convention of OIPF.

As shown in FIG. 76, the properties of the web bookmark collection may include the number of web bookmark items included in the web bookmark collection. The count information of the web book mark item is readonly and includes the length of an integer value.

As shown in FIG. 77, a WebBookmarkCollection is a collection of Web bookmarks, ordered by time, channel number, title and any categories of bookmark(e.g., bookmark type, content delivery, commercials, . . . ), but the present invention is not limited thereto.

As shown in FIG. 78, the web bookmark collection may further include a removeWebBookmark API in addition to the above mentioned addBookmark API and readWebBookmark API. The removeWebBookmark API may mean an API for deleting a web bookmark from a web bookmark collection such as a web bookmark storage list. If the Web Bookmark cannot be removed (e.g. because the value given for time lies outside of the length of the recording). This method SHALL return null.)

The removeWebBookmark API may include a web bookmark argument but the present invention is not limited thereto.

The web bookmark argument webBookmark indicates a web bookmark item deleted from a web bookmark collection.

FIG. 79 is a view illustrating a structure of web bookmark service data of a web bookmark collection according to an embodiment of the present invention.

A data structure configuring web bookmark service may include a channel number field, a channel name field, a web bookmark title field, a web bookmark setting time, a web bookmark effective time field, a web bookmark expiration time field, a web bookmark location field, and a thumbnail location field.

The channel number field Channel Number indicates a channel number at the web bookmark setting time. The channel number field may be expressed in a string type, for example, the format of "6-1".

The channel name field Channel name indicates a channel name at the web bookmark setting time. The channel name field may be expressed in a string type, for example, the format of "ABC".

The web bookmark title field Title indicates the title or title information of a web bookmark item. The web bookmark title field may be expressed in a string type, for example, the format of "CSI Miami".

The web bookmark setting time field Time indicates a time at which a web bookmark is set. The web bookmark setting time field may be expressed in a Date and Time type, for example, the format of "2012.08.01 13:10".

The web bookmark valid time field Valid Time indicates a time at which a web bookmark item is available. The web bookmark valid time field may be expressed in a Date and Time type, for example, the format of "2012.08.02 12:00:00".

The web bookmark expiration time field Expiry Time indicates a time at which a web bookmark item is deletable. The web bookmark expiration time may indicate a time at which a web bookmark item is deletable from the web bookmark storage unit 400 automatically. The web bookmark expiration time field may be expressed in a Date and Time type, for example, the format of "2014.04.05 12:00".

The web bookmark location field Location indicates the URL where a web bookmark item is saved. The web bookmark location field may be used later to find the location of a place where a web bookmark item is saved through a user input. The web bookmark location field may be expressed in a URL type, for example, the format of "http://cnn.com/accident/update".

The thumbnail location field Thumbnail indicates the URL where a thumbnail obtained by capturing a scene of main AV content during web bookmark setting. When displaying a web bookmark storage list on a screen, the receiver may use a thumbnail according to a thumbnail location field. The thumbnail location field may be expressed in a URL type, for example, the format of "http://cnn.com/accident/update_thumbnail.jpg".

Additionally, according to another embodiment of the present invention, the web bookmark collection described with reference to FIG. 79 may be included in an Evnet element extractable from a TDO XML file. As described above, the receiver may extract a TPT server address from an URIString of iTV message included in a transmitted trigger and may receive a TDO XML file by using the TPT server address, and after transmitting an Event element including the web bookmark collection by extracting the event element in the TDO XML file, may display that there is web bookmark service, so that even when there is no web bookmark service data included, the receiver may provide web bookmark service.

Figure 80:
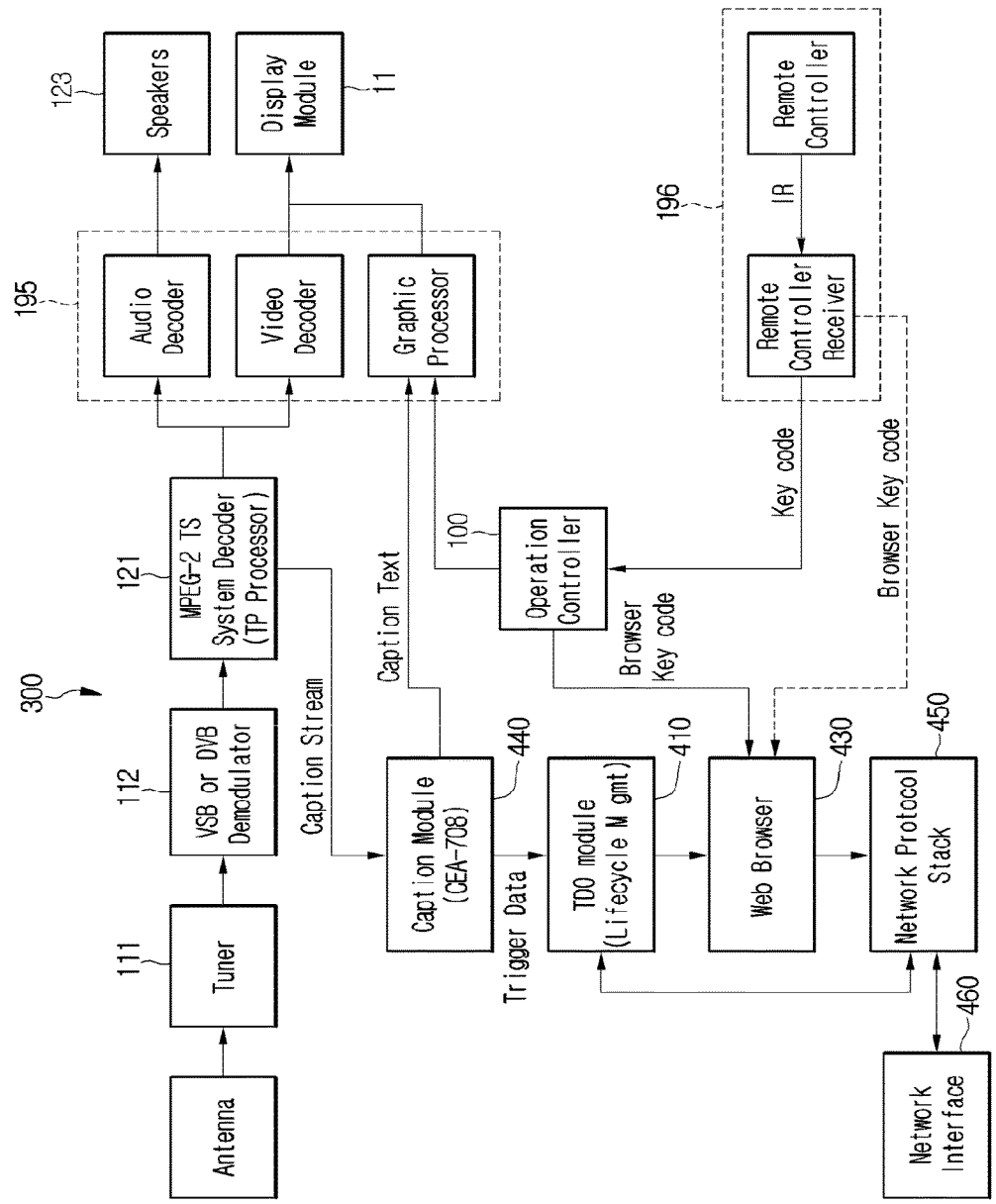
FIG. 80 is a view illustrating a structure of a receiver processing web bookmark service according to another embodiment of the present invention.

FIG. 80 is a view illustrating a structure of a receiver processing web bookmark service according to another embodiment of the present invention. The receiver shown in FIG. 80 further comprises a web browser 430, a caption module 440, a network protocol stack module 450, and a network interface 460, compared to the receiver shown in FIG. 70. Hereinafter, a description of the same configuration of the receiver described with reference to FIG. 70 is omitted.

As shown in FIG. 80, when a web bookmark service trigger is included in the DTV-CC of a transport stream, the MPEG-2 TP handler 121 may extract a caption stream from the transport stream. The caption module 440 may extract triggering data from the caption stream transmitted from the MPEG-2 TP handler 121 and may transmit the extracted triggering data to the TDO module 410.

The TDO module 410 may directly access data included in the triggering data. As described above, the triggering data may include triggering data according to a data property of the Event element described with reference to FIG. 62. The TDO module 410 may receive triggering data according to an operation of a TDO and may obtain data necessary for displaying a web bookmark through the data included in the Data element. The TDO module 410 may manage web bookmark service by saving or deleting web bookmark data in or from the web bookmark module 420 by using the above-mentioned APIs according to a user selection.

Or, when the trigger processing unit 330a obtains data necessary for displaying a web bookmark through the data included in the Data element, a TDO may be executed by the TDO module 410 and the web bookmark module 420 may manage web bookmark items.

Or, when the TDO module 410 receives data from a server by using a direct XMLHTTPRequest command without using the Data element, the above-mentioned APIs may be used. When the TDO module 410 processes data by using APIs, information such as a web bookmark item is saved in the receiver 300.

Figure 81:
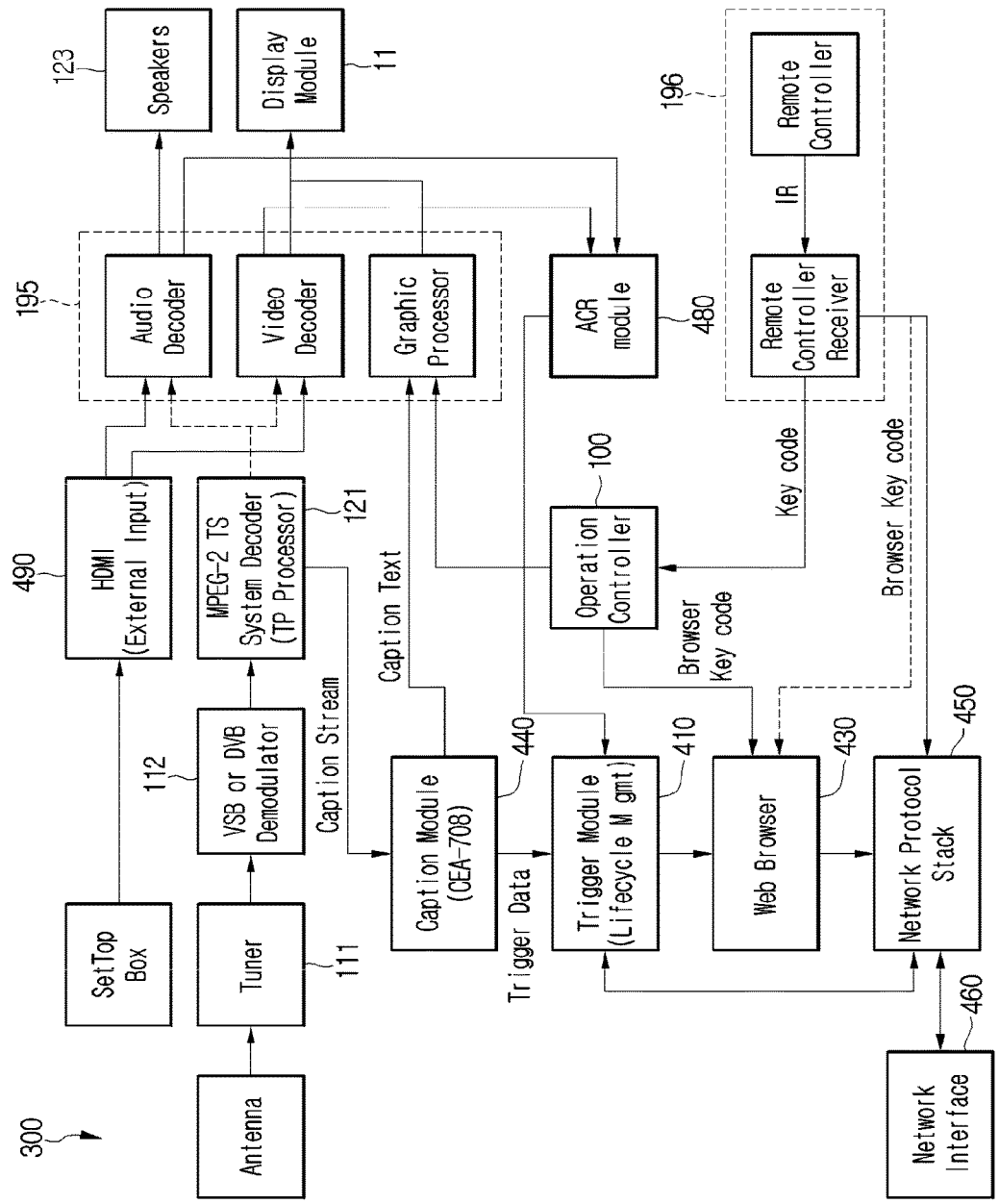
FIG. 81 is a view illustrating a structure of a receiver processing web bookmark service according to an embodiment of the present invention.

FIG. 81 is a view illustrating a structure of a receiver processing web bookmark service according to an embodiment of the present invention. The receiver shown in FIG. 81 further includes an ACR module 480 and an external input unit 490 compared to the receiver shown in FIG. 80. Hereinafter, a description of the same configuration of the receiver described with reference to FIG. 81 is omitted.

When video data and audio data are transmitted by an external input, for example, by a SetTop Box, the external input 490 such as HDMI receives triggering data. The external input unit 490 may transmit video data and audio data to the presentation manager 195. When video data and audio data are transmitted by an external input, triggering data is not included in a transport stream, especially, the DTV-CC, and not transmitted.

The ACR module 480 may extract signature information such as characteristic information of a video screen in execution currently from the presentation manager 195 and may then transmit the extracted signature information to a predetermined ACR server. The ACR module 480 may recognize a channel in execution currently by receiving current channel information corresponding to the signature information from an ACR server. Moreover, the ACR module 480 may obtain URI information such as the data described with reference to FIGS. 60 to 62 or TPT information identical or similar thereto by using the data transmitted from the ACR server. In such a manner, the TDO module 410 of the receiver 300 may receive and then process a web bookmark service trigger and TDO information relating to web bookmark service execution by using an ACR technique. The ACR technique will be described in more detail below.

Hereinafter, a network topology is described with reference to FIGS. 82 to 90 according to an embodiment of the present invention.

Figure 82:
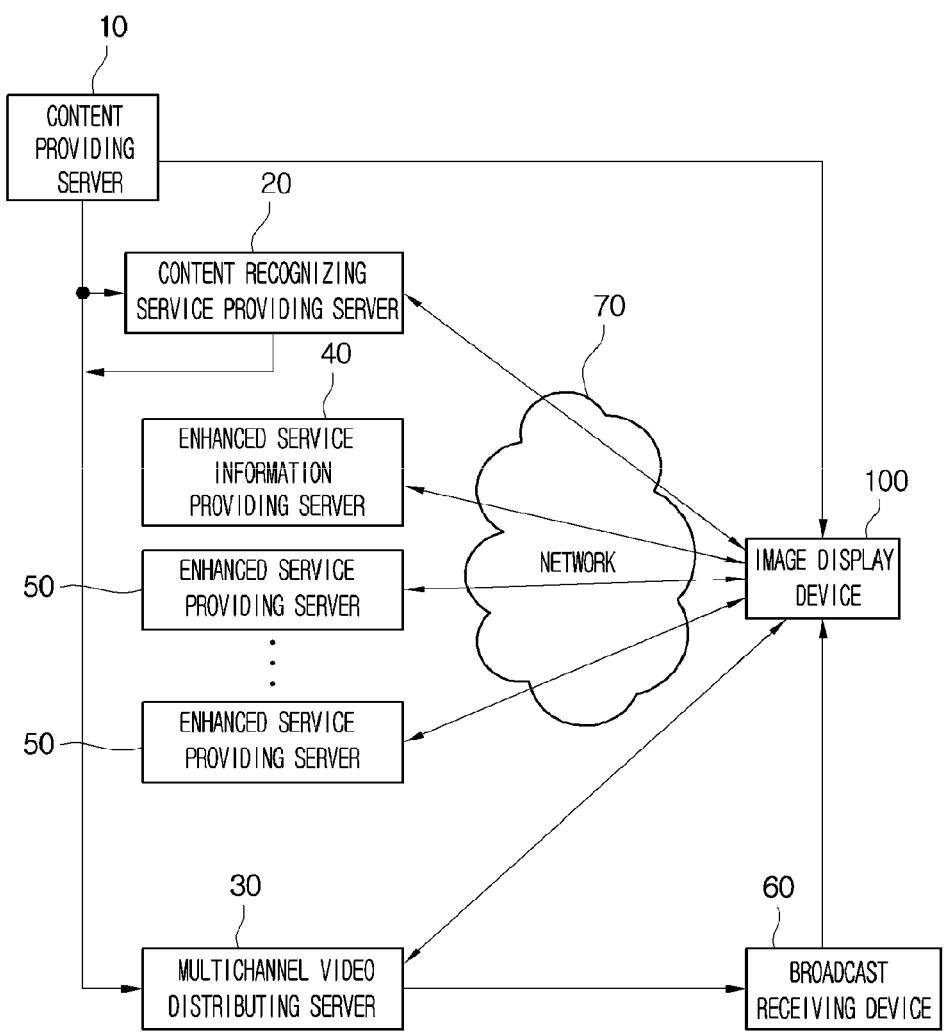
FIG. 82 is a block diagram illustrating the network topology according to the embodiment.

FIG. 82 is a block diagram illustrating the network topology according to the embodiment.

As shown in FIG. 82, the network topology includes a content providing server 10, a content recognizing service providing server 20, a multi channel video distributing server 30, an enhanced service information providing server 40, a plurality of enhanced service providing servers 50, a broadcast receiving device 60, a network 70, and a video display device 500.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, additional data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 500 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts feature information from some frames or audio samples of the main audio-visual content and saves it. This feature information is called signature.

The multi channel video distributing server 30 receives and multiplexes broadcast signals from a plurality of broadcasting stations and provides the multiplexed broadcast signals to the broadcast receiving device 60. Especially, the multi channel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multi channel video distributing server 30 may exclude the extracted enhanced service or may add another enhanced service, a broadcasting station may not provide services led by it. There may be at least one multi channel video distributing server.

The broadcasting device 60 may tune a channel selected by a user and receives a signal of the tuned channel, and then, performs demodulation and channel decoding on the received signal to extract a main audio-visual content. The broadcasting device 60 decodes the extracted main audio-visual content through H.264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main AV content to the video display device 500 through its external input port.

The enhanced service information providing server 40 provides enhanced service information on at least one available enhanced service relating to a main AV content in response to a request of a video display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main AV content in response to a request of a video display device. There may be at least one enhanced service providing server.

The video display device 500 may be a television, a notebook computer, a hand phone, and a smart phone, each including a display unit. The video display device 500 may receive an uncompressed main AV content from the broadcast receiving device 60 or a broadcast signal including an encoded main AV content from the contents providing server 10 or the multi channel video distributing server 30. The video display device 500 may receive a content recognizing service from the content recognizing service providing server 20 through the network 70, an address of at least one available enhanced service relating to a main AV content from the enhanced service information providing server 40 through the network 70, and at least one available enhanced service relating to a main AV content from the enhanced service providing server 50.

At least two of the content providing server 10, the content recognizing service providing server 20, the multi channel video distributing server 30, the enhanced service information providing server 40, and the plurality of enhanced service providing servers 50 may be combined in a form of one server and may be operated by one provider.

Figure 83:
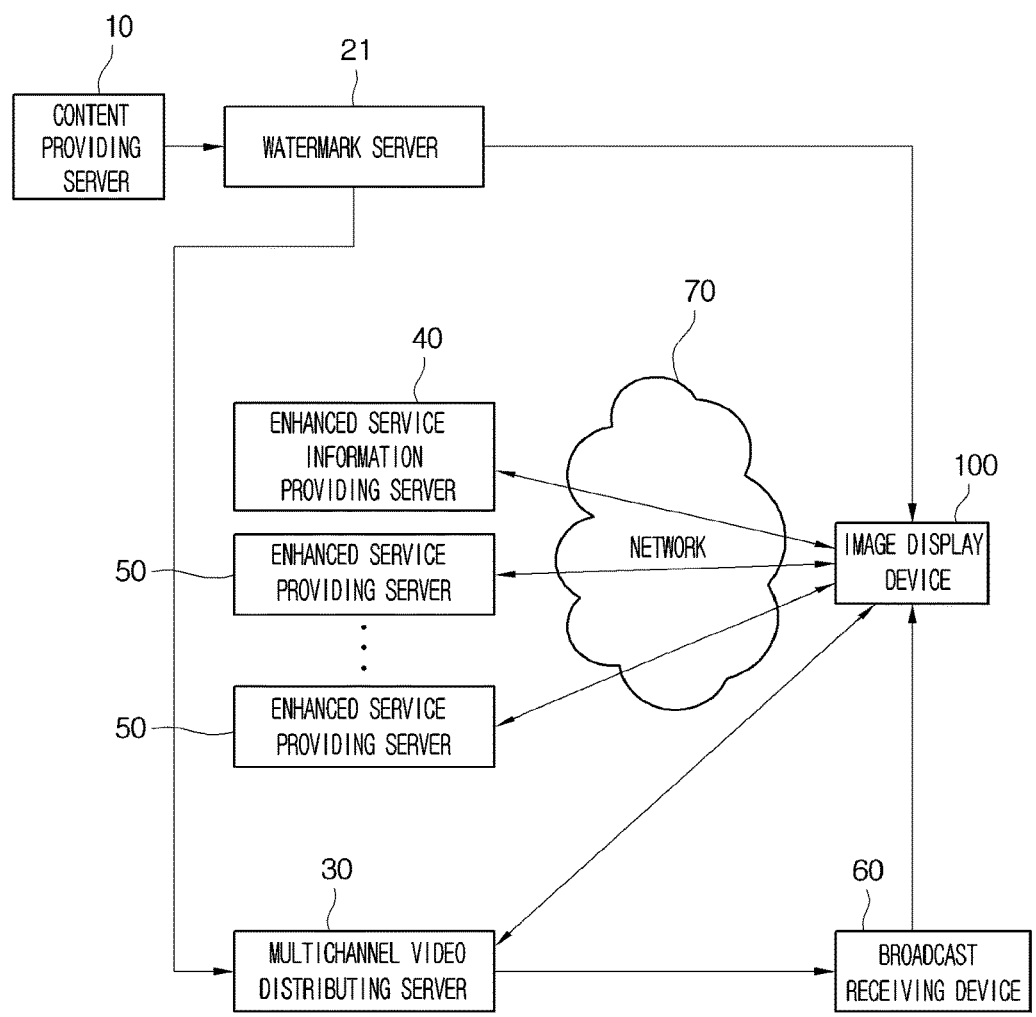
FIG. 83 is a block diagram illustrating a watermark based network topology according to an embodiment.

FIG. 83 is a block diagram illustrating a watermark based network topology according to an embodiment.

As shown in FIG. 83, the watermark based network topology may further include a watermark server 21.

As shown in FIG. 83, the watermark server 21 edits a main AV content to insert content information into it. The multi channel video distributing server 30 may receive and distribute a broadcast signal including the modified main AV content. Especially, a watermark server may use a digital watermarking technique described below.

A digital watermark is a process for inserting information, which may be almost undeletable, into a digital signal. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include additional information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

Figure 84:
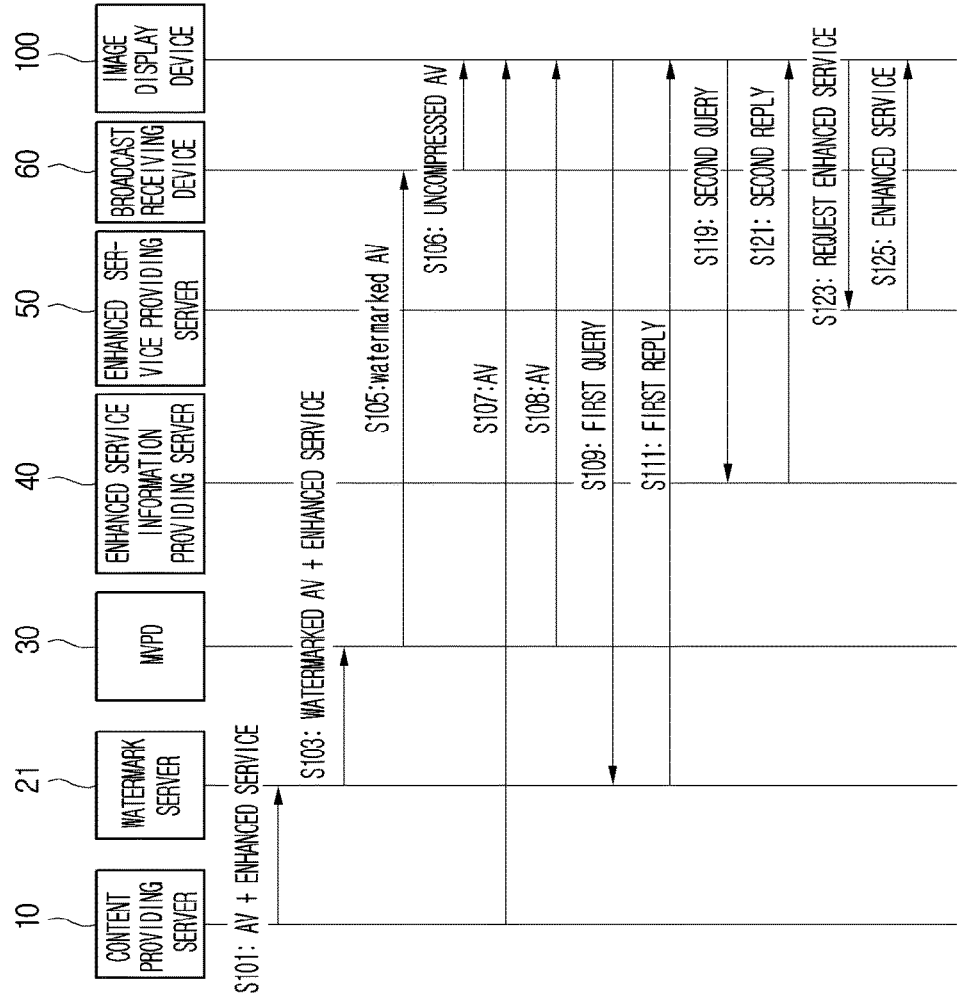
FIG. 84 is a ladder diagram illustrating a data flow in a watermark based network topology according to an embodiment.

FIG. 84 is a ladder diagram illustrating a data flow in a watermark based network topology according to an embodiment.

First, the content providing server 10 transmits a broadcast signal including a main AV content and an enhanced service in operation S101.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S103.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main AV content, main AV content identification information, time information of a content section used in content information acquisition, names of channels through which main AV content is broadcasted, logos of channels through which main AV content is broadcasted, descriptions of channels through which main AV content is broadcasted, a usage information reporting period, the minimum usage time for usage information acquisition, and available enhanced service information relating to main AV content.

If the video display device 500 uses a watermark to acquire content information, the time information of a content section used for content information acquisition may be the time information of a content section into which a watermark used is embedded. If the video display device 500 uses a fingerprint to acquire content information, the time information of a content section used for content information acquisition may be the time information of a content section where feature information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main AV content watching information reporting address and an enhanced service usage information reporting address. The usage information reporting period may include at least one of a main AV content watching information reporting period and an enhanced service usage information reporting period. A minimum usage time for usage information acquisition may include at least one of a minimum watching time for a main AV content watching information acquisition and a minimum usage time for enhanced service usage information extraction.

On the basis that a main AV content is watched for more than the minimum watching time, the video display device 500 acquires watching information of the main AV content and reports the acquired watching information to the main AV content watching information reporting address in the main AV content watching information reporting period.

On the basis that an enhanced service is used for more than the minimum usage time, the video display device 500 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with IP or Advanced Television Systems Committee-Mobile/Handheld (ATSC M/H). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main AV content.

For example, the watermark server 21 may insert a barcode at a predetermined position of a logo. At this point, the predetermined position of the logo may correspond to the first line at the bottom of an area where the logo is displayed. The video display device 500 may not display a barcode when receiving a main AV content including a logo with the barcode inserted.

For example, the watermark server 21 may insert a barcode at a predetermined position of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main AV content and enhanced service and generates a multiplexed signal to provide it to the broadcast receiving device 60 in operation S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 500 in operation S106.

Moreover, the content providing server 10 also broadcasts a broadcast signal including a main AV content through a wireless channel in operation S107.

Additionally, the MVPD 30 may directly transmit a broadcast signal including a main AV content to the video display device 500 without going through the broadcast receiving device 60 in operation S108.

The video display device 500 may receive an uncompressed main AV content through the broadcast receiving device 60. Additionally, the video display device 500 may receive a broadcast signal through a wireless channel, and then, may demodulate and decode the received broadcast signal to obtain a main AV content. Additionally, the video display device 500 may receive a broadcast signal from the MVPD 30, and then, may demodulate and decode the received broadcast signal to obtain a main AV content. The video display device 500 extracts watermark information from some frames or a section of audio samples of the obtained main AV content. If watermark information corresponds to a logo, the video display device 500 confirms a watermark server address corresponding to a logo extracted from a corresponding relationship between a plurality of logos and a plurality of watermark server addresses. When the watermark information corresponds to the logo, the video display device 500 cannot identify the main AV content only with the logo. Additionally, when the watermark information does not include content information, the video display device 500 cannot identify the main AV content but the watermark information may include content provider identifying information or a watermark server address. When the watermark information includes the content provider identifying information, the video display device 500 may confirm a watermark server address corresponding to the content provider identifying information extracted from a corresponding relationship between a plurality of content provider identifying information and a plurality of watermark server addresses. In this manner, when the video display device 500 cannot identify a main AV content the video display device 500 only with the watermark information, it accesses the watermark server 21 corresponding to the obtained watermark server address to transmit a first query in operation S109.

The watermark server 21 provides a first reply to the first query in operation S511. The first reply may include at least one of content information, enhanced service information, and an available enhanced service.

If the watermark information and the first reply do not include an enhanced service address, the video display device 500 cannot obtain enhanced service. However, the watermark information and the first reply may include an enhanced service address providing server address. In this manner, the video display device 500 does not obtain a service address or enhanced service through the watermark information and the first reply. If the video display device 500 obtains an enhanced service address providing server address, it accesses the enhanced service information providing server 40 corresponding to the obtained enhanced service address providing server address to transmit a second query including content information in operation S119.

The enhanced service information providing server 40 searches at least one available enhanced service relating to the content information of the second query. Later, the enhanced service information providing server 40 provides to the video display device 500 enhanced service information for at least one available enhanced service as a second reply to the second query in operation S121.

If the video display device 500 obtains at least one available enhanced service address through the watermark information, the first reply, or the second reply, it accesses the at least one available enhanced service address to request enhanced service in operation S123, and then, obtains the enhanced service in operation S125.

Figure 85:
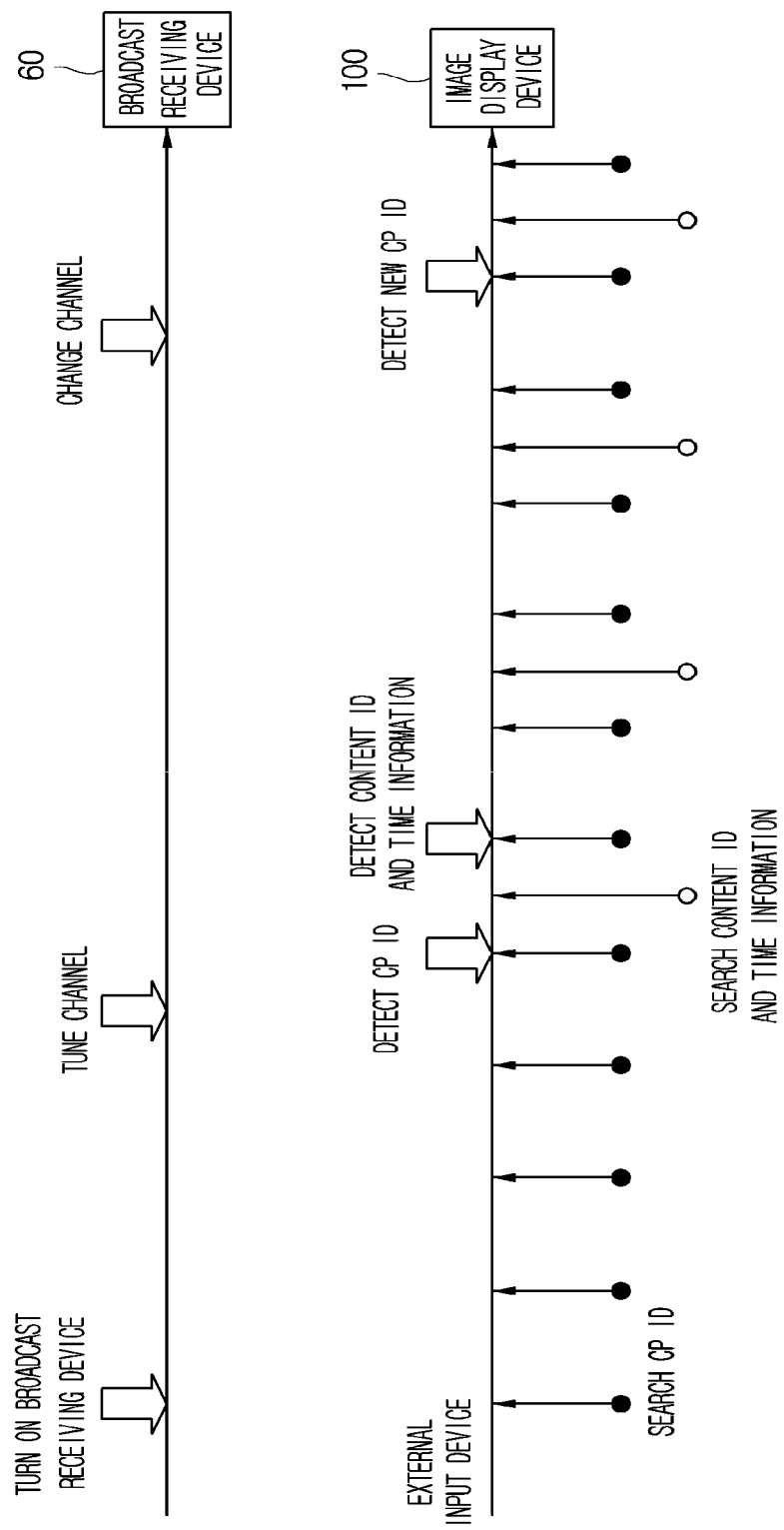
FIG. 85 is view illustrating a watermark based content recognition timing according to an embodiment.

FIG. 85 is a view illustrating a watermark based content recognition timing according to an embodiment.

As shown in FIG. 85, when the broadcast receiving device 60 is turned on and tunes a channel, and also, the video display device 500 receives a main AV content of the turned channel from the broadcast receiving device 60 through an external input port 511, the video display device 500 may sense a content provider identifier (or a broadcasting station identifier) from the watermark of the main AV content. Then, the video display device 500 may sense content information from the watermark of the main AV content on the basis of the sensed content provider identifier.

At this point, as shown in FIG. 85, the detection available period of the content provider identifier may be different from that of the content information. Especially, the detection available period of the content provider identifier may be shorter than that of the content information. Through this, the video display device 500 may have an efficient configuration for detecting only necessary information.

Figure 86:
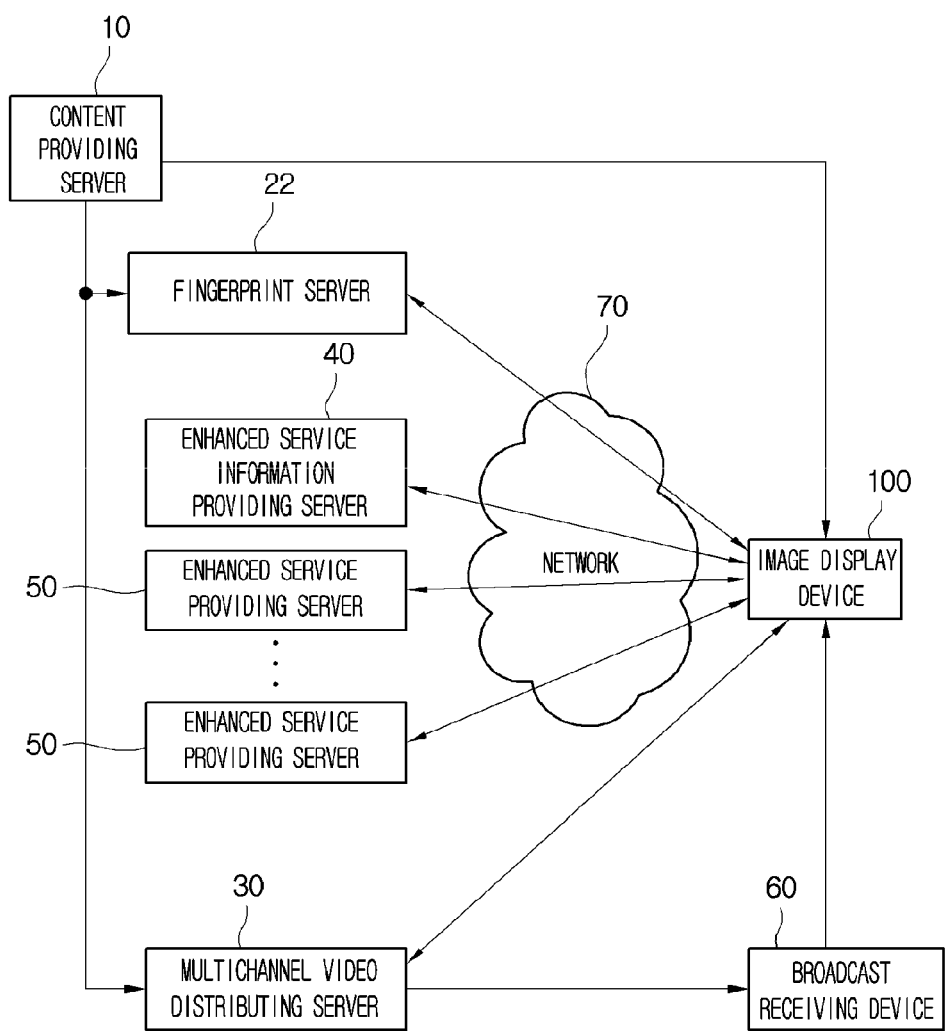
FIG. 86 is a block diagram illustrating a fingerprint based network topology according to an embodiment.

FIG. 86 is a block diagram illustrating a fingerprint based network topology according to an embodiment.

As shown in FIG. 86, the network topology may further include a fingerprint server 22.

As shown in FIG. 86, the fingerprint server 22 does not edit a main AV content, but extracts feature information from some frames or a section of audio samples of the main AV content and saves the extracted feature information. Then, when receiving the feature information from the video display device 500, the fingerprint server 22 provides an identifier and time information of an AV content corresponding to the received feature information.

Figure 87:
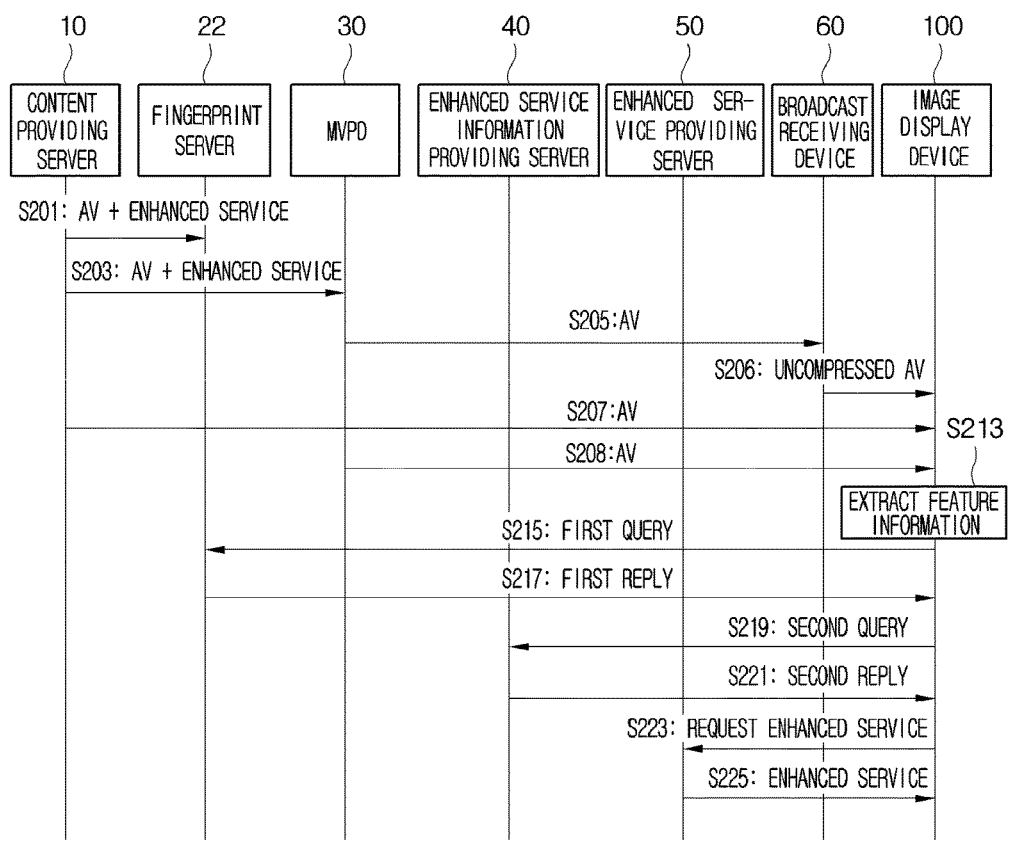
FIG. 87 is a ladder diagram illustrating a data flow in a fingerprint based network topology according to an embodiment.

FIG. 87 is a ladder diagram illustrating a data flow in a fingerprint based network topology according to an embodiment.

First, the content providing server 10 transmits a broadcast signal including a main AV content and an enhanced service in operation S201.

The fingerprint server 22 receives a broadcast signal that the content providing server 10, extracts a plurality of pieces of feature information from a plurality of frame sections or a plurality of audio sections of the main AV content, and establishes a database for a plurality of query results corresponding to the plurality of feature information in operation S203. The query result may include at least one of content information, enhanced service information, and an available enhanced service.

The MVPD 30 receives broadcast signals including a main AV content and enhanced service and generates a multiplexed signal to provide it to the broadcast receiving device 60 in operation S205. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 500 in operation S206.

Moreover, the content providing server 10 also broadcasts a broadcast signal including a main AV content through a wireless channel in operation S207.

Additionally, the MVPD 30 may directly transmit a broadcast signal including a main AV content to the video display device 500 without going through the broadcast receiving device 60.

The video display device 500 may receive an uncompressed main AV content through the broadcast receiving device 60. Additionally, the video display device 500 may receive a broadcast signal through a wireless channel, and then, may demodulate and decode the received broadcast signal to obtain a main AV content. Additionally, the video display device 500 may receive a broadcast signal from the MVPD 30, and then, may demodulate and decode the received broadcast signal to obtain a main AV content. The video display device 500 extracts feature information from some frames or a section of audio samples of the obtained main AV content in operation S213.

The video display device 500 accesses the fingerprint server 22 corresponding to the predetermined fingerprint server address to transmit a first query including the extracted feature information in operation S215.

The fingerprint server 22 provides a query result as a first reply to the first query in operation S217. If the first reply corresponds to fail, the video display device 500 accesses the fingerprint server 22 corresponding to another fingerprint server address to transmit a first query including the extracted feature information.

The fingerprint server 22 may provide Extensible Markup Language (XML) document as a query result. Examples of the XML document containing a query result will be described with reference to FIG. 88 and Table 4.

Figure 88:
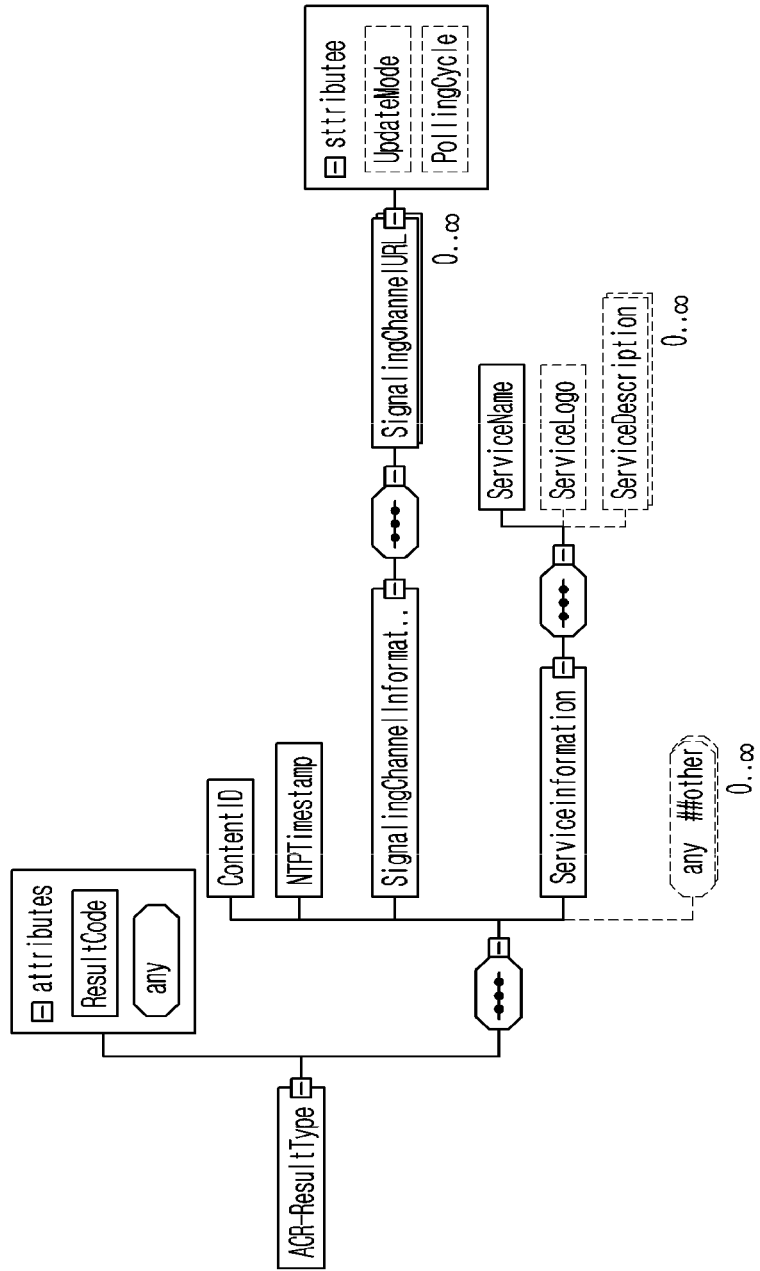
FIG. 88 is a view illustrating an XML schema diagram of ACR-Resulttype containing a query result according to an embodiment.

FIG. 88 is a view illustrating an XML schema diagram of ACR-Resulttype containing a query result according to an embodiment.

As shown in FIG. 88, ACR-Resulttype containing a query result includes ResultCode attributes and ContentID, NTP-Timestamp, SignalingChannelInformation, and ServiceInformation elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value.

The ServiceInformation element includes ServiceName, ServiceLogo, and ServiceDescription elements.

Table 4 illustrates an XML schema of ACR-ResultType containing the query result.

TABLE 4

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL" maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle" type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
            <xs:complexType>
                <xs:sequence>
                    <xs:element name="ServiceName" type="xs:string"/>
                    <xs:element name="ServiceLogo" type="xs:anyURI" minOccurs="0"/>
                    <xs:element name="ServiceDescription" type="xs:string" minOccurs="0"
                            maxOccurs="unbounded"/>
                </xs:sequence>
            </xs:complexType>
        </xs:element>
```

TABLE 4-continued

```
      <xs:any namespace="##other" processContents="skip" minOccurs="0"
maxOccurs="unbounded"/>
      </xs:sequence>
      <xs:attribute name="ResultCode" type="xs:string" use="required"/>
      <xs:anyAttribute processContents="skip"/>
   </xs:complexType>
```

As the ContentID element, an ATSC content identifier may be used as shown in Table 5.

TABLE 5

| Syntax | The Number of bits | format |
|---|---|---|
| ATSC_content_identifier( ) { | | |
| TSID | 16 | uimsbf |
| reserved | 2 | bslbf |
| end_of_day | 5 | uimsbf |
| unique_for | 9 | uimsbf |
| content_id | var | |
| } | | |

As shown in Table 5, the ATSC content identifier has a structure including TSID and a house number.

The 16 bit unsigned integer TSID carries a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content identifier. The video display device 500 reduces unique_for by 1 in a corresponding time to end_of_day daily and presumes that content_id is unique if unique_for is not 0.

Moreover, as the ContentID element, a global service identifier for ATSC-M/H service may be used as described below.

The global service identifier has the following form.
urn:oma:bcast:iauth:atsc:service:<region>:<xsid>:<serviceid>

Here, <region> is an international country code including two characters regulated by ISO 639-2. <xsid> for local service is a decimal number of TSID as defined in <region>, and <xsid> (regional service) (major>69) is "0". <serviceid> is defined with <major> or <minor>. <major> represent a Major Channel number, and <minor> represents a Minor Channel Number.

Examples of the global service identifier are as follows.
urn:oma:bcast:iauth:atsc:service:us:1234:5.1
urn:oma:bcast:iauth:atsc:service:us:0:500.200

Moreover, as the ContentID element, an ATSC content identifier may be used as described below.

The ATSC content identifier has the following form.
urn:oma:bcast:iauth:atsc:content:<region>:<xsidz>:<contentid>:<unique_for>:<end_of_day>

Here, <region> is an international country code including two characters regulated by ISO 639-2. <xsid> for local service is a decimal number of TSID as defined in <region>, and may be followed by "."<serviceid>. <xsid> for (regional service) (major>69) is <serviceid>. <content_id> is a base64 sign of a content_id field defined in Table 5, <unique_for> is a decimal number sign of an unique_for field defined in Table 5, and <end_of_day> is a decimal number sign of an end_of_day field defined in Table 2.

Hereinafter, FIG. 87 is described again.

If the query result does not include an enhanced service address or enhanced service but includes an enhanced service address providing server address, the video display device 500 accesses the enhanced service information providing server 40 corresponding to the obtained enhanced service address providing server address to transmit a second query including content information in operation S219.

The enhanced service information providing server 40 searches at least one available enhanced service relating to the content information of the second query. Later, the enhanced service information providing server 40 provides to the video display device 500 enhanced service information for at least one available enhanced service as a second reply to the second query in operation S221.

If the video display device 500 obtains at least one available enhanced service address through the first reply or the second reply, it accesses the at least one available enhanced service address to request enhanced service in operation S223, and then, obtains the enhanced service in operation S225.

When the UpdateMode attribute has a Pull value, the video display device 500 transmits an HTTP request to the enhanced service providing server 50 through SignalingChannelURL and receives an HTTP reply including a PSIP binary stream from the enhanced service providing server 50 in response to the request. In this case, the video display device 500 may transmit the HTTP request according to a Polling period designated as the PollingCycle attribute. Additionally, the SignalingChannelURL element may have an update time attribute. In this case, the video display device 500 may transmit the HTTP request according to an update time designated as the update time attribute.

If the UpdateMode attribute has a Push value, the video display device 500 may receive update from a server asynchronously through XMLHTTPRequest API. After the video display device 500 transmits an asynchronous request to a server through XMLHTTPRequest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

Figure 89:
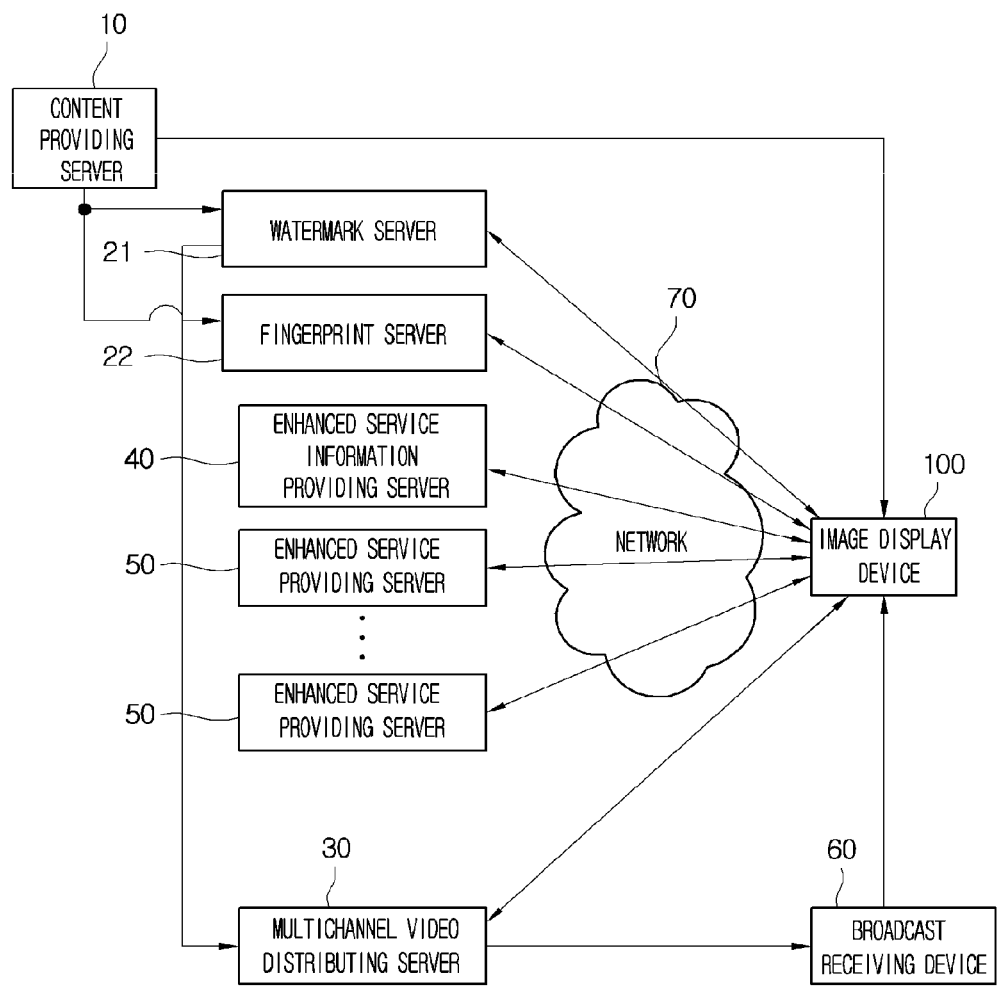
FIG. 89 is a block diagram illustrating a watermark and fingerprint based network topology according to an embodiment.

FIG. 89 is a block diagram illustrating a watermark and fingerprint based network topology according to an embodiment.

As shown in FIG. 89, the watermark and fingerprint based network topology may further include a watermark server 21 and a fingerprint server 22.

As shown in FIG. 89, the watermark server 21 inserts content provider identifying information into a main AV content. The watermark server 21 may insert content provider identifying information as a visible watermark such as a logo or an invisible watermark into a main AV content.

The fingerprint server 22 does not edit a main AV content, but extracts feature information from some frames or a certain section of audio samples of the main AV content and saves the extracted feature information. Then, when receiving the feature information from the video display device 500, the fingerprint server 22 provides an identifier and time information of an AV content corresponding to the received feature information.

Figure 90:
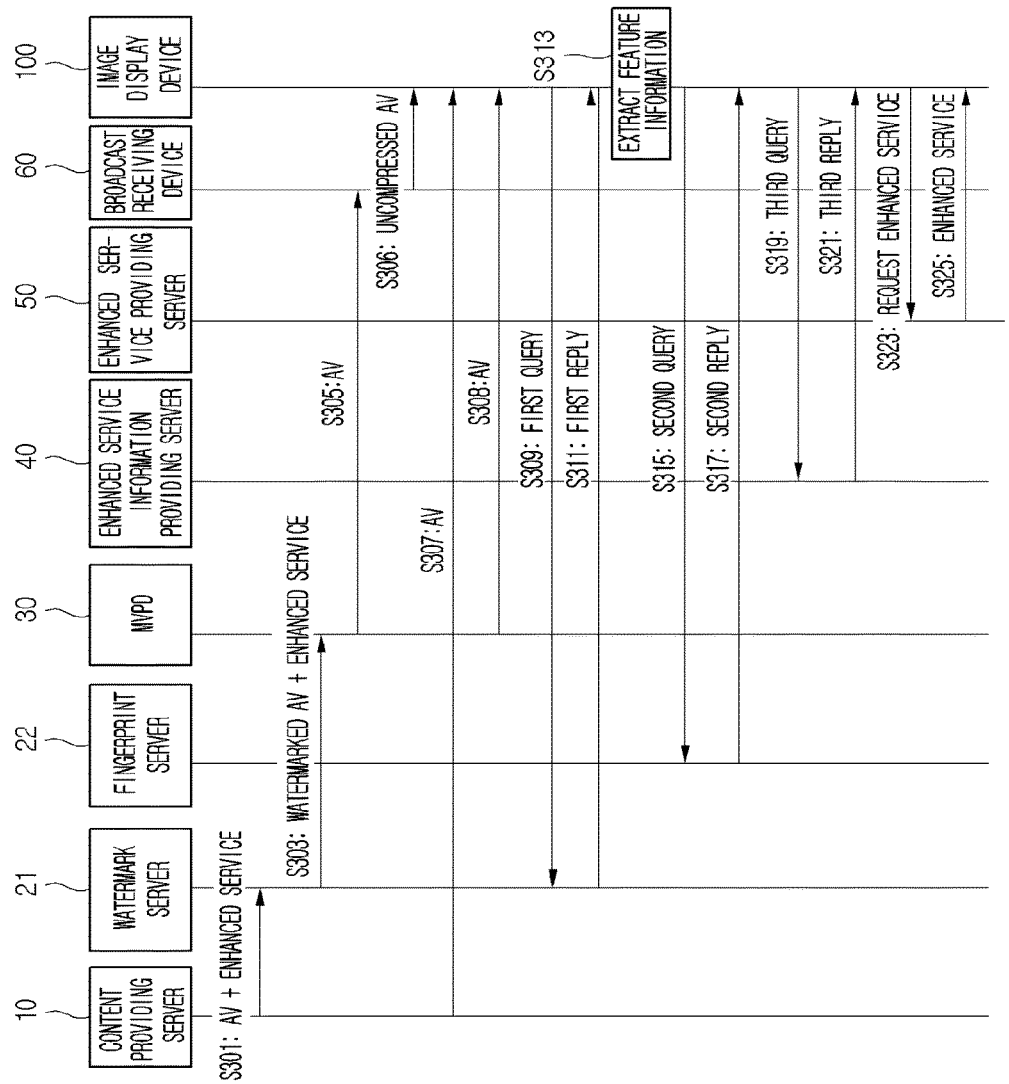
FIG. 90 is a ladder diagram illustrating a data flow in a watermark and fingerprint based network topology according to an embodiment.

FIG. 90 is a ladder diagram illustrating a data flow in a watermark and fingerprint based network topology according to an embodiment.

First, the content providing server 10 transmits a broadcast signal including a main AV content and an enhanced service in operation S301.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S303. The watermark information inserted through an invisible watermark may include at least one of content information, enhanced service information, and an available enhanced service. The content information and enhanced service information are described above.

The MVPD 30 receives broadcast signals including watermarked main AV content and enhanced service and generates a multiplexed signal to provide it to the broadcast receiving device 60 in operation S305. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 500 in operation S306.

Moreover, the content providing server 10 also broadcasts a broadcast signal including a main AV content through a wireless channel in operation S307.

Additionally, the MVPD 30 may directly transmit a broadcast signal including a main AV content to the video display device 500 without going through the broadcast receiving device 60 in operation S308.

The video display device 500 may receive an uncompressed main AV content through the broadcast receiving device 60. Additionally, the video display device 500 may receive a broadcast signal through a wireless channel, and then, may demodulate and decode the received broadcast signal to obtain a main AV content. Additionally, the video display device 500 may receive a broadcast signal from the MVPD 30, and then, may demodulate and decode the received broadcast signal to obtain a main AV content. The video display device 500 extracts watermark information from audio samples in some frames or periods of the obtained main AV content. If watermark information corresponds to a logo, the video display device 500 confirms a watermark server address corresponding to a logo extracted from a corresponding relationship between a plurality of logos and a plurality of watermark server addresses. When the watermark information corresponds to the logo, the video display device 500 cannot identify the main AV content only with the logo. Additionally, when the watermark information does not include content information, the video display device 500 cannot identify the main AV content but the watermark information may include content provider identifying information or a watermark server address. When the watermark information includes the content provider identifying information, the video display device 500 may confirm a watermark server address corresponding to the content provider identifying information extracted from a corresponding relationship between a plurality of content provider identifying information and a plurality of watermark server addresses. In this manner, when the video display device 500 cannot identify a main AV content the video display device 500 only with the watermark information, it accesses the watermark server 21 corresponding to the obtained watermark server address to transmit a first query in operation S309.

The watermark server 21 provides a first reply to the first query in operation S311. The first reply may include at least one of a fingerprint server address, content information, enhanced service information, and an available enhanced service. The content information and enhanced service information are described above.

If the watermark information and the first reply include a fingerprint server address, the video display device 500 extracts feature information from some frames or a certain section of audio samples of the main AV content in operation S313.

The video display device 500 accesses the fingerprint server 22 corresponding to the fingerprint server address in the first reply to transmit a second query including the extracted feature information in operation S315.

The fingerprint server 22 provides a query result as a second reply to the second query in operation S317.

If the query result does not include an enhanced service address or enhanced service but includes an enhanced service address providing server address, the video display device 500 accesses the enhanced service information providing server 40 corresponding to the obtained enhanced service address providing server address to transmit a third query including content information in operation S319.

The enhanced service information providing server 40 searches at least one available enhanced service relating to the content information of the third query. Later, the enhanced service information providing server 40 provides to the video display device 500 enhanced service information for at least one available enhanced service as a third reply to the third query in operation S321.

If the video display device 500 obtains at least one available enhanced service address through the first reply, the second reply, or the third reply, it accesses the at least one available enhanced service address to request enhanced service in operation S323, and then, obtains the enhanced service in operation S325.

Then, referring to FIGS. 91 and 18, the video display device 500 will be described according to an embodiment.

Figure 91:
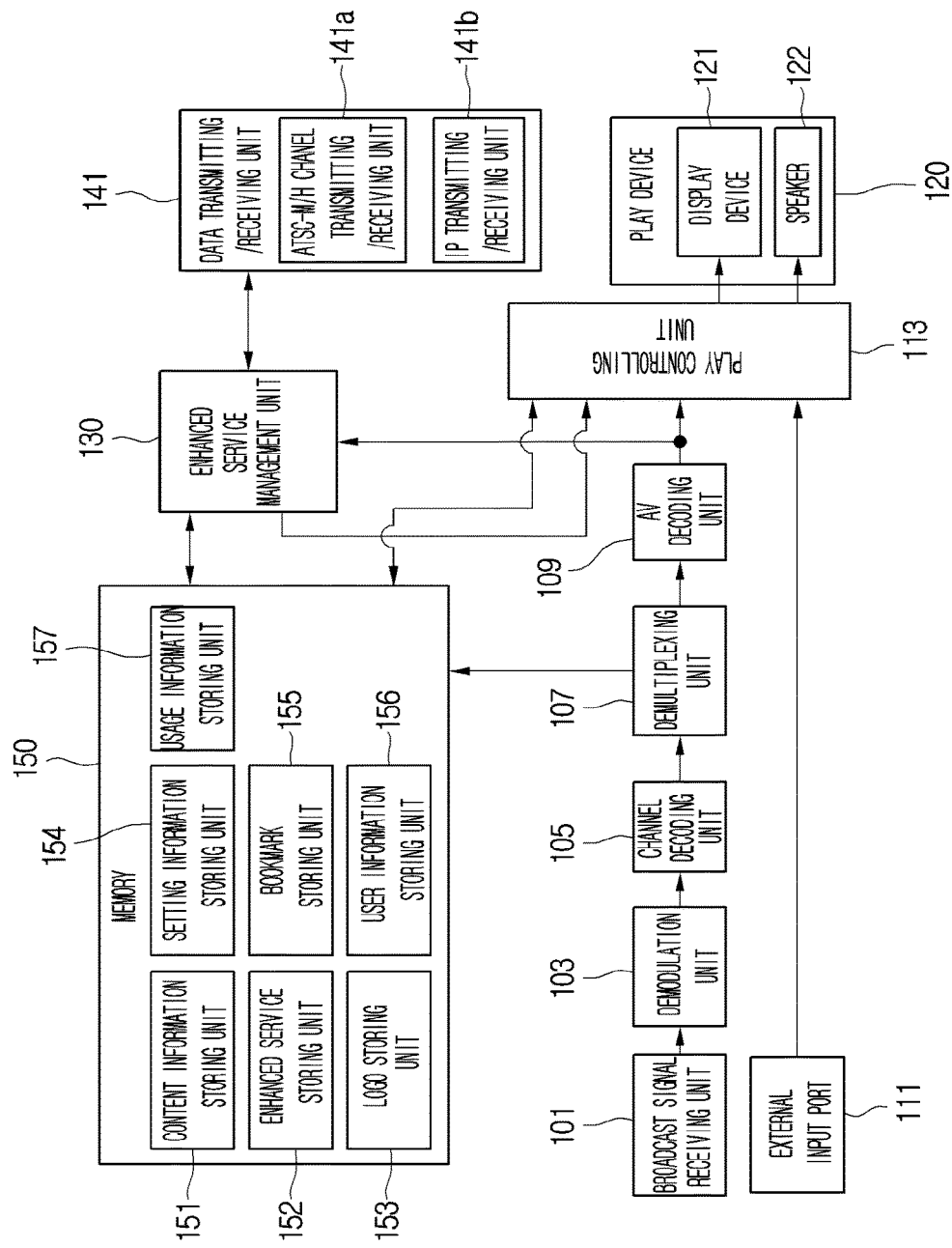
FIG. 91 is a block diagram illustrating the video display device according to the embodiment.

FIG. 91 is a block diagram illustrating the video display device according to the embodiment.

As shown in FIG. 91, the video display device 500 includes a broadcast signal receiving unit 501, a demodulation unit 503, a channel decoding unit 505, a demultiplexing unit 507, an AV decoding unit 509, an external input port 511, a play controlling unit 513, a play device 520, an enhanced service management unit 530, a data transmitting/receiving unit 541, and a memory 550.

The broadcast signal receiving unit 501 receives a broadcast signal from the content providing server 10 or MVPD 30.

The demodulation unit 503 demodulates the received broadcast signal to generate a demodulated signal.

The channel decoding unit 505 performs channel decoding on the demodulated signal to generate channel-decoded data.

The demultiplexing unit 507 separates a main AV content and enhanced service from the channel-decoded data.

The separated enhanced service is saved in an enhanced service storage unit 552.

The AV decoding unit 509 performs AV decoding on the separated main AV content to generate an uncompressed main AV content.

Moreover, the external input port 511 receives an uncompressed main AV content from the broadcast receiving device 60, a digital versatile disk (DVD) player, a Blu-ray disk player, and so on. The external input port 511 may include at least one of a DSUB port, a High Definition Multimedia Interface (HDMI) port, a Digital Visual Interface (DVI) port, a composite port, a component port, and an S-Video port.

The play controlling unit 513 controls the play device 520 to play at least one of an uncompressed main AV content that the AV decoding unit 509 generates and an uncompressed main AV content received from the external input port 511 according to a user's selection.

The play device 520 includes a display unit 521 and a speaker 523. The display unit 21 may include at least one of a liquid crystal display (LCD), a thin film transistor-liquid crystal display (TFT LCD), an organic light-emitting diode (OLED), a flexible display, and a 3D display.

The enhanced service management unit 530 obtains content information of the main AV content and obtains available enhanced service on the basis of the obtained content information. Especially, as described above, the enhanced service management unit 530 may obtain the identification information of the main AV content on the basis of some frames or a certain section of audio samples the uncompressed main AV content. This is called automatic contents recognition (ACR) in this specification.

The data transmitting/receiving unit 541 may include an Advanced Television Systems Committee-Mobile/Handheld (ATSC-M/H) channel transmitting/receiving unit 541a and an IP transmitting/receiving unit 541b.

The memory 550 may include at least one type of storage medium such as a flash memory type, a hard disk type, a multimedia card micro type, a card type memory such as SD or XD memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The video display device 500 may operate in linkage with a web storage performing a storage function of the memory 550 in the Internet.

The memory 550 may include a content information storage unit 551, an enhanced service storage unit 552, a logo storage unit 553, a setting information storage unit 554, a bookmark storage unit 555, a user information storage unit 556, and a usage information storage unit 557.

The content information storage unit 551 saves a plurality of content information corresponding to a plurality of feature information.

The enhanced service storage unit 552 may save a plurality of enhanced services corresponding to a plurality of feature information or a plurality of enhanced services corresponding to a plurality of content information.

The logo storage unit 553 saves a plurality of logos. Additionally, the logo storage unit 553 may further save content provider identifiers corresponding to the plurality of logos or watermark server addresses corresponding to the plurality of logos.

The setting information storage unit 554 saves setting information for ACR.

The bookmark storage unit 555 saves a plurality of bookmarks.

The user information storage unit 556 saves user information. The user information may include at least one of at least one account information for at least one service, regional information, family member information, preferred genre information, video display device information, and a usage information range. The at least one account information may include account information for a usage information measuring server and account information of social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once the usage information range is set, the video display device 500 collects and reports main AV content watching information and enhanced service usage information within the set range. The usage information range may be set in each virtual channel. Additionally, the usage information measurement allowable range may be set over an entire physical channel.

The usage information providing unit 557 saves the main AV content watching information and the enhanced service usage information, which are collected by the video display device 500. Additionally, the video display device 500 analyzes a service usage pattern on the basis of the collected main AV content watching information and enhanced service usage information, and saves the analyzed service usage pattern in the usage information storage unit 557.

The enhanced service management unit 530 may obtain the content information of the main AV content from the fingerprint server 22 or the content information storage unit 551. If there is no content information or sufficient content information, which corresponds to the extracted feature information, in the content information storage unit 551, the enhanced service management unit 530 may receive additional content information through the data transmitting/receiving unit 541. Moreover, the enhanced service management unit 530 may update the content information continuously.

The enhanced service management unit 530 may obtain available enhanced service from the enhanced service providing server 50 or the enhanced service storage unit 553. If there is no enhanced service or sufficient enhanced service in the enhanced service storage unit 553, the enhanced service management unit 530 may update enhanced service through the data transmitting/receiving unit 541. Moreover, the enhanced service management unit 530 may update the enhanced service continuously.

The enhanced service management unit 530 may extracts a logo from the main AV content, and then, may make a query to the logo storage unit 555 to obtain a content provider identifier or watermark server address, which is corresponds to the extracted logo. If there is no logo or a sufficient logo, which corresponds to the extracted logo, in the logo storage unit 555, the enhanced service management unit 530 may receive an additional logo through the data transmitting/receiving unit 541. Moreover, the enhanced service management unit 530 may update the logo continuously.

The enhanced service management unit 530 may compare the logo extracted from the main AV content with the plurality of logos in the logo storage unit 555 through various methods. The various methods may reduce the load of the comparison operation.

For example, the enhanced service management unit 530 may perform the comparison on the basis of color characteristics. That is, the enhanced service management unit 530 may compare the color characteristic of the extracted logo with the color characteristics of the logos in the logo storage unit 555 to determine whether they are identical or not.

Moreover, the enhanced service management unit 530 may perform the comparison on the basis of character recognition. That is, the enhanced service management unit 530 may compare the character recognized from the extracted logo with the characters recognized from the logos in the logo storage unit 555 to determine whether they are identical or not.

Furthermore, the enhanced service management unit 530 may perform the comparison on the basis of the contour of the logo. That is, the enhanced service management unit 530 may compare the contour of the extracted logo with the contours of the logos in the logo storage unit 555 to determine whether they are identical or not.

Hereinafter, referring to FIGS. 92 and 99, the enhanced service management unit 530 will be described according to various embodiments.

Figure 92:
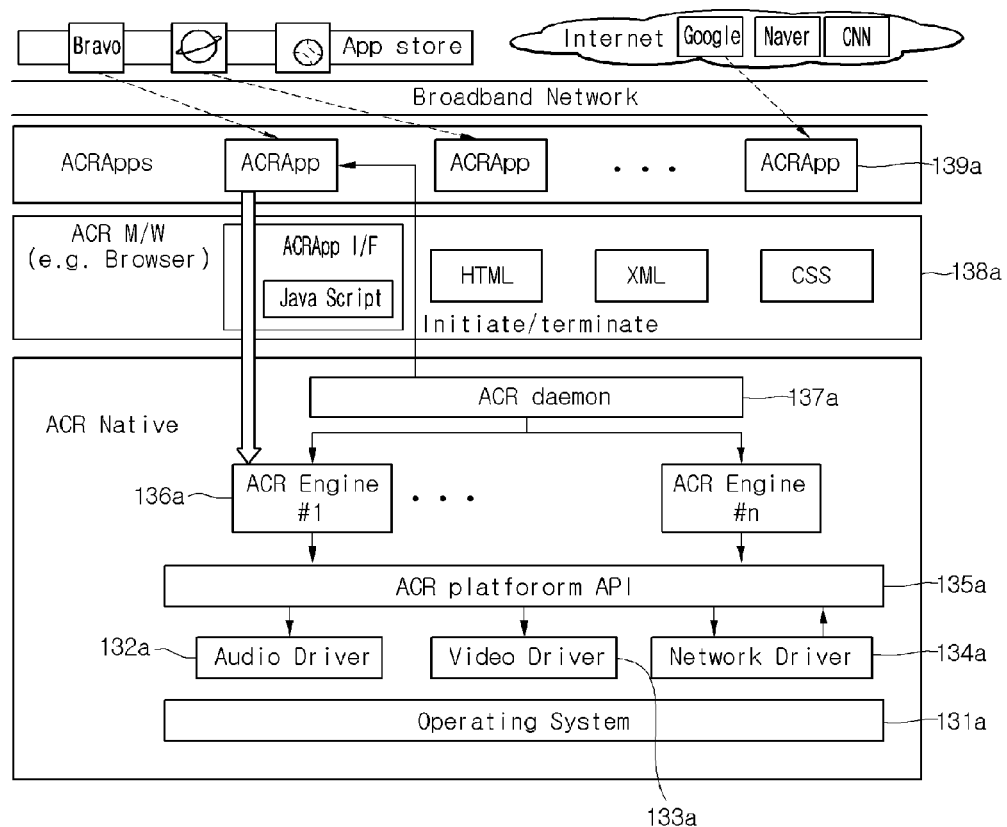
FIG. 92 is a hierarchy diagram of an enhanced service management unit according to an embodiment.

FIG. 92 is a hierarchy diagram of an enhanced service management unit according to an embodiment.

As shown in FIG. 92, the enhanced service management unit 530 may include an operating system 131*a*, an audio driver 132*a*, a video driver 133*a*, a network driver 134*a*, an ACR platform application program interface (API) 135*a*, at least one ACR engine 136*a*, an ACR daemon 137*a*, an ACR middleware 138*a*, and at least one ACR application 139*a*.

When the enhanced service management unit 530 is used as shown in FIG. 92, a user doesn't need to necessarily recognize a channel or content and an ACR operation may be performed always.

The enhanced service management unit 530 may access an application save through the data transmitting/receiving unit 541 to download application.

The audio driver 132*a* may access an audio buffer used for audio fingerprint or audio watermark.

The video driver 133*a* may access a video buffer used for video fingerprint or video watermark.

The network driver 134*a* allows the ACR engine 136*a* to access the data transmitting/receiving unit 541.

The platform API 135*a* provides API to allow the ACR engine 136*a* to access the audio driver 132*a*, the video driver 133*a*, and the network driver 134*a*.

Since a plurality of broadcasting stations or content providers use respectively different content recognizing services, the video display device 500 may include a plurality of ACR engines 136*a*. That is, the video display device 500 may include an ACR engine for at least one of a plurality of video watermark extraction algorithms, a plurality of audio watermark extraction algorithms, a plurality of video signature extraction algorithms, and a plurality of audio signature extraction algorithms. The watermark based ACR engine 136*a* may extract watermark information, and then, may obtain at least one of a watermark purpose, content information, enhanced service information, and an available enhanced service from the extracted watermark information.

The fingerprint based ACR engine 136*a* may extract feature information of a certain section of a main AV content, and then, may obtain at least one of content information, enhanced service information, and an available enhanced service on the basis of the extracted feature information.

The ACR daemon 137*a* manages at least one ACR engine 136*a*. The daemon is executed continuously to process a periodic service request. The daemon appropriately delivers the collected requests to allow another program to process them. The ACR daemon 137*a* may manage the execution and termination of the ACR engine 136*a*. The ACR daemon 137*a* searches an ACR engine matching to a current main AV content among a plurality of ACR engines 136*a*. Especially, if a system resource is consumed greatly because several ACR engines are executed, the ACR daemon 137*a* sequentially executes the plurality of ACR engines 136*a* one by one according to a specific rule or priority to confirm whether content recognition is successful. Additionally, if one of the plurality of ACR engines 136*a* is successful in content recognition, the ACR daemon 137*a* obtains and executes an ACR application 139*a* corresponding to an enhanced service for the recognized content. While the ACR engine 136*a* performs the content recognition successfully, if contents are not recognized any more due to a channel change, the ACR daemon 137*a* may terminate the ACR application 139*a*.

The ACR middleware 138*a* serves as a browser for at least one ACR application 139*a*.

The ACR application 139*a* may provide user experience enhanced by ACR to a user. The ACR application 139*a* may be an application downloaded from an application save or the Internet or may be a simple Uniform Resource Locator (URL). The ACR application 139*a* may provide content target advertisement, a content provider portal service, a program specific service such as electronic program guide (EPG), or a content provider specific service. While the ACR application 139*a* interact with the ACR engine 136*a* through the ACR application, it receives content information or signature from the ACR engine 136*a* and additionally obtains an enhanced service corresponding to the content information or signature to play them in the play device 520. For this, an ACR application interface that the ACR application 139*a* uses is shown in Table 6 below.

TABLE 6

|  | Name | description |
| --- | --- | --- |
| Method | String getContentID( ) | Return recognized content id, or undefined if content has not been recognized. |
|  | Date getTiming( ) | Return time stamp, or undefined if content has not been recognized or time stamp is unavailable. |
|  | String getSignature( ) | Return the signature captured, or undefined if capturing of the signature has failed. |

Figure 93:
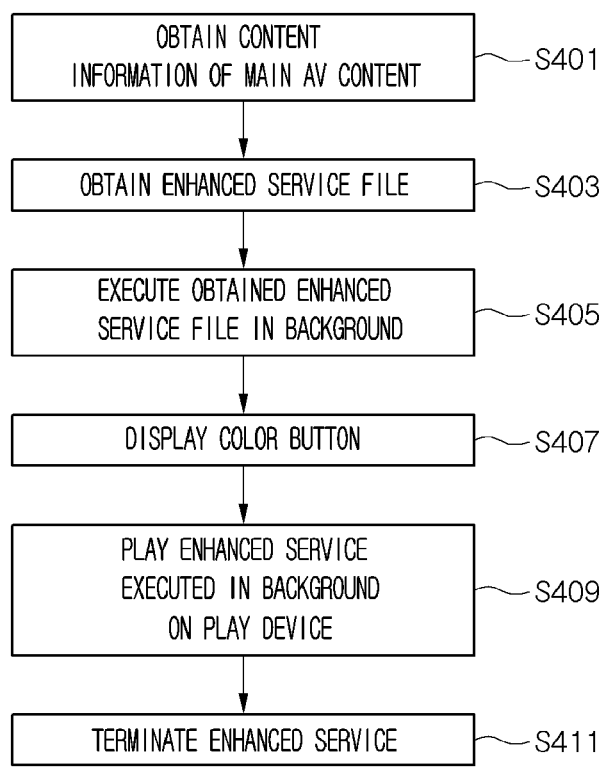
FIG. 93 is a flowchart illustrating an operation of an enhanced service management unit according to an embodiment.

FIG. 93 is a flowchart illustrating an operation of an enhanced service management unit according to an embodiment.

When the broadcast receiving device 60 and the video display device 500 are turned on and the external input port 511 of the video display device 500 is selected, the ACR daemon 137*a* obtains the content information of a main AV content broadcasted in a tuned channel through at least one ACR engine 136*a* in operation S401.

Then, the ACR daemon 137a obtains an available enhanced service relating to the content information in operation S403.

The ACR daemon 137a executes the obtained enhanced service in background in operation S405.

The ACR daemon 137a displays a color button on the display unit 521 to notify a user that enhanced service is available in operation S407.

When the ACR daemon 137a receives the use of the enhanced service, it plays the enhanced service executed in background in the play device 520 in operation S409.

If a change or main AV content is changed, the ACR daemon 137a recognizes a change through at least one ACR engine 136a and terminates the enhanced service in operation S411.

Figure 94:
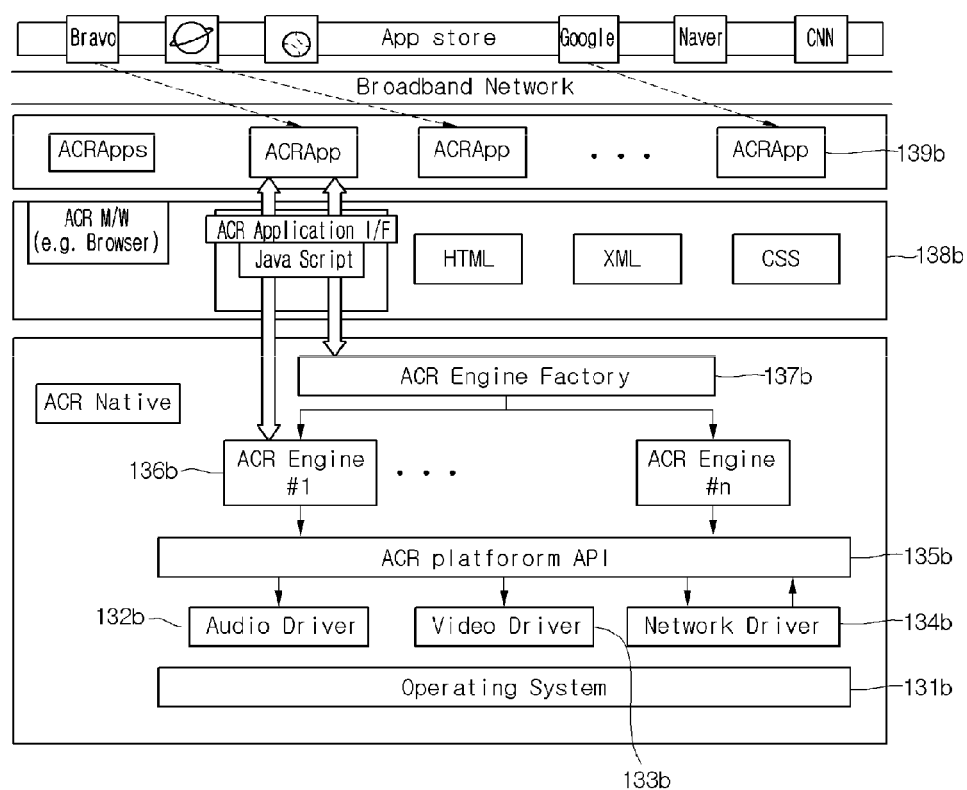
FIG. 94 is a hierarchy diagram of an enhanced service management unit according to an embodiment.

FIG. 94 is a hierarchy diagram of an enhanced service management unit according to an embodiment.

As shown in FIG. 94, the enhanced service management unit 530 may include an operating system 131b, an audio driver 132b, a video driver 133b, a network driver 134b, an ACR platform application program interface (API) 135b, at least one ACR engine 136b, an ACR engine management unit 137b, an ACR middleware 138b, and at least one ACR application 139b.

When the enhanced service management unit 530 is used as shown in FIG. 94, a user may need to necessarily recognize a channel or content. However, since the number of queries for ACR may be reduced, server overhead may be decreased.

The audio driver 132b, the video driver 133b, the network driver 134b, the ACR platform API 135b, the at least one ACR engine 136b, and the ACR middleware 138b in the enhanced service management unit 530 of FIG. 94 are identical or similar to those 132a, 133a, 134a, 135a, 136a, and 138a in the enhanced service management unit 530 FIG. 92. Therefore, their detailed descriptions will be omitted.

The ACR engine management unit 137b manages a list of at least one ACR engine 136b and provides a selection interface of the ACR engine 136b to the ACR application 139b.

The ACR application 139b may provide user experience enhanced by ACR to a user. The ACR application 139b may be an application downloaded from an application save or the Internet or may be a simple Uniform Resource Locator (URL). The ACR application 139b may provide content target advertisement, a content provider portal service, a program specific service such as electronic program guide (EPG), or a content provider specific service.

While the ACR application 139b interacts with the ACR engine management unit 137b through the ACR application interface of the ACR middleware 138b, it may select the ACR engine 136b to be used. For this, the ACR application interface that the ACR application 139b uses is shown in Table 7 and Table 8 below.

TABLE 7

| | Name | description |
|---|---|---|
| Property | readonly ACRCollection acrCollection | List of ACR engines installed in the Receiver |
| Method | ACR getACR(String acrId) | Return an ACR object matched with ACR Id, or undefined if no item matched is found. The argument acrid means the unique identifier of the ACR engine/solution. |

TABLE 7-continued

| | Name | description |
|---|---|---|
| | ACRCollection getAllACR( ) | Return the whole set of ACR objects installed in the Receiver, or undefined if no ACR is present at the Receiver. |

TABLE 8

| | Name | description |
|---|---|---|
| Property | readonly Integer length | The number of ACR engines in the collection |
| Method | ACR item(Integer index) | Return the ACR object at position index in the collection, or undefined if no item is present at that position. The argument index means the index of the item that shall be returned. |

While the ACR application 139b interacts with the ACR engine 136b through the ACR application interface of the ACR middleware 138b, it controls the ACR engine 136b, and receives content information or signature from the ACR engine 136b to additionally obtain an enhanced service corresponding to the content information or signature. Then, the ACR application 139b plays them in the play device 520. For this, the ACR application interface that the ACR application 139b uses is shown in Table 9 below.

TABLE 9

| | Name | description |
|---|---|---|
| Property | readonly String acrId | the unique id of the ACR engine |
| | readonly String name | short name of ACR engine |
| | readonly String description | Description of ACR engine |
| | readonly Integer acrType | FP or WM |
| | readonly Integer acrComponent | components used for ACR (audio, video and both) |
| | readonly String contentId | for WM |
| | readonly Date timing function onSignatureCaptured (String signature) | for WM |
| Constant | ACR_FINGERPRINT = 1 | ACR done by fingerprint technology |
| | ACR_WATERMARK = 2 | ACR done by watermark technology |
| | ACR_AUDIO = 1 | Audio component is used for the content recognition. |
| | ACR_VIDEO = 2 | Video component is used for the content recognition. |
| | ACR_AUDIO_VIDEO = 3 | Both audio/video components are used. |
| Method | Boolean Initialize( ) | Initialize the ACR object. |
| | Boolean Finalize( ) | Destroy the ACR object. |
| | Boolean startACR( ) | Start ACR engine in order to get ready to content recognition. |
| | Boolean stopACR( ) | Stop the ACR engine. |
| | Boolean getSignature( ) | for FP |
| | String getContentId( ) | for WM |
| | String getTiming( ) | for WM |
| | String getALSURL( ) | for WM |

TABLE 9-continued

| Name | description |
|---|---|
| Boolean setAudioAlgorithm (Integer audioNumCh, Interget audioSampleRate, Integer audioNumSamples, Integer audioBitPerSample) | |
| Boolean setVideoAlgorithm (Integer videoNumFrames, RECT screenRect) | |

Thus, one example of a fingerprint sample code of a content provider related application using such an ACR application interface is shown in Table 10.

TABLE 10

```
<HEAD>
<title>NBCU app</title>
<meta name="acr " content="zeitera-fp-audio"/>
<meta name="appAttribute" content="CP"/>
<object type="application/x-acr" id="ACRSol" / >
<object type="application/x-acrfactory" id="ACRFac" / >
<script type="text/javascript">
var aspfpURL= "www.zeitera.com/fp-audio";
var acrSol = get ElementbyID(ACRSol);
var acrFac = get ElementbyID(ACRFac);
acrSol=acrFac.getACR("zeitera-fp-audio");
if(acrSol == null) return;
acrSol.Initiailize( );
while ( ) { // for FP
    var signature = acrSol.getSignature( );
    if (signature == null) continue;
    var res = sendRequest(aspfpURL, signature); // 1st query
        if (res.contentID.substring(0, 3) == "NBCU" ) { // CP
matching success
            var res2 = sendRequest(res.alsURL); // 2nd query
            if (res2.asURL) {
                // launch specific app application with this appURL
            }
        }
}
</script>
</HEAD>
<BODY>
...
</BODY>
```

Thus, one example of a fingerprint sample code of a content provider related application using such an ACR application interface is shown in Table 11.

TABLE 11

```
<HEAD>
<title>NBCU Heros app</title>
<meta name="acr " content="zeitera-fp-audio"/>
<meta name="appAttribute" content="Program"/>
<object type="application/x-acr" id="ACRSol" / >
<object type="application/x-acrfactory" id="ACRFac" / >
<script type="text/javascript">
var aspfpURL= "www.zeitera.com/fp-audio";
var acrSol = get ElementbyID(ACRSol);
var acrFac = get ElementbyID(ACRFac);
acrSol=acrFac.getACR("zeitera-fp-audio");
```

TABLE 11-continued

```
if(acrSol == null) return;
acrSol.Initiailize( );
while ( ) { // for FP
    var signature = acrSol.getSignature( );
    if (signature == null) continue;
    var res = sendRequest(aspfpURL, signature); // 1st query
        if (res.contentID.substring(0, 9) == "NBCU-Heros" ) { //
Program matching success
            var res2 = sendRequest(res.alsURL, res.contentID,
            res.timing); // 2nd query
            if (res2.asURL) {
                // launch specific app application with this appURL
            }
        }
}
</script>
</HEAD>
<BODY>
</BODY>
```

Thus, one example of a watermarking sample code of a content provider related application using such an ACR application interface is shown in Table 12.

TABLE 12

```
<HEAD>
<title>NBCU app</title>
<meta name="acr " content="nielsen-wm-audio"/>
<meta name="appAttribute" content="CP"/>
<object type="application/x-acr" id="ACRSol" / >
<object type="application/x-acrfactory" id="ACRFac" / >
<script type="text/javascript">
var aspfpURL= "www.nielsen.com/wm-audio";
var acrSol = get ElementbyID(ACRSol);
var acrFac = get ElementbyID(ACRFac);
acrSol=acrFac.getACR("nielsen-wm-audio");
if(acrSol == null) return;
acrSol.Initiailize( );
while ( ) { // for WM
    var contentId = acrSol.getContentId( );
    if (contentId == null) continue;
    var alsURL = acrSol.getALSURL( );
    if (contentId.substring(0, 3) == "NBCU" ) { // CP matching success
        var res = sendRequest(alsURL); // 2nd query
        if (res.asURL) {
            // launch specific app application with this appURL
        }
    }
}
</script>
</HEAD>
<BODY>
...
</BODY>
```

Thus, one example of a watermarking sample code of a content provider related application using such an ACR application interface is shown in Table 13.

TABLE 13

```
<HEAD>
<title>NBCU Heros app</title>
<meta name="acr " content="nielsen-wm-audio"/>
<meta name="appAttribute" content="Program"/>
<object type="application/x-acr" id="ACRSol" / >
<object type="application/x-acrfactory" id="ACRFac" / >
<script type="text/javascript">
var aspfpURL= "www.nielsen.com/wm-audio";
var acrSol = get ElementbyID(ACRSol);
var acrFac = get ElementbyID(ACRFac);
acrSol=acrFac.getACR("nielsen-wm-audio");
if(acrSol == null) return;
acrSol.Initiailize( );
while ( ) { // for WM
```

TABLE 13-continued

```
    var contentId = acrSol.getContentId( );
    if (contentId == null) continue;
    var timing = acrSol.getTiming( );
    var alsURL = acrSol.getALSURL( );
    if (contentId.substring(0, 9) == "NBCU-Heros" ) { // Program
    matching success
            var res = sendRequest(alsURL, contentId, timing); // 2nd
    query
            if (res.asURL) {
                // launch specific app application with this appURL
            }
        }
    }
}
</script>
</HEAD>
<BODY>
    ...
</BODY>
```

Figure 95:
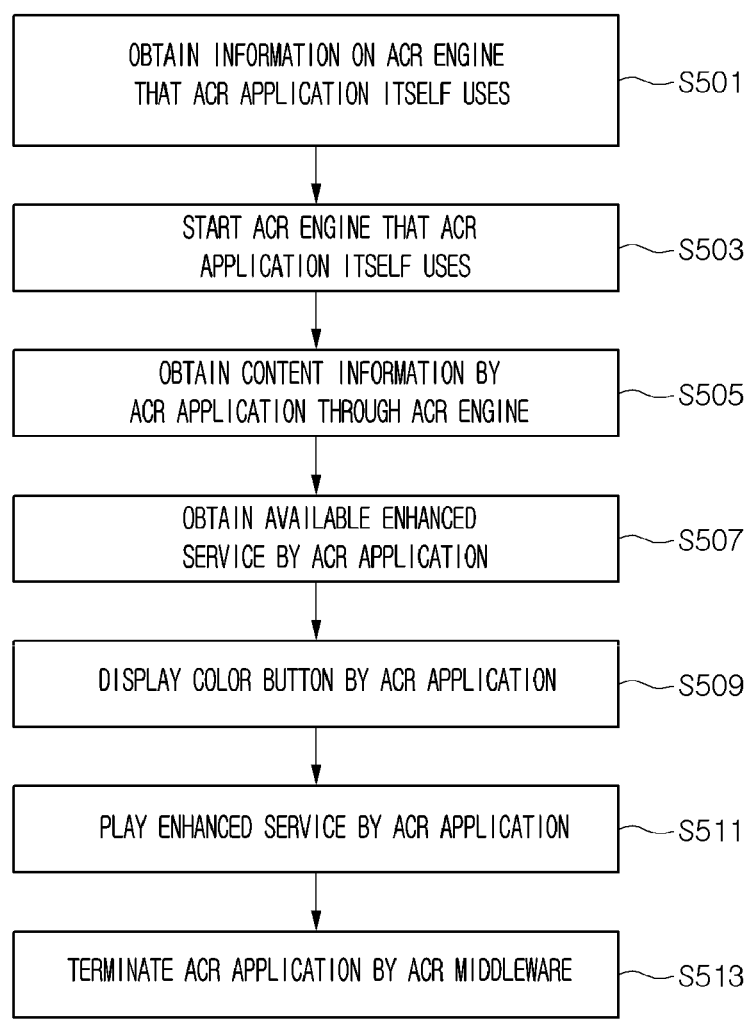
FIG. 95 is a flowchart illustrating an operation of an enhanced service management unit according to an embodiment.

FIG. 95 is a flowchart illustrating an operation of an enhanced service management unit according to an embodiment.

Although the broadcast receiving device 60 and the video display device 500 are turned on and the external input port 511 of the video display device 500 is selected, the video display device 500 may not perform automatic content recognition before the ACR application 139b is executed.

Once the corresponding channel related ACR application 139b is executed by a user recognizing a channel of a main AV content, the ACR application 139b queries and information on the ACR engine 136b that it uses to the ACR engine management unit 137b and receives it in operation S501.

Then, the ACR application 139b starts the ACR engine 136b that it uses in operation S503 and obtains content information through the ACR engine 136b in operation S505.

The ACR application 139b obtains an available enhanced service relating to a main AV content through the obtained content information in operation S507, and displays a color button on the display unit 521 to notify a user that an enhanced service is available in operation S509.

When the ACR application 139b receives the use of the enhanced service, it plays the enhanced service in the play device 520 in operation S511.

When the ACR middleware 138b receives a user input relating to the termination of the ACR application 139b, it terminates the ACR application 139b in operation S513.

Figure 96:
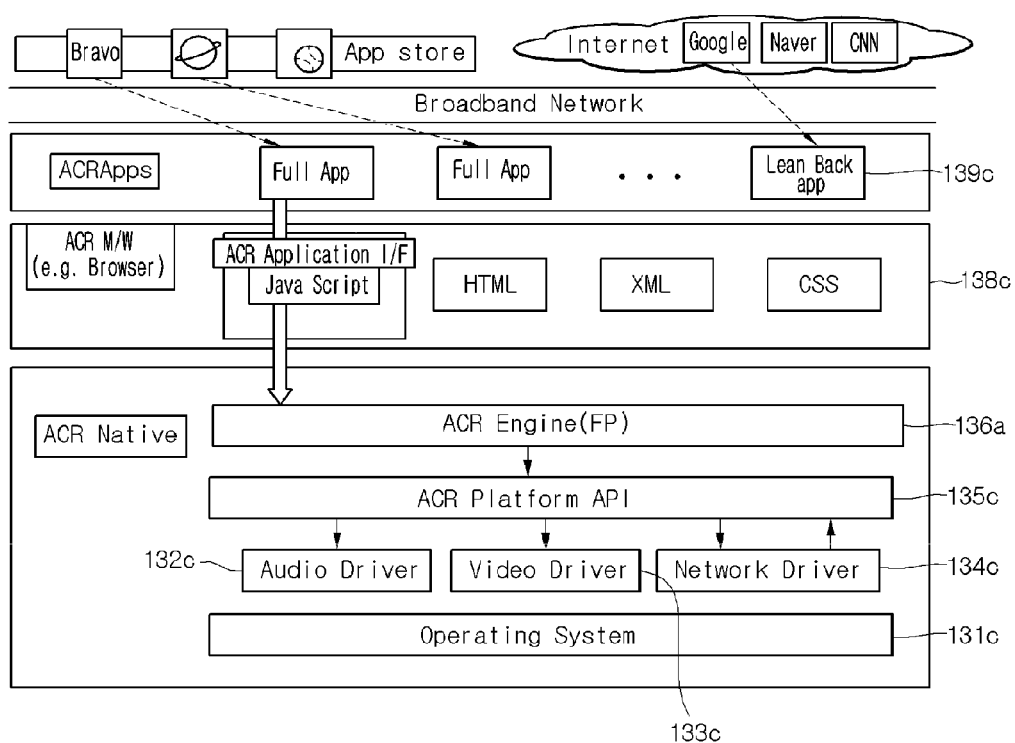
FIG. 96 is a hierarchy diagram of an enhanced service management unit according to an embodiment.

FIG. 96 is a hierarchy diagram of an enhanced service management unit according to an embodiment.

As shown in FIG. 96, the enhanced service management unit 530 may include an operating system 131c, an audio driver 132c, a video driver 133c, a network driver 134c, an ACR platform API 135c, an ACR engine 136c, an ACR middleware 138c, and at least one ACR application 139c.

When the enhanced service management unit 530 is used as shown in FIG. 96, a user may need to necessarily recognize a channel or content. However, since the number of queries for ACR may be reduced, server overhead may be decreased.

Figure 97:
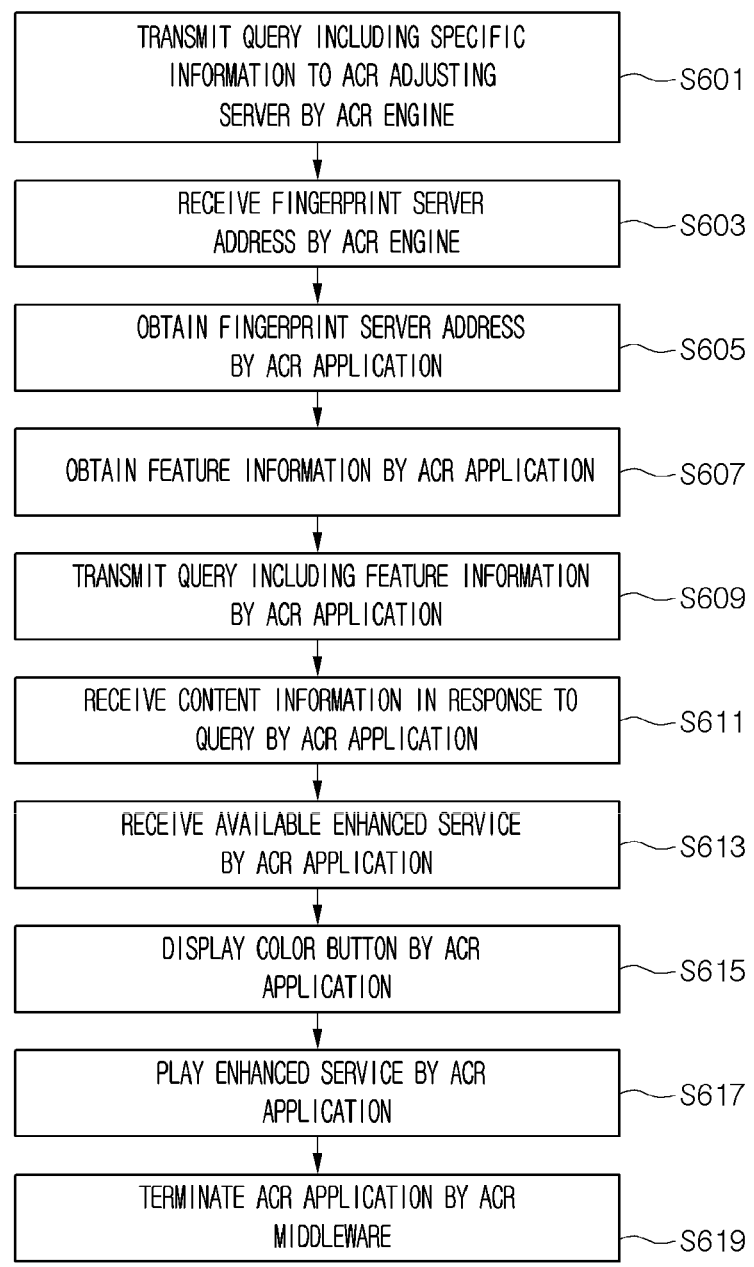
FIG. 97 is a flowchart illustrating an operation of an enhanced service management unit according to an embodiment.

The audio driver 132c, the video driver 133c, the network driver 134c, the ACR platform API 135c, and the ACR middleware 138c in the enhanced service management unit 530 of FIG. 96 are identical or similar to those 132a, 133a, 134a, 135a, and 138a in the enhanced service management unit 530 FIG. 97. Therefore, their detailed descriptions will be omitted.

The ACR engine 136c extracts feature information from some frames or a certain section of audio samples of a main AV content to transmit a query including the extracted feature information to an ACR adjustment server (not shown). The ACR adjustment server may transmit a fingerprint server address in response to the query. Additionally, the ACR adjustment server may transmit content information corresponding to the feature information together with the fingerprint server address.

When receiving the fingerprint server address from the ACR engine 136c, the ACR application 139c directly transmit a query, which includes the feature information that the ACR engine 136c extracts, to the fingerprint server corresponding to the fingerprint server address. For this, the ACR application interface that the ACR application 139c uses is shown in Table 14 below.

TABLE 14

| | Name | description |
|---|---|---|
| Property | Readonly String signature | For fingerprint, |
| | function (String signature) onSignatureCaptured | For fingerprint, function pointer: pointed function will return signature value from lower ACREngine, event driven |
| Method | Boolean getSignature( ) | For fingerprint, asynchronous call to get signature, will use onSignatureCaptured |
| | Boolean getContentID( ) | For watermark, Return recognized content id, or undefined if content has not been recognized. |
| | Boolean resetACREngine( ) | When getSignature fails several times(ch change), app will give control to ACREngine to query back to ACRCoordinator. |
| | String getACRBackend( ) | Return ACRBackend URL |

Thus, one example of a fingerprint sample code using such an ACR application interface is shown in Table 15.

TABLE 15

```
<HEAD>
<title>CP app</title>
<object type="application/x-acr" id="ACRSol" / >
<script type="text/javascript">
var acrSol = get ElementbyID(ACRSol);
acrSol.onSignatureCaptured = returnSignature;
var acrBE = acrSol.getACRBackend( );
function doACR( ) {
    acrSol.getSignature( );
    setTimer("acrTimeout", 1000);
}
function acrTimeout( ) {
    timeout++;
    if(timeout > 3)
        acrSol.resetACREngine( );
}
function returnSignature(signature) {
    timeout = 0;
    doSpecificJob(signature);
}
function doSpecificJob(signature) {
    // do specific work regarding this time
}
</script>
</HEAD>
<BODY onload="doACR( )">
    ...
</BODY>
```

FIG. 97 is a flowchart illustrating an operation of an enhanced service management unit according to an embodiment.

When the broadcast receiving device 60 and the video display device 500 are turned on and the external input port 511 of the video display device 500 is selected, the ACR engine 136c extracts feature information from some frames or a certain section of audio samples of a main AV content to transmit a query including the extracted feature information to an ACR adjustment server (not shown) in operation S601.

The ACR engine 136c receives a fingerprint server address in response to the query in operation S603.

The ACR application 139c obtains the fingerprint server address from the ACR engine 136c through a getACRBackend( ) method.

The ACR application 139c obtains feature information of a certain video frame section or a certain audio section of a main AV content from the ACR engine 136c through a getSignature( ) method in operation S607.

The ACR application 139c transmits a query, which includes the obtained feature information, to a fingerprint server corresponding to the obtained fingerprint server address in operation S609.

The ACR application 139c receives content information in response to the query in operation S611.

The ACR application 139c obtains an available enhanced service on the basis of the obtained content information in operation S613, and displays a color button on the display unit 521 to notify a user that an enhanced service is available in operation S615.

When the ACR application 139c receives the use of the enhanced service, it plays the enhanced service in the play device 520 in operation S617.

When the ACR middleware 138c receives a user input relating to the termination of the ACR application 139c, it terminates the ACR application 139c in operation S619.

Figure 98:
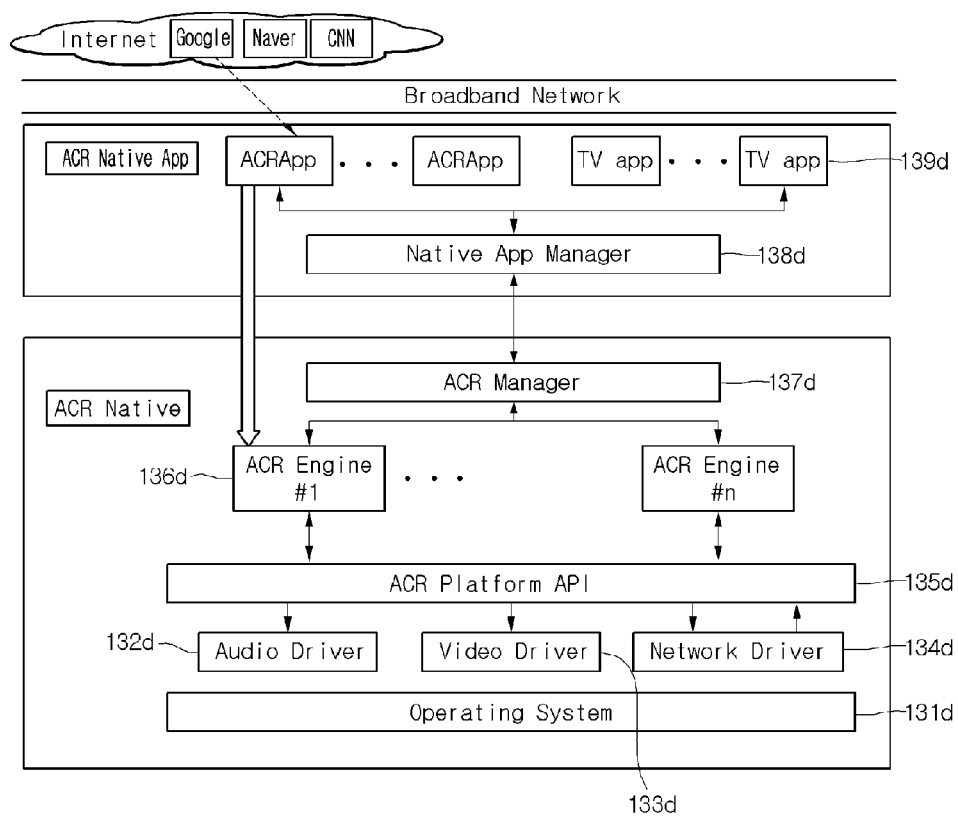
FIG. 98 is a hierarchy diagram of an enhanced service management unit according to an embodiment.

FIG. 98 is a hierarchy diagram of an enhanced service management unit according to an embodiment.

As shown in FIG. 98, the enhanced service management unit 530 may include an operating system 131d, an audio driver 132d, a video driver 133d, a network driver 134d, an ACR platform API 135d, at least one ACR engine 136d, an ACR engine management unit 137d, an application management unit 138d, and at least one ACR application 139d.

When the enhanced service management unit 530 is used as shown in FIG. 98, a user doesn't need to necessarily recognize a channel or content and an ACR operation may be performed always.

The audio driver 132d, the video driver 133d, the network driver 134d, the ACR platform API 135d, and the plurality of ACR engines 136d in the enhanced service management unit 530 of FIG. 98 are identical or similar to those 132a, 133a, 134a, 135a, and 136a in the enhanced service management unit 530 FIG. 92. Therefore, their detailed descriptions will be omitted.

The ACR engine management unit 137d confirms that the ACR engine 136d matches to the main AV content received from the external input port 511 and confirms that the ACR engine 136d matches to the application 139d. At this point, the ACR engine management unit 137d controls the plurality of ACR engines 136d to simultaneously or sequentially perform watermark extraction or query transmission. The ACR engine management unit 137d controls the plurality of ACR engines 136d through priority. If one of the plurality of ACR engines 136d is successful in recognizing a main AV content, the ACR engine management unit 137d puts the remaining ACR engines in sleep mode and obtains the content information of the main AV content from the operating ACR engine.

While the application management unit 138d interacts with the ACR engine management unit 137d, it controls generation, start, stop, sleep, and termination of the ACR application.

The ACR application 139d may be a built-in application. The ACR application 139d may control the ACR engine 136b through functions shown in Table 16.

TABLE 16

| | Name |
|---|---|
| Function calls | char *getContentID( ) <br> Date getTiming( ) <br> char *getSignature( ) <br> Boolean registerEventListener(EvtType evtType, Boolean (*eventListener)(EvtType evtType, char *contentId, Date *timing, char *signature)); |
| Data Structure | struct Date { <br>     int year; <br>     int month; <br>     int day; <br>     int hour; <br>     int minute; <br>     int second; <br>     int msecond; <br> }; <br> typedef enum EvtType  { <br>     EVT_PROGRAM_CHANGED, <br>     EVT_CHANNEL_CHANGED, <br>     EVT_ALL }; |

Figure 99:
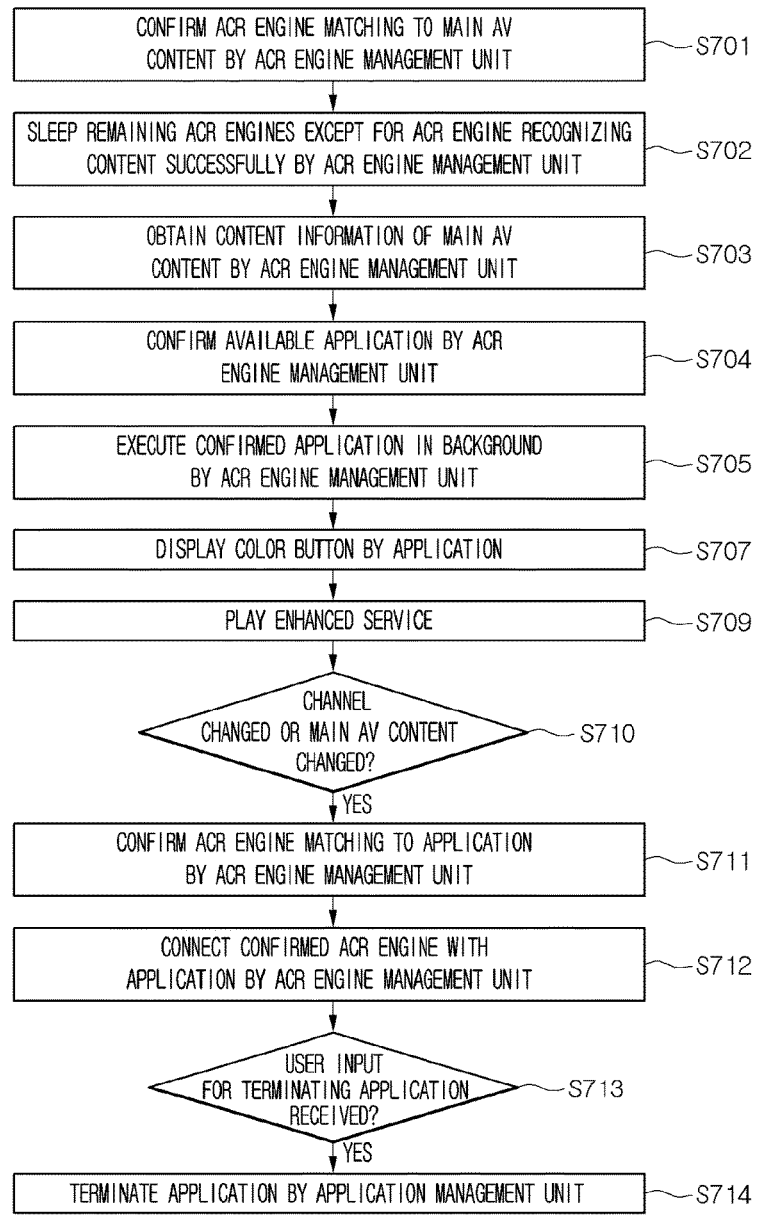
FIG. 99 is a flowchart illustrating an operation of an enhanced service management unit according to an embodiment.

FIG. 99 is a flowchart illustrating an operation of an enhanced service management unit according to an embodiment.

When the broadcast receiving device 60 and the video display device 500 are turned on and the external input port 511 of the video display device 500 is selected, the ACR engine management unit 137d confirms that the ACR engine 136a matches to the main AV content received from the external input port 511 in operation S701. At this point, the ACR engine management unit 137d controls the plurality of ACR engines 136d to simultaneously or sequentially perform watermark extraction or query transmission. The ACR engine management unit 137d controls the plurality of ACR engines 136d through priority.

If one of the plurality of ACR engines 136d is successful in recognizing a main AV content, the ACR engine management unit 137d puts the remaining ACR engines in sleep mode in operation S702, and obtains the content information of the main AV content from the operating ACR engine in operation S703.

Then, the ACR engine management unit 137d confirms an available application relating to content information in operation S704, and requests the execution of the confirmed application 139d to the application management unit 138d.

The application management unit 138d executes the confirmed application 139d in background in operation S705.

The application 139d executed in background displays a color button on the display unit 521 to notify a user that enhanced service is available in operation S707.

When the application 139d executed in background receives the use of the enhanced service from a user, it plays the enhanced service in the play device 520 in operation S709.

If a channel or main AV content is changed in operation S710, the ACR engine management unit 137d confirms the ACR engine 136a matching to the application 139d and connects the confirmed ACR engine 136a to the application 139d in operation S711. At this point, the ACR engine management unit 137d controls the plurality of ACR engines 136d to simultaneously or sequentially perform watermark extraction or query transmission.

If the application management unit 138d receives a user input for the termination of the application 139d in operation S712, it terminates the application 139d in operation S713.

Figure 100:
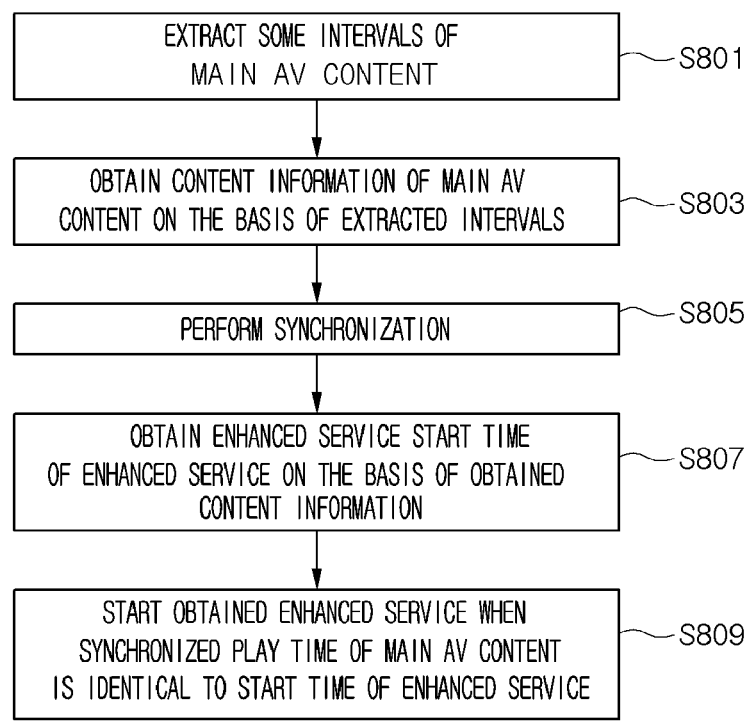
FIG. 100 is a flowchart illustrating a method of synchronizing a play time of a main AV content with a play time of an enhanced service according to an embodiment.

Then, referring to FIGS. 100 and 101, a method of synchronizing a play time of a main AV content with a play time of an enhanced service according to an embodiment will be described.

Then, referring to FIGS. 100 and 101, a method of synchronizing a play time of a main AV content with a play time of an enhanced service according to an embodiment will be described.

Enhanced service information may include a start time of an enhanced service. At this point, the video display device 500 may need to start the enhanced service at the start time. However, since the video display device 500 receives a signal transmitting an uncompressed main AV content with no time stamp, the reference time of a plying time of the main AV content is different from that of a start time of the enhanced service. Although the video display device 500 receives a main AV content having time information, the reference time of a plying time of the main AV content may be different from that of a start time of the enhanced service, like rebroadcasting. Accordingly, the video display device 500 may need to synchronize the reference time of the main AV content with that of the enhanced service. Especially, the video display device 500 may need to synchronize the play time of the main AV content with the start time of the enhanced service.

First, the enhanced service management unit 530 extracts a certain section of a main AV content in operation S801. The section of the main AV content may include at least one of some video frames or a certain audio section of the main AV content. Time that the enhanced service management unit 530 extracts the section of the main AV content is designated as Tn.

The enhanced service management unit 530 obtains content information of a main AV content on the basis of the extracted section. In more detail, the enhanced service management unit 530 decodes information encoded with invisible watermark in the extracted section to obtain content information. Additionally, the enhanced service management unit 530 may extract feature information in the extracted section, and obtain the content information of the main AV content from the fingerprint server 22 or the content information storage unit 551 on the basis of the extracted feature information. Time that the enhanced service management unit 530 obtains the content information is designated as Tm.

Moreover, the content information includes a start time Ts of the extracted section. After the content information acquisition time Tm, the enhanced service management unit 530 synchronizes the play time of the main AV content with the start time of the enhanced service on the biases of Ts, Tm, and Tn. In more detail, the enhanced service management unit 530 regards the content information acquisition time Tm as a time Tp calculated by the following Equation 1.

$$Tp = Ts + (Tn - Tn)$$ [Equation 1]

Additionally, the enhanced service management unit 530 regards a time of when Tx elapses after the content information acquisition time as Tp+Tx.

Then, the enhanced service management unit 530 obtains an enhanced service and its start time Ta on the obtained content information in operation S807.

If the synchronized play time of the main AV content is identical to the start time Ta of the enhanced service, the enhanced service management unit 530 starts the obtained enhanced service in operation S809. In more detail, the enhanced service management unit 530 may start the enhanced service when the following Equation 2 is satisfied.

$$Tp + Tx = Ta$$ [Equation 2]

Figure 101:
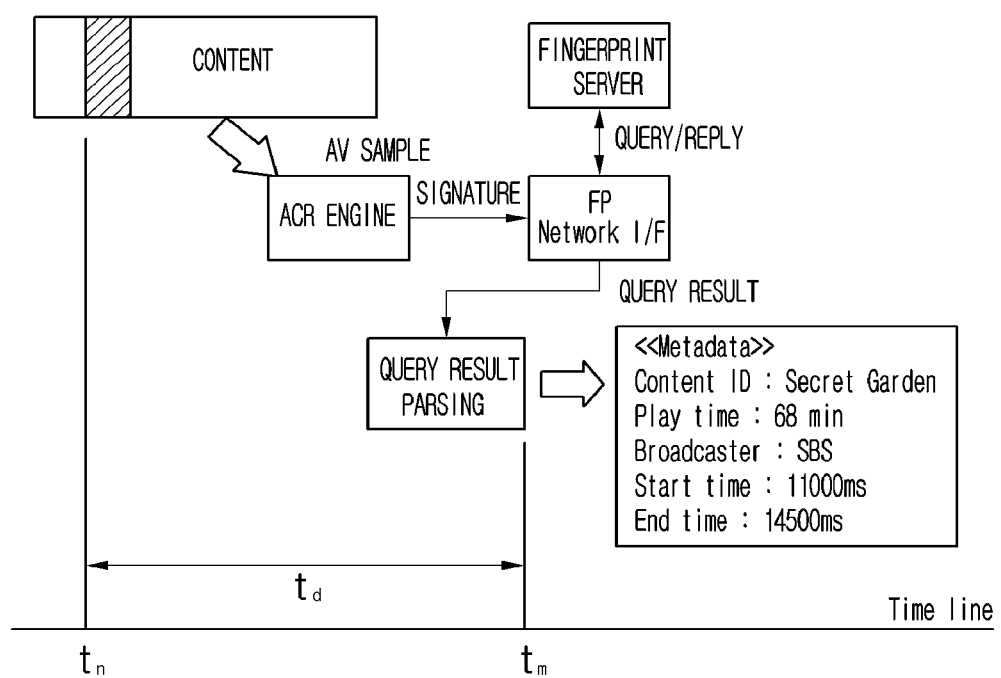
FIG. 101 is a conceptual diagram illustrating a method of synchronizing a play time of a main AV content with a play time of an enhanced service according to an embodiment.

FIG. 101 is a conceptual diagram illustrating a method of synchronizing a play time of a main AV content with a play time of an enhanced service according to an embodiment.

As shown in FIG. 101, the video display device 500 extracts an AV sample during a system time Tn.

The video display device 500 extracts feature information from the extracted AV sample, and transmits a query including the extracted feature information to the fingerprint server 22 to receive a query result. The video display device 500 confirms whether a start time Ts of the extracted AV sample corresponds to 11000 ms at Tm by parsing the query result.

Accordingly, the video display device 500 regards the time of when the start time of the extracted AV sample is confirmed according to Equation 1 as Ts+(Tm−Tn), so that, after that, the play time of the main AV content may be synchronized with the start time of the enhanced service.

Next, an ACR application will be described according to various embodiments with reference to FIGS. 102 to 131.

The ACR application may include an auto playing application, a content provider application, and an video display manufacturer application.

Figure 102:
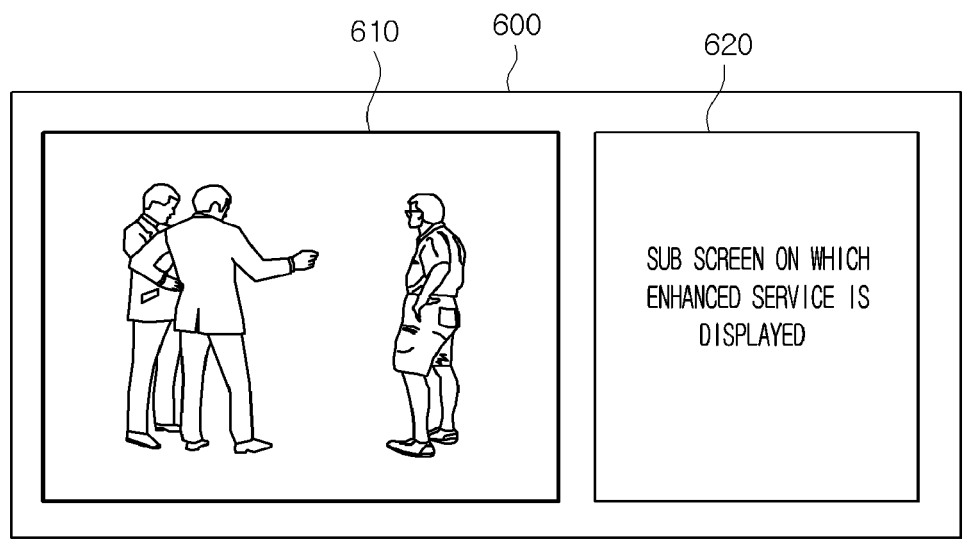
FIG. 102 is a screen when an auto playing application is executed according to an embodiment.

FIG. 102 is a screen when an auto playing application is executed according to an embodiment.

The auto playing application automatically plays an enhanced service even when a user makes no action. In this sense, the auto playing application is designated as a lean back application in this specification.

The auto playing application automatically plays an enhanced service such as scene related information that a content provider or broadcasting station provides during playing of the main AV content according to a play time of the main AV content, without a user's input. That is, a content provider or broadcasting station entirely controls the auto playing application.

As shown in FIG. 102, once the auto playing application is executed, the screen 600 may include a sub screen 610 where a reduced main AV content is played and a sub screen 620 where additional information is displayed. The sub screen 600 where additional information is displayed may be spatially separated from the sub screen 610 where a main AV content is played.

Moreover, when an auto playing application is executed, an area where additional information is displayed may be semi-transparent. In this case, the area where additional information is displayed may overlay on an area where a main AV content played.

FIG. 103 is a screen when a content provider application is executed according to an embodiment.

In this specification, the content provider application is designated as a full interactive application.

As shown in FIG. 103 (A), the video display device 500 downloads and saves a plurality of applications. FIG. 103 (A) illustrates icons 530 of the applications. A content provider application among the plurality of applications is an application created and distributed by a content provider, and thus, may be under control of the content provider.

A user of the video display device 500 may download a content provider application from an application save and determines whether to execute the downloaded content provider application.

FIG. 103 (B) is a screen when a content provider application is executed. As shown in FIG. 103 (B), the screen 600 may include the sub screen 610 where a reduced main AV content is played and the sub screen 620 where additional information is displayed.

Hereinafter, a video display device manufacturer application will be described according to an embodiment with reference to FIGS. 104 to 131.

The video display device manufacturer application is created and controlled by a video display device manufacturer, and may be saved in advance when the video display device 500 is manufactured. That is, the video display device manufacturer application may provide the same service and user interface regardless of a content provider or content.

The video display device manufacturer application may include an area where an enhanced service that a content provider provides is displayed and an area where an enhanced service that a video display device manufacturer provides is displayed, separately. A user of the video display device 500 may determine whether to execute the video display device manufacturer application.

The video display device manufacturer application may have two types.

The video display device manufacturer application of the first type has a resizing user interface. The video display device manufacturer application having the resizing user interface reduces the size of an area where a main AV content is displayed to display all the main AV content in a reduced area. Additionally, the video display device manufacturer application having the resizing user interface reshapes an area where an application is displayed with an L or inverse-L shaped structure.

The video display device manufacturer application of the second type has an overlay user interface. The video display device manufacturer application having the overlay user interface maintains the size of an area where a main AV content is displayed, and overlaps an area where an application is displayed on the main AV content. Since the area where an application is displayed covers the main AV content, an application area may be semi-transparent.

Figure 104:
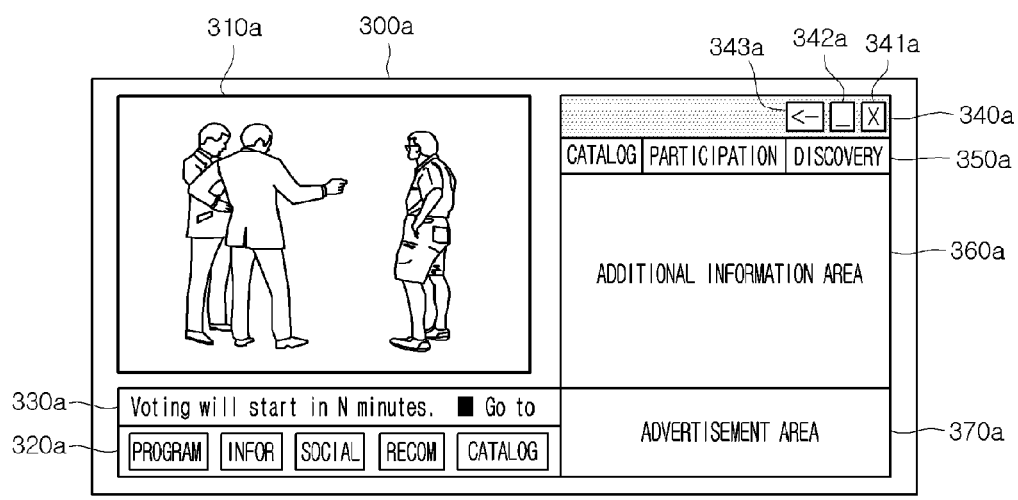
FIG. 104 is a screen when a video display device manufacturer application having a resizing user interface is executed according to an embodiment.

FIG. 104 is a screen when a video display device manufacturer application having a resizing user interface is executed according to an embodiment.

As shown in FIG. 104, the screen 300a of when a video display device manufacturer application having a resizing user interface is executed includes a main content area 310a where a main AV content is displayed, a main menu area 320 where a main menu is displayed, a notification area 330a where a notification message is displayed, a control button area 340a where a control button is displayed to control the video display device manufacturer application, a sub menu area 350a where a sub menu is displayed, an additional information area 360a where additional information is displayed, and an advertisement area 370a where advertisement is displayed.

The control button area 340a includes an ending button 341a for ending the video display device manufacturer application, a hiding button 342a for hiding the video display device manufacturer application, and a back button 343a for returning to previous information.

In the video display device manufacturer application having the resizing user interface, the main AV content area 310a is disposed on the top-left of the screen 300a; the main menu area 320 and the notification area 330a is disposed on the bottom of the main AV content area 310a; the control button area 340a is disposed on the top-left; the sub menu area 350a is disposed between the control button area 340a and the additional information area 360a; the advertisement area 370a is disposed on the bottom-right; and the additional information area 360a is disposed between the sub menu area 350a and the advertisement area 370a. However, their positions may vary.

Figure 105:
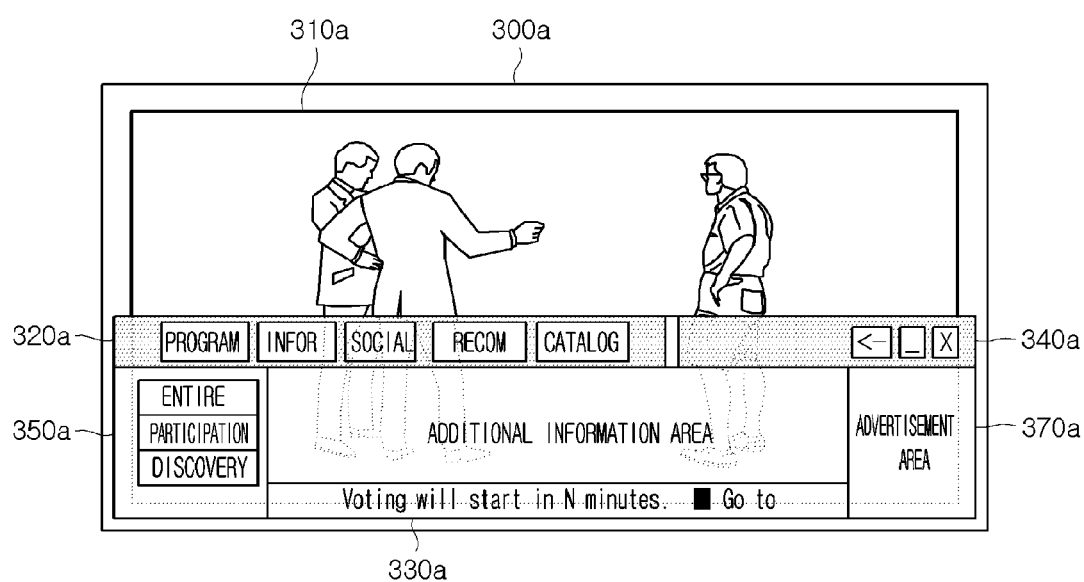
FIG. 105 is a screen when a video display device manufacturer application having an overlay user interface is executed according to an embodiment.

FIG. 105 is a screen when a video display device manufacturer application having an overlay user interface is executed according to an embodiment.

As shown in FIG. 105, like the video display device manufacturer application having the resizing user interface, the screen 300a of when the video display device manufacturer application having the overlay user interface is executed includes a main content area 310a where a main AV content is displayed, a main menu area 320 where a main menu is displayed, a notification area 330a where a notification message is displayed, a control button area 340a where a control button is displayed to control the video display device manufacturer application, a sub menu area 350a where a sub menu is displayed, an additional information area 360a where additional information is displayed, and an advertisement area 370a where advertisement is displayed.

In the video display device manufacturer application having the overlay user interface, the main AV content area 310a is disposed on the top-left of the screen 300a; the main menu area 320 and the notification area 330a is disposed on the bottom of the main AV content area 310a; the control button area 340a is disposed on the top-left; the sub menu area 350a is disposed between the control button area 340a and the additional information area 360a; the advertisement area 370a is disposed on the bottom-right; and the additional information area 360a is disposed between the sub menu area 350a and the advertisement area 370a. However, their positions may vary.

Hereinafter, a video display device manufacturer application having a resizing user interface will be mainly described.

The video display device manufacturer application receives necessary information from an ACR engine built in the video display device 500 and has two types of menus largely according to its character.

The first type menu is for a time insensitive enhanced service. That is, when a menu relating to the time insensitive enhanced service is selected, the video display device 500 obtains an identifier of a main AV content that is currently played on a screen, obtains an enhanced service on the basis of the obtained identifier, and displays the obtained enhanced service on the additional information area 360a. Examples of such a time insensitive enhanced service includes titles, genres, actors, directors, and other people's evaluations, short clips, and short explanations. Through this basic information, the video display device 500 may search additional information, link to a social network service such as Facebook and Twitter, or provide a recommended service and a related advertisement.

The second type menu is for a time sensitive enhanced service. That is, when a menu relating to the time sensitive enhanced service is selected, the video display device 500 obtains an identifier and play time information of a main AV content that is currently played on a screen, obtains a time sensitive enhanced service on the basis of the obtained identifier and play time information, and displays the obtained enhanced service on the additional information area 360*a*.

The main menu of the video display device manufacturer application includes a program menu, an information menu, a social menu, a recommendation menu, and a catalogue menu. Among these, the time insensitive menu includes the information menu, the social menu, the recommendation menu, and the catalogue menu, and the time sensitive menu includes the program menu. If the time insensitive menu is selected, the time sensitive application may be called. Other than these five main menus, other main menus may be added. If each main menu is selected, a sub menu of the selected main menu is displayed on the sub menu area 350*a*.

Figure 106:
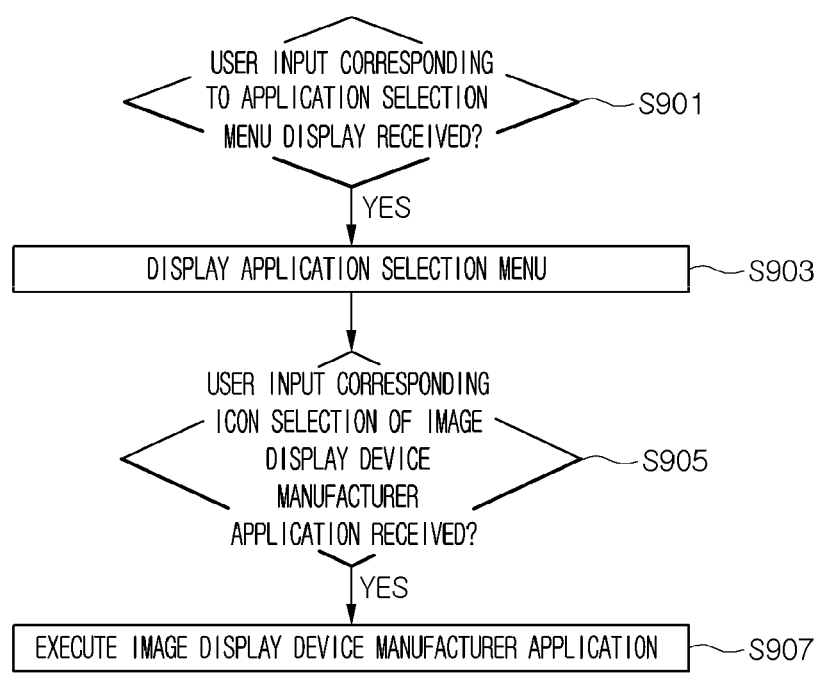
FIG. 106 is a flowchart illustrating a method of executing a video display device manufacturer application according to an embodiment.

FIG. 106 is a flowchart illustrating a method of executing a video display device manufacturer application according to an embodiment.

Figure 107:
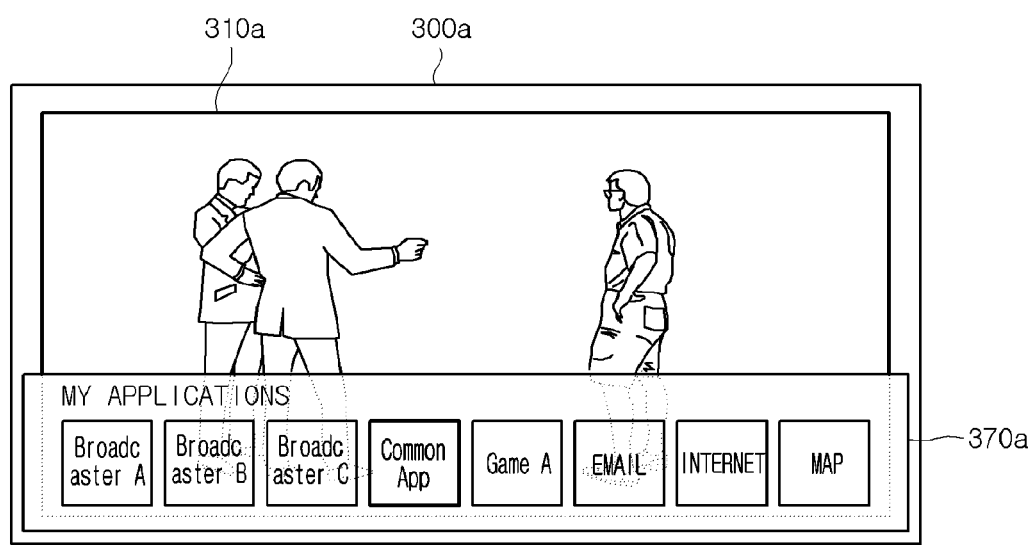
FIG. 107 is a screen when an application selection menu is displayed according to an embodiment.

When receiving a user input corresponding to an application selection menu display through pressing of a specific key of a remote controller, shaking of a motion remote controller in a downward direction, zooming of the cursor of a motion remote controller in the bottom direction of the screen while a main AV content is played in operation S901, the video display device 500 displays an application selection menu of FIG. 107 in operation S903.

FIG. 107 is a screen when an application selection menu is displayed according to an embodiment.

As shown in FIG. 107, the application selection menu 380 is disposed at the bottom of the screen 300*a*. The application selection menu 380 may be semi-transparent.

The application selection menu 380 includes execution icons of a plurality of applications installed in the video display device 500. One icon of the displayed execution icons corresponds to the execution icon of the video display device manufacturer application.

When receiving a user input corresponding to an icon selection of the video display device manufacturer application through manipulating of the left and right arrow keys in a remote controller or moving of the cursor according to a movement of a motion remote controller in operation S905, the video display device 500 executes the video display device manufacturer application in operation S907. Through this, a user may immediately execute the application if he/she wants without access to an application save while watching a main AV content.

Once the video display device manufacturer application is executed, its main menu is displayed. If a program menu is selected by default, its sub menu is displayed on the sub menu area 350*a*. An all sub menu is selected by default among the sub menus of the program menu. Focus is made on the all sub menu. As time elapses, an enhanced service displayed on the additional information area 360*a* is automatically updated. The ←button is used for returning to a previous menu and the X button is used for returning to an entire screen after closing the video display device manufacturer application.

Then, a video display device manufacturer application will be described according to an embodiment with reference to FIGS. 108 to 110.

The program main menu is a menu for displaying an application, which is time-related to a main AV content that is being played, on the additional information area 360*a*. Enhanced service information for displaying an application linking with the main AV content may be provided from a content owner such as TV broadcasters. The video display device 500 analyzes the enhanced service information to display a corresponding application in the additional information area 360*a* at the right timing. UI in a screen is shown in the drawing below.

The program menu includes an all sub menu, a participation sub menu, and a discovery sub menu.

The all sub menu is a menu for displaying all applications related to the participation sub menu and discovery sub menu on the additional information area 360*a*. The participation sub menu is a menu for displaying an application inducing program participation such as voting in a program. The discovery sub menu is a menu for displaying an application such as scene related information. The sub menu of the program menu may be added or edited according to contents of an application that a content owner wants.

Figure 108:
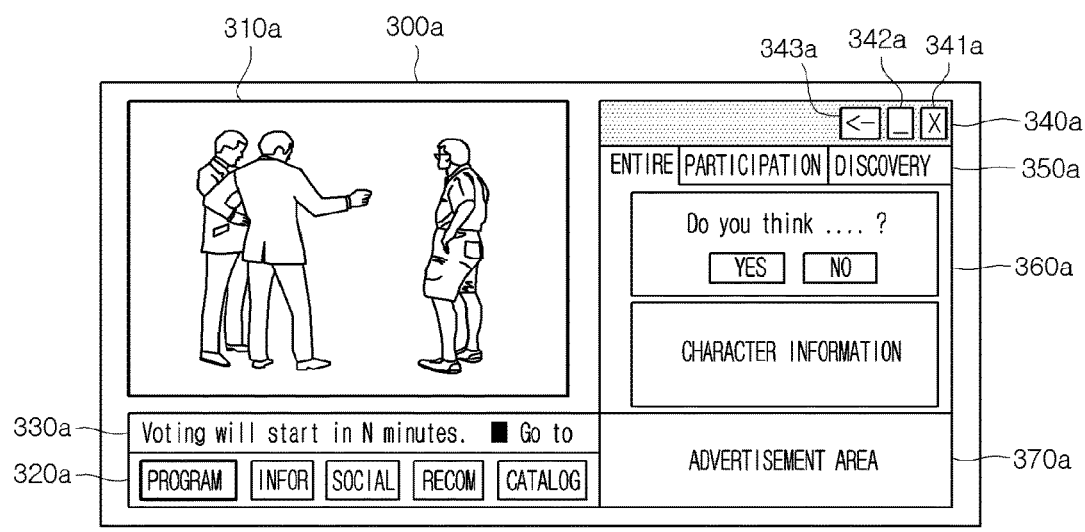
FIG. 108 is a screen when an all sub menu of a program main menu in a video display device manufacturer application is selected according to an embodiment.

FIG. 108 is a screen when an all sub menu of a program main menu in a video display device manufacturer application is selected according to an embodiment.

When the all sub menu, i.e., the first sub menu of the program main menu, is selected, the video display device 500 displays all applications related to the participation sub menu and display sub menu on the additional information area 360*a*.

When the all sub menu is selected, the video display device 500 displays an application or event synchronized with a specific time on the additional information area 360*a*. If there is no application synchronized with a specific time, the video display device 500 may leave the additional information area 350*a* as empty space. However, since the empty space may not give motivation for additional interaction to a user, if there is no application synchronized with a specific time, the video display device 500 may gather applications or events that occur prior to now in order to display a history.

When a user enters into the video display device manufacturer application, it may be seen that the user may have an intention to perform an interactive application related to a main AV content while watching the main AV content. While navigating several menus, a user may not watch an event at a specific time. Especially, when a user navigates menus for time insensitive enhanced services, the above case may likely occur. Therefore, after entering into the video display device manufacturer application, if a time sensitive event occurs during navigation, the video display device 500 displays a notification message for this on the notification area 330*a* to notify a user that there is a special event at the current time broadcasted from a broadcasting station.

While a user confirms music information or place information through the video display device manufacturer application, a time linked application occurs, the video display device 500 displays a notification message on the notification area 330*a*. When receiving a user input corresponding to the Go To button press, the video display device 500 enters into a sub menu related to an occurring time linked application and displays the occurring time linked application on the additional information area 360*a*. The notification message may be a text message. Additionally, the video display device 500 may display an amount of the delivered application as a number. The notification message may be delivered to a viewer in a Push method.

Figure 109:
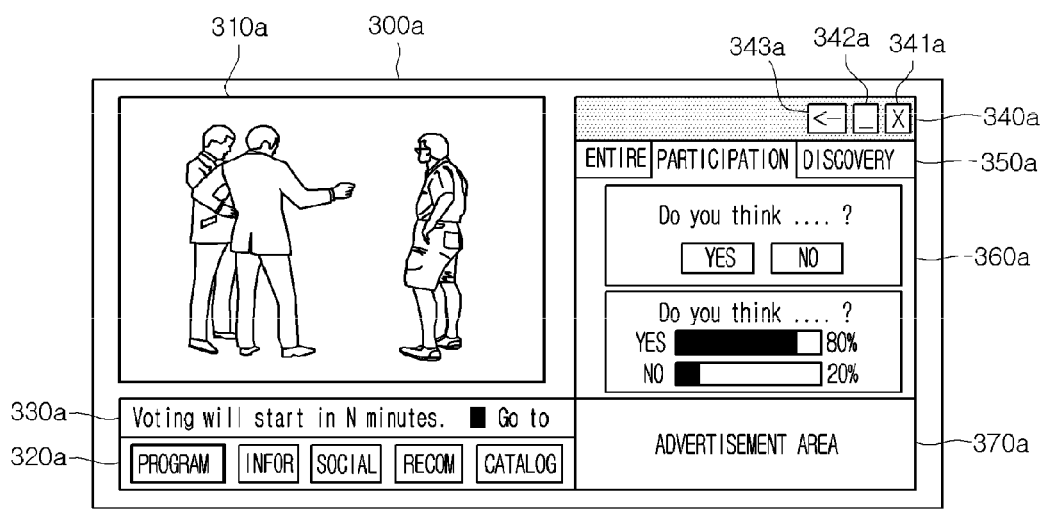
FIG. 109 is a screen when a participation sub menu of a program main menu in a video display device manufacturer application is selected according to an embodiment.

FIG. 109 is a screen when a participation sub menu of a program main menu in a video display device manufacturer application is selected according to an embodiment.

As shown in FIG. 109, once the participation sub menu is selected, the video display device 500 displays an application inducing viewer participation such as voting on the additional information area 360*a*. If a viewer participation application occurs, the video display device 500 displays it on the additional information area 360a. If the viewer participation application is voting, the video display device 500 may display voting questions and voting results. Moreover, the video display device 500 displays current events and also previous events that the viewer participates on the bottom of the current event, for the viewer's convenience.

Figure 110:
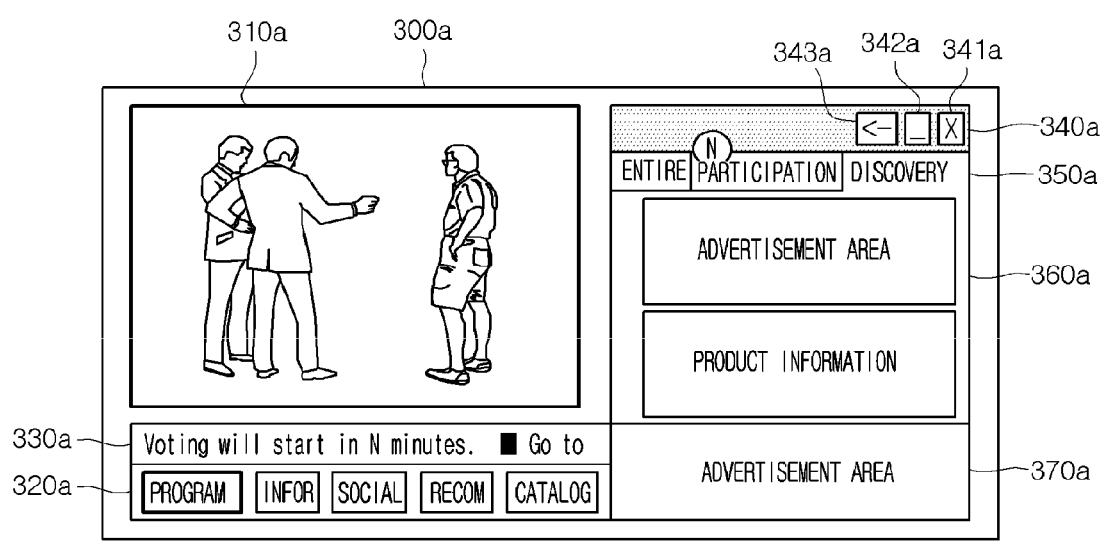
FIG. 110 is a screen when a discovery sub menu of a program main menu in a video display device manufacturer application is selected according to an embodiment.

FIG. 110 is a screen when a discovery sub menu of a program main menu in a video display device manufacturer application is selected according to an embodiment.

As shown in FIG. 110, once the discovery sub menu is selected, the video display device 500 displays all time linked applications besides a viewer participation application on the additional information area 360a. For example, the video display device 500 displays scene related information on products or places shown in a main AV content. The video display device 500 may display current scene related information and previous scene related information simultaneously.

Moreover, the video display device 500 may display a notification message that there is a time linked application or event on a sub menu. For example, if a viewer participation application occurs, the video display device 500 displays an icon having a flashing N on the participation sub menu to induce viewer participation. If a user does not respond to the notification for a predetermined time, the video display device 500 may remove the notification.

Hereinafter, an information main menu of a video display device manufacturer application will be described according to an embodiment with reference to FIGS. 111 to 117.

The information main menu corresponds to a time insensitive area. Like the UI of the program main menu, the information main menu does not operate in a UI manner that an application is automatically displayed and disappears at a specific time. Of course, although the above-mentioned time linked application may be displayed through this menu, when a main menu other than the program main menu is selected, a second service such as search service or Twitter service may be linked.

The information main menu includes a search sub menu, a Twitter sub menu, and a news sub menu.

Then, a search sub menu of an information main menu in a video display device manufacturer application will be described according to an embodiment with reference to FIGS. 111 to 113.

Figure 111:
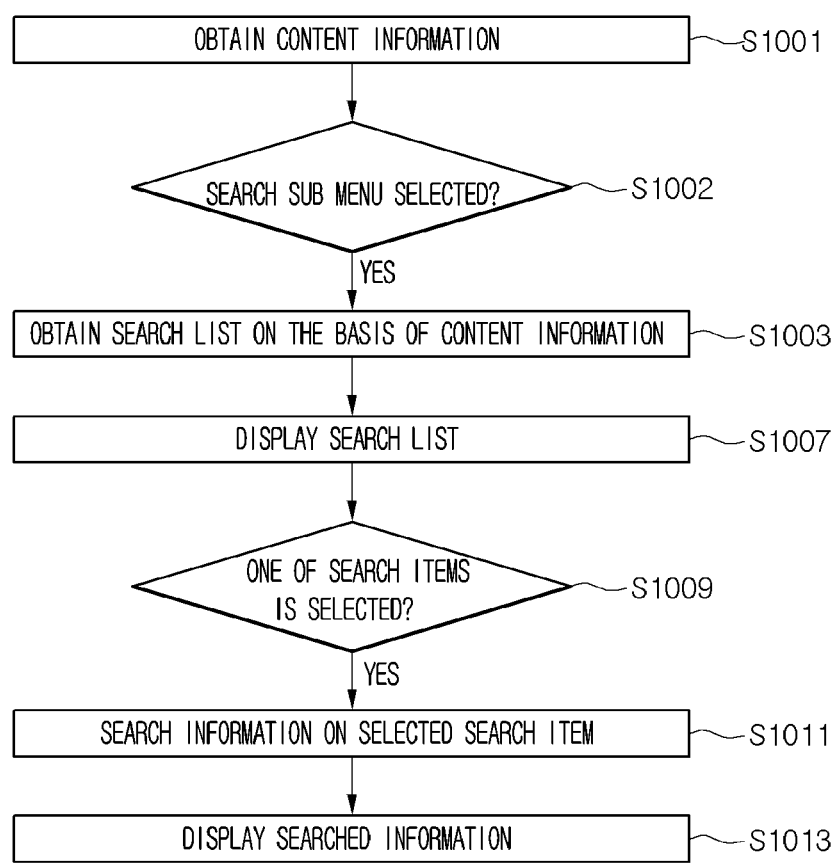
FIG. 111 is flowchart illustrating a searching method according to an embodiment.

FIG. 111 is flowchart illustrating a searching method according to an embodiment.

The video display device 500 extracts a certain section of a main AV content and obtains content information on the basis of the extracted section.

Once the search sub menu of an information main menu in a video display device manufacturer application is selected in operation S1002, the video display device 500 obtains a search list including a plurality of search items corresponding to an enhanced service on the basis of the obtained content information in operation S1003. The search list includes at least one of genres, actors, directors, places, and products.

The video display device 500 displays the search list on the additional information area 360a in operation S1007. A display example of the search list will be described with reference to FIG. 111.

Figure 112:
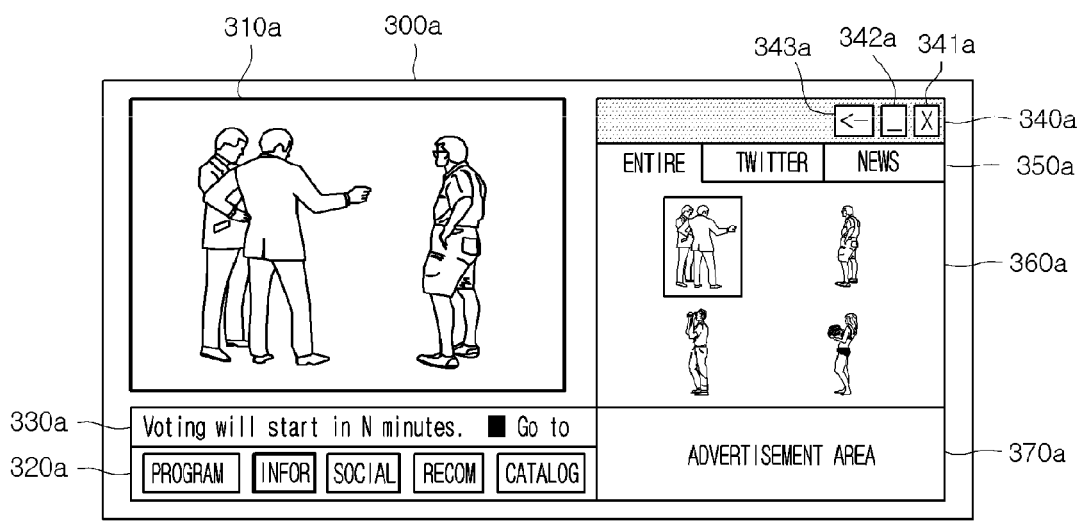
FIG. 112 is a screen when a search sub menu of an information main menu in a video display device manufacturer application is selected according to an embodiment.

FIG. 112 is a screen when a search sub menu of an information main menu in a video display device manufacturer application is selected according to an embodiment.

As shown in FIG. 112, the search list includes characters of a main AV content. The video display device 500 may display at least one of pictures or names of a search item on the additional information area 360a.

When one of a plurality of search items is selected through the cursor of a remote controller in operation S1009, the video display device 500 searches information on the selected search item in operation S1011. At this point, the video display device 500 may use an internet search engine such as Google. Moreover, the video display device 500 may use information such as Tribune media or IMDb.

The video display device 500 displays the searched information on the additional information area 360a in operation S1013. Since the searched result is automatically retrieved through programming such as Open API of a service provider, time for a screen design may be greatly saved. A display example of the search information will be described with reference to FIG. 113.

Figure 113:
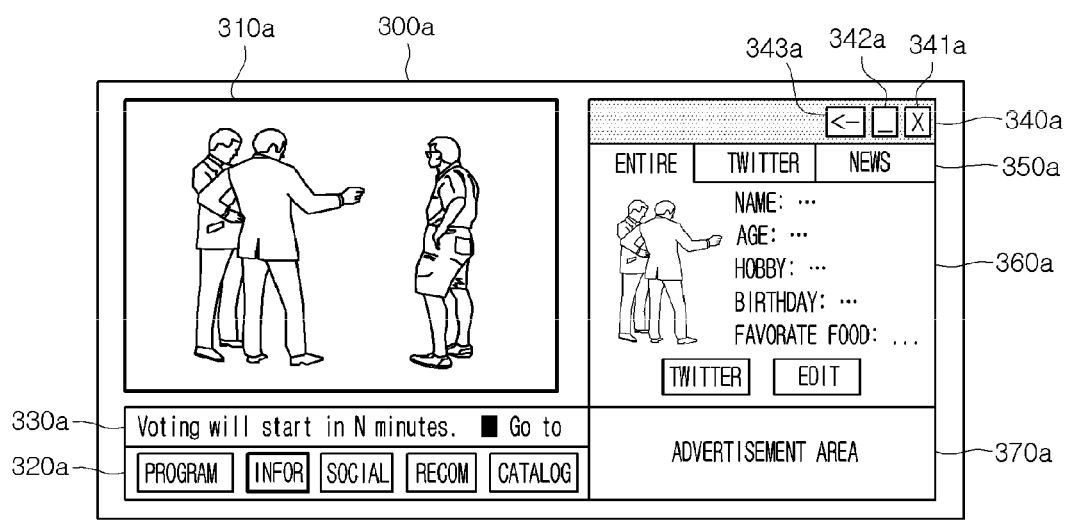
FIG. 113 is another screen when a search sub menu of an information main menu in a video display device manufacturer application is selected according to an embodiment.

FIG. 113 is another screen when a search sub menu of an information main menu in a video display device manufacturer application is selected according to an embodiment.

As shown in FIG. 113, the video display device 500 displays a search result for the selected search item on the additional information area 360a. Moreover, the video display device positions a Twitter button and an edit button on the additional information area 360a to follow an actor's Twitter or edit an actor's profile such as filmography or biography.

Like this, if the searching method according to an embodiment is used, information related to a main AV data may be searched through one click, so that an effort to input a search word may be reduced.

Next, a Twitter sub menu of an information main menu in a video display device manufacturer application will be described according to an embodiment with reference to FIGS. 114 to 115.

Figure 114:
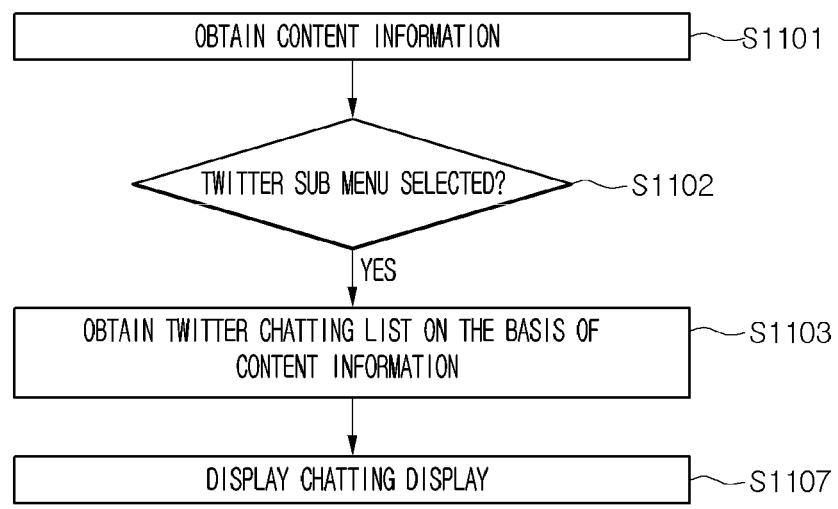
FIG. 114 is flowchart illustrating a chatting window displaying method according to an embodiment.

FIG. 114 is flowchart illustrating a chatting window displaying method according to an embodiment.

The video display device 500 extracts a certain section of a main AV content and obtains content information on the basis of the extracted section in operation S1101.

Once a Twitter sub menu of an information main menu in a video display device manufacturer application is selected in operation S1102, the video display device 500 obtains a Twitter chatting list corresponding to an enhanced service on the basis of the obtained content information in operation S1103. The video display device 500 writes a program name on Hashtag of Twitter to load a Twitter chatting list related to the program. This chatting list is linked to Twitter and is continuously updated in real time.

The video display device 500 displays one chatting window in the Twitter chatting list on the additional information area 360a through a user selection or automatically in operation S1107. A display example of the chatting window will be described with reference to FIG. 115.

Figure 115:
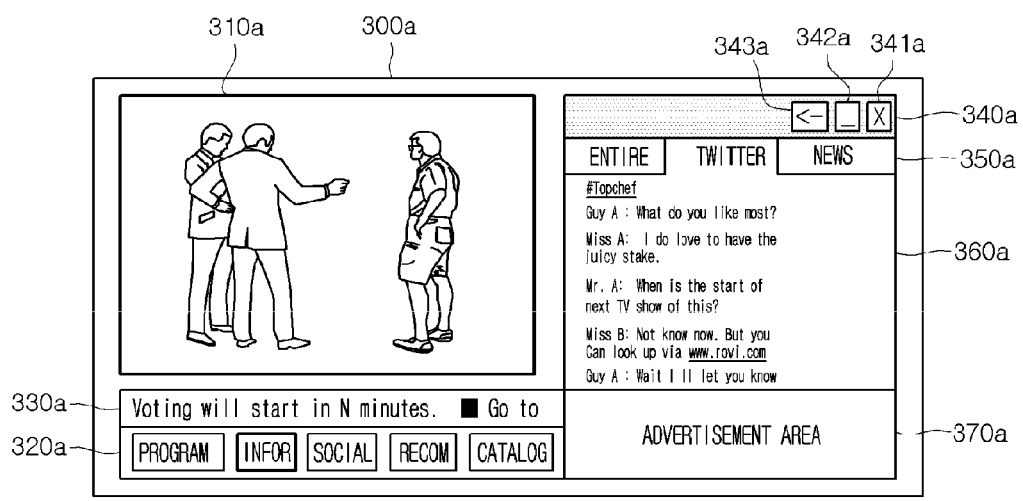
FIG. 115 is a screen when a Twitter sub menu of an information main menu in a video display device manufacturer application is selected according to an embodiment. 6

FIG. 115 is a screen when a Twitter sub menu of an information main menu in a video display device manufacturer application is selected according to an embodiment. 6

As shown in FIG. 115, the video display device 500 displays a chatting window on the additional information area 360a to support chatting between viewers watching the same program.

When a program is broadcasted, a user of the program may directly write a message in a chatting room actually. If the video display device 500 has a log in mechanism like Smart TV, a user of the video display device 500 may immediately start chatting with his own ID in a logged in state when entering into a menu. If it is inconvenient to make an input to the video display device 500 through a remote controller, the video display device 500 may display only a chatting message. If the video display device 500 is linked to a second device such as Smart Phone or tablet, a message may be typed using the input device of the second device. Although information in Hashtag is a program name basically, it may be selected as a tag of actors or directions, i.e., the above-mentioned another basic information, so that a user may selectively participate in chatting of a corresponding subject.

Next, a news sub menu of an information main menu in a video display device manufacturer application will be described according to an embodiment with reference to FIGS. 116 to 117.

Figure 116:
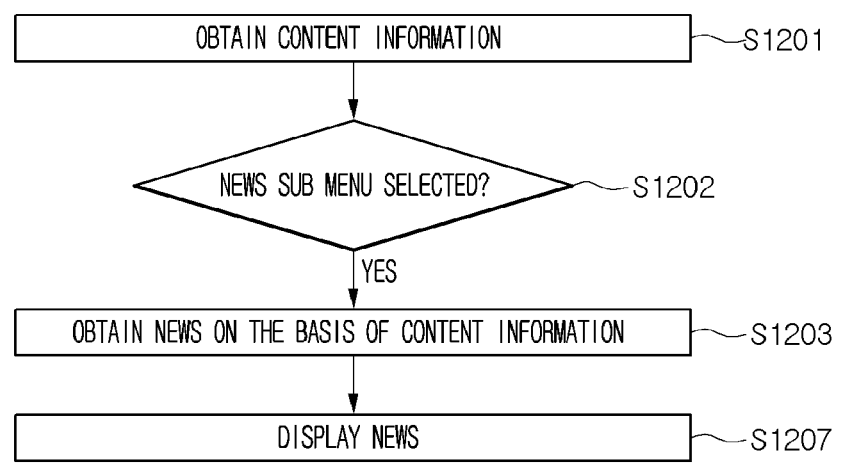
FIG. 116 is a flowchart illustrating a news obtaining method according to an embodiment.

FIG. 116 is a flowchart illustrating a news obtaining method according to an embodiment.

The video display device 500 extracts a certain section of a main AV content and obtains content information on the basis of the extracted section in operation S1201.

Once the news sub menu of an information main menu in a video display device manufacturer application is selected in operation S1202, the video display device 500 obtains news corresponding to an enhanced service on the basis of the obtained content information in operation S1203. At this point, the news may or may not relate to a main AV content. Or, the news may be provided from a broadcaster of a main AV content. If the broadcaster does not provide news through Open API, the video display device 500 may receive news through News feeds of an internet service such as Google or Yahoo.

The video display device 500 displays the obtained news on the additional information area 360*a* in operation S1207. A display example of news will be described with reference to FIG. 117.

Figure 117:
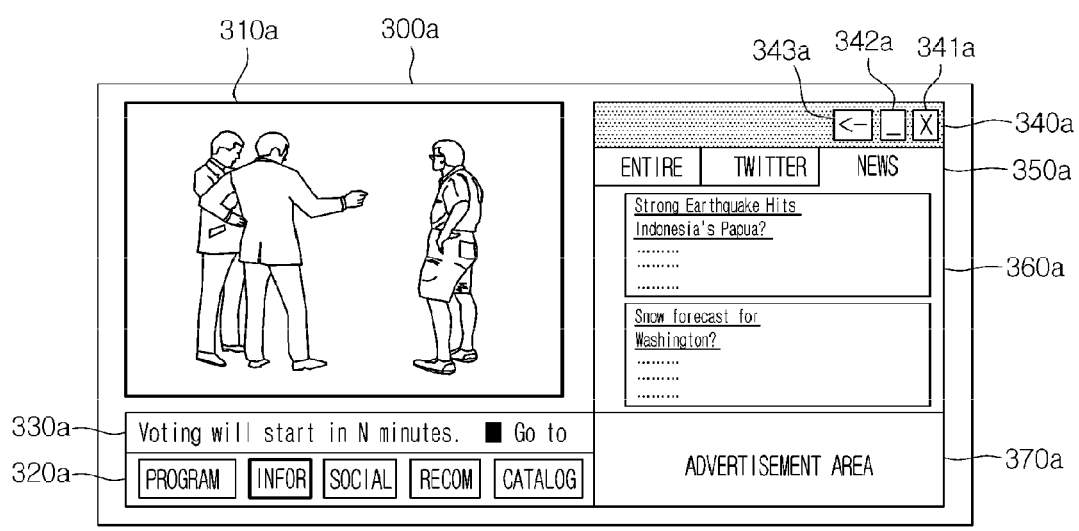
FIG. 117 is a screen when a news sub menu of an information main menu in a video display device manufacturer application is selected according to an embodiment.

FIG. 117 is a screen when a news sub menu of an information main menu in a video display device manufacturer application is selected according to an embodiment.

As shown in FIG. 117, the video display device 500 may display the obtained news on the additional information area 360*a*.

Hereinafter, a social main menu of a video display device manufacturer application will be described according to an embodiment with reference to FIGS. 118 to 123.

The social main menu corresponds to a time insensitive area. Like the UI of the program main menu, the social main menu does not operate in a UI manner that an application is automatically displayed and disappears at a specific time. Of course, although the above-mentioned time linked application may be displayed through this menu, when a main menu other than the program main menu is selected, a second service such as Facebook may be linked.

The social main menu includes a viewer list sub menu and a preference display sub menu.

Then, a viewer list sub menu of a social main menu in a video display device manufacturer application will be described according to an embodiment with reference to FIGS. 118 to 521.

Figure 118:
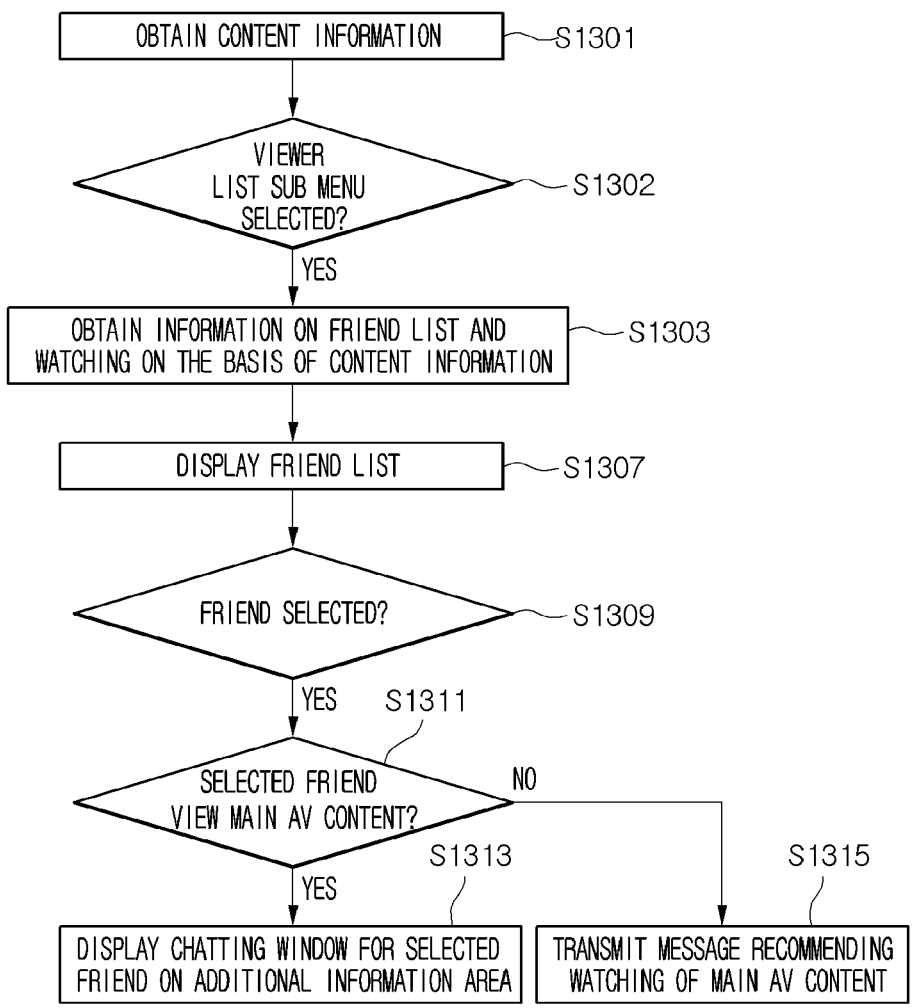
FIG. 118 is flowchart illustrating a viewer list displaying method according to an embodiment.

FIG. 118 is flowchart illustrating a viewer list displaying method according to an embodiment.

The video display device 500 extracts a certain section of a main AV content and obtains content information on the basis of the extracted section in operation S1301.

Once a viewer list sub menu of a social main menu in a video display device manufacturer application is selected in operation S1302, the video display device 500 obtains information on a friends list and whether each friend watches a main AV content on the basis of the obtained content information in operation S1303. The video display device 500 may be linked with a social network service such as Facebook to obtain a list of friends watching a main AV content.

The video display device 500 displays the obtained viewer list on the additional information area 360*a* in operation S1307. A display example of the viewer list will be described with reference to FIG. 119.

Figure 119:
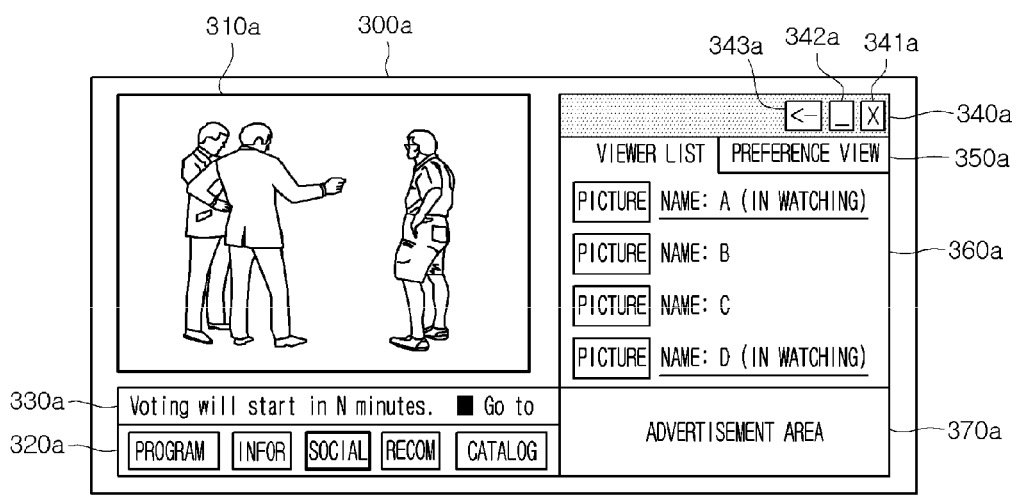
FIG. 119 is a screen when a viewer list sub menu of a social main menu in a video display device manufacturer application is selected according to an embodiment.

FIG. 119 is a screen when a viewer list sub menu of a social main menu in a video display device manufacturer application is selected according to an embodiment.

As shown in FIG. 119, the video display device 500 may display the pictures and names of the viewers corresponding to the obtained viewer list on the additional information area 360*a*.

Especially, the video display device 500 may display a friends list together with whether each friend watches contents or only a list of friends watching contents currently.

When one friend is selected from the displayed friends list in operation S1309, the video display device 500 confirms whether the selected friend watches a main AV content in operation S1311.

If the selected friend watches the main AV content, the video display device 500 displays the chatting window of the selected friend on the additional information are 360*a* in operation S1313.

Additionally, if the selected friend does not watch the main AV content, the video display device 500 sends a message recommending watching the main AV content to the e-mail or mobile phone of the selected friend in operation S1315. Even if the selected friend does not watch the main AV content, the video display device 500 may display the chatting window of the selected friend on the additional information are 360*a*.

For chatting, a user may use the remote controller of the video display device 500 or the input device of the second device connected to the video display device 500, and may chat with friends through a social network service application of a smart phone regardless of the video display device 500. In any cases, a chatting screen of the social network service may be displayed on the screen of the video display device 500. Through buttons for evaluating a program, a user may send his/her intention to friends. For example, a user may notify friends that he/she currently watches a main AV content and may recommend friends who do not watch the main AV content currently to watch it through a "good" button.

Like this, the video display device 500 automatically realizes who is watching which program by using an ACR technique through a viewer list sub menu. In order to confirm who is watching which program, a user needs to log in. Once an account for log in is registered in the video display device 500, each time the video display device 500 is turned on, a user may log in automatically. Therefore, the video display device 500 may realize who is watching a main AV content.

Figure 120:
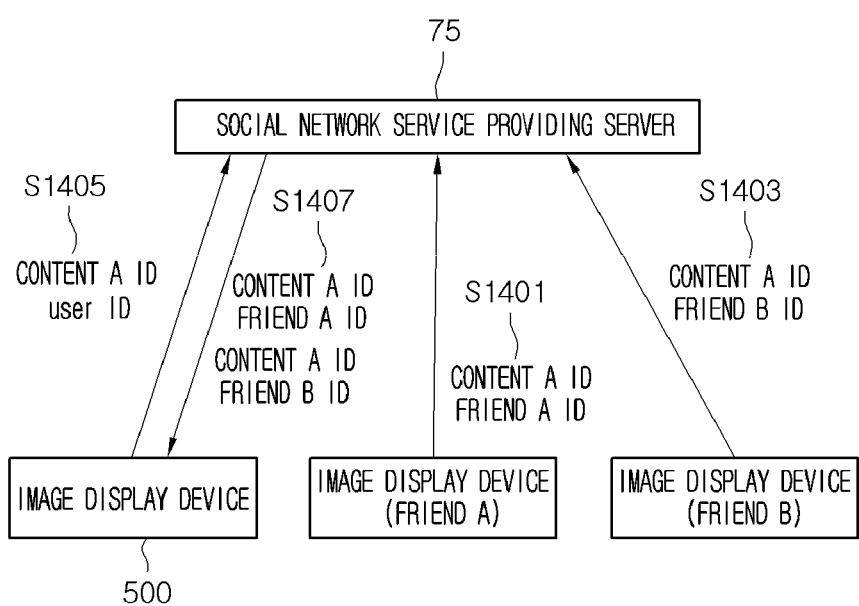
FIG. 120 is a signal flow when a video display device obtains a friends list and watching information according to an embodiment.

FIG. 120 is a signal flow when a video display device obtains a friends list and watching information according to an embodiment.

As shown in FIG. 120, if a video display device of a friend A plays a main AV content A, it transmits an identifier of the main AV content A and an identifier of the friend A to the SNS providing server 75 in operation S1401.

Additionally, if a video display device of a friend B plays the main AV content A, it transmits an identifier of the main AV content A and an identifier of the friend B to the SNS providing server 75 in operation S1403.

If the video display device 500 plays the main AV content A, it transmits a user ID and an identifier of the main AV content A to the SNS providing server 75 in operation S1405.

The SNS providing server 75 confirms information on a friends list of the video display device 500 and whether each friend watches a main AV content on the basis of the friend relationship information and received content identifiers in operation S1407.

Figure 121:
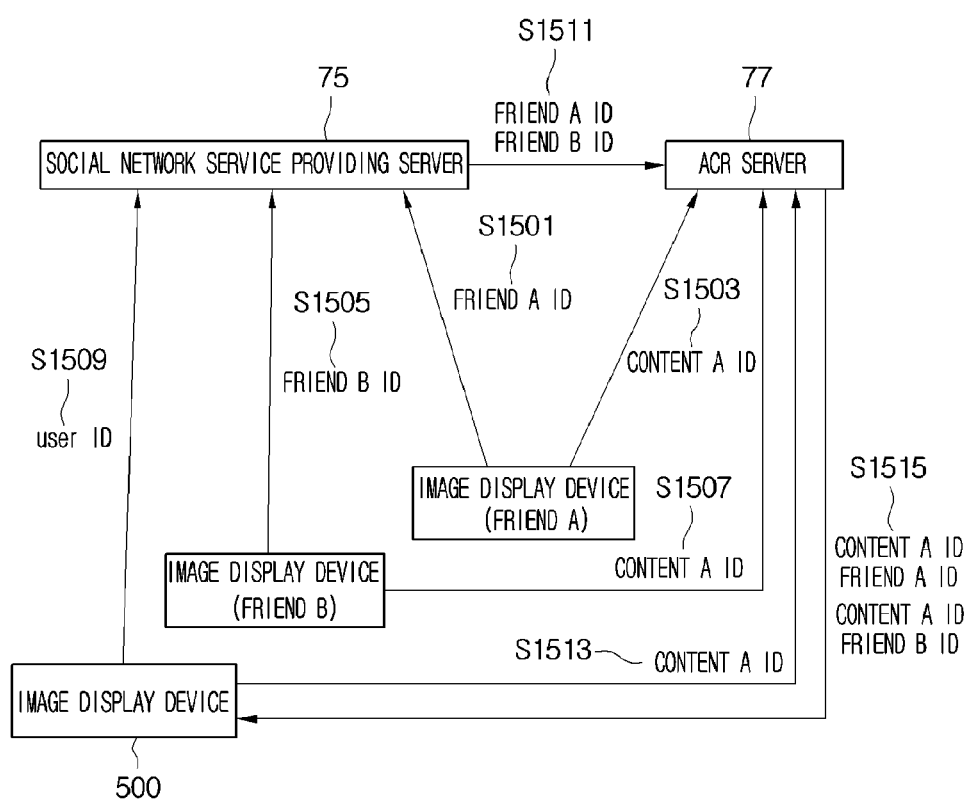
FIG. 121 is a signal flow when a video display device obtains a friends list and watching information according to another embodiment.

FIG. 121 is a signal flow when a video display device obtains a friends list and watching information according to another embodiment.

As shown in FIG. 121, if a video display device of a friend A plays a main AV content A, it transmits an identifier of the friend A to the SNS providing server 75 in operation S1501, and transmits the main AV content A to the ACR sever in operation S1503. The ACR server 77 may be one of a watermark server 21, a fingerprint server 22, an enhanced service information providing server 40, and an enhanced service providing sever 50.

Additionally, if a video display device of a friend B plays the main AV content A, it transmits an identifier of the friend B to the SNS providing server 75 in operation S1505, and transmits the main AV content A to the ACR sever 77 in operation S1507.

The video display device 500 transmits a user ID to the SNS providing server 75 in operation 1509.

Then, the SNS providing server 75 provides a friend list corresponding to the user ID to the ACR server 75 in operation S1511.

Moreover, if the video display device 500 plays the main AV content A, it transmits a user ID and an identifier of the main AV content A to the ACR server 75 in operation S1513.

The ACR server 75 confirms information on the friends list of the video display device 500 and whether each friend watches a main AV content on the basis of the friends list corresponding to the user ID and content identifier, and then, provides the confirmed information to the video display device 500 in operation S1515.

Then, a preference display sub menu of a social main menu in a video display device manufacturer application will be described according to an embodiment with reference to FIGS. 122 to 123.

Figure 122:
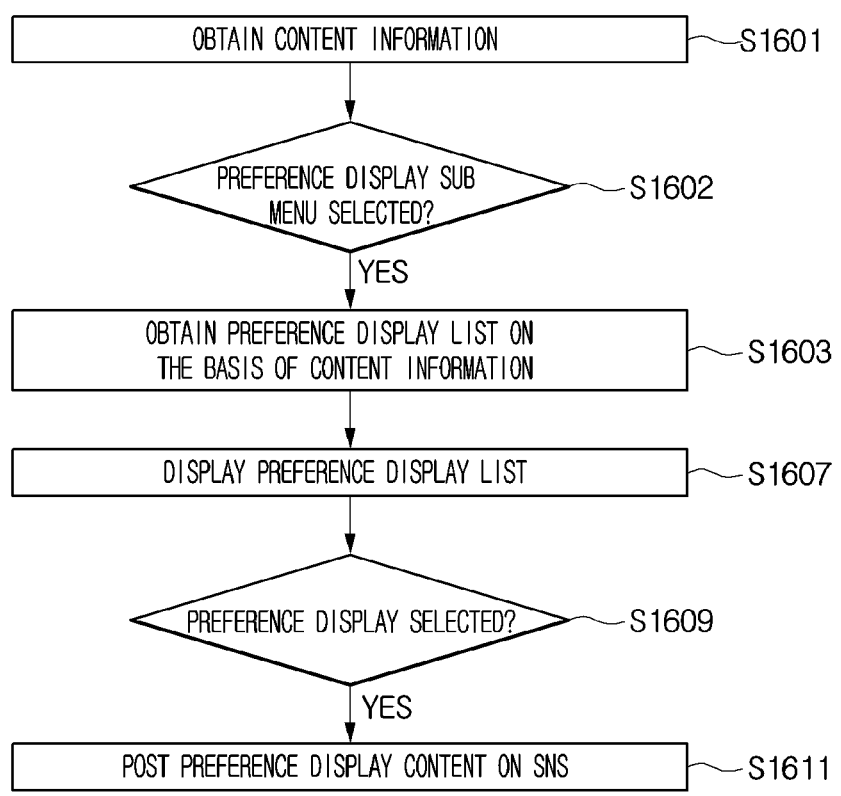
FIG. 122 is flowchart illustrating a preference displaying method according to an embodiment.

FIG. 122 is flowchart illustrating a preference displaying method according to an embodiment.

The video display device 500 extracts a certain section of a main AV content and obtains content information on the basis of the extracted section in operation S1601.

Once a preference display sub menu of a social main menu in a video display device manufacturer application is selected in operation S1602, the video display device 500 obtains a preference display list including a plurality of preference display items on the basis of the obtained content information in operation S1603. Here, the preference display item may include preview or a preview address. The preview may be an image or a short video. The preview may be directly provided from a broadcaster through Open API, or may be obtained by a search engine of an internet service, or obtained by extracting only a necessary portion from an internet server of a broadcaster. Images corresponding to core scenes of a time interval corresponding to several minutes may be provided or one image for one program may be provided.

The video display device 500 displays the obtained preference display list on the additional information area 360*a* in operation S1607. A display example of the viewer list will be described with reference to FIG. 123.

Figure 123:
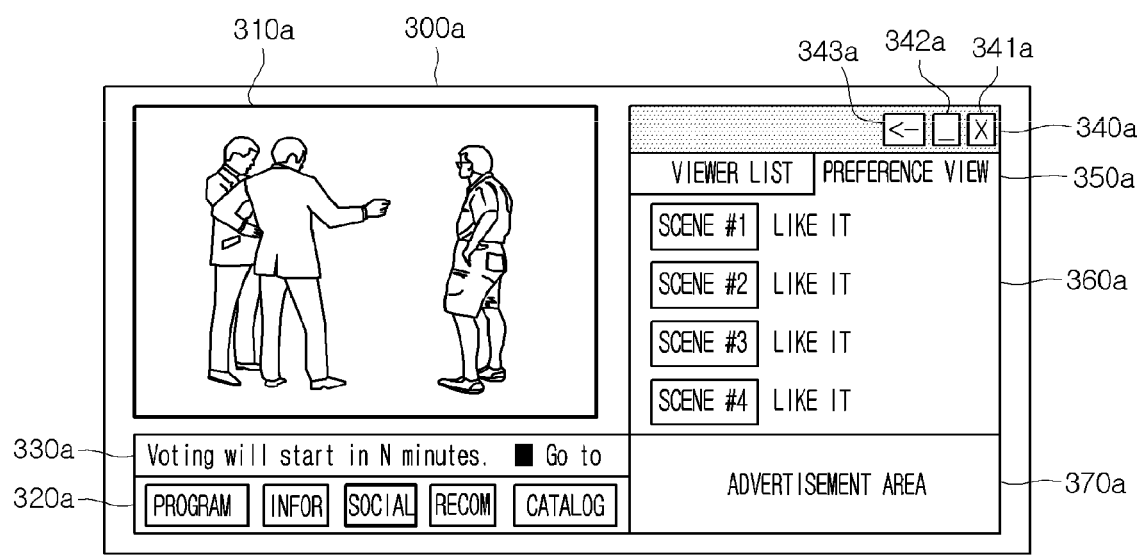
FIG. 123 is a screen when a preference display sub menu of a social main menu in a video display device manufacturer application is selected according to an embodiment.

FIG. 123 is a screen when a preference display sub menu of a social main menu in a video display device manufacturer application is selected according to an embodiment.

As shown in FIG. 123, the video display device 500 may display previews in a preference display list and "Like it" buttons for preference display on the additional information area 360*a*.

Once the "Like it" button corresponding to one preference display item is selected in operation S1609, the video display device 500 posts a preview and simple text corresponding to the selected preference display item on SNS such as Facebook in operation S1611. Here, the simple text may be automatically generated, or may be inputted through a remote controller or an input device of a second device.

Hereinafter, a recommendation main menu of a video display device manufacturer application will be described according to an embodiment with reference to FIGS. 124 to 127.

The recommendation main menu corresponds to a time insensitive area. Like the UI of the program main menu, the recommendation main menu does not operate in a UI manner that an application is automatically displayed and disappears at a specific time. Of course, through this menu, the above-mentioned time linked application may be displayed but if a recommendation menu is selected, another service may be linked.

The recommendation main menu may include a previous episode sub menu, a VOD sub menu, and an application sub menu.

Figure 124:
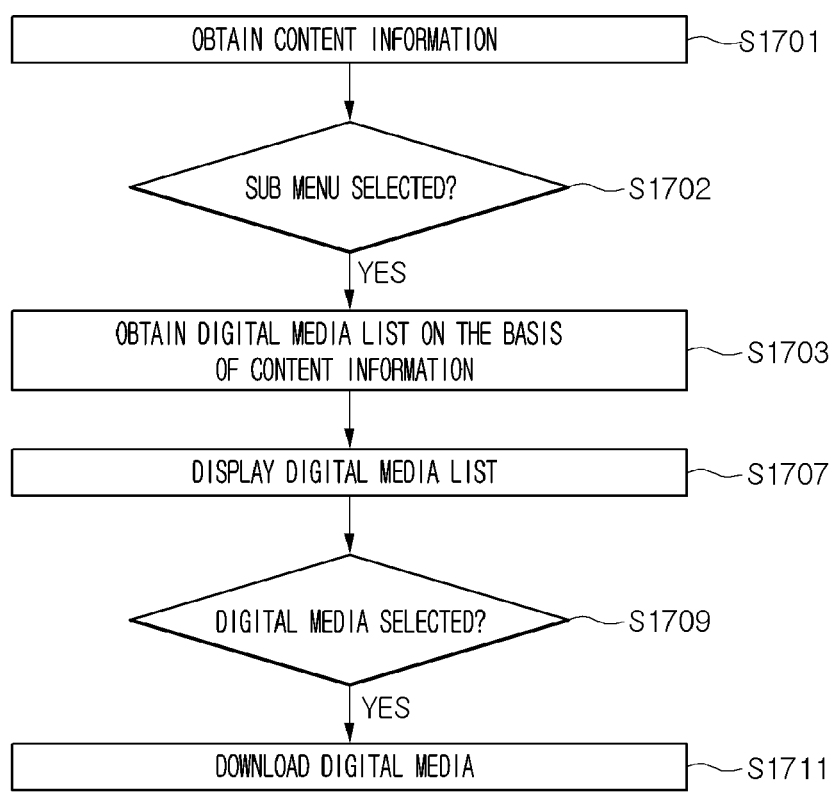
FIG. 124 is flowchart illustrating a digital media downloading method according to an embodiment.

FIG. 124 is flowchart illustrating a digital media downloading method according to an embodiment.

The video display device 500 extracts a certain section of a main AV content and obtains content information on the basis of the extracted section in operation S1701.

Once a recommendation main menu of a video display device manufacturer application is selected in operation S1702, the video display device manufacturer application obtains a digital media list on the basis of the obtained content information in operation S1703. If the previous episode sub menu is selected, the video display device 500 obtains a previous episode list. If the VOD sub menu is selected, the video display device 500 obtains a VOD list that relates to a main AV content or a provider of the main AV content recommends. If the application sub menu is selected, the video display device 500 obtains a VOD list that relates to a main AV content or a provider of the main AV content recommends. Here, the digital media list may include a preview, a preview address, and an icon related image.

The video display device manufacturer application displays the obtained digital media list on the additional information area 360*a* in operation S1707.

An example of a previous episode list is described with reference to FIG. 125.

Figure 125:
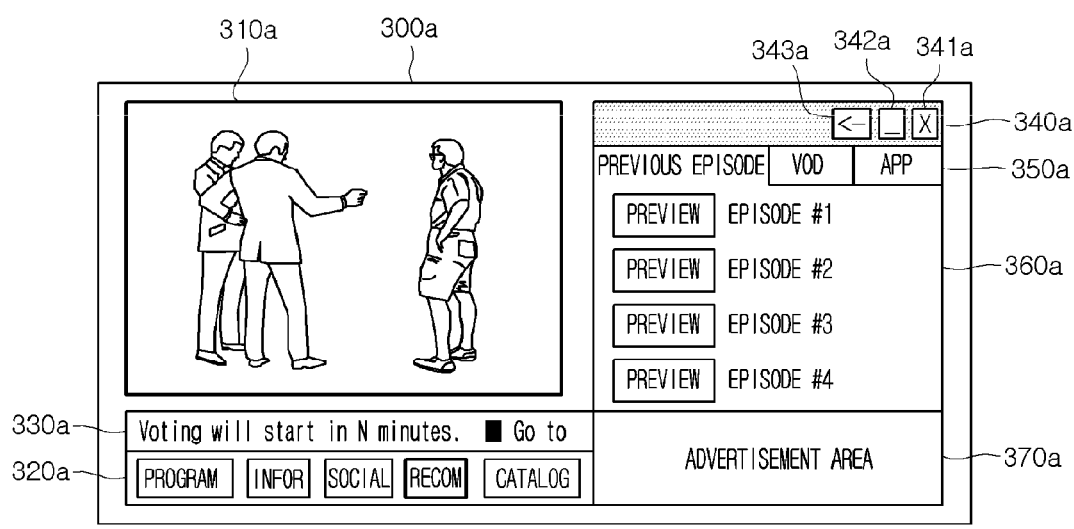
FIG. 125 is a screen when a previous episode sub menu of a recommendation main menu in a video display device manufacturer application is selected according to an embodiment.

FIG. 125 is a screen when a previous episode sub menu of a recommendation main menu in a video display device manufacturer application is selected according to an embodiment.

As shown in FIG. 125, the video display device 500 displays previews and titles of a previous episode list on the additional information area 360*a*. Like this, according to an embodiment, the video display device 500 may automatically search and display a previous episode without user's manipulation.

A display example of the VOD list will be described with reference to FIG. 126.

Figure 126:
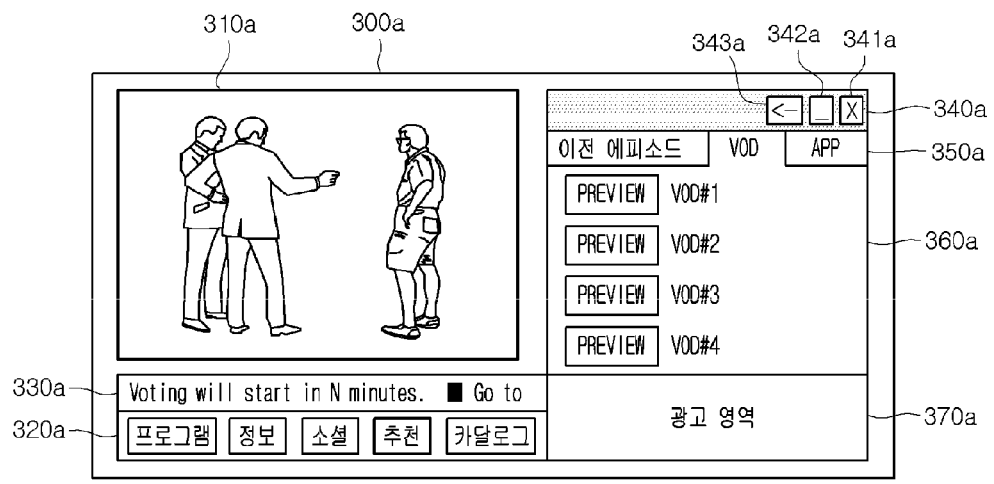
FIG. 126 is a screen when a VOD sub menu of a recommendation main menu in a video display device manufacturer application is selected according to an embodiment.

FIG. 126 is a screen when a VOD sub menu of a recommendation main menu in a video display device manufacturer application is selected according to an embodiment.

As shown in FIG. 126, the video display device 500 displays previews and titles of a VOD list on the additional information area 360*a*. Like this, according to an embodiment, the video display device 500 may automatically search and display VOD related to a main AV content without user's manipulation.

A display example of the application list will be described with reference to FIG. 127.

Figure 127:
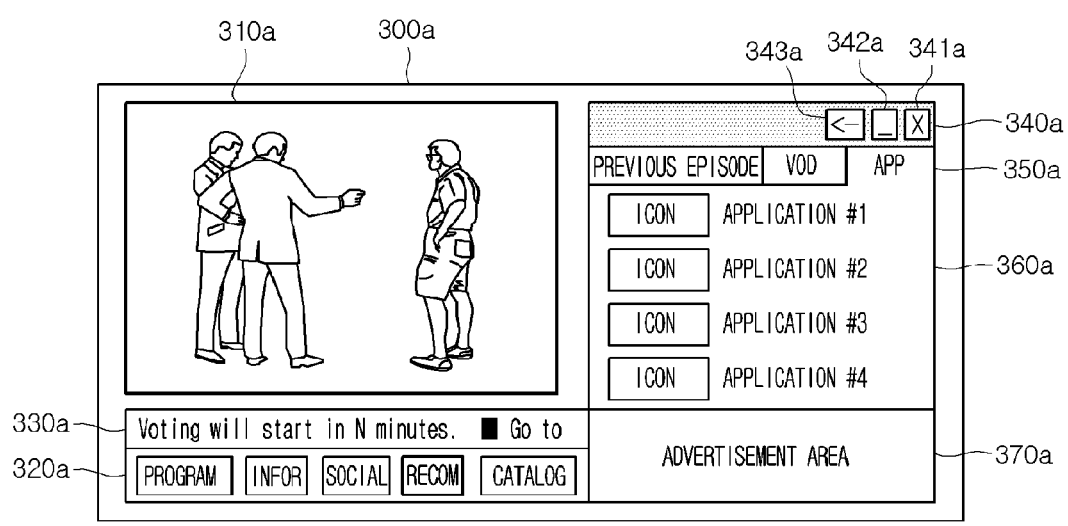
FIG. 127 is a screen when an application sub menu of a recommendation main menu in a video display device manufacturer application is selected according to an embodiment.

FIG. 127 is a screen when an application sub menu of a recommendation main menu in a video display device manufacturer application is selected according to an embodiment.

As shown in FIG. 127, the video display device 500 displays icons and application names of the application list on the additional information area 360*a*. Like this, according to an embodiment, the video display device 500 may automatically search and display applications related to a main AV content without user's manipulation.

Once one item is selected from the digital media list in operation S1709, the video display device manufacturer application downloads a digital media corresponding to the selected item in operation S1711. At this point, the video display device 500 may download the digital media after payment. If the selected item is a previous episode or VOD, the video display device 500 may play the downloaded digital media. If the selected item is an application, the video display device may automatically play the downloaded application or may play it through a user's selection.

Like this, according to an embodiment, the video display device may download digital media through simple manipulation.

Hereinafter, a catalog main menu of a video display device manufacturer application will be described according to an embodiment with reference to FIGS. 128 to 130.

The catalog main menu corresponds to a time insensitive area. Like the UI of the program main menu, the catalog main menu does not operate in a UI manner that an application is automatically displayed and disappears at a specific time. Of course, through this menu, the above-mentioned time linked application may be displayed but if a catalog menu is selected, another service may be linked.

The catalog main menu may include a style sub menu, a music sub menu, and another sub menu.

Figure 128:
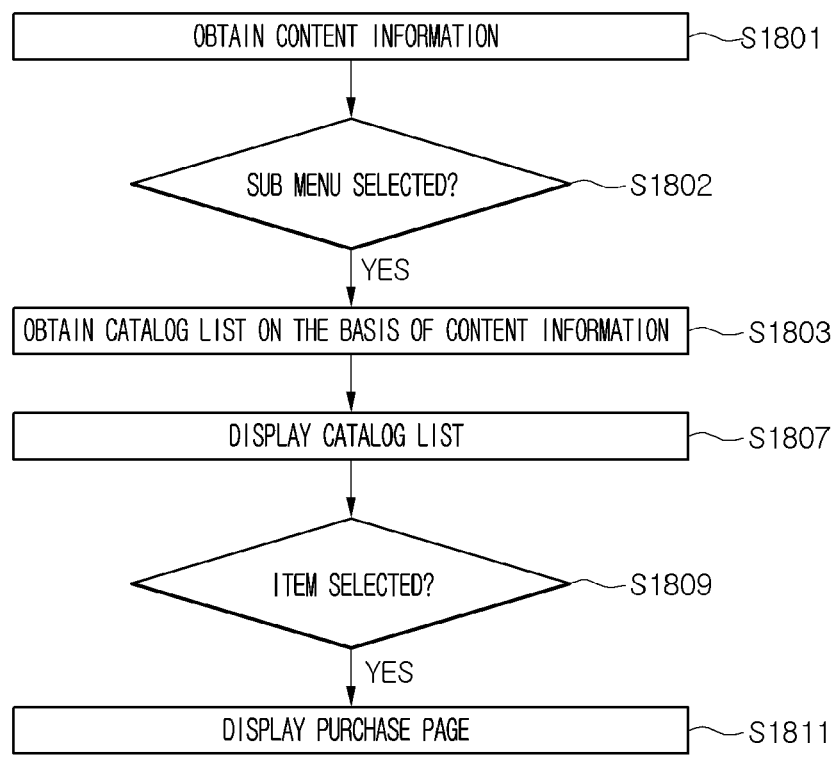
FIG. 128 is flowchart illustrating a catalog displaying method according to an embodiment.

FIG. 128 is flowchart illustrating a catalog displaying method according to an embodiment.

The video display device 500 extracts a certain section of a main AV content and obtains content information on the basis of the extracted section in operation S1801.

Once a sub menu of a catalog main menu in a video display device manufacturer application is selected in operation S1802, the video display device manufacturer application obtains a catalog list on the basis of the obtained content information in operation S1803. If the style sub menu is selected, the video display device 500 obtains a clothing catalog list that relates to a main AV content or a provider of the main AV content recommends. If the music sub menu is selected, the video display device 500 obtains a music catalog list that relates to a main AV content or a provider of the main AV content recommends. If the other sub menu is selected, the video display device 500 obtains a products or places catalog list that relates to a main AV content or a provider of the main AV content recommends. Here, the digital media list may include a related image, price information, description, and coupon. The coupon may be numbers or QR codes. The video display device 500 may display coupons only when a user watches a main AV content, or may allow a user to use it during the available period after saving it on the memory 550.

The video display device manufacturer application displays the obtained catalog list on the additional information area 360*a* in operation S1807.

A display example of the clothing catalog list will be described with reference to FIG. 129.

Figure 129:
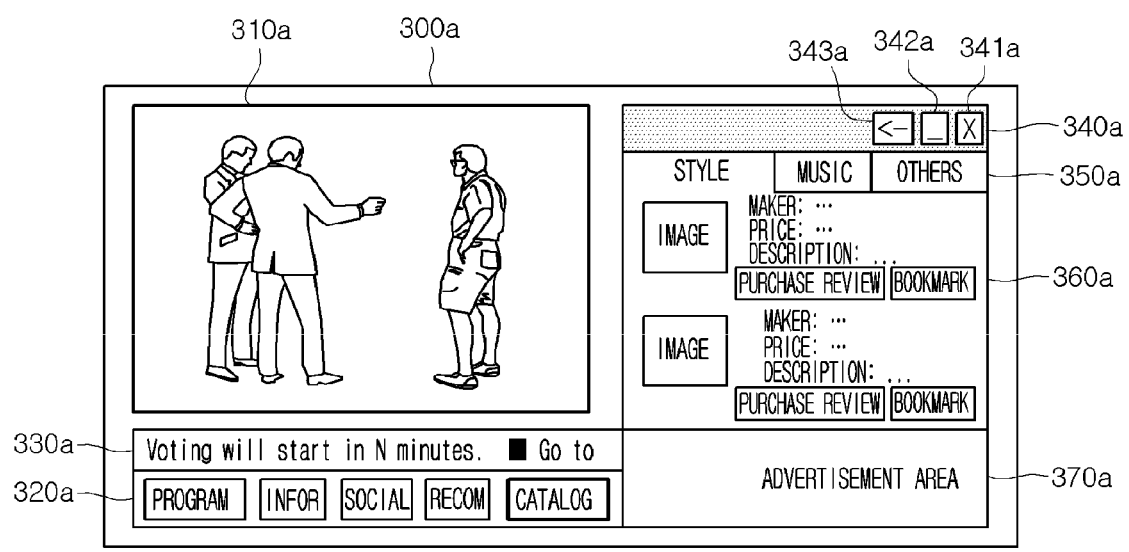
FIG. 129 is a screen when a style sub menu of a recommendation main menu in a video display device manufacturer application is selected according to an embodiment.

FIG. 129 is a screen when a style sub menu of a recommendation main menu in a video display device manufacturer application is selected according to an embodiment.

As shown in FIG. 129, the video display device 500 displays maker information, price information, of description information of clothing related to a main AV content on the additional information area 360*a*. Like this, according to an embodiment, the video display device 500 may automatically search and display a clothing catalog related to a main AV content without user's manipulation.

An example of a music catalog list is described with reference to FIG. 130.

Figure 130:
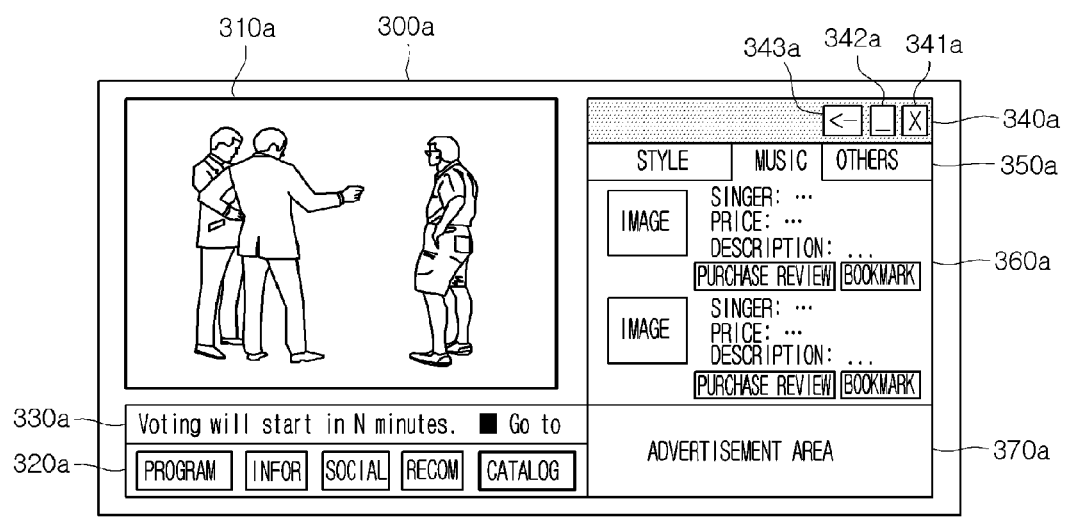
FIG. 130 is a screen when a music sub menu of a recommendation main menu in a video display device manufacturer application is selected according to an embodiment.

FIG. 130 is a screen when a music sub menu of a recommendation main menu in a video display device manufacturer application is selected according to an embodiment.

As shown in FIG. 130, the video display device 500 displays singer information, price information, and description information of music related to a main AV content on the additional information area 360*a*. Like this, according to an embodiment, the video display device 500 may automatically search and display a music catalog related to a main AV content without user's manipulation.

A display example of another catalog list will be described with reference to FIG. 131.

Figure 131:
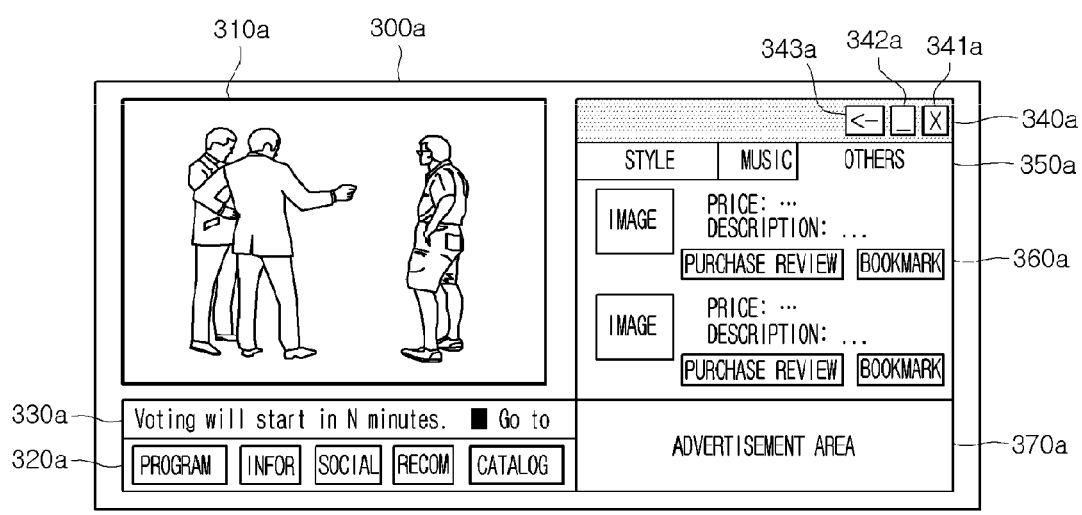
FIG. 131 is a screen when another sub menu of a recommendation main menu in a video display device manufacturer application is selected according to an embodiment.

FIG. 131 is a screen when another sub menu of a recommendation main menu in a video display device manufacturer application is selected according to an embodiment.

As shown in FIG. 131, the video display device 500 displays price information and description information of products and places related to a main AV content on the additional information area 360*a*. Like this, according to an embodiment, the video display device 500 may automatically search and display a products or places catalog related to a main AV content without user's manipulation.

Once one item is selected from the catalog list in operation S1809, the video display device manufacturer application displays a purchase item corresponding to the selected item in operation S1811.

Like this, according to an embodiment, a user may purchase products through simple manipulation.

A post purchase review button and a bookmark button may be disposed at each item in the catalog list.

Once the post purchase review button is selected, the video display device 500 may display a post use review of a product on the additional information are 360*a*. Additionally, a user may write a post purchase review.

Additionally, after bookmarking a specific item through the bookmark button, a user may recommend the bookmarked item through a viewer list sub menu of a social main menu.

In this case, the video display device 500 may provide bookmark item information to the ACR server 77 or SNS providing server 75.

Then, the video display device 500 of a user receiving the recommendation obtains content information on the basis of the extracted section from a main AV content, and may display a recommendation message such as "this product is recommended by a friend U" if the main AV content corresponds to an advertisement of the recommended item on the basis of the obtained content information. Additionally, instead of a recommendation message, a short video may be displayed.

Then, an on/off control of an ACR function will be described according to an embodiment with reference to FIGS. 132 and 133.

Figure 132:
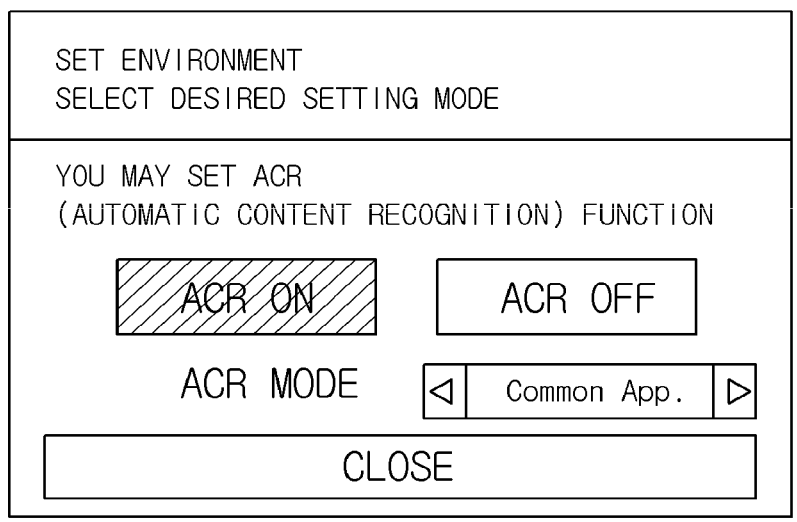
FIG. 132 is a view of a user interface for controlling an ACR function according to an embodiment.

FIG. 132 is a view of a user interface for controlling an ACR function according to an embodiment.

As shown in FIG. 132, the play controlling unit 513 displays an ACR function setting window. A user may activate or deactivate the ACR function through the ACR function setting window.

When the ACR function is activated, a user may select an ACR mode. The ACR mode may be set with one of an auto playing application mode, a content provider application mode, and an video display manufacturer application mode.

When the ACR function mode is set in the above manner, the play controlling unit 513 saves setting information on a setting information storage unit 554.

Figure 133:
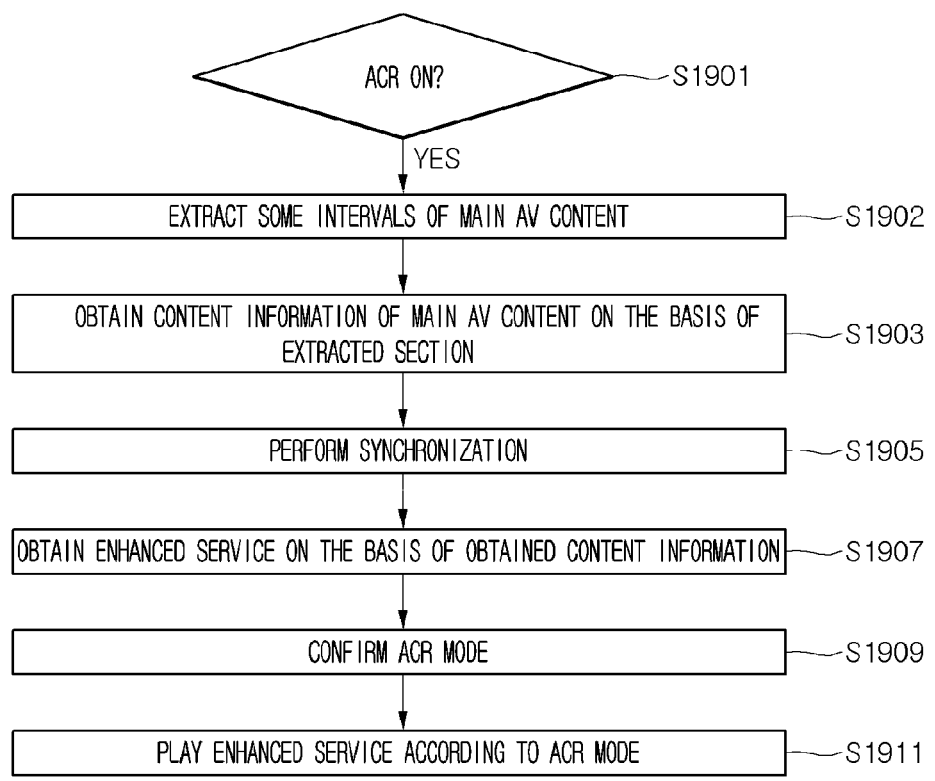

FIG. 133 is a flowchart illustrating a method of controlling a video display device according to the embodiment.

The enhanced service management unit 530 confirms whether the ACR function is turned on in operation S1901.

If the ACR function is deactivated, the enhanced service management unit 530 does not perform a content information obtaining procedure any more.

If the ACR function is activated, the enhanced service management unit 530 extracts a certain section of a main AV content in operation S1902.

The enhanced service management unit 530 obtains content information of the main AV content on the basis of the extracted section in operation S1903.

The enhanced service management unit 530 synchronizes the reference time of the main AV content with the reference time of an alternative advertisement in operation S1905.

The enhanced service management unit 530 obtains an enhanced service on the basis of the obtained content information in operation S1907. The enhanced service management unit 530 obtains enhanced service information on the basis of the content information, and then obtains an enhanced service on the basis of the enhanced service information.

Then, the enhanced service management unit 530 confirms the ACR mode in operation S1909.

The enhanced service management unit 530 plays the enhanced service according to the ACR mode in operation S1911.

In more detail, if the ACR mode is an automatic play application mode, the enhanced service management unit 530 executes an automatic play application, and the executed automatic play application plays the obtained enhanced service.

If the ACR mode is the content provider application mode, the enhanced service management unit 530 executes a content provider application corresponding to the obtained content information in background. The enhanced service management unit 530 displays a content provider application when receiving a user input corresponding to an enhanced service use. This content provider application may play the obtained enhanced service. Instead that the content provider application is automatically executed in background, it may be executed by a user input.

If the ACR mode is the video display device manufacturer application mode, the enhanced service management unit 530 executes its video display device manufacturer application in background. The enhanced service management unit 530 displays the video display device manufacturer application when receiving a user input corresponding to an enhanced service use. This video display device manufacturer application may play the obtained enhanced service. Instead that the video display device manufacturer application is automatically executed in background, it may be executed by a user input.

Next, an advertisement alternative method will be described according to an embodiment with reference to FIGS. 134 and 135.

Figure 134:
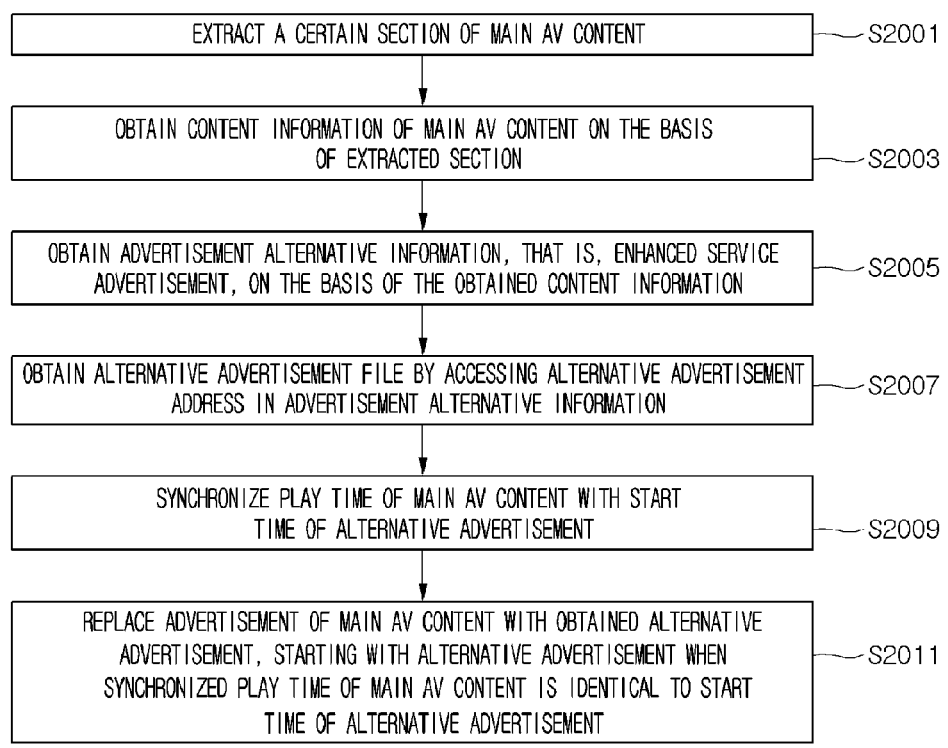

FIG. 134 is a flowchart illustrating an advertisement alternative method according to an embodiment.

First, the enhanced service management unit 530 extracts a certain section of a main AV content in operation S6001.

The enhanced service management unit 530 obtains content information of the main AV content on the basis of the extracted section in operation S6003.

Then, the enhanced service management unit 530 obtains advertisement alternative information, i.e., enhanced service information, on the basis of the obtained content information in operation S6005

The enhanced service management unit 530 may receive a query result including both content information and advertisement alternative information of the main AV content. Table 17 illustrates an example of the query result.

TABLE 17

```
<queryresult>
<content >
< id>Secret Garden</id>
< playtime unit="mm:ss">68:00</playtime>
< broadcastor>SBS </broadcastor>
</content>
<signature>
<starttime unit="ms">78000</starttime>
<endtime unit="ms">79965</endtime>
</signature>
<AD>
<ad1>
<adtype> stream or/and file </adtype>
<category>product</category>
<adname>LG LED DTV </adname>
<starttime unit="ms">95000</starttime>
<endtime unit="ms">110000</endtime>
<adURI>www.lge.co.kr/DTV/lw5700.avi</adURI>
< description>LG 3D smart TV </description>
</ad1>
<ad2>
<adtype> stream or/and file </adtype>
<category>product</category>
<adname>LG smart phone </adname>
<starttime unit="ms">145000</starttime>
<endtime unit="ms">175000</endtime>
<adURI>www.lge.co.kr/phone/lu2300.avi</adURI>
< description>LG smart phone </description>
</ad2>
...
</AD>
</queryresult>
```

In Table 17, a <queryresult> tag is a root tag, and represents a query reply from the fingerprint server 22. A <content> tag shows entire information of a main AV content. A <playtime> tag shows entire play time of the main AV content. The video display device 500 may calculate the end time of the main AV content through information in the <playtime> tag. A <broadcastor> tag shows broadcasting station information of the main AV content.

A <signature> tag shows time information of an AV sample that the video display device 500 uses to generate a signature. A <starttime> tag in the <signature> tag includes the start time of the AV sample used for generating a signature, and a <endtime> tag in the <signature> tag includes the end time of the AV sample used for generating a signature. The video display device 500 may continuously synchronize the play time of the main AV content through information in the <starttime> tag and <endtime> tag.

A <AD> tag includes all advertisement alternative information related to a content that is currently played in chronological order. The video display device 500 receives and saves an advertisement file or stream in advance or may buffer it through information in the <AD> tag Moreover, the video display device 500 may properly replace an advertisement at the synchronized time with the main AV content through the information in the <AD> tag.

A <ad1> tag includes information on one advertisement used for advertisement alternative. A <adtype> tag represents a type of an advertisement, and notifies a receiver that an advertisement is a media file or media stream. A <category> tag shows a category item of advertisement, and the video display device 500 selects and displays an advertisement that a user wants if there are several advertisements in the same advertising time by using the <category> tag. A <adname> tag shows a name of an advertisement.

A <starttime> tag shows a start time of an alternative advertisement, and an <endtime> tag shows an end time of an alternative advertisement. The start time and end time of the alternative advertisement are a time stamp value calculated from the starting of the main AV content and are expressed in ms. A <adRUL> tag includes position information of an alternative advertisement. A <description> tag includes description of an alternative advertisement.

After the advertisement alternative information is transmitted, only the content information shown in Table 18 may be transmitted.

TABLE 18

<queryresult>
<content >
< id>Secret Garden</id>
< playtime unit="mm:ss">68:00</playtime>
< broadcastor>SBS </broadcastor>
</content>
<signature>
<starttime unit="ms">110000</starttime>
<endtime unit="ms">115000</endtime>
</signature>
</queryresult>

The enhanced service management unit 530 accesses an alternative advertisement address in the advertisement alternative information to obtain an alternative advertisement file in operation S6007. As shown in Table 17, if the advertisement alternative information includes a plurality of advertisement addresses, the enhanced service management unit 530 obtains a plurality of alternative advertisement files.

The enhanced service management unit 530 synchronizes the play time of the main AV content with the start time of an alternative advertisement in operation S6009.

If the synchronized play time of the main AV content is identical to the start time of the alternative advertisement, the enhanced service management unit 530 starts the alternative advertisement to replace the advertisement of the main AV content in operation S2011.

Figure 135:
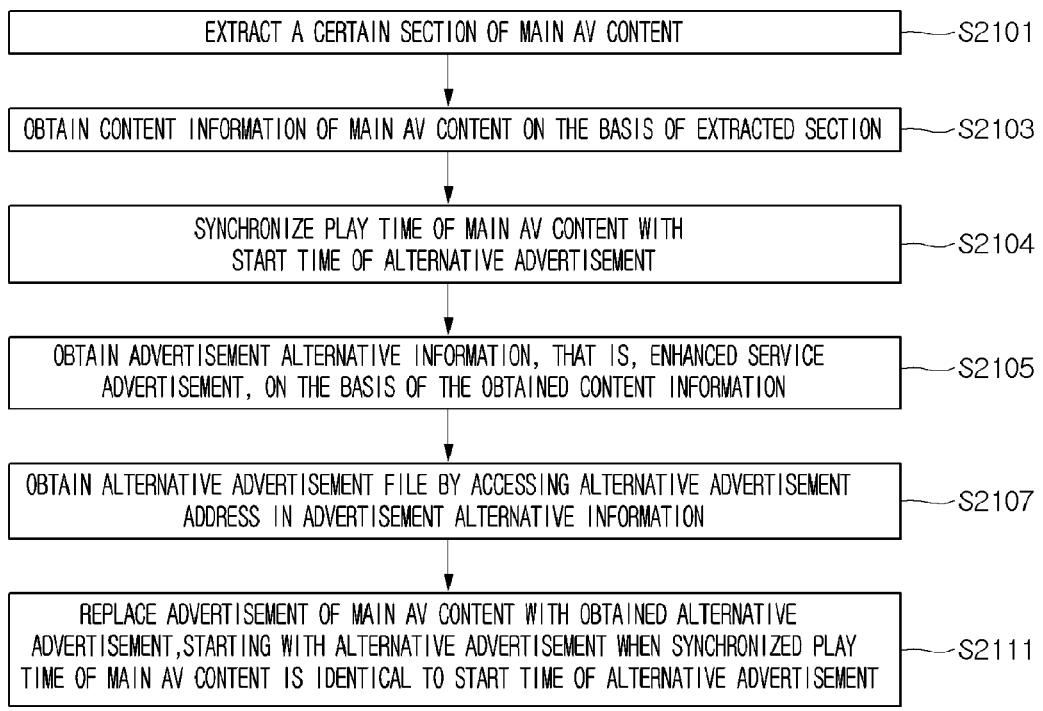

FIG. 135 is a flowchart illustrating an advertisement alternative method according to another embodiment.

First, the enhanced service management unit 530 extracts a certain section of a main AV content in operation S2101.

The enhanced service management unit 530 obtains content information of the main AV content on the basis of the extracted section in operation S2103. At this point, the content of the content information corresponds to Table 18.

The enhanced service management unit 530 synchronizes the play time of the main AV content with the start time of an alternative advertisement in operation S2104.

Then, the enhanced service management unit 530 obtains advertisement alternative information, i.e., enhanced service information, on the basis of the obtained content information in operation S2105.

The enhanced service management unit 530 may receive a query result including both content information and advertisement alternative information of the main AV content. Table 19 illustrates an example of the query result.

TABLE 19

<queryresult>
<content >
< id>Secret Garden</id>
< playtime unit="mm:ss">68:00</playtime>
< broadcastor>SBS </broadcastor>
</content>
<signature>
<starttime unit="ms">78000</starttime>
<endtime unit="ms">79965</endtime>
</signature>
<AD>
<adtype> stream or/and file </adtype>
<category>product</category>
<adname>LG LED DTV </adname>
<starttime unit="ms">95000</starttime>
<endtime unit="ms">110000</endtime>
<adURI>www.lge.co.kr/DTV/lw5700.avi</adURI>
< description>LG 3D smart TV </description>
</AD>
</queryresult>

The enhanced service management unit 530 accesses an alternative advertisement address in the advertisement alternative information to obtain an alternative advertisement file in operation S2107.

If the synchronized play time of the main AV content is identical to the start time of the alternative advertisement, the enhanced service management unit 530 starts the alternative advertisement to replace the advertisement of the main AV content in operation S2511.

Next, a scene related information displaying method will be described according to an embodiment with reference to FIGS. 136 and 143.

Figure 136:
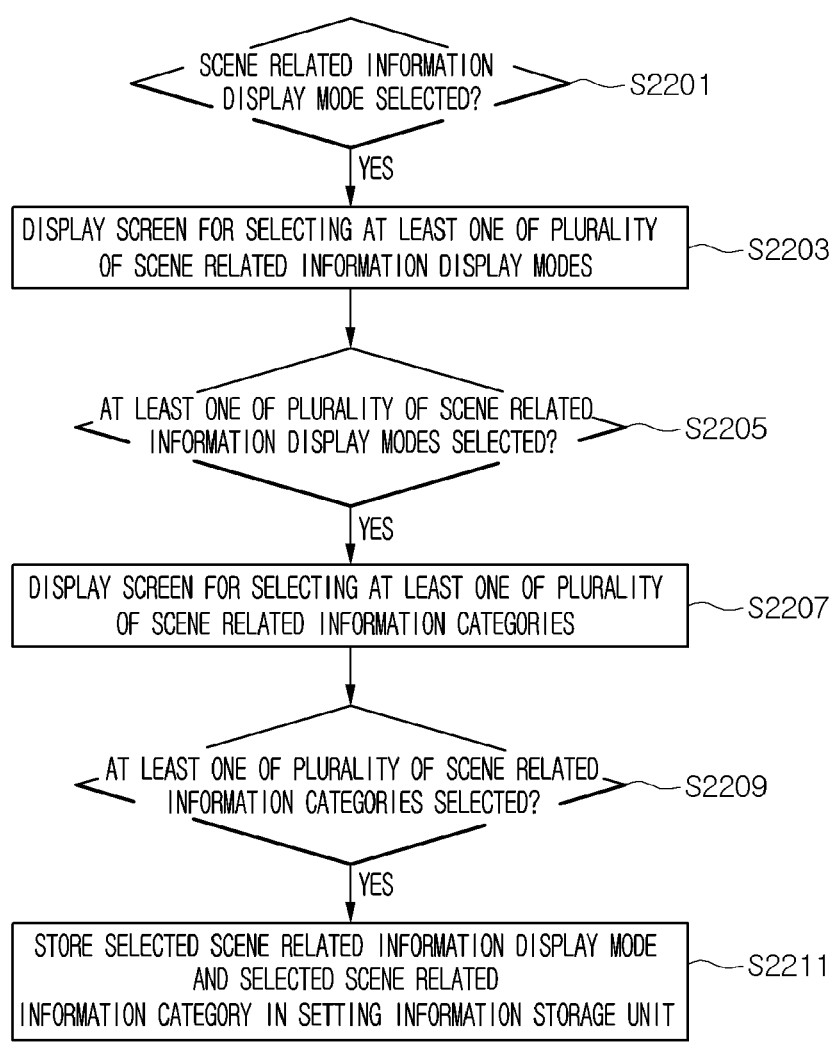
Figure 137:
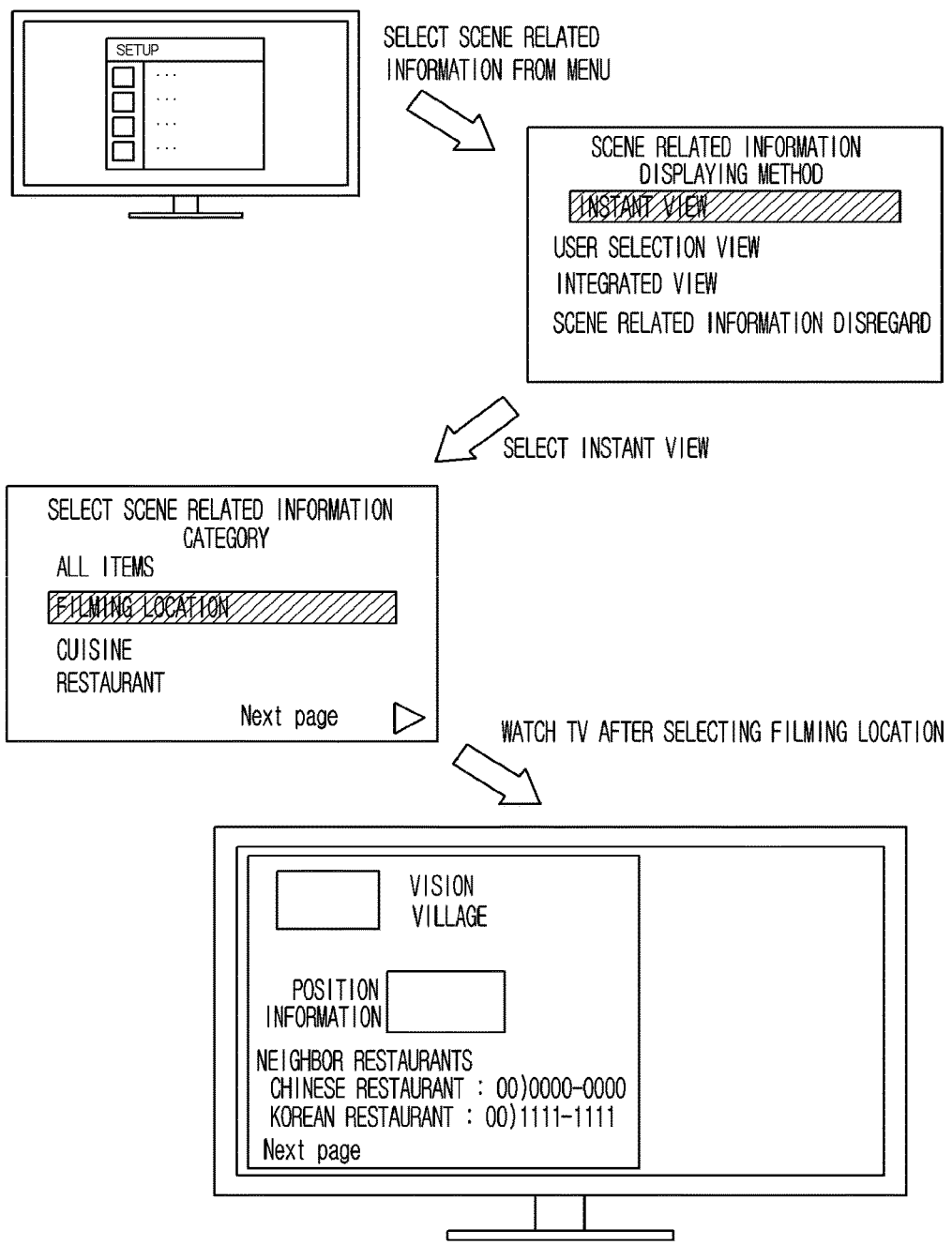

FIG. 136 is a flowchart illustrating a scene related information displaying method according to an embodiment. FIG. 137 is a user interface for selecting a scene related information displaying mode according to an embodiment.

When a user selects the scene related information displaying mode from a plurality of menus by a user in operation S2201, the enhanced service management unit 530 displays a screen for selecting at least one of a plurality of scene related information display modes on the display unit 521 in operation S2203.

As shown in FIG. 137, the plurality of scene related information display modes may include an immediate display mode, a user selection displaying mode, an integrated display mode, and a scene related information disregarding mode.

When one of the plurality of scene related information displaying modes is selected in operation S2205, the enhanced service management unit 530 displays a screen for selecting at least one of a plurality of scene related information category items on the display unit 21 in operation S2207.

As shown in FIG. 137, the plurality of scene related information category items may include various items such as filming places, cuisines, and restaurants.

When at least one of the plurality of scene related information category items is selected in operation S2209, the enhanced service management unit 530 saves the selected scene related information displaying mode and selected scene related information category item on the setting information storage unit 557 in operation S2211.

Figure 138:
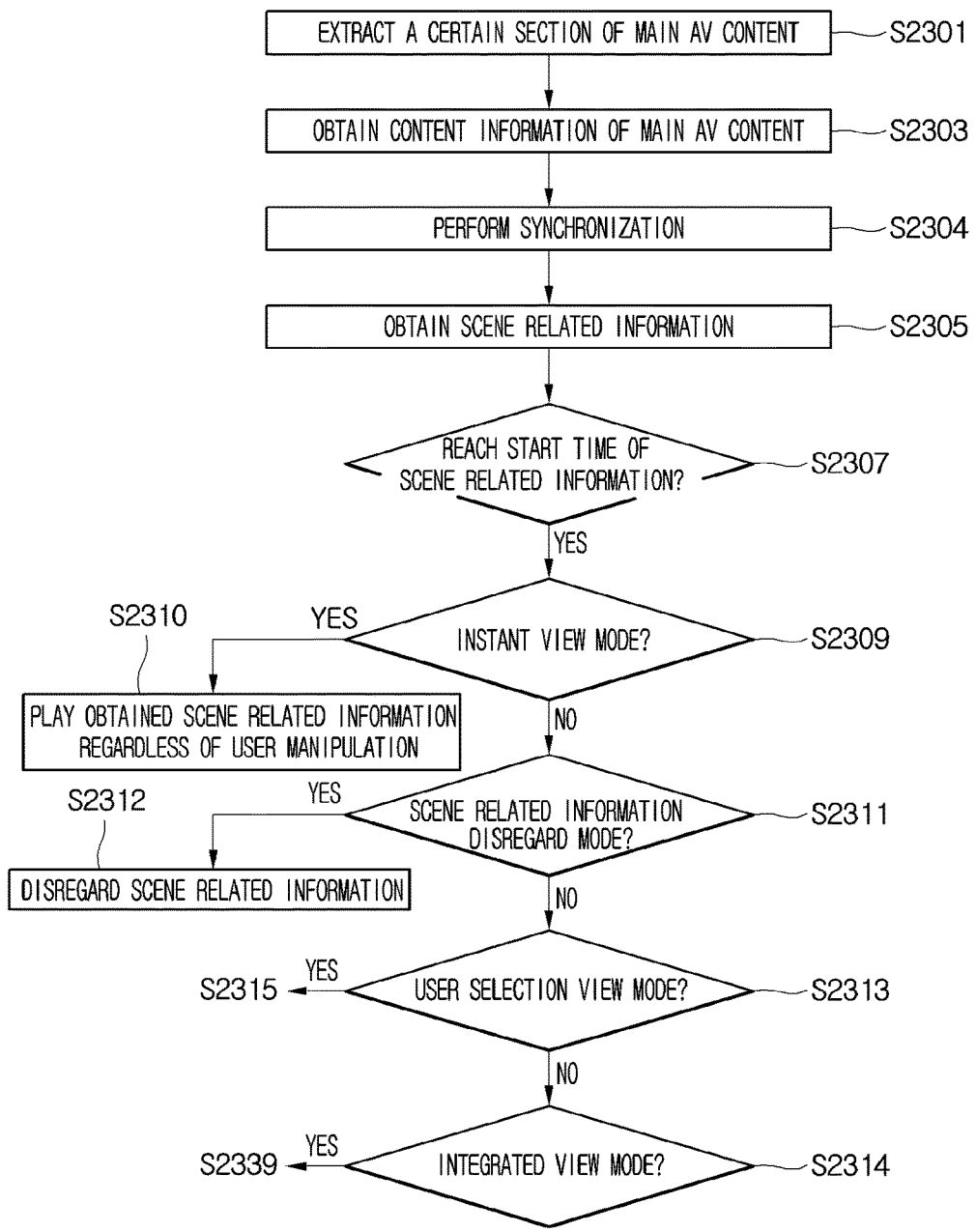

FIG. 138 is flowchart illustrating a scene related information displaying method according to an embodiment.

First, the enhanced service management unit 530 extracts a certain section of a main AV content in operation S2301.

The enhanced service management unit 530 obtains content information of the main AV content on the basis of the extracted section in operation S2303.

The enhanced service management unit 530 synchronizes the play time of the main AV content with the start time of scene related information, i.e., enhanced service information, in operation S2304.

Then, the enhanced service management unit 530 obtains the scene related information, i.e., enhanced service information, on the basis of the obtained content information in operation S2305.

The enhanced service management unit 530 may receive a query result including both content information and scene related information of the main AV content. Table 20 illustrates an example of the query result.

TABLE 20

```
<queryresult>
<content >
< id>Secret Garden</id>
< playtime unit="mm:ss">68:00</playtime>
< broadcastor>SBS </broadcastor>
</content>
<signature>
<starttime unit="ms">78000</starttime>
<endtime unit="ms">79965</endtime>
</signature>
<sceneRelatedInfo>
<category>food</category>
<infoname>food name 1 </infoname>
<starttime unit="ms">95000</starttime>
<endtime unit="ms">110000</endtime>
<icon URI>www.food.co.kr/food/name1.jpg</iconURI>
<infoURI>www.food.co.kr/food/name1.html</infoURI>
< description>food name1's recipe </description>
</sceneRelatedInfo>
</queryresult>
```

The enhanced service management unit 530 accesses a scene related information address in the query result to obtain the scene related information in operation S2307.

If the synchronized play time of the main AV content is identical to the start time of the scene related information in operation S2308, the enhanced service management unit 530 processes the scene related information according to a scene related information displaying mode and scene related information category item saved in the setting information storage unit 557.

At this point, if the selected scene related information displaying mode is an immediate display mode and a category of the obtained scene related information corresponds to a scene related information category item selected related to the selected scene related information displaying mode in operation S2309, the enhanced service management unit 530 plays the obtained scene related information regardless of user's manipulation in operation S2310.

At this point, if the selected scene related information displaying mode is a scene related information disregarding mode and a category of the obtained scene related information corresponds to a scene related information category item selected related to the selected scene related information displaying mode in operation S2311, the enhanced service management unit 530 may disregard the obtained scene related information in operation S2312. That is, the enhanced service management 530 may not display an indicator for scene related information and may not execute scene related information. At this point, if the selected scene related information displaying mode is a scene related information disregarding mode, the enhanced service management unit 530 may disregard the obtained scene related information regardless of the selected scene related information category item.

If the selected scene related information displaying mode is a user selection displaying mode and a category item of the obtained scene related information corresponds to a scene related information category item selected related to the selected scene related information displaying mode in operation S2313, the enhanced service management unit 530 may display an indicator for notifying that there is the obtained scene related information on the display unit 521, and may play the obtained scene related information in correspondence to an enhanced service display user input in the play device 520. This will be described with reference to FIGS. 139 and 140.

Figure 139:
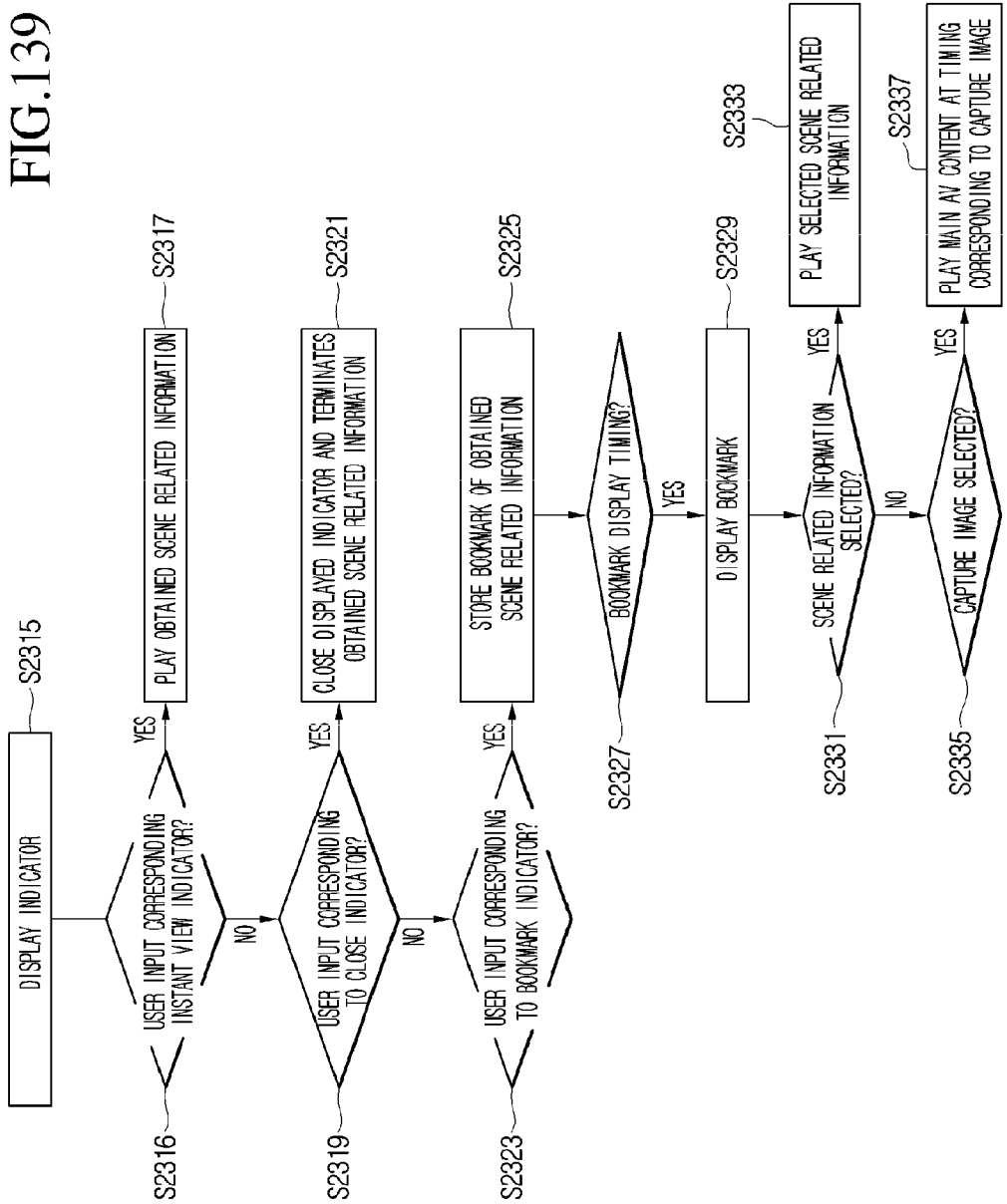
Figure 140:
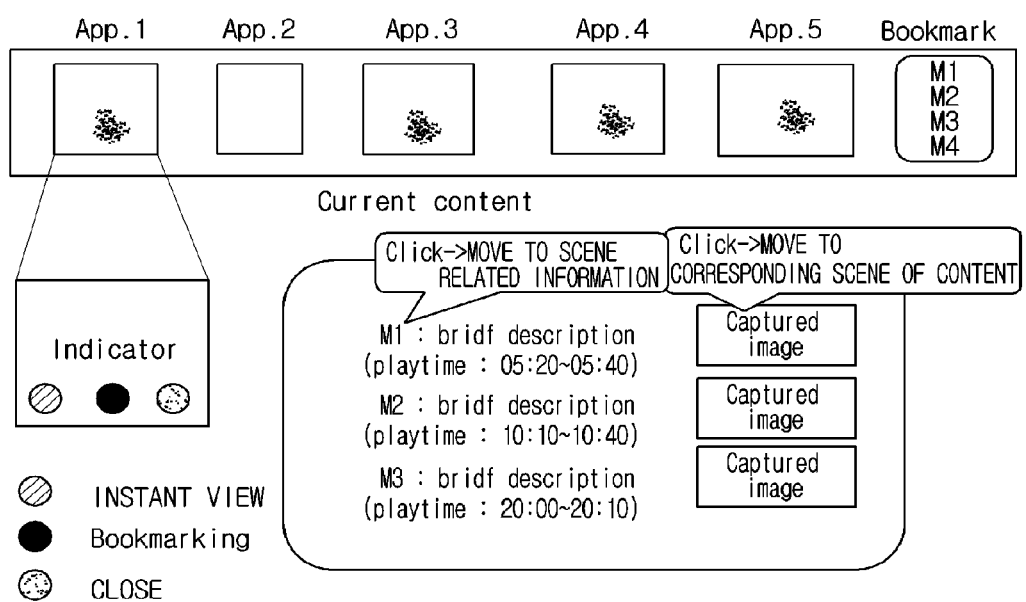

FIG. 139 is a flowchart illustrating a user selection displaying method of scene related information according to an embodiment. FIG. 140 is conceptual diagram illustrating a user selection displaying method of scene related information according to an embodiment.

Once it reaches the start time of an application 1 corresponding to scene related information, the video display device 500 displays at least one indicator on the display unit 521 in operation S2315. As shown in FIG. 140, at least one indicator may include an immediate view indicator, a bookmarking indicator, and a close indicator.

When receiving a user input corresponding to the immediate view indicator in operation S2316, the video display device 500 plays the obtained scene related information in the play device 520 in operation S2317.

When receiving a user input corresponding to the close indicator in operation S2319, the video display device 500 closes the displayed indicator and terminates the obtained scene related information in operation S2321.

When receiving a user input corresponding to the bookmarking indicator in operation S2323, the video display device 500 saves the bookmark of the obtained scene related information in the storage unit 555 in operation S2325. At this point, the bookmark includes a bookmark identifier, a scene related information address, scene related information description, available time of scene related information, and a capture image of a main AV content corresponding to the scene related information.

Later, when the video display device 500 receives a user input corresponding to bookmark display or it reaches a predetermined bookmark display time in operation S2327, the video display device 500 may display at least one bookmark on the display unit 521 in operation S2329. The predetermined set bookmark display time may be the end time of a main AV content. A plurality of bookmarks may be displayed by using a category item and available time as a classifier.

When a user clicks the scene related information address or description in operation S2331, the video display device 500 plays the clicked scene related information in operation S2333.

Additionally, when a user clicks a capture image of a main AV content corresponding to the scene related information in operation S2335, the video display device 500 plays the main AV content at the point corresponding to the capture image in operation S2337. At this point, the video display device 500 may receive the main AV content in a stream format and may play it.

If the selected scene related information displaying mode is an integrated display mode and a category item of the obtained scene related information corresponds to a scene related information category item selected related to the selected scene related information displaying mode in operation S2314, the enhanced service management unit 530 saves the bookmark of the scene related information obtained regardless of user's manipulation in the bookmark storage unit 555. This will be described with reference to FIGS. 141 and 142.

Figure 141:
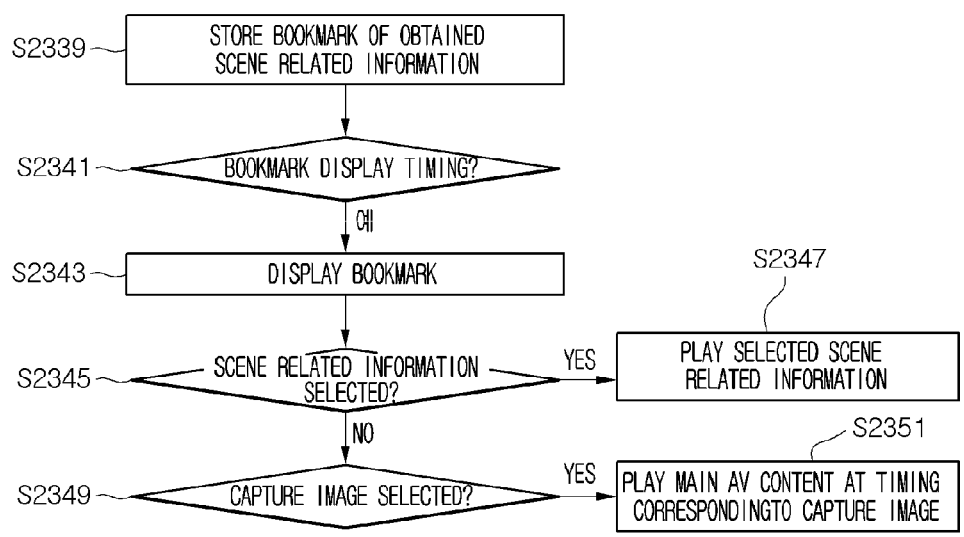
Figure 142:
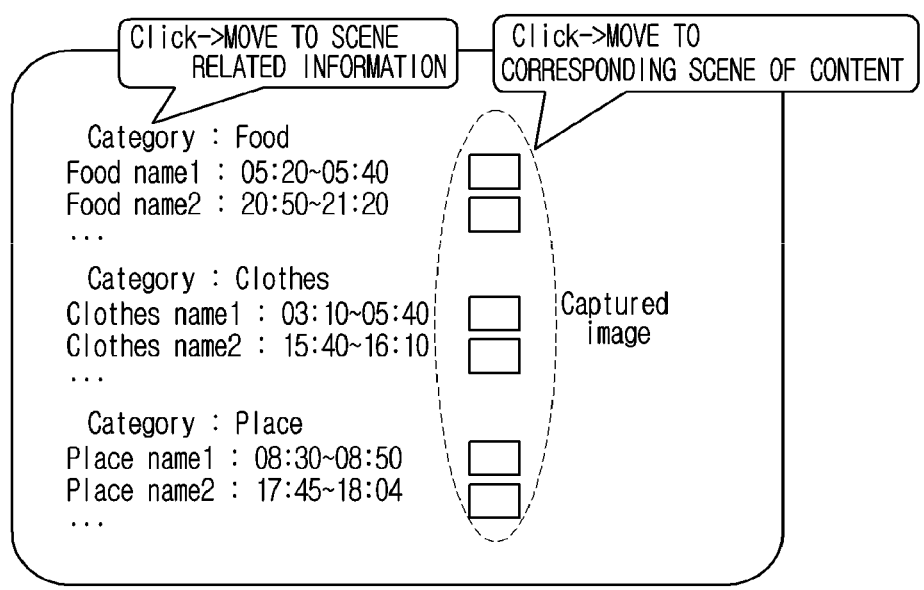

FIG. 141 is a flowchart illustrating a method of displaying integrated scene related information according to an embodiment. FIG. 142 is conceptual diagram illustrating a method of displaying integrated scene related information according to an embodiment.

If the selected scene related information displaying mode is an integrated display mode and a category item of the obtained scene related information corresponds to a scene related information category item selected related to the selected scene related information displaying mode, the enhanced service management unit 500 saves the bookmark of the scene related information obtained regardless of user's manipulation in the bookmark storage unit 555 in operation S2339, without displaying an indicator. At this point, the bookmark includes a bookmark identifier, a scene related information address, scene related information description, available time of scene related information, and a capture image of a main AV content corresponding to the scene related information.

Later, when the video display device 500 receives a user input corresponding to bookmark display or it reaches a predetermined bookmark display time in operation 2341, the video display device 500 may display at least one bookmark on the display unit 521 in operation S2343. The predetermined set bookmark display time may be the end time of a main AV content. As shown in FIG. 142, a plurality of bookmarks may be displayed by using a category item and available time as a classifier.

When a user clicks the scene related information address or description in operation S2345, the video display device 500 plays the clicked scene related information in operation S2347.

Additionally, when a user clicks a capture image of a main AV content corresponding to the scene related information in operation S2349, the video display device 500 plays the main AV content at the point corresponding to the capture image in operation S2351. At this point, the video display device 500 may receive the main AV content in a stream format and may play it.

Figure 143:
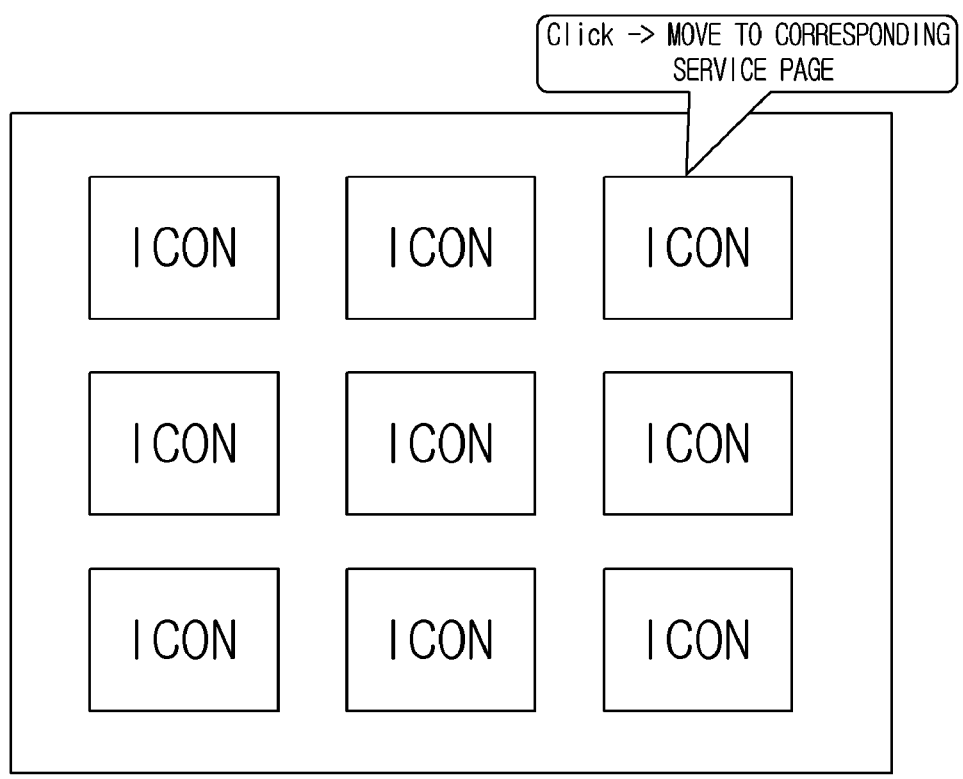

If a method of displaying the integrated scene related information is used as shown in FIG. 143, sponsors of the main AV content may be integrated and displayed.

FIG. 143 illustrates an integrated screen of sponsor advertisements of a main AV content.

As shown in FIG. 143, when the video display device 500 receives a user input corresponding to bookmark display or it reaches a predetermined bookmark display time, the video display device 500 may display an integrated screen of sponsor advertisements of the main AV content. At this point, sponsor advertisement items of the main AV content are displayed in an icon form, and once an icon is clicked, the video display device 500 may display a service page corresponding to the clicked icon.

Next, referring to FIGS. 144 and 148, a method of controlling the video display device 500 according to rating information will be described according to an embodiment.

Figure 144:
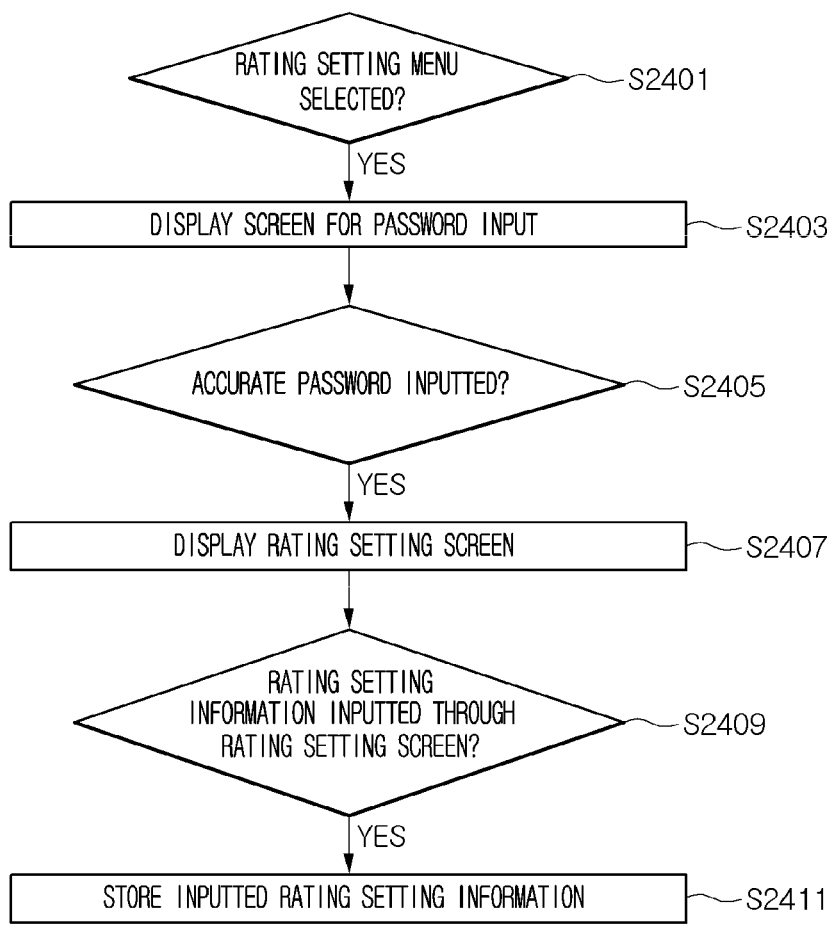

FIG. 144 is a flowchart illustrating a method of saving rating setting information according to an embodiment. FIG. 145 is a user interface for saving rating setting information according to an embodiment.

When a user selects a rating setting menu from a plurality of menus in operation S2401, the management unit 530 displays a screen for password input on the display unit 521 in operation S2403.

If an accurate password is inputted in operation S2405, the enhanced service management unit 530 displays a rating setting screen on the display unit 521 in operation S2407. As shown in FIG. 145, a plurality of rating setting items may be inputted through a rating setting screen. Each rating setting item may include a rating applying time and a rating value. The rating value may include available all ages, available over 7 years, available over 12 years, and available over 19 years.

Once rating setting information is inputted through the rating setting screen in operation S2409, the enhanced service management unit 530 saves the inputted rating setting information in the setting information storage unit 557 in operation S2441.

FIG. 146 is flowchart illustrating a method of playing a rating based main AV content according to an embodiment.

First, the enhanced service management unit 530 extracts a certain section of a main AV content in operation S2501.

The enhanced service management unit 530 obtains content information of the main AV content on the basis of the extracted section in operation S2503. Table 21 illustrates an example of the obtained content information.

TABLE 21

<queryresult>
<content>
<id>Secret Garden</id>
<playtime unit="mm:ss">68:00</playtime>
<broadcastor>SBS </broadcastor>
<rating country="Korea" value="12세이상 시청가" type="방송">
</content>
<signature>
<starttime unit="ms">78000</starttime>
<endtime unit="ms">79965</endtime>
</signature>
</queryresult>

As shown in Table 21, the rating of the current main AV content corresponds to available over 12 years.

The enhanced service management unit 530 determines whether the main AV content rating information in the obtained content information satisfies the set main AV rating information in operation S2505.

If the main AV content rating information in the obtained content information does not satisfy the set main AV rating information, the enhanced service management unit 530 obtains an enhanced service for preventing a main AV content from being played such as mosaic, picture, advertisement, and password input screen and then plays the obtained enhanced service in operation S2507.

If an accurate password is inputted through the password input screen in operation S2509, the enhanced service management unit 530 cancels the enhanced service for preventing the main AV content from being played in operation S2507.

The enhanced service management unit 530 records an event that does not satisfy the set main AV rating information and an event that cancels the enhanced service for preventing the main AV content from being played in operation S2513.

Then, the enhanced service management unit 530 reports the recorded event information to the predetermined e-mail according to a predetermined reporting time or a user request in operation S2515.

FIG. 147 is flowchart illustrating a method of playing a rating based main AV content according to another embodiment.

First, the enhanced service management unit 530 extracts a certain section of a main AV content in operation S2601.

The enhanced service management unit 530 obtains content information of the main AV content on the basis of the extracted section in operation S2603. Table 22 illustrates an example of the obtained content information.

TABLE 22

```
<queryresult>
<content >
<id>Secret Garden</id>
<playtime unit= "mm:ss" >68:00</playtime>
<broadcastor>SBS </broadcastor>
<rating country= "Korea" type= " 방송 " >
</content>
<signature>
<starttime unit= "ms" >78000</starttime>
<endtime unit= "ms" >79965</endtime>
</signature>
<sceneRating>
<scene1 startTime= "30" endTime= "100" value= "12
세 이상 시청가" >
<scene2 startTime= "150" endTime= "300" value= "19
세이상시청가" >
<scene3 startTime= "700" endTime= "1000" value= "19
세이상시청가" >
<scene4 startTime= "3000" endTime= "10000" value= "12
세이상시청가" >
...
</sceneRating>
</queryresult>
```

As shown in Table 22, the content information includes rating information having a plurality of rating information items corresponding to a plurality of time slots, respectively. Each rating information item has a start time, an end time, and a rating value.

In Table 22, a rating value of a time slot between 30 sec and 500 sec of a current main AV content corresponds to available over 12 years; a rating value of a time slot between 15 sec and 300 a sec of a current main AV content corresponds to available over 19 years; a rating value of a time slot between 700 sec and 1000 sec of a current main AV content corresponds to available over 19 years; and a rating value of a time slot between 3000 sec and 10000 sec of a current main AV content corresponds to available over 12 years.

The enhanced service management unit 530 synchronizes the play time of the main AV content with the time of the rating information in operation S2604.

The enhanced service management unit 530 determines whether the rating information at the timing of when the main AV content is played satisfies the set main AV rating information on the basis of the main AV content rating information in the obtained content information in operation S2605.

If the rating information at the timing of when the main AV content is played does not satisfy the set main AV rating information, the enhanced service management unit 530 obtains an enhanced service for preventing a main AV content from being played such as mosaic, picture, advertisement, and password input screen and then plays the obtained enhanced service in operation S2607.

If an accurate password is inputted through the password input screen in operation S2609, the enhanced service management unit 530 cancels the enhanced service for preventing the main AV content from being played in operation S2611.

The enhanced service management unit 530 records an event that does not satisfy the set main AV rating information and an event that cancels the enhanced service for preventing the main AV content from being played in operation S2613.

Then, the enhanced service management unit 530 reports the recorded event information to the predetermined e-mail according to a predetermined reporting time or a user request in operation S2615.

FIG. 148 is flowchart illustrating a method of playing a rating based main AV content according to another embodiment.

First, the enhanced service management unit 530 extracts a certain section of a main AV content in operation S2701.

The enhanced service management unit 530 obtains content information of the main AV content on the basis of the extracted section in operation S2703.

The enhanced service management unit 530 synchronizes the play time of the main AV content with the start time of a deletion section AV content, i.e., enhanced service, in operation S2704.

Then, the enhanced service management unit 530 obtains the enhanced service information on the basis of the obtained content information in operation S2705.

The enhanced service management unit 530 may receive a query result including both content information and enhanced service information of the main AV content. Table 23 illustrates an example of the query result.

Table 23 illustrates an example of the obtained content information.

TABLE 23

```
<queryresult>
<content >
<id>Secret Garden</id>
<playtime unit= "mm:ss" >68:00</playtime>
<broadcastor>SBS </broadcastor>
<rating country= "Korea" type= " 방송 " >
</content>
<signature>
<starttime unit= "ms" >78000</starttime>
<endtime unit= "ms" >79965</endtime>
</signature>
<deletedScene>
```

TABLE 23-continued

```
<scene1 startTime= "30:00" endTime= "35:00" rating= "19
세이상시청가" >
<avlocation> www.movie.com/part/12345.avi</avlocation>
</scene1>
<scene2 startTime= "55:30" endTime= "61:40" rating= "19
세이상시청가" >
<avlocation> www.movie.com/part/12346.avi</avlocation>
</scene2>
</deletedScene>
</queryresult>
```

As shown in Table 23, the content information includes rating information having a plurality of rating information items corresponding to a plurality of time slots, respectively. Each rating information item has a start time, an end time, a rating value, and a deletion AV content address.

As shown in Table 23, a rating value of a time slot between 30 min and 35 min of a current main AV content corresponds to available over 19 years, and an AV content of a deleted corresponding time slot is obtained from a deletion AV content address "www.movie.com/part/12345.avi". A rating value of a time slot between 55 min 30 sec and 61 min 40 sec of a current main AV content corresponds to available over 19 years, and an AV content of a deleted corresponding time slot is obtained from a deletion AV content address "www.movie.com/part/12346.avi".

The enhanced service management unit 530 accesses an address of an AV content of a deletion section to obtain the deleted AV content in operation S2707.

The enhanced service management unit 530 determines whether the rating information of the AV content in the deletion section satisfies the set main AV rating information in operation S2709.

If the rating information of the AV content in the deletion section satisfies the set main AV rating information and the synchronized play time of the main AV content is identical to the start time of the AV content in the deletion section, the enhanced service management unit 530 stops playing the main AV content, saves the received main AV content, and plays the AV content in the deletion time slot in operation S2711.

If the synchronized play time of the main AV content is identical to the end time of the AV content in the deletion section, the enhanced service management unit 530 plays the saved main AV content from the time of when the main AV content playback stops to provide a continuous AV content in operation S2712.

The enhanced service management unit 530 records an event that plays a main AV content in the deletion time slot in operation S2713.

Then, the enhanced service management unit 530 reports the recorded event information to the predetermined e-mail according to a predetermined reporting time or a user request in operation S2715.

Next, a usage information reporting method will be described according to an embodiment with reference to FIGS. 149 and 157.

The video display device 500 may include an operation for registering itself to a usage information measuring server to report usage information, an operation for obtaining usage information, and an operation for reporting and using usage information.

FIG. 149 is flowchart illustrating a method of registering to a usage information measuring server according to an embodiment.

As shown in FIG. 149, the video display device 500 communicates with the usage information measuring server 80. The usage information measuring server 80 may be one module in the content providing server 10, the content recognizing service providing server 20, the multi channel video distributing server 30, the enhanced service information providing server 40, the plurality of enhanced service providing servers 50, the broadcast receiving device 60, or the video display device 500, or may be an additional server inside or outside a home.

First, the video display device 500 collects user information in operation S2801. The video display device 500 receives and collects account information, family member information, preferred genre information, and usage information range from a user, and then, saves the collected user information in the user information storage unit 556. The video display device 500 may collect video display device information from the user information storage unit 556.

Then, the video display device 500 generates a registration request message including the collected user information in operation S2803. The registration request message may include an XML type document as shown in FIG. 550.

FIG. 150 is a view illustrating an XML schema of user information according to an embodiment.

As shown in FIG. 150, a UserProfile element containing user information has id, password, and terminalID attributes and Region, Demographic, Favorite, SNS, and Terminal elements.

The id and password attributes include account information for the usage information measuring server 80. The terminalID attribute includes an identifier of the video display device 500.

The Region element includes Country, City, Address, and Zip elements. The Country element includes country information; the City element includes city information; the Address element includes address information; and the Zip element includes zip code. Information in the Region element allows different advertisement and product introduction according to a region.

The Demographic element includes Age, Sex, Religion, Income, and Family Type elements. The Age element includes age information; the Sex element includes sex information; and the Religion element includes religion information. The Income element includes household income information, and the Family Type element includes family member type information. Information in the Demographic element allows customized service according to a family member type.

The Favorite element includes MainCategory and SubCategory elements. The MainCategory element includes a main preferred genre, and the SubCategory element includes a sub preferred genre.

The SNS element includes Facebook and Twitter elements. The Facebook element includes Facebook account information, and the Twitter element includes Twitter account information.

The Terminal element includes Type, Manufacturer, FirmwareVer, Resolution, Model, OS, Browser, Storage, and Network elements. The type element includes video display device type information; the Manufacturer element includes video display manufacturer information; and the FirmwareVer element includes firmware version information of a video display device. The Resolution element includes resolution information and a video display device; the Model element includes model information of a video display device; and the OS element includes OS information of a video display device. The Browser element includes browser information and a video display device; the Storage element includes storage information of a video display device; and the Network element includes network information of a video display device.

Moreover, the registration request message may further include a usage information range. The usage information range may be set in each virtual channel. Additionally, the usage information range may be set over an entire physical channel.

The video display device 500 transmits the generated registration request message to the usage information measuring server 80 to request a registration in operation S2805.

FIG. 151 is flowchart illustrating a method of obtaining, reporting, and using usage information according to an embodiment.

First, the enhanced service management unit 530 extracts a certain section of a main AV content in operation S2901.

The enhanced service management unit 530 obtains content information of the main AV content on the basis of the extracted section in operation S2903. In more detail, the enhanced service management unit 530 decodes information encoded with invisible watermark in the extracted section to obtain content information. Additionally, the enhanced service management unit 530 may extract feature information in the extracted section, and obtain the content information of the main AV content from the fingerprint server 22 or the content information storage unit 551 on the basis of the extracted feature information.

The enhanced service management unit 530 synchronizes the play time of the main AV content with the start time of enhanced service information in operation S2904.

Then, the enhanced service management unit 530 obtains the enhanced service information on the basis of the obtained content information in operation S2905.

The enhanced service management unit 530 obtains an enhanced service on the basis of the obtained content information in operation S2907.

The enhanced service management unit 530 collects main AV content watching information in a usage information range on the basis of continuously obtained content information in operation S2909, and saves the collected main AV content watching information in the usage information storage unit 557. The main AV content watching information may include a main AV content identifier and main AV watching time information. The main AV content watching time information may include the watching start time of and watching end time of the main AV content.

The enhanced service management unit 530 collects enhanced service usage information in a usage information range on the basis of a user input corresponding to the execution, manipulation, and ending of the obtained enhanced service in operation S2911, and saves the collected enhanced service usage information in the usage information storage unit 557. The enhanced service usage information may include an enhanced service identifier and enhanced service usage time information. The enhanced service usage time information may include the usage start time and usage end time of the enhanced service.

The enhanced service management unit 530 obtains the address and reporting period of the usage information measuring server 80 in operation S2913. The address and reporting period of the usage information measuring server 80 may be predetermined. The enhanced service management unit 530 obtains the address and reporting period of the usage information measuring server 80 from the content information or enhanced service information.

In the other hand, the enhanced service management unit 530 obtains content information and enhanced service information on the basis of the extracted main AV content section, and obtains ATSC 2.0 metadata from the obtained information. The enhanced service management unit 530 extracts a usage reporting location table such as Table 34 or Table 25 from a service signaling channel of an ATSC 2.0 metadata service, and obtains a reporting address and reporting period from the table. The usage reporting location table may have a low signaling period such as a 1 min period, and this may reduce bandwidth usage.

TABLE 24

| Syntax | No. BIts | Format |
|---|---|---|
| usage_reporting_location_table_section( ) { | | |
|     table_id | 8 | 0xTBD |
|     section_syntax_indicator | 1 | '0' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     num_usage_reporting_location_in_section | 8 | uimsbf |
|     URL_count | 5 | uimsbf |
|     for (i=0; i<URL_count ; i++) { | | uimsbf |
|         type_of_URL | 3 | uimsbf |
|         reserved | 5 | uimsbf |
|         URL_length | 8 | uimsbf |
|         URL( ) | var | uimsbf |
|         reporting_interval | 5 | uimsbf |
|     } | | |
| } | | |

As shown in Table 24, the usage reporting location table may signal a plurality of reporting addresses and reporting periods. The plurality of reporting periods correspond to the plurality of reporting addresses, respectively.

TABLE 25

| Syntax | No. BIts | Format |
|---|---|---|
| usage_reporting_location_table_section( ) { | | |
|     table_id | 8 | 0xTBD |
|     section_syntax_indicator | 1 | '0' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     num_usage_reporting_location_in_section | 8 | uimsbf |
|     reporting_interval | 5 | uimsbf |
|     URL_count | 5 | uimsbf |
|     for (i=0; i<URL_count ; i++) { | | uimsbf |
|         type_of_URL | 3 | uimsbf |
|         reserved | 5 | uimsbf |
|         URL_length | 8 | uimsbf |
|         URL( ) | var | uimsbf |
|     } | | |
| } | | |

As shown in Table 25, the usage reporting location table may signal a plurality of reporting addresses and one common reporting period.

The enhanced service management unit 530 generates reporting information including at least one main AV content watching information item and at least one enhanced service usage information item in operation S2915.

Examples of a main AV content watching information item and an enhanced service usage information item will be described with reference to FIGS. 151 and 153.

FIG. 152 is an XML schema of a main AV content watching information item according to an embodiment.

As shown in FIG. 152, an AudienceMeasurement element corresponding to the main AV content watching information item includes an id attribute, a password attribute, and a terminalID attribute, and a ContentInfo element and a TimeInfo element.

The id and password attributes include account information for the usage information measuring server 80. The terminalID attribute includes an identifier of the video display device 500.

The ContentInfo element includes an Id element, a Name element, a ChallelName element, a Country element, a Genre element, and an HD element.

The ID element includes a main AV content identifier. Especially, as the main AV content identifier, the Id element may include a transport stream identifier Transport Stream ID, a source identifier source_id, an ATSC content identifier, or a global service identifier.

The Name element includes a main AV content name; the ChannelName element includes a channel name of a broadcasted main AV content; the Country element includes country information of a broadcasted main AV content; and the Genre element includes genre information of a main AV content.

The TimeInfo element includes a TotalWatchingTime element and a Slot element.

The TotalWatchingTime element includes a main AV content watching time information.

An example of the enhanced service usage information item will be described with reference to FIG. 553.

FIG. 153 is an XML schema of an enhanced service usage information item according to an embodiment.

As shown in FIG. 153, a UsageMonitor element corresponding to the enhanced service usage information item includes an id attribute, a password attribute, a terminalID attribute, and a ServiceInfo element.

The ServiceInfo element includes a bound attribute and a simplyDisplay attribute, and an Id element, a Name element, a Category element, a Purchase element, and a UserInteraction element.

The bound attribute is set with bound or unbound. The bound means that an enhanced service is linked with a main AV content, and the unbound means that an enhanced service is not linked with a main AV content.

The simplyDisplay attribute is set with a simple information display or user interaction.

The Id element includes an enhanced service identifier; the Name element includes an enhanced service name; and the category element includes an enhanced service category.

The Purchase element includes a ProductName element, a MakerName element, an AdditionalInfo element, a Price element, and a ContentID element. The ProductName element includes an enhanced service product name; the MakerName element includes a manufacturer name of an enhanced service product; the AdditionalInfo element includes additional information on an enhanced service; the Price element includes price information of an enhanced service product; and a ContentID element includes a content identifier of an enhanced service product.

The UserInteraction element includes a Time element and a Level element.

The Time element includes a From element and a To element. The From element includes an enhanced service usage start time and the To element includes an enhanced service usage end time.

The Level element includes information on no interaction, trigger selection, advertisement content watching, product purchase, and full interaction.

Moreover, as shown in Table 26, contents of the ID element and time element may vary according to a category of an enhanced service.

TABLE 26

| Category | Field Name | Descriptions |
|---|---|---|
| Web Bookmark | TSID | TSID(Transport Stream ID) in currently watching |
| | Set_time | Time for setting Web Bookmark |
| | Follow_time | Time for again accessing Web Bookmark and using enhanced service |
| NRT service | TSID | TSID received/receiving NRT content |
| | Source_id | source_id of NRT content |
| | Service_id | Serviceid of NRT content |
| | Content_linkage | content_linkage of NRT content |
| | Action | Download start/Download end/Subscribe/Unsubscribe/launching/Terminating |
| | Stat_time | Action start time for NRT content |
| | End_time | Action end time for NRT content (there may be no meaning according to Action) |

As shown in Table 26, if the enhanced service corresponds to a web bookmark service, the Id element includes TSID, and the Time element includes the time for setting a Web Bookmark and the time of when an enhanced service used after accessing the Web Bookmark again.

If the enhanced service corresponds to a non-real-time (NRT) service, the Id element includes TSID, source_id, service_id, and content_linkage, and the Time element includes Action, start_time, and end_time.

The enhanced service management unit 530 logs in the usage information measuring server 80 through account information in operation S2917. This operation may be omitted if necessary.

The enhanced service management unit 530 transmits reporting information to the usage information measuring server 80 corresponding to a reporting address in a reporting period in operation S2919. At this point, the enhanced service management unit 530 transmits the reporting information through HTTP request and terminates the reporting when receiving HTTP reply. Additionally, the enhanced service 530 transmits an HTTP request including a unique identifier such as the identifier of the video display device 500 to the usage information measuring server 80, and transmits reporting information after receiving a reply including a reporting request from the usage information measuring server 80.

The usage information measuring server 80 provides the accumulated usage information to the content providing server 10 in operation S2921, in order to allow the content providing server 10 to use it. Especially, the content providing server 10 provides customizing content and target advertisement, and charges for a bill on the basis of the accumulated usage information.

Moreover, the usage information measuring server 80 may recognize statistical and behavioral characteristics of a user on the basis of viewer information and reported usage information in operation S2923.

The enhanced service management unit 530 obtains various enhanced services on the basis of the obtained user characteristics in operation S2925. A user characteristic based enhanced service will be described with reference to FIGS. 154 to 157. If the usage information measuring server 80 is one module in the video display device 500, the enhanced service management unit 530 may obtain an enhanced service from the enhanced service storage unit 552. If the usage information measuring server 80 is one module in the content providing server 10, the content recognizing service providing server 20, the multi channel video distributing server 30, the enhanced service information providing server 40, the plurality of enhanced service providing servers 50, or the broadcast receiving device 60, it may obtain an enhanced service from a corresponding device.

FIGS. 154 to 157 are conceptual diagrams of a user characteristic based enhanced service according to an embodiment.

As shown in FIG. 154, a user characteristic is that a user enjoys watching a specific AV content. In this case, the enhanced service management unit 530 may obtain an enhanced service that recommends a change to a channel in which a specific AV content is broadcasted. The enhanced service management unit 530 displays the obtained enhanced service, and receives and plays an AV content of a corresponding channel when receiving a user input for channel change confirmation.

As shown in FIG. 155, a user characteristic is that a user enjoys watching a specific genre. In this case, the enhanced service management unit 530 may obtain an enhanced service that recommends a current AV content or enhanced service corresponding to a user's favorite genre. The enhanced service management unit 530 displays the obtained enhanced service, and receives and plays a corresponding AV content or enhanced service when receiving a user input for watching confirmation.

Figure 156:
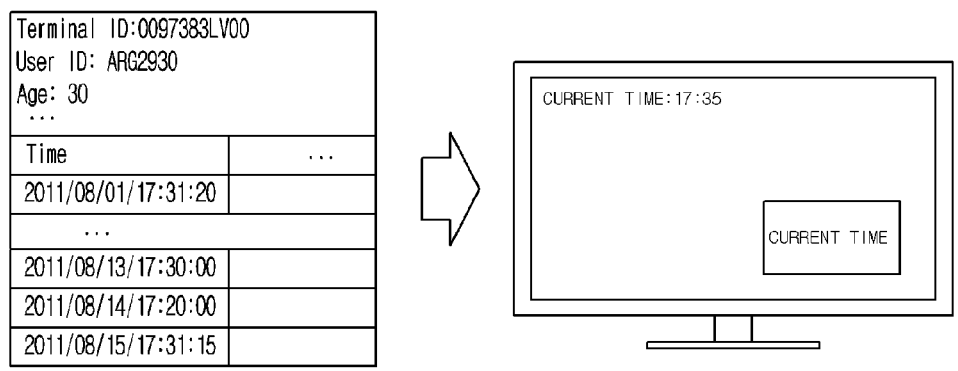

As shown in FIG. 156, a user characteristic is that a user enjoys watching TV at a specific time. In this case, the enhanced service management unit 530 may receive a target advertisement for the specific time that a user usually watches TV, and may play the received target advertisement.

Figure 157:
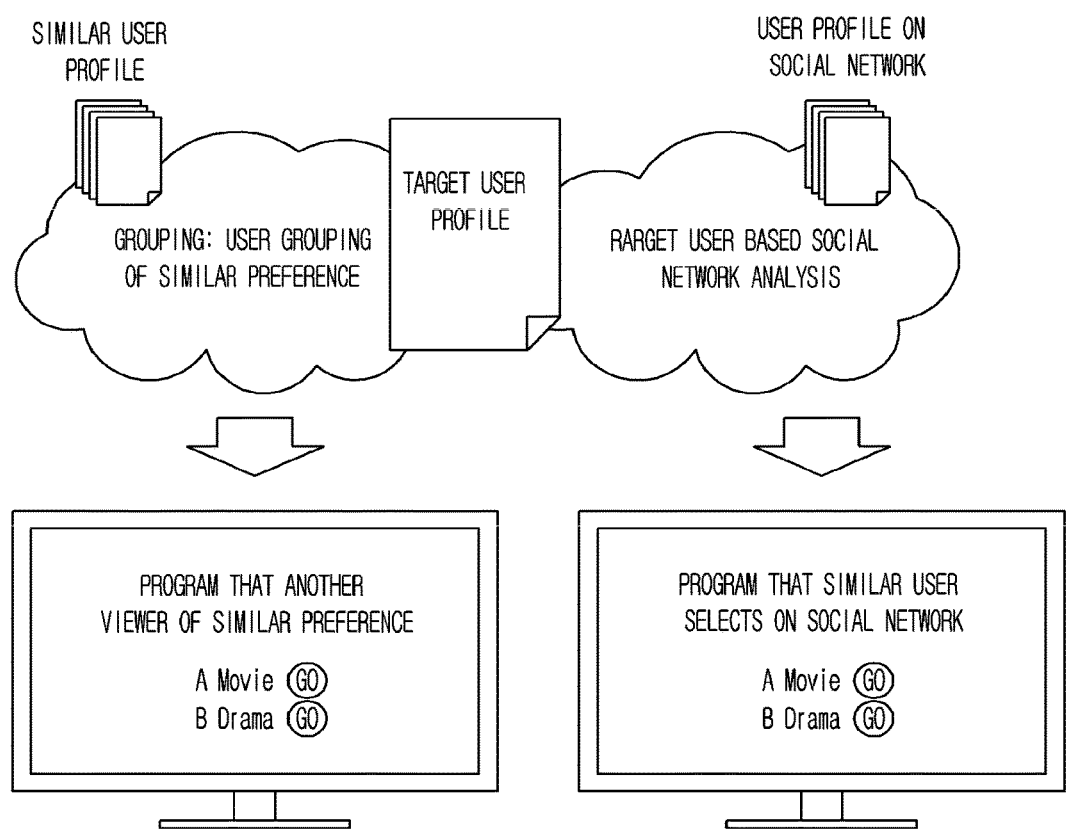

As shown in FIG. 157, users having similar user characteristic may be grouped. On the basis of determining which user of the video display device 500 is included which group, contents or enhanced services that users of a corresponding group prefer most may be recommend. The enhanced service management unit 530 obtains an enhanced service, which recommends an AV content that a user having similar user characteristic selects or watches currently. Additionally, the enhanced service management unit 530 obtains an enhanced service, which recommends an AV content that a similar user on a social network selects or watches currently.

Next, a structure of a video display device according to various embodiments will be described with reference to FIGS. 158 and 159.

FIG. 158 is a block diagram illustrating a structure of a fingerprint based video display device according to another embodiment.

As shown in FIG. 158, a tuner 501 extracts a symbol from an 8-VSB RF signal transmitted through an air channel.

An 8-VSB demodulator 503 demodulates the 8-VSB symbol that the tuner 501 extracts and restores meaningful digital data.

A VSB decoder 505 decodes the digital data that the 8-VSB demodulator 503 to restore an ATSC main service and ATSC M/H service.

An MPEG-2 TP Demux 507 filters a Transport Packet that the video display device 500 is to process from an MPEG-2 Transport Packet transmitted through an 8-VSB signal or an MPEG-2 Transport Packet saved in a PVR Storage to relay the filtered Transport Packet into a processing module.

A PES decoder 539 buffers and restores a Packetized Elementary Stream transmitted through an MPEG-2 Transport Stream.

A PSI/PSIP decoder 541 buffers and analyzes PSI/PSIP Section Data transmitted through an MPEG-2 Transport Stream. The analyzed PSI/PSIP data are collected by a Service Manager (not shown), and then, is saved in DB in a form of Service Map and Guide data.

A DSMCC Section Buffer/Handler 511 buffers and processes DSMCC Section Data for file transmission through MPEG-2 TP and IP Datagram encapsulation.

An IP/UDP Datagram Buffer/Header Parser 513 buffers and restores IP Datagram, which is encapsulated through DSMCC Addressable section and transmitted through MPEG-2 TP to analyze the Header of each Datagram. Additionally, an IP/UDP Datagram Buffer/Header Parser 513 buffers and restores UDP Datagram transmitted through IP Datagram, and then analyzes and processes the restored UDP Header.

A Stream component handler 557 may include ES Buffer/Handler, PCR Handler, STC module, Descrambler, CA Stream Buffer/Handler, and Service Signaling Section Buffer/Handler.

The ES Buffer/Handler buffers and restores an Elementary Stream such as Video and Audio data transmitted in a PES form to deliver it to a proper A/V Decoder.

The PCR Handler processes Program Clock Reference (PCR) Data used for Time synchronization of Audio and Video Stream.

The STC module corrects Clock values of the A/V decoders by using a Reference Clock value received through PCR Handler to perform Time Synchronization.

When scrambling is applied to the received IP Datagram, the Descrambler restores data of Payload by using Encryption key delivered from the CA Stream Handler.

The CA Stream Buffer/Handler buffers and processes Data such as Key values for Descrambling of EMM and ECM, which are transmitted for a Conditional Access function through MPEG-2 TS or IP Stream. An output of the CA Stream Buffer/Handler is delivered to the Descrambler, and then, the descrambler descrambles MPEG-2 TP or IP Datagram, which carriers A/V Data and File Data.

The Service Signaling Section Buffer/Handler buffers, restores, and analyzes NRT Service Signaling Channel Section Data transmitted in a form of IP Datagram. The Service Manager (not shown) collects the analyzed NRT Service Signaling Channel Section data and saves them in DB in a form of Service Map and Guide data.

The A/V Decoder 561 decodes the Audio/Video data received through an ES Handler to present them to a user.

An MPEG-2 Service Demux (not shown) may include an MPEG-2 TP Buffer/Parser, a Descrambler, and a PVR Storage module.

An MPEG-2 TP Buffer/Parser (not shown) buffers and restores an MPEG-2 Transport Packet transmitted through an 8-VSB signal, and also detects and processes a Transport Packet Header.

The Descrambler restores the data of Payload by using an Encryption key, which is delivered from the CA Stream Handler, on the Scramble applied Packet payload in the MPEG-2 TP.

The PVR Storage module saves an MPEG-2 TP received through an 8-VSB signal at the user's request and outputs an MPEG-2 TP at the user's request. The PVR storage module may be controlled by the PVR manager (not shown).

The File Handler 551 may include an ALC/LCT Buffer/Parser, an FDT Handler, an XML Parser, a File Reconstruction Buffer, a Decompressor, a File Decoder, and a File Storage.

The ALC/LCT Buffer/Parser buffers and restores ALC/LCT data transmitted through a UDP/IP Stream, and analyzes a Header and Header extension of ALC/LCT. The ALC/LCT Buffer/Parser may be controlled by an NRT Service Manager (not shown).

The FDT Handler analyzes and processes a File Description Table of FLUTE protocol transmitted through an ALC/LCT session. The FDT Handler may be controlled by an NRT Service Manager (not shown).

The XML Parser analyzes an XML Document transmitted through an ALC/LCT session, and then, delivers the analyzed data to a proper module such as an FDT Handler and an SG Handler.

The File Reconstruction Buffer restores a file transmitted through an ALC/LCT, FLUTE session.

If a file transmitted through an ALC/LCT and FLUTE session is compressed, the Decompressor performs a process to decompress the file.

The File Decoder decodes a file restored in the File Reconstruction Buffer, a file decompressed in the decompressor, or a film extracted from the File Storage.

The File Storage saves or extracts a restored file if necessary.

The M/W Engine (not shown) processes data such as a file, which is not an A/V Stream transmitted through DSMCC Section and IP Datagram. The M/W Engine delivers the processed data to a Presentation Manager module.

The SG Handler (not shown) collects and analyzes Service Guide data transmitted in an XML Document form, and then, delivers them to the EPG Manager.

The Service Manager (not shown) collects and analyzes PSI/PSIP Data transmitted through an MPEG-2 Transport Stream and Service Signaling Section Data transmitted through an IP Stream, so as to produce a Service Map. The Service Manager (not shown) saves the produced service map in a Service Map & Guide Database, and controls an access to a Service that a user wants. The Service Manager is controlled by the Operation Controller (not shown), and controls the Tuner 501, the MPEG-2 TP Demux 507, and the IP Datagram Buffer/Handler 513.

The NRT Service Manager (not shown) performs an overall management on the NRT service transmitted in an object/file form through a FLUTE session. The NRT Service Manager (not shown) may control the FDT Handler and File Storage.

The Application Manager (not shown) performs overall management on Application data transmitted in a form of object and file.

The UI Manager (not shown) delivers a user input to an Operation Controller through a User Interface, and starts a process for a service that a user requests.

The Operation Controller (not shown) processes a command of a user, which is received through a UI Manager, and allows a Manager of a necessary module to perform a corresponding action.

The Fingerprint Extractor 565 extracts fingerprint feature information from an AV stream.

The Fingerprint Comparator 567 compares the feature information extracted by the Fingerprint Extractor with a Reference fingerprint to find an identical content. The Fingerprint Comparator 567 may use a Reference fingerprint DB saved in local and may query a Fingerprint query server on the internet to receive a result. The matched result data obtained by a comparison result may be delivered to Application and used.

As an ACR function managing module or an application module providing an enhanced service on the basis of ACR, the Application 569 identifies a broadcast content in watching to provide an enhanced service related to it.

FIG. 159 is a block diagram illustrating a structure of a watermark based video display device according to another embodiment.

Although the watermark based video display device of FIG. 159 is similar to the fingerprint based video display device of FIG. 158, the fingerprint based video display device does not includes the Fingerprint Extractor 565 and the Fingerprint Comparator 567, but further includes the Watermark Extractor 566.

The Watermark Extractor 566 extracts data inserted in a watermark format from an Audio/Video stream. The extracted data may be delivered to an application and used.

Moreover, the above methods of the present invention can also be embodied as computer readable codes on a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The configurations and methods of the above-described embodiments are applied to the video display device without any restriction, and all or some of the embodiments may be selectively combined to have various modifications.

The invention claimed is:

1. A method for a broadcast transmitting device, comprising:
   configuring transport packet for broadcast, wherein a header of a video stream includes digital TV closed Caption (DTV-CC)
   transmitting the transport packet,
   wherein the DTV-CC includes extended characters including Uniform Reference Indicator (URI) string and trigger information of an event for an application,
   wherein the trigger information includes activation trigger information,
   wherein the URI string is used for obtaining a parameter table that describes a segment of program,
   wherein the parameter table includes protocol version element representing version number of the parameter table, id element representing the segment described by the parameter table,
   and capability element representing capacity necessary for presenting the application,
   wherein the parameter table includes live trigger element specifying information used for activation trigger information,
   wherein the live trigger element includes URL element of a server providing the activation trigger information, delivery type element representing protocol for receiving updated activation trigger information, and poll period element representing a period for receiving activation trigger information, wherein the parameter table includes an application element representing the application while the parameter table describes the segment,
wherein the application element includes content item element representing a content item including at least one data file that the application requires,
wherein the application element includes event element representing an event for the application,
wherein the application element includes appID element identifying the application within the segment described by the parameter table,
wherein the event element includes eventID element identifying the event for the application,
wherein the event for the application is referenced to the activation trigger information through a combination of the appID element and the eventID element.

2. The method of claim 1,
wherein the transport packet includes video or audio data,
wherein the information of an event for an application is delivered via a watermark, which is included in the video or audio data.

3. The method of claim 1,
wherein the event includes a service for a bookmark.

* * * * *